(12) United States Patent
Yang et al.

(10) Patent No.: US 9,652,678 B2
(45) Date of Patent: *May 16, 2017

(54) METHOD AND DEVICE FOR REPRODUCING CONTENT

(71) Applicant: SAMSUNG ELECTRONICS CO., LTD., Suwon-si (KR)

(72) Inventors: Pil-seung Yang, Seoul (KR); Da-hye Park, Suwon-si (KR); Seol-hye Won, Seoul (KR); In-kuk Yun, Suwon-si (KR); Yong-gook Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,111

(22) Filed: May 22, 2015

(65) Prior Publication Data

US 2015/0339051 A1  Nov. 26, 2015

Related U.S. Application Data

(63) Continuation-in-part of application No. 14/497,451, filed on Sep. 26, 2014.

(30) Foreign Application Priority Data

May 23, 2014 (KR) ......... 10-2014-0062621
Feb. 6, 2015 (KR) ......... 10-2015-0018871

(51) Int. Cl.
*G06K 9/00* (2006.01)
*G06F 3/0488* (2013.01)
(Continued)

(52) U.S. Cl.
CPC ....... *G06K 9/00872* (2013.01); *G06F 3/0482* (2013.01); *G06F 3/0488* (2013.01);
(Continued)

(58) Field of Classification Search
CPC ............ G06F 3/04883; G06F 3/03545; G06F 17/243; G06K 9/00402; G06K 9/00436; G06K 9/00865
(Continued)

(56) References Cited

U.S. PATENT DOCUMENTS 6,774,939 B1  8/2004  Peng
8,121,463 B2  2/2012  McCrossan et al.
(Continued)

FOREIGN PATENT DOCUMENTS

KR  10-2013-0027973 A  3/2013
WO        9428480 A1   12/1994

OTHER PUBLICATIONS

Communication dated Jul. 30, 2015, issued by the International Searching Authority in counterpart International Application No. PCT/KR2015/005211 (PCT/ISA/210 and PCT/ISA/237).
(Continued)

*Primary Examiner* — Manuchehr Rahmjoo
(74) *Attorney, Agent, or Firm* — Sughrue Mion, PLLC

(57) ABSTRACT

Provided is a device including: a display unit configured to display handwritten content based on an analog handwritten input of a user; a user input unit that receives a user input of selecting a portion of the handwritten content displayed on the display unit; and a control unit reproduces a segment of multimedia content, which corresponds to the portion of the handwritten content, from the multimedia content synchronized with the handwritten content.

17 Claims, 108 Drawing Sheets

(51) Int. Cl.
*G06F 3/0482* (2013.01)
*G06F 3/0484* (2013.01)

(52) U.S. Cl.
CPC ...... *G06F 3/04842* (2013.01); *G06F 3/04883* (2013.01); *G06F 3/04886* (2013.01); *G06F 2203/04803* (2013.01); *G06F 2203/04807* (2013.01); *G06F 2203/04808* (2013.01)

(58) Field of Classification Search
USPC .......................................................... 382/189
See application file for complete search history.

(56) References Cited

U.S. PATENT DOCUMENTS

| | | | |
|---|---|---|---|
| 9,317,486 B1* | 4/2016 | Story, Jr. | G06K 9/00442 |
| 2002/0018066 A1 | 2/2002 | Vizer | |
| 2002/0107885 A1* | 8/2002 | Brooks | G06F 3/04883 |
| | | | 715/224 |
| 2006/0159345 A1* | 7/2006 | Clary | G06K 9/2063 |
| | | | 382/186 |
| 2009/0251336 A1 | 10/2009 | Marggraff et al. | |
| 2010/0013843 A1 | 1/2010 | Ameline | |
| 2011/0107246 A1 | 5/2011 | Vik | |
| 2011/0111775 A1 | 5/2011 | Kim et al. | |
| 2011/0181619 A1 | 7/2011 | Kwon et al. | |
| 2013/0300676 A1 | 11/2013 | Hashiba et al. | |
| 2014/0015776 A1 | 1/2014 | Kim et al. | |
| 2014/0028590 A1 | 1/2014 | Itaya | |
| 2014/0129931 A1 | 5/2014 | Hashiba | |
| 2014/0145974 A1* | 5/2014 | Sugiura | G06F 3/042 |
| | | | 345/173 |
| 2015/0116283 A1* | 4/2015 | Black | G06F 3/03545 |
| | | | 345/179 |

OTHER PUBLICATIONS

Communication dated Oct. 5, 2015, issued by the European Patent Office in counterpart European Application No. 15169001.3.

* cited by examiner

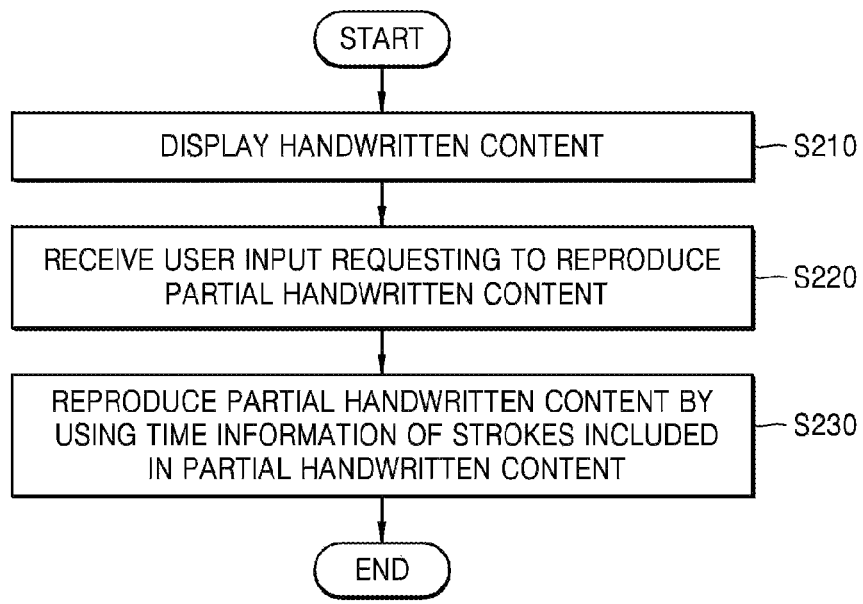
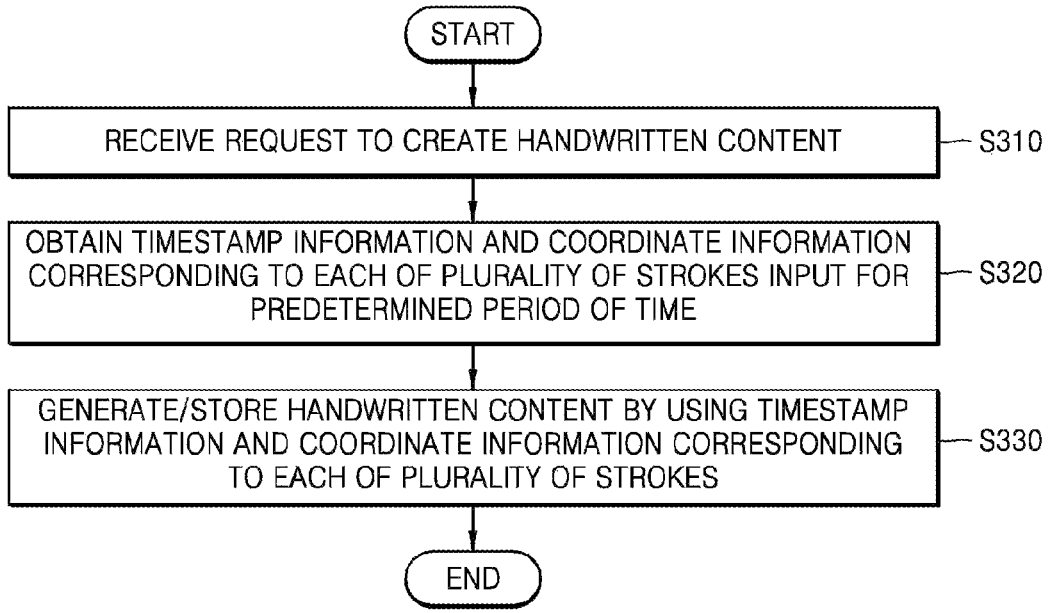

500

| Stroke(510) | Timestamp 1 (520) |
|---|---|
| S1 | 002525 |
| S2 | 002688 |
| S3 | 003900 |
| S4 | 004566 |
| ⋮ | ⋮ |

| Coordinate (530) | Timestamp 2 (540) |
|---|---|
| (x0, y0) | 000000 |
| (x1, y1) | 000003 |
| (x2, y2) | 000004 |
| (x3, y3) | 000008 |
| ⋮ | ⋮ |

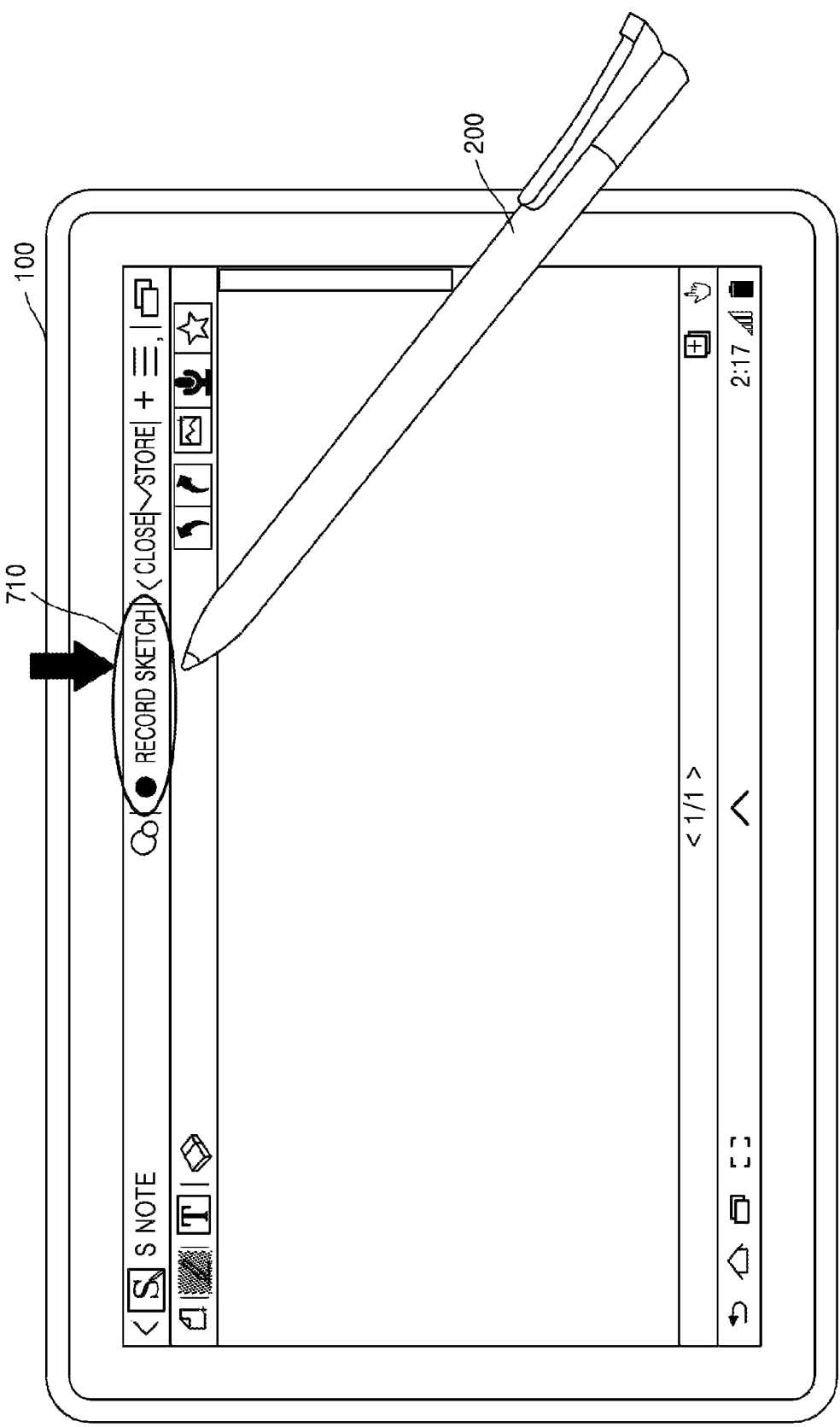

FIG. 7C
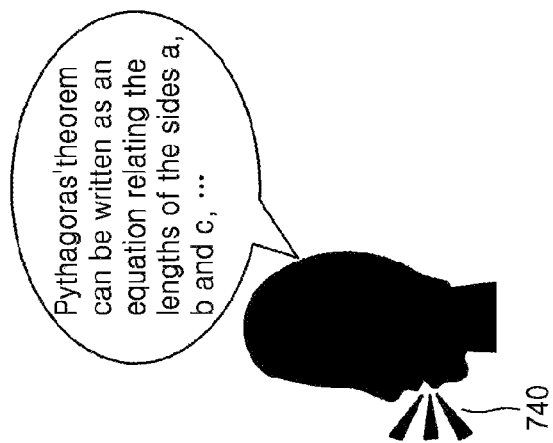
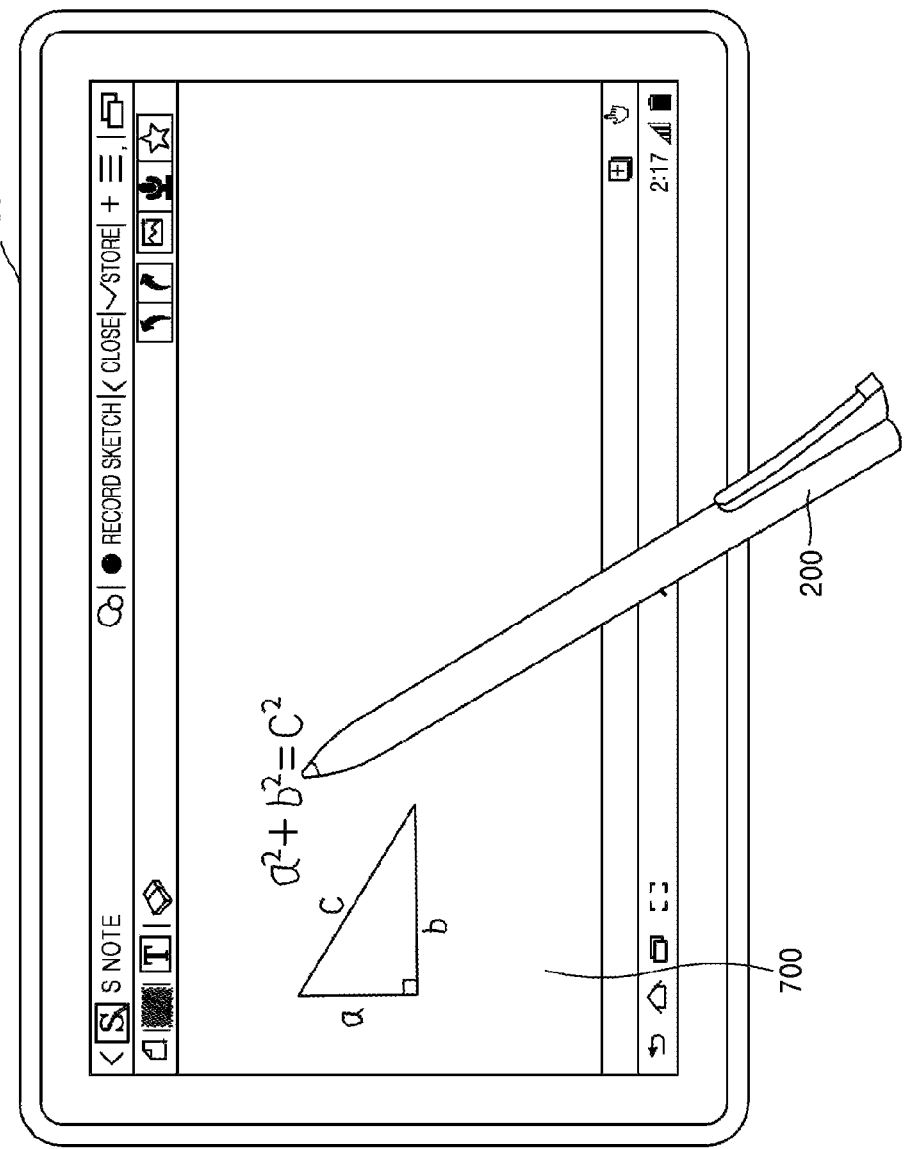

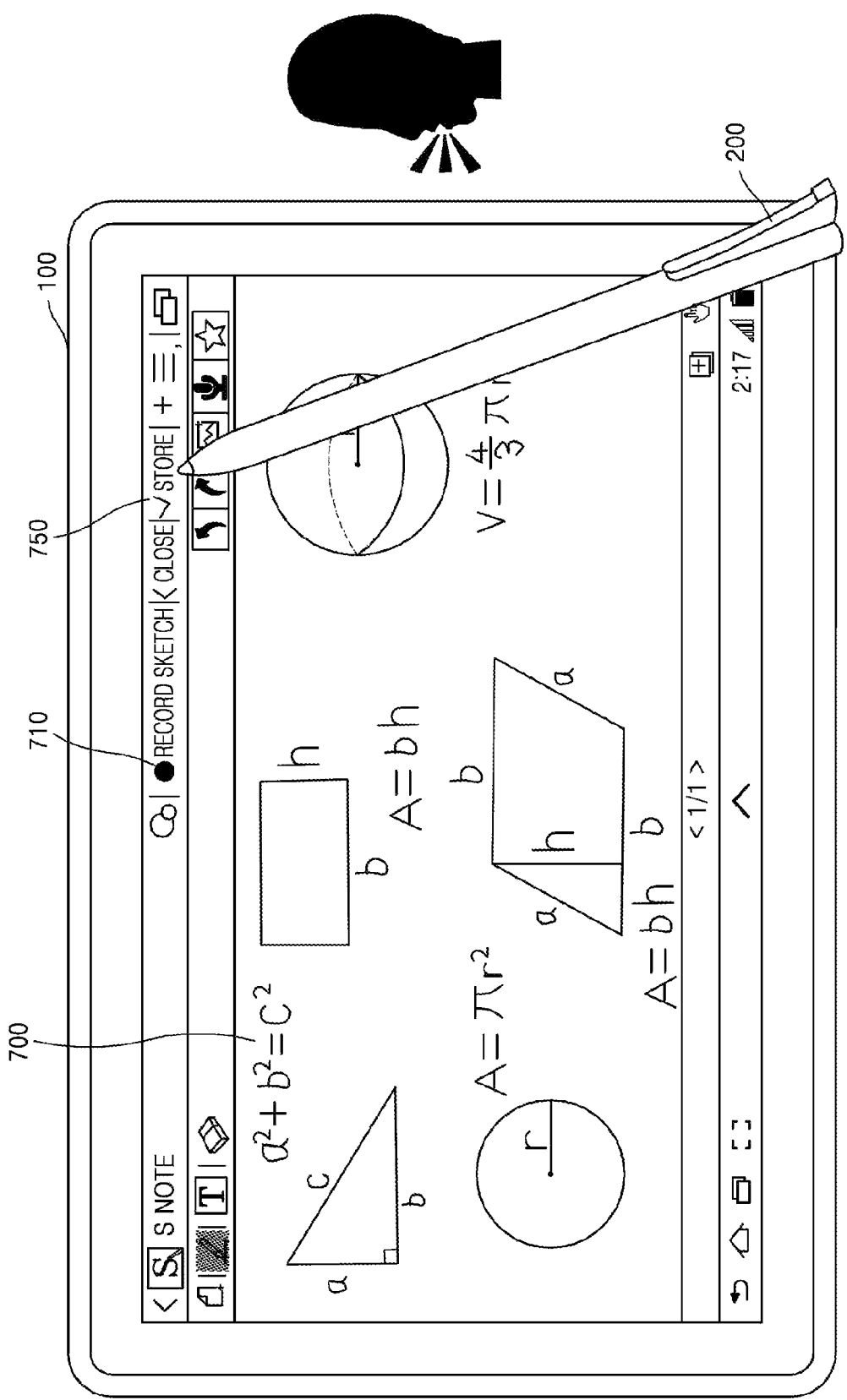

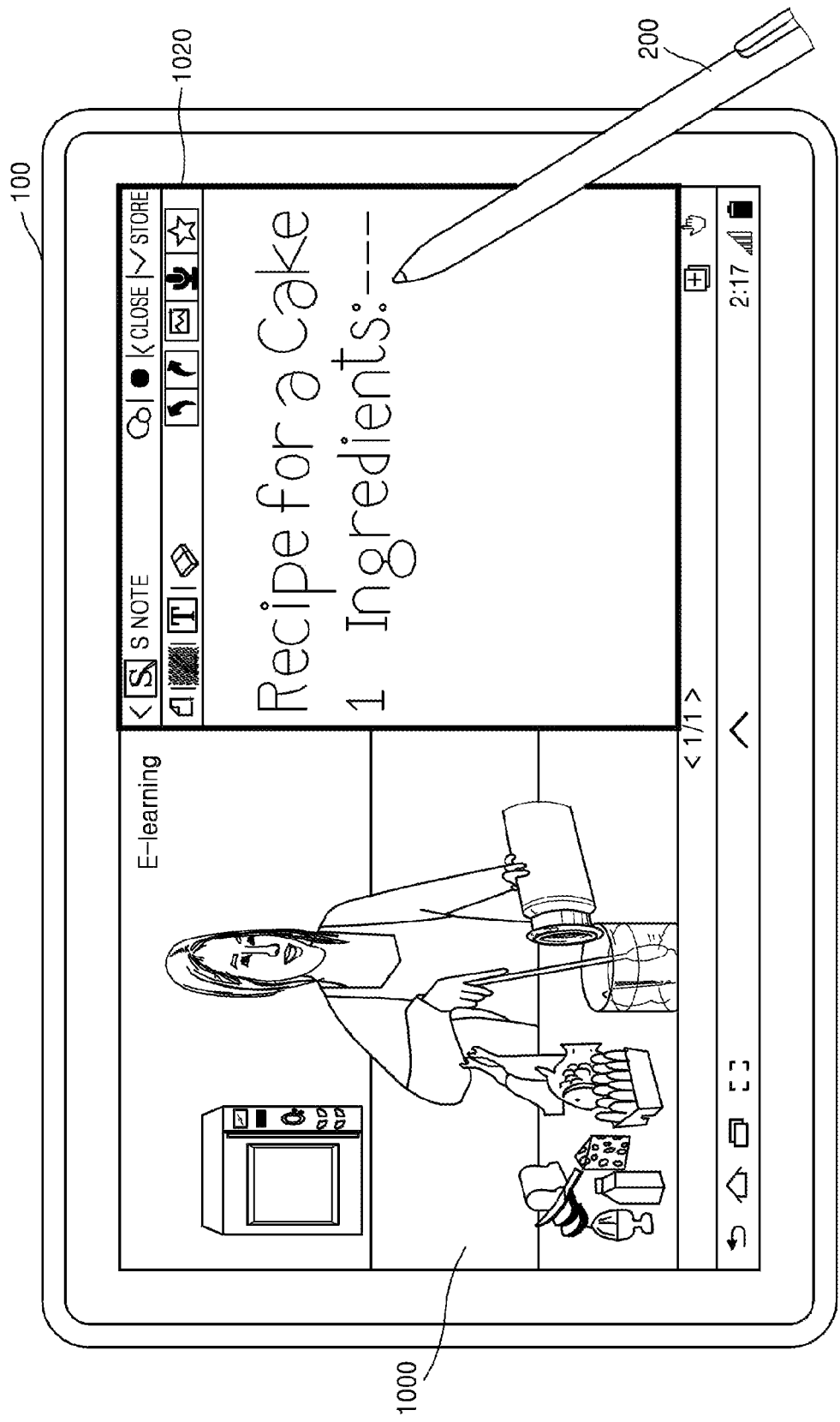

FIG. 11A

| Video content (1110) |
|---|

| Content (1111) |
|---|
| 01.avi |
| 02.avi |
| 11.mpg |
| 13.wmv |

| Time (1112) | Stroke (Link) (1113) |
|---|---|
| 000000 | S1 |
| 000004 | S2 |
| 000030 | S3 |
| 000560 | S4 |

| Handwritten Content (1120) |
|---|

| Stroke(1121) | Timestamp 1 (1122) |
|---|---|
| S1 | 002525 |
| S2 | 002688 |
| S3 | 003900 |
| S4 | 004566 |

| Coordinate (1123) | Timestamp 2 (1124) |
|---|---|
| (x0, y0) | 000000 |
| (x1, y1) | 000003 |
| (x2, y2) | 000004 |
| (x3, y3) | 000008 |

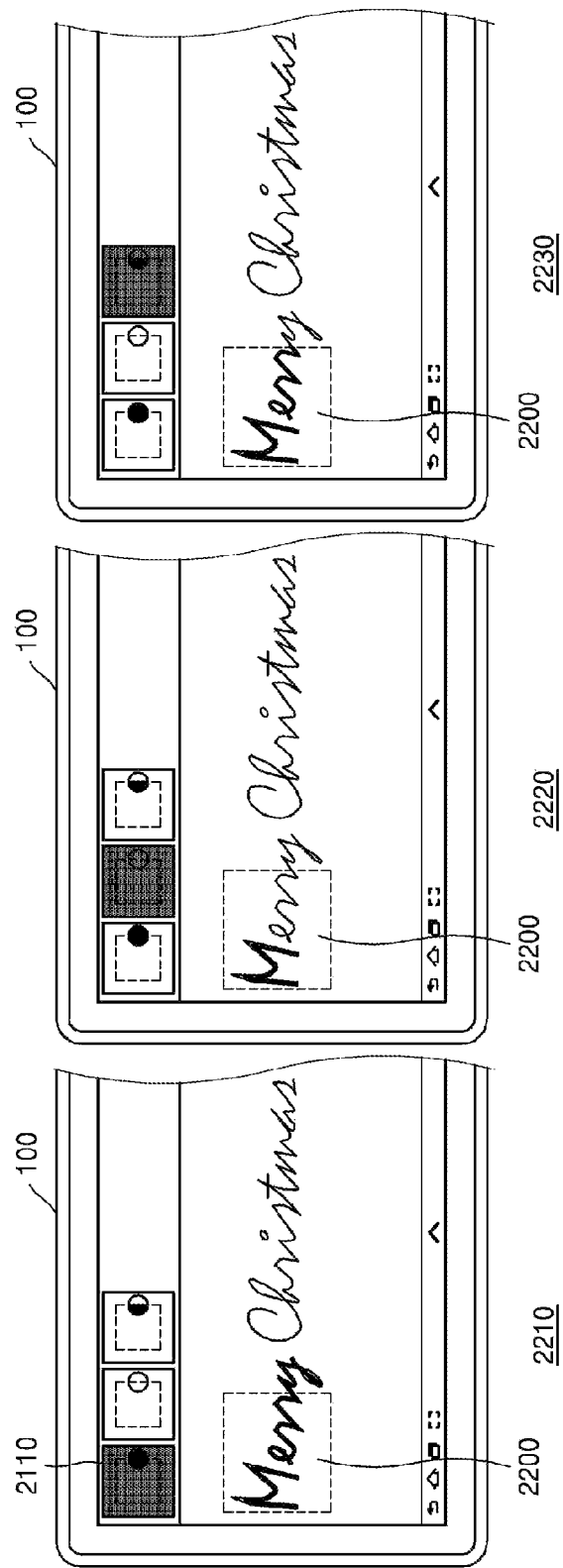

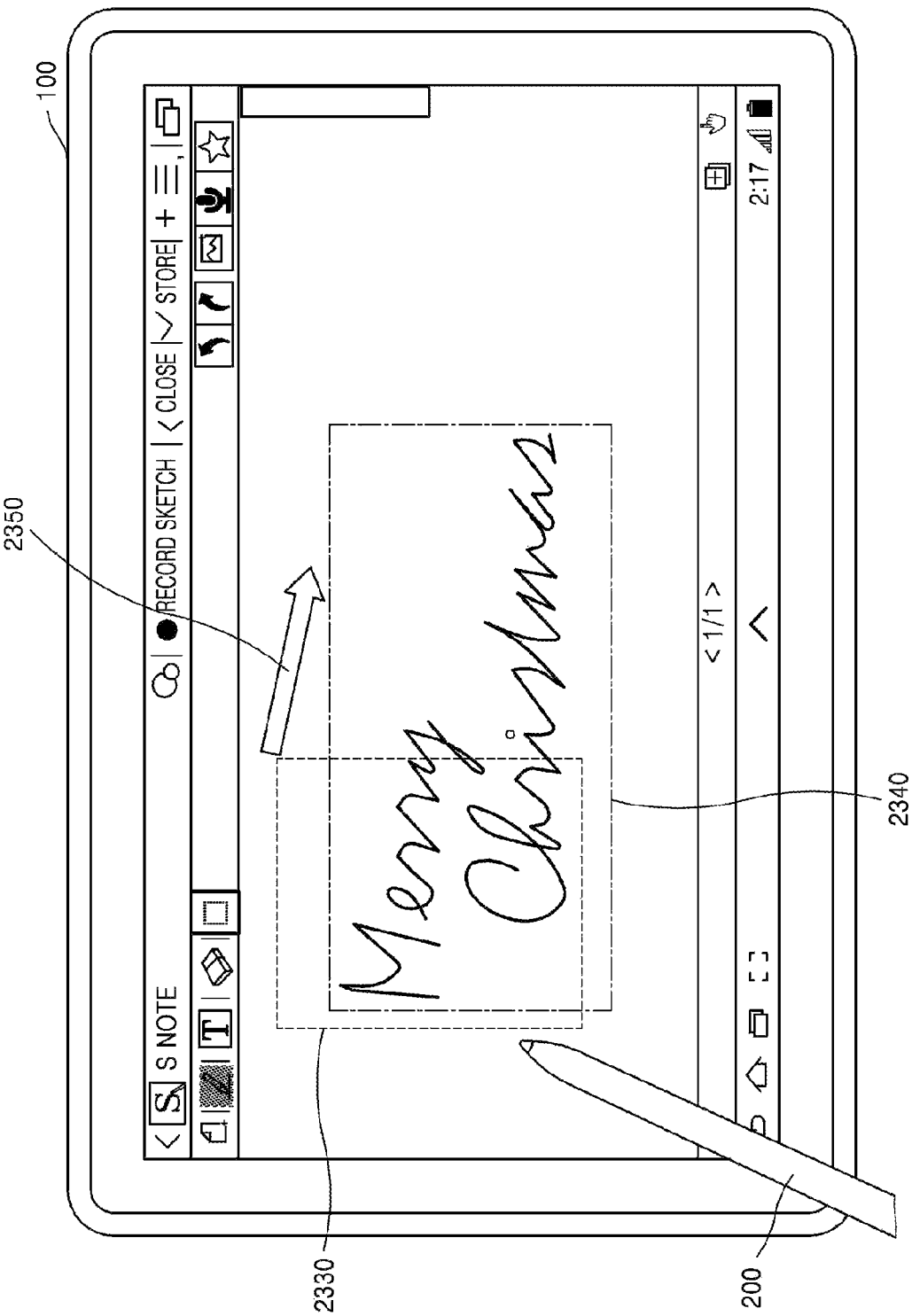

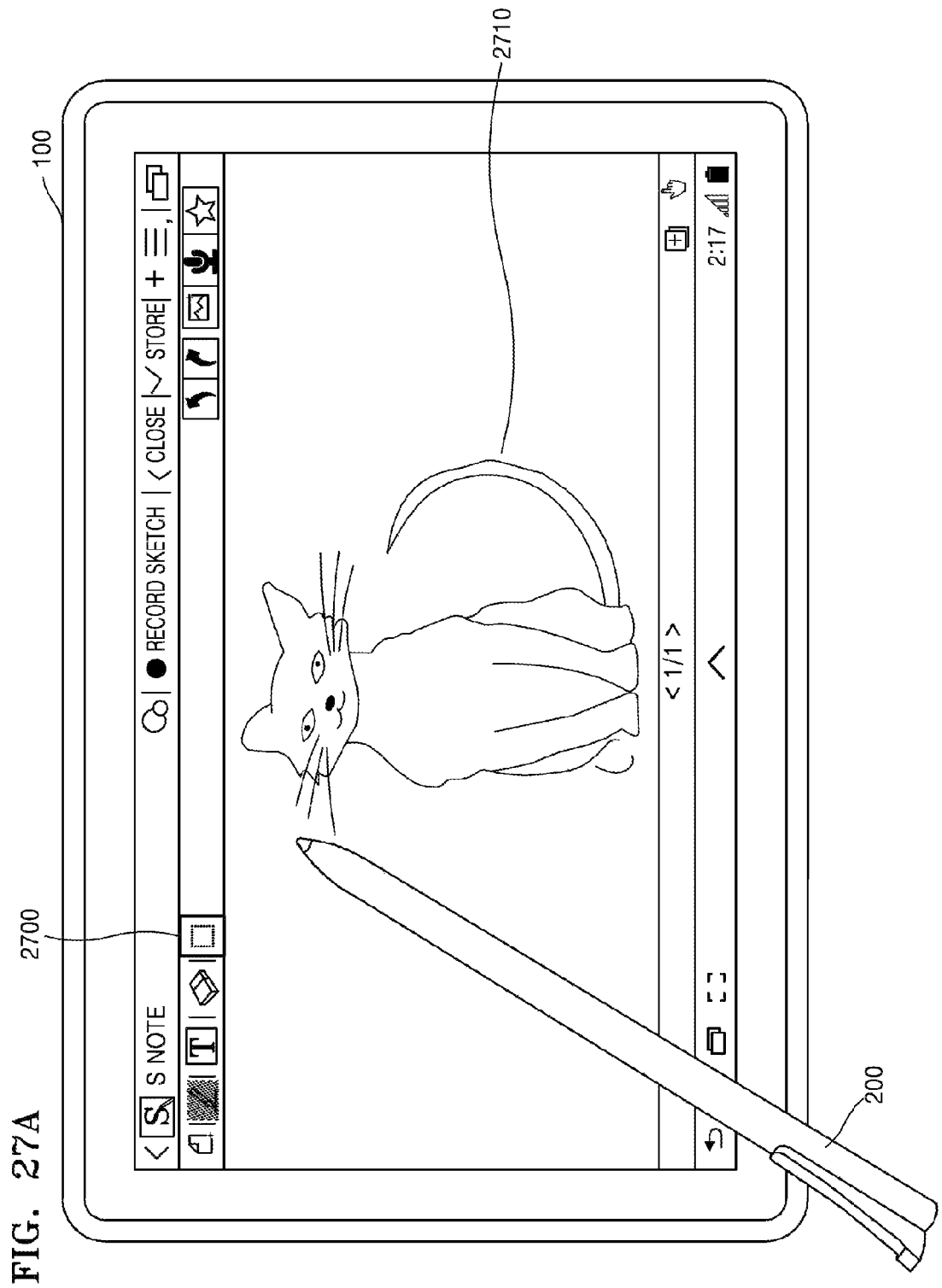

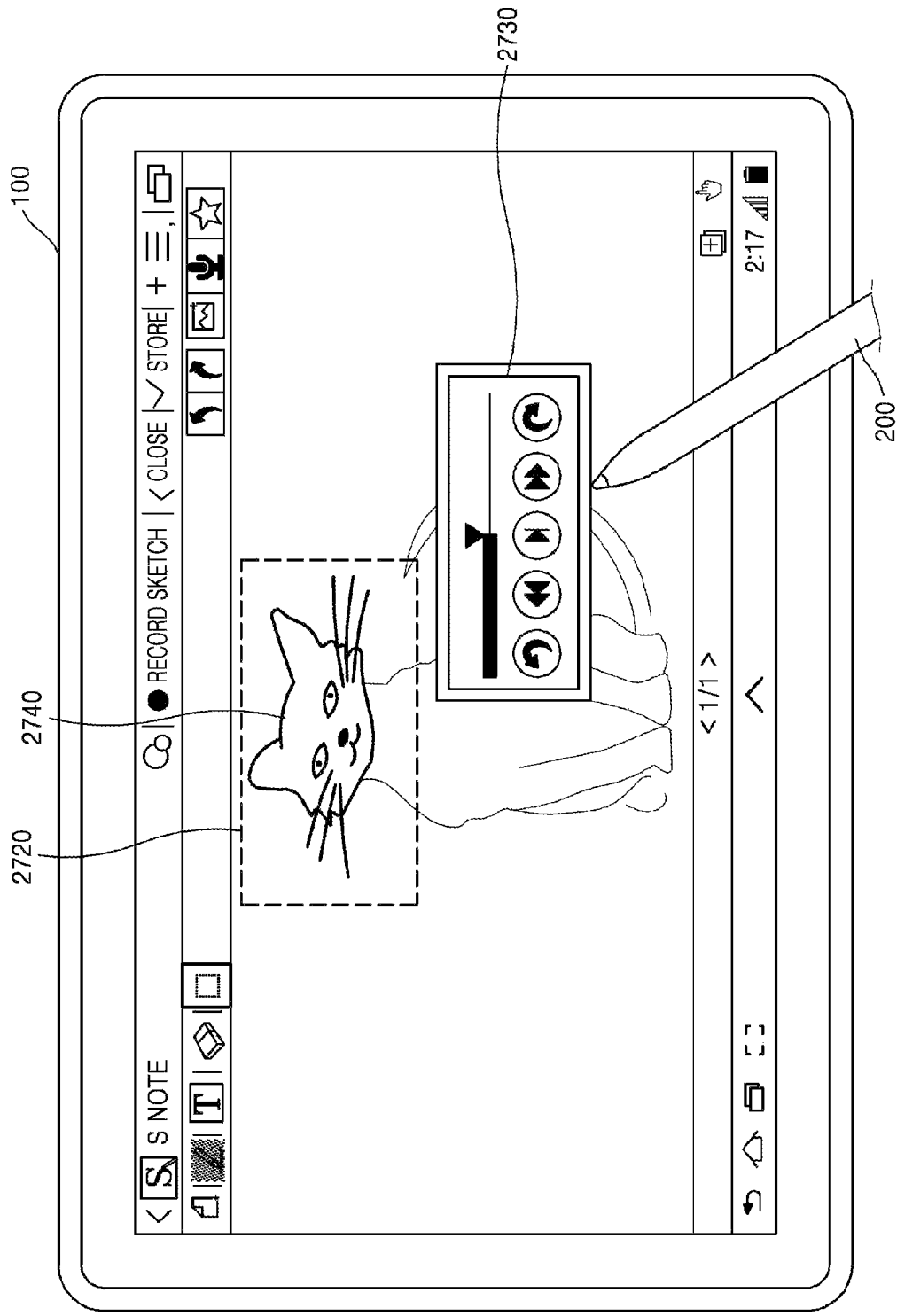

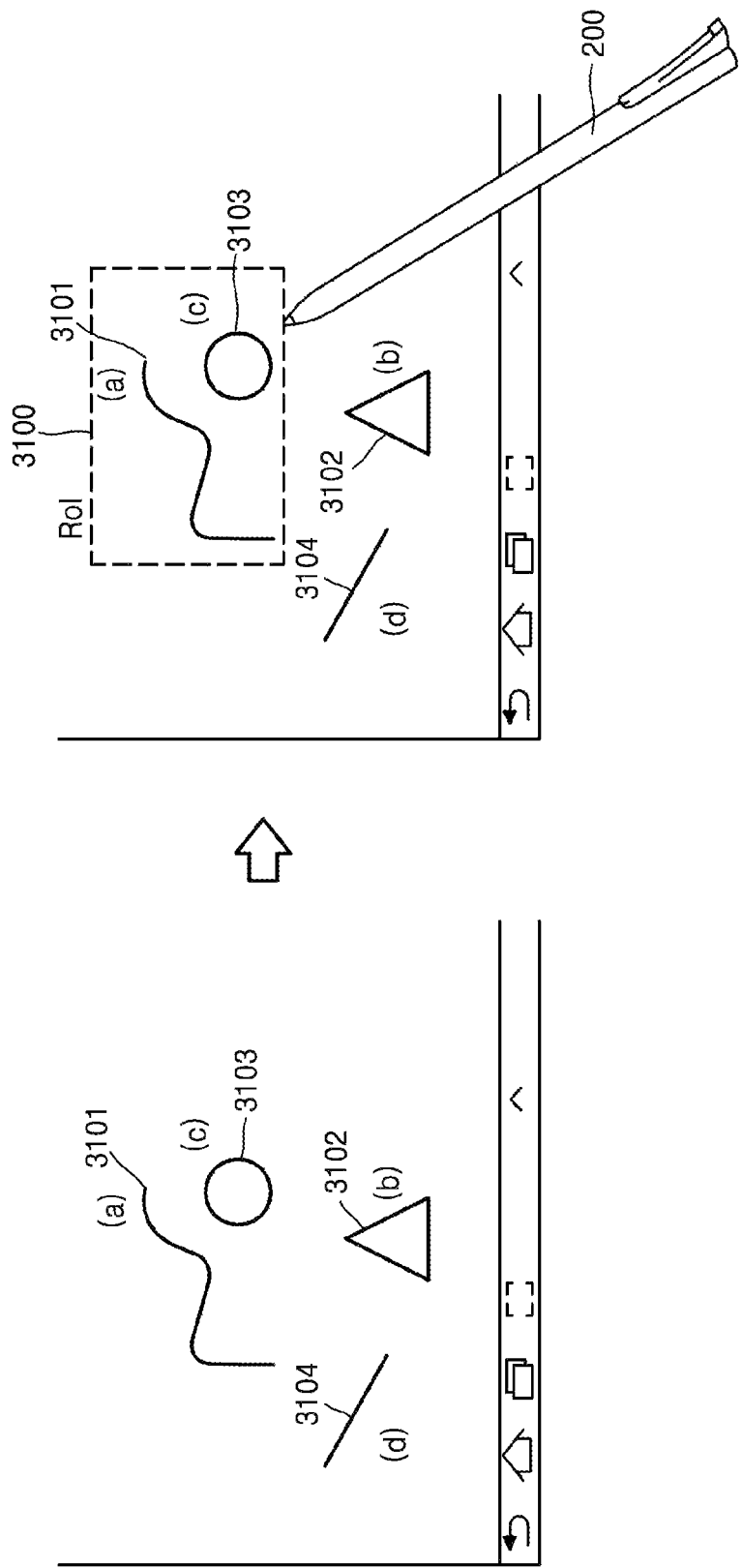

FIG. 32B

| Coordinate | Timestamp 2 | |
|---|---|---|
| (x0, y0) | 000000 | |
| . . . | . . . | 3210 |
| (x30, y30) | 001304 | |
| (0, 0) | 999999 | ← DELIMITER (3240) |
| (x0, y0) | 001305 | |
| . . . | . . . | 3203 |
| (x12, y12) | 001805 | |

3220 / 3230 / 3200

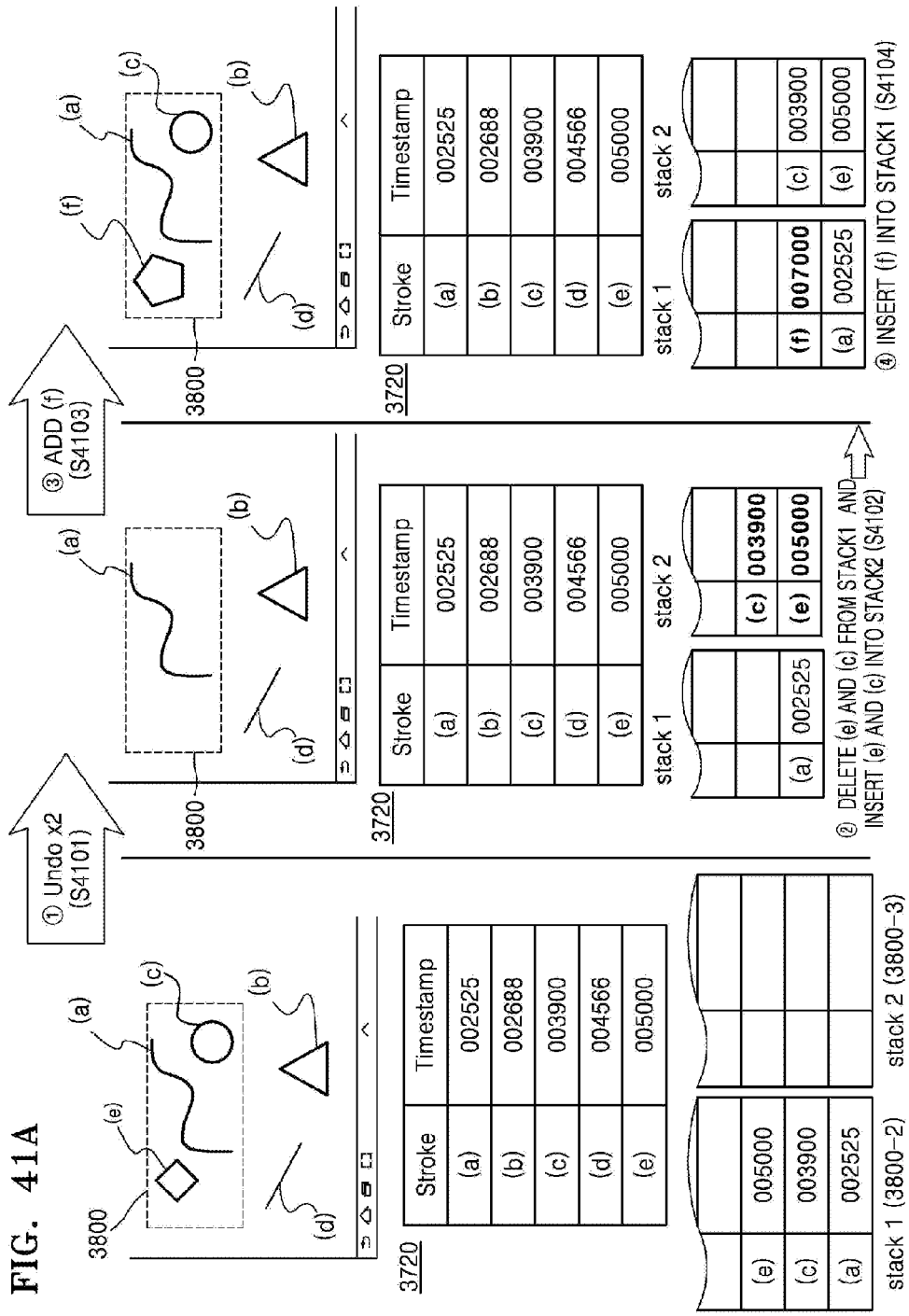

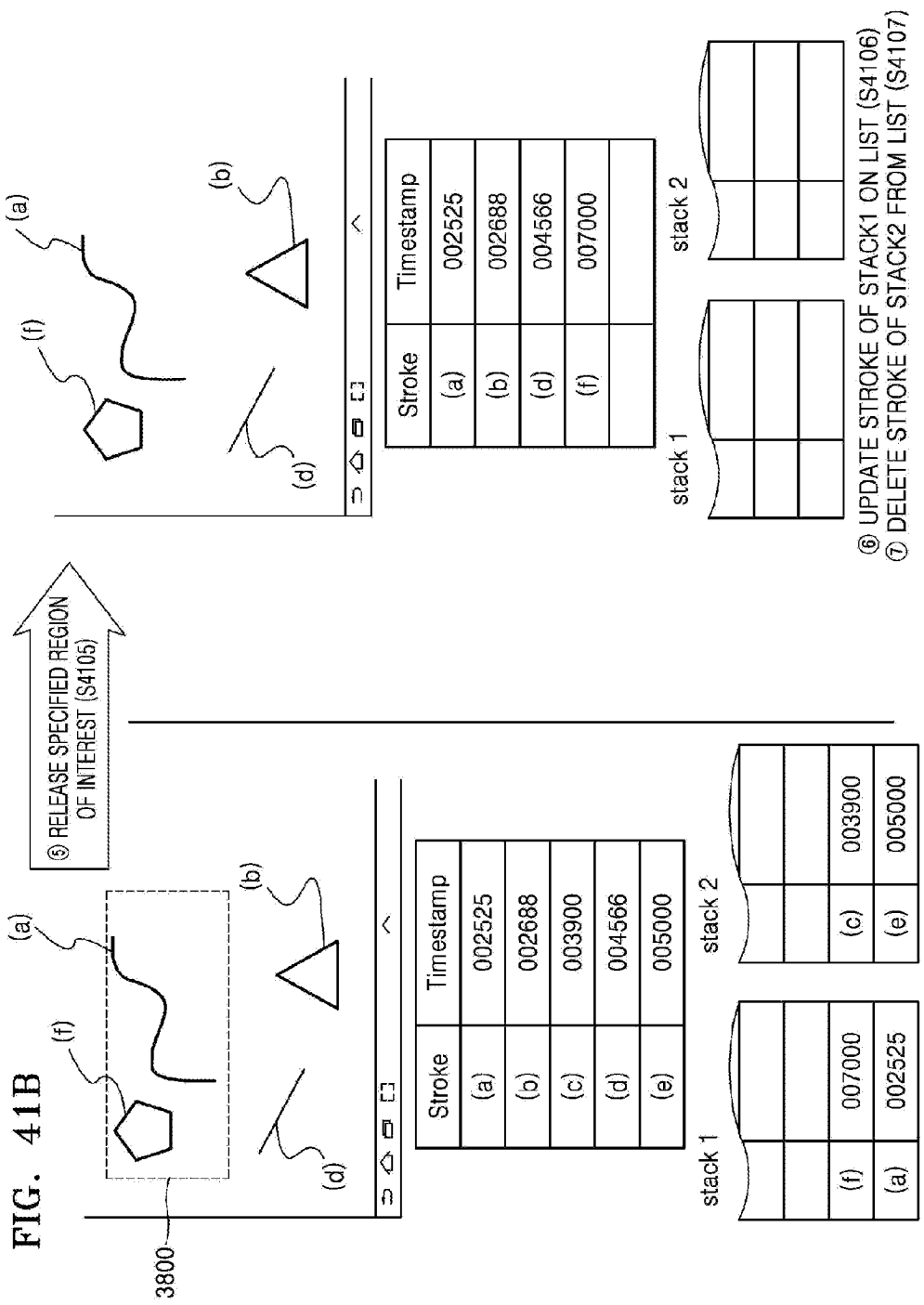

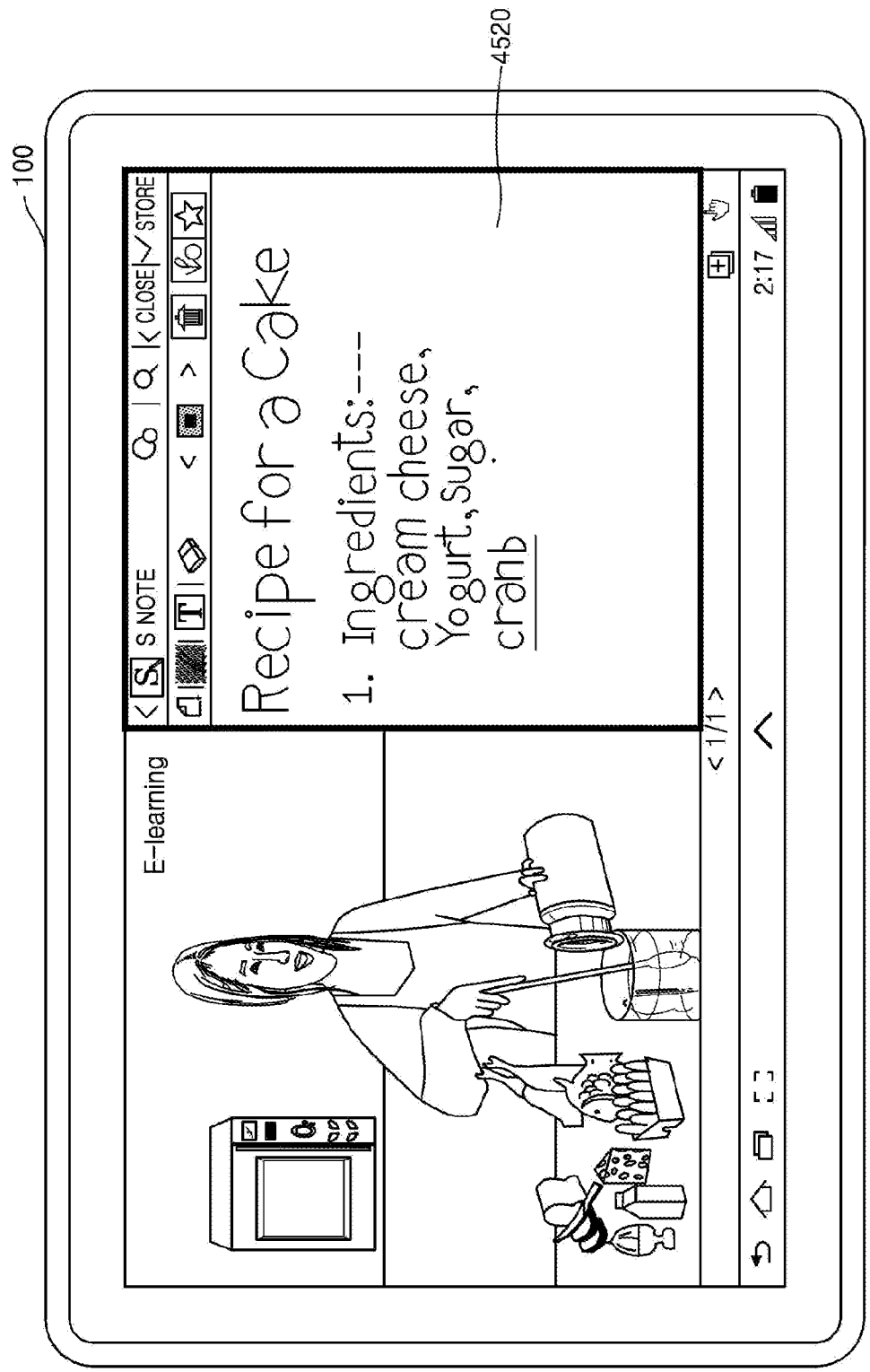

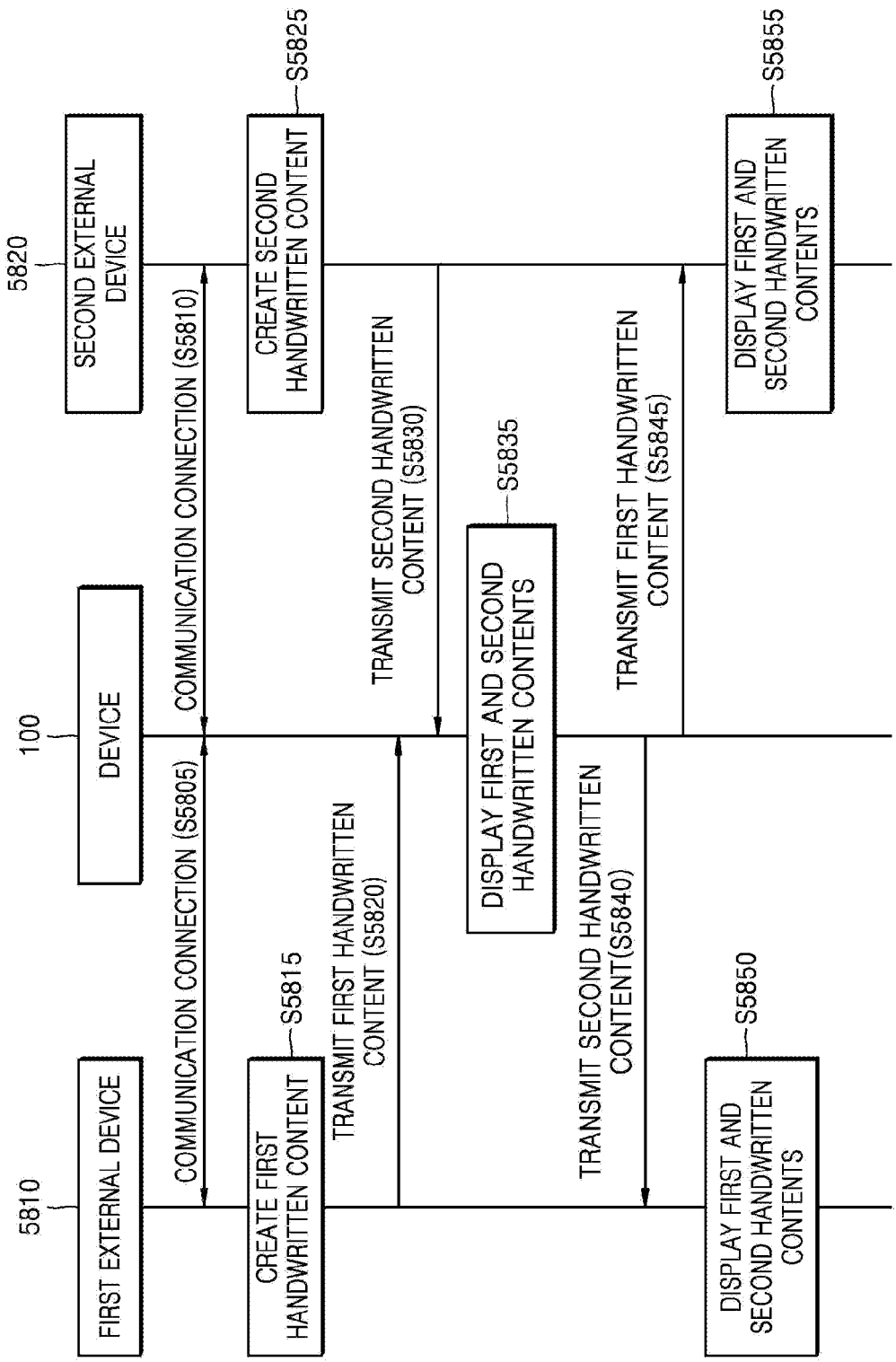

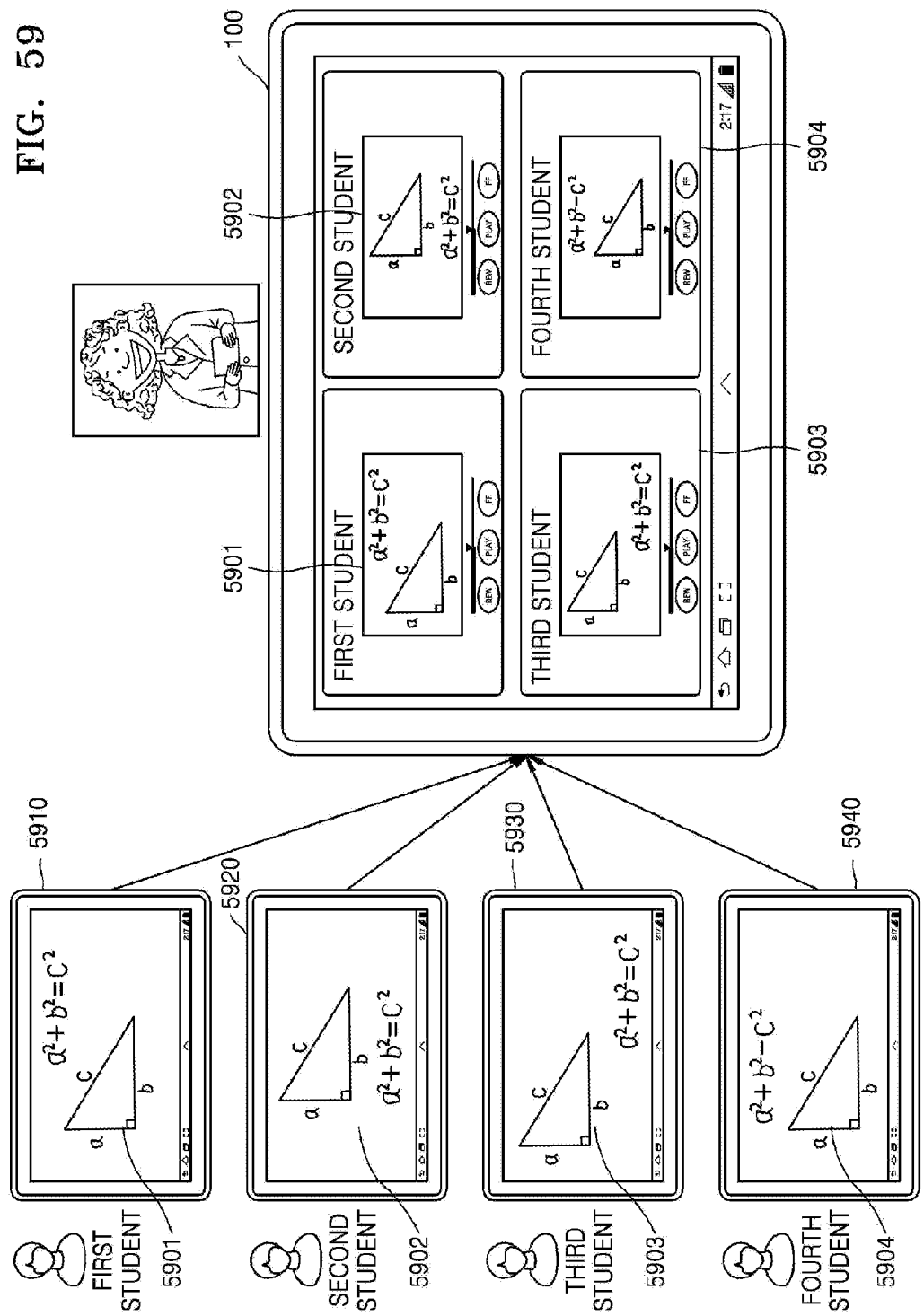

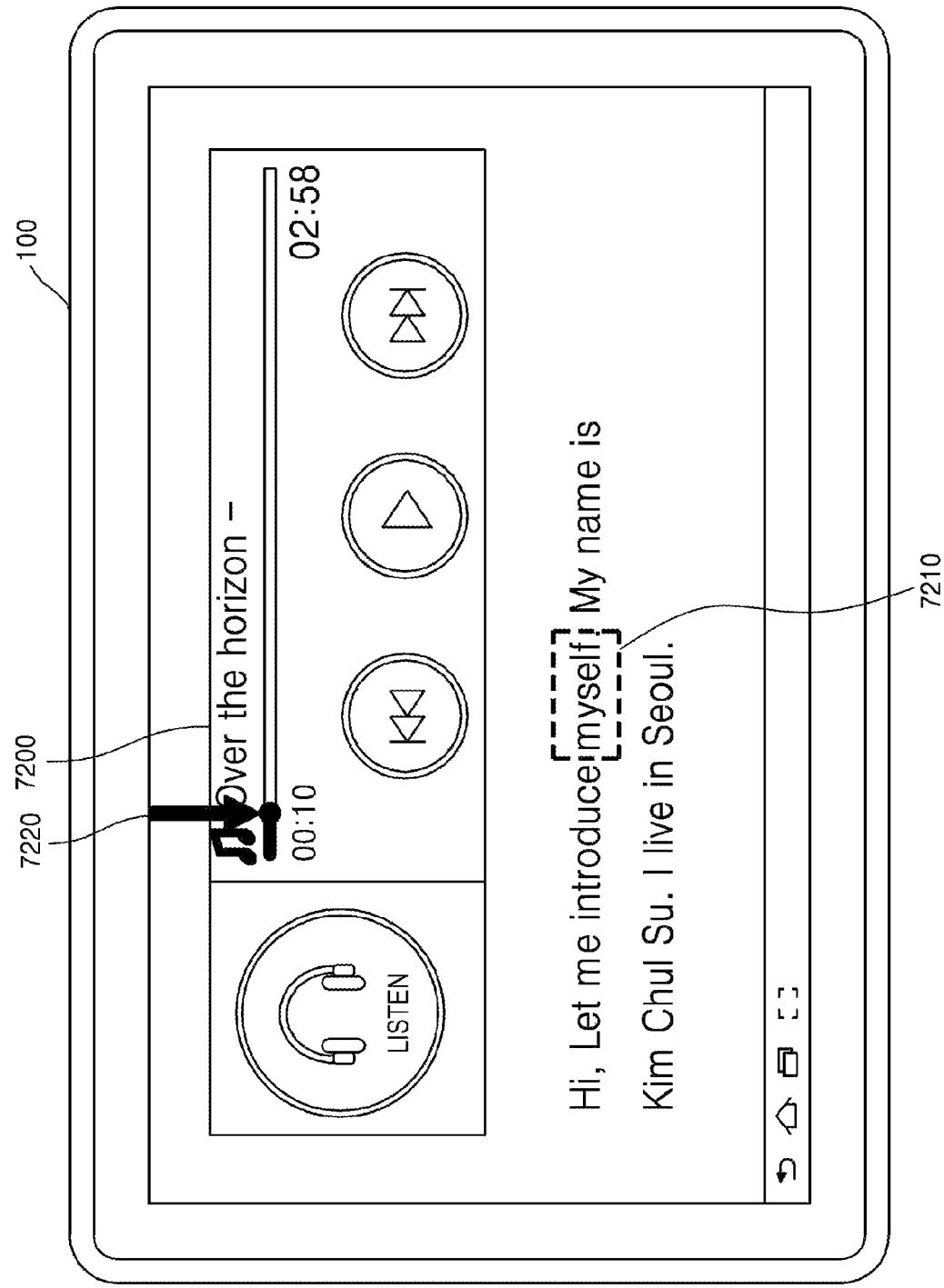

METHOD AND DEVICE FOR REPRODUCING CONTENT

CROSS-REFERENCE TO RELATED APPLICATION

This application is a continuation-in-part of U.S. patent application Ser. No. 14/497,451, filed on Sep. 26, 2014, in the U.S. Patent and Trademark Office, which claims priority from Korean Patent Application No. 10-2014-0062621, filed on May 23, 2014, and Korean Patent Application No. 10-2015-0018871, filed on Feb. 6, 2015, in the Korean Intellectual Property Office, the disclosures of which are incorporated herein by reference in their entireties.

BACKGROUND

1. Field

Aspects of exemplary embodiments relate to a method and device for reproducing partial handwritten content selected by a user.

2. Description of the Related Art

Mobile terminals may be configured to perform various functions, such as a data and voice communication function, a photographing or a moving image function, a voice storing function, a function of reproducing a music file via a speaker system, and a function of displaying an image or a video.

Some mobile terminals may have an additional function for reproducing games, and other mobile terminals may be realized as multimedia devices. In addition, according to acceleration in the development of smart phones, various applications are increasingly developed and used.

SUMMARY

One or more aspects of exemplary embodiments include a method and a device for reproducing partial handwritten content by using time information of strokes included in the partial handwritten content.

One or more aspects of exemplary embodiments include a method and device for reproducing a partial segment of multimedia content synchronized with partial handwritten content.

Additional aspects will be set forth in part in the description which follows and, in part, will be apparent from the description, or may be learned by practice of the exemplary embodiments.

According to an aspect of an exemplary embodiment, there is provided a device including: a display unit that displays handwriting on a screen; a user input unit that receives a user input for selecting a portion of the handwriting displayed on the display unit; and a control unit configured to control the display unit to reproduce the selected portion of the handwriting in a same temporal manner in which the portion of the handwriting was handwritten.

According an aspect of an exemplary embodiment, there is provided a method of reproducing handwriting on a screen of a device, the method including: displaying handwriting on the screen of the device; receiving a user input that selects a portion of the handwriting displayed on the screen; and reproducing the selected portion of the handwriting in a same temporal manner in which the portion of the handwriting was handwritten.

According to an aspect of an exemplary embodiment, there is provided a device including: a display unit configured to display handwritten content based on an analog handwritten input of a user; a user input unit that receives a user input of selecting a portion of the handwritten content displayed on the display unit; and a control unit reproduces a segment of multimedia content, which corresponds to the portion of the handwritten content, from the multimedia content synchronized with the handwritten content.

According to an aspect of an exemplary embodiment, there is provided a method of reproducing handwritten content, the method including: displaying handwritten content on a screen of a device; receiving a user input of selecting a portion of the handwritten content; and reproducing a segment of multimedia content, which corresponds to the portion of the handwritten content, from the multimedia content synchronized with the handwritten content.

The control unit may reproduce the segment by obtaining time information of the multimedia content based on coordinate information of the portion of the handwritten content.

The control unit may reproduce the portion of the handwritten content while the segment is being reproduced.

The control unit may reproduce the portion of the handwritten content in a temporal manner that is the same as a temporal manner in which the portion of the handwritten content was written.

The control unit may extract strokes included in the portion of the handwritten content, and determine an order of the strokes by using time stamp information corresponding to the strokes.

The control unit may determine a first stroke that is input first from among the strokes as a start position and a last stroke that is input last from among the strokes as an end position.

When a plurality of regions of the handwritten content displayed on the display unit are selected, the control unit may reproduce a plurality of segments of the multimedia content, which correspond to the plurality of regions.

When the portion of the handwritten content is selected, the control unit may control the display unit to display a control panel including a reproduce function button within a certain distance from the portion of the handwritten content, and the user input unit may receive an input of activating the reproduce function button through the control panel.

The control unit may edit the handwritten content by using time information of strokes included in the portion of the handwritten content.

BRIEF DESCRIPTION OF THE DRAWINGS

These above and other aspects will become apparent and more readily appreciated from the following description of the exemplary embodiments, taken in conjunction with the accompanying drawings in which:

FIG. 2 is a flowchart of a method of reproducing, by a device, partial handwritten content, according to an exemplary embodiment;

FIG. 3 is a flowchart of a method of creating, by a device, handwritten content, according to an exemplary embodiment;

FIGS. 7A through 7E are diagrams for describing an example of synchronizing and storing, by a device, handwritten content and audio content;

FIGS. 10A and 10B are diagrams for describing an example of synchronizing and storing, by a device, handwritten content and moving image content;

FIG. 11A is a diagram for describing an example of storage formats of handwritten content and moving image content;

FIGS. 21 and 22 are diagrams of an example of a graphical user interface (GUI) for determining partial handwritten content corresponding to a region of interest;

FIG. 23B is a diagram of an example of displaying, by a device, a guide image for guiding specifying of a region of interest;

FIGS. 27A and 27B are diagrams for describing an example of providing, by a device, a control panel including a reproduce function button or an edit function button;

FIG. 31 is a diagram of an example of selecting, by a device, strokes in a region of interest;

FIG. 32B is a diagram of an example of creating, by a device, a stack by using information about strokes in a region of interest;

FIGS. 41A and 41B are diagrams for describing an example of performing an undo function and a stroke adding function, by a device, on partial handwritten content;

FIGS. 45A through 45C are diagrams for describing an example of reproducing, by a device, entire handwritten content by reflecting edit information about partial handwritten content;

FIG. 58 is a flowchart of a method of providing, by a device, a plurality of handwritten contents received from a plurality of external devices, according to an exemplary embodiment;

FIG. 59 is a diagram of an example of providing, by a device, a plurality of handwritten contents received from a plurality of external devices;

FIGS. 72A and 72B are diagrams of an example of providing, by a device, a partial audio segment corresponding to a selected word, according to an exemplary embodiment.

DETAILED DESCRIPTION

Figure 1:
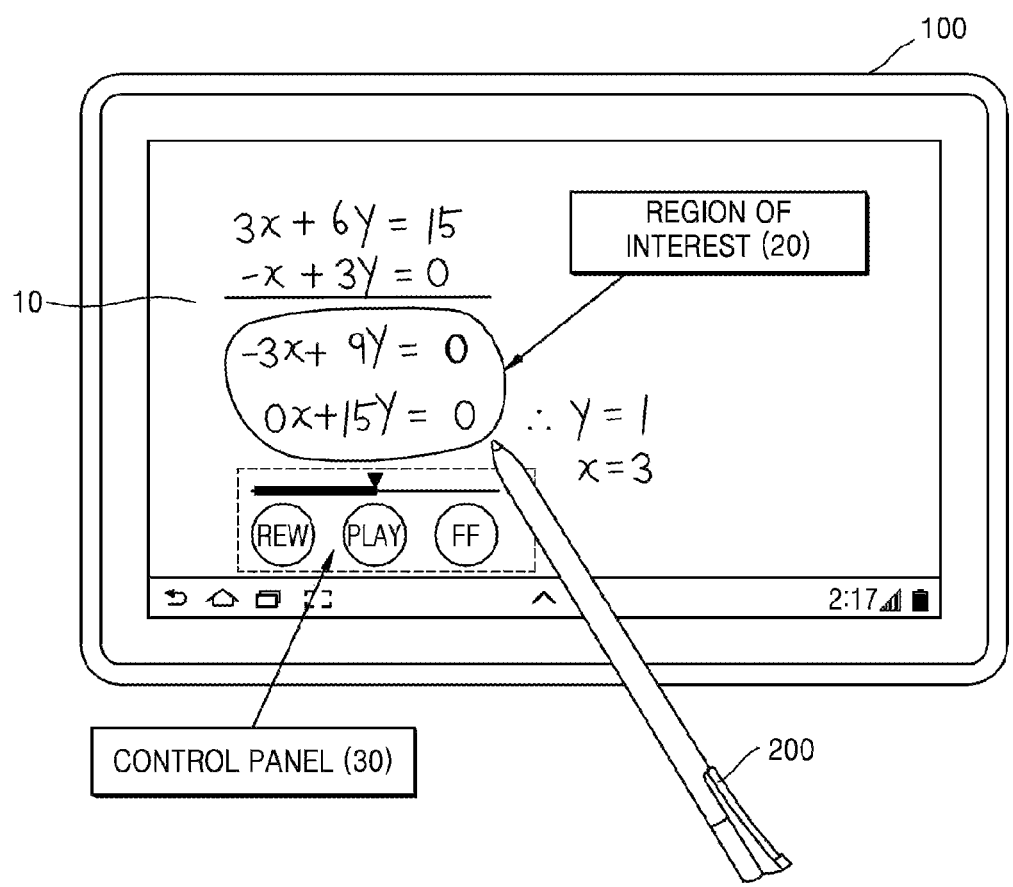
FIG. 1 is a diagram for describing a device for providing a function of reproducing partial handwritten content, according to an exemplary embodiment.

Terms used herein will now be briefly described, and then one or more exemplary embodiments will be described in detail.

All terms including descriptive or technical terms which are used herein should be construed as having meanings that are understood to one of ordinary skill in the art. However, the terms may have different meanings according to an intention of one of ordinary skill in the art, precedent cases, or the appearance of new technologies. Also, some terms may be selected by the applicant, and in this case, the meaning of the selected terms will be described in detail in the detailed description. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

As used herein, the term "and/or" includes any and all combinations of one or more of the associated listed items. Expressions such as "at least one of," when preceding a list of elements, modify the entire list of elements and do not modify the individual elements of the list.

Herein, a "touch input" is a gesture of a user performed on a touch screen to control a device. For example, a touch input may be a tap, a touch and hold, a double-tap, a drag, panning, a flick, or a drag-and-drop.

A "tap" is a gesture in which a user touches a screen by using a finger or a touch tool, for example, an electronic pen, and then, immediately lifts the finger or touch tool off from the screen without dragging on the screen.

A "touch and hold" is a gesture in which a user touches a screen by using a finger or a touch tool, for example, an electronic pen and holds the touch for more than a critical period of time, for example, 2 seconds. That is, a difference in time between time points of a touch on and a lift-off from the screen is longer than the critical period of time, for example, 2 seconds. If the touch input is held for more than the critical period of time to make a user recognize whether the touch input is a tap or a touch and hold, a feedback signal may be visually, aurally, or tactually provided. The critical period of time may vary according to exemplary embodiments.

A "double-tap" is a gesture in which a user touches a screen twice by using a finger, touch tool, or stylus.

A "drag" is a gesture in which a user touches a screen by using a finger or a touch tool and moves the finger or the touch tool to another location in the screen while holding the touch. When the drag is performed, an object moves, or a panning gesture, which is described below, is performed.

A "panning" gesture is a gesture in which a user performs a drag without selecting an object. As the panning does not select a specific object, an object does not move in a page, and the page moves in the screen or a group of objects moves in the page.

A "flick" is a gesture in which a user performs a drag at a critical speed or at a higher speed, for example, 100 pixels per second, by using a finger or a touch tool. The flick may be distinguished from the drag or the panning based on whether a moving speed of a finger or a touch tool is equal to or higher than the critical speed, for example, 100 pixels/s.

A "drag-and-drop" is a gesture in which a user drags an object to a predetermined place in a screen by using a finger or a touch tool, and then, lifts the finger or touch tool off the screen.

A "pinch" is a gesture in which a user touches a screen with two or more fingers and moves the two fingers in different directions. The pinch may be a pinch-open gesture for zooming-in to an object or a page, or a pinch-close gesture for zooming-out from an object or a page. A zoom-in or zoom-out value is determined according to distance between the fingers.

A "swipe" is a gesture for touching an object in a screen by using a finger or a touch tool and moving the finger or the touch tool in a horizontal or vertical direction for a certain distance. Moving in a diagonal direction may not be recognized as a swipe event.

One or more exemplary embodiments will now be described more fully with reference to the accompanying drawings. However, the exemplary embodiments may be embodied in many different forms, and should not be construed as being limited to the exemplary embodiments set forth herein; rather, these exemplary embodiments are provided so that this disclosure will be thorough and complete, and will fully convey the concept of the one or more exemplary embodiments to those of ordinary skill in the art. In the following description, well-known functions or constructions are not described in detail because they would obscure the one or more exemplary embodiments with unnecessary detail, and like reference numerals in the drawings denote like or similar elements throughout the specification.

FIG. 1 is a diagram for describing a content reproducing system according to an exemplary embodiment.

As shown in FIG. 1, according to an exemplary embodiment, the content reproducing system may include a device 100 and an input tool. Structures of the device 100 and the input tool will now be described in detail.

According to an exemplary embodiment, the device 100 may be a display device that displays handwritten content. For example, the device 100 described herein may be a mobile phone, a smart phone, a laptop computer, a tablet personal computer (PC), an electronic book terminal, a digital broadcasting terminal, a personal digital assistant (PDA), a portable multimedia reproducer (PMP), a navigation, an MP3 player, a digital camera, a wearable device (such as glasses or wrist watch), but the device is not limited thereto.

Throughout the specification, "handwritten content" may mean content obtained by converting an analog handwritten input of a user to digital information. For example, the handwritten content may include a hand-drawn image or a handwritten text on a digital device, but the handwritten content is not limited thereto.

Handwritten content 10 according to an exemplary embodiment may be a group of strokes input in a predetermined chronological order. A "stroke" may mean one trajectory drawn by the input tool while maintaining a touch from a point of time the input tool touched the device 100. For example, in '3x+6y=5', if a user drew each of 3, x, 6, and y at once while maintaining a touch, each of 3, x, 6, and y may form one stroke. Regarding '+', because the user draws '−' first and then draws '|', '−' and '|' may each form one stroke. According to an exemplary embodiment, one stroke may form one character or symbol, or a combination of strokes may form one character or symbol.

Meanwhile, each of the strokes included in the handwritten content 10 is related to time information. Here, the time information of the stroke may correspond to a point of time when the stroke is created or changed. Also, the time information of the stroke may be recorded according to a timestamp form indicating a certain time.

According to an exemplary embodiment, the device 100 may receive a touch input of the user. For example, when the device 100 displays the handwritten content 10 including a math problem solving process on a screen, the device 100 may receive a touch input for specifying a region of interest (region of interest) 20. The region of interest 20 may be a region including an object, such as partial handwritten content or at least one stroke, in which the user is interested.

According to an exemplary embodiment, the input tool may be a tool used by the user to input certain information to the device 100. For example, the input tool may be a finger or an electronic pen (such as a stylus pen), but the input tool is not limited thereto. Hereinafter, for convenience of description, it is assumed that the input tool is an electronic pen 200.

According to an exemplary embodiment, the device 100 may display a control panel 30 having virtual buttons on the screen. For example, the device 100 may display at least one button (for example, a fast forward button, a rewind button, a reproduce button, a pause button, and a reproduction speed control button) for controlling reproduction of partial handwritten content (for example, −3x+9y=0 and 0x+15y=0) included in the region of interest 20 on the control panel 30.

A method of reproducing, by the device 100, partial handwritten content will now be described in detail with reference to FIG. 2. Throughout the specification, Hereinafter, a partial handwritten content may be referred to as a portion of the handwritten content.

FIG. 2 is a flowchart of a method of reproducing, by the device 100, partial handwritten content, according to an exemplary embodiment.

In operation S210, the device 100 may display handwritten content on a screen.

According to an exemplary embodiment, the handwritten content may include a plurality of strokes input in a predetermined order. The plurality of strokes included in the handwritten content may have various shapes. In other words, a thickness, a color, brightness, chroma, and transparency of each of the plurality of strokes may be different from each other.

According to an exemplary embodiment, the handwritten content displayed on the device 100 may be created by the device 100 or received from an external apparatus, such as the electronic pen 200, a server, or another external device. For example, the device 100 may create the handwritten content including the plurality of strokes for a predetermined time based on a user request. An operation of the device 100 creating the handwritten content will be described in detail later with reference to FIGS. 3 through 5. Alternatively, the device 100 may receive the handwritten content created by another source from the external apparatus.

According to an exemplary embodiment, the device 100 may display a list of pre-stored handwritten contents on the screen. The device 100 may receive a user input for selecting handwritten content from the list of the pre-stored handwritten contents. For example, the user may use an input tool, such as a finger or an electronic pen, to select handwritten content from the list of the pre-stored handwritten contents. The device 100 may extract the selected handwritten content from a memory, and display the extracted handwritten content on the screen.

According to an exemplary embodiment, the device 100 may display the handwritten content on an execution window of an application executed by the device 100. For example, the certain application may be a note application, a memo application, a diary application, a calendar application, an electronic book application, a household accounts application, a letter writing application, or an online learning application, but the application is not limited thereto.

Meanwhile, according to an exemplary embodiment, the handwritten content may be synchronized with moving image content or audio content. In this case, the device 100 may synchronously display the moving image content or the audio content together with the handwritten content.

In operation S220, the device 100 may receive a user input requesting to reproduce partial handwritten content from the handwritten content displayed on the screen. The partial handwritten content may be a portion of the handwritten content. According to an exemplary embodiment, a user input may request the device 100 to reproduce partial handwritten content.

For example, the device 100 may receive a user input for selecting the partial handwritten content from among the handwritten content. The selection may be by way of highlighting, encircling, bracketing, or otherwise selecting the partial handwritten content according to operations of the application in which the handwritten content is displayed. At this time, the device 100 may display a control panel that includes a reproduce button. The device 100 may receive a user input for activating the reproduce function button via the control panel and reproduce the partial handwritten content.

Alternatively, the device 100 may receive a pre-set gesture corresponding to a reproduce command. For example, when the user selects the partial handwritten content via a drag input, and then double-taps the partial handwritten content with two fingers, the device 100 may interpret the double-tap gesture to be a request to reproduce the partial handwritten content.

Alternatively, the user may input a reproduce command for the partial handwritten content to the device 100 by using a touch input and a voice input. For example, the user may select the partial handwritten content via the touch input, and input an instruction requesting to reproduce the partial handwritten content to the device 100 via voice.

In operation S230, the device 100 may reproduce the partial handwritten content by using time information of strokes included in the partial handwritten content. In the specification, reproduction of partial handwritten content may mean reproducing a process of drawing strokes included in the partial handwritten content.

According to an exemplary embodiment, time information of strokes may include at least one of relative chronological order information of the strokes and timestamp information corresponding to each of the strokes. Meanwhile, timestamp information may be absolute time information (for example, a year, a month, a day, a time, a minute, a second, or 2014.05.18.08.53.36) of the device 100 when a stroke is created, or may be an arbitrarily assigned number (for example, 0001, 0002, or 0003) that indicates an offset from a base time, such as a time of a first timestamp of a first stroke.

According to an exemplary embodiment, the device 100 may extract the strokes corresponding to the partial handwritten content. The device 100 may determine an order of the extracted strokes by using the timestamp information of each of the extracted strokes. For example, a first stroke that is firstly input among the extracted strokes may be determined as a start position, and an n-th stroke that is input last from among the extracted strokes may be determined as an end position, wherein n is an integer greater than 1. The device 100 may reproduce from the first stroke determined as the start position to the n-th stroke determined as the end position by using timestamp information and coordinate information of the extracted strokes.

A method of reproducing, by the device 100, partial handwritten content will be described in more detail later with reference to FIG. 30. An operation of directly creating, by the device 100, handwritten content will now be described with reference to FIG. 3.

FIG. 3 is a flowchart of a method of creating, by the device 100, handwritten content, according to an exemplary embodiment.

In operation S310, the device 100 may receive a request to create handwritten content. For example, the device 100 may receive an input for activating a predetermined button corresponding to the request to create the handwritten content. Alternatively, the device 100 may recognize predetermined voice or a predetermined motion corresponding to the request to create the handwritten content.

In operation S320, the device 100 may obtain timestamp information and coordinate information corresponding to each of a plurality of strokes input for a predetermined period of time. For example, the device 100 may track coordinate values of each stroke drawn on the device 100 at regular time intervals (for example, 0.01 second) to obtain the timestamp information and coordinate information corresponding to each of the plurality of strokes. The coordinate values may be coordinate values with reference to a physical position on a display of the device 100, such as a coordinate position with reference to an origin on the display, or a virtual position associated with the note application.

In operation S330, the device 100 may create or store the handwritten content by using the timestamp information and the coordinate information corresponding to each of the plurality of strokes. An example of the device 100 creating handwritten content will now be described with reference to FIGS. 4A through 4C.

Figure 4A:
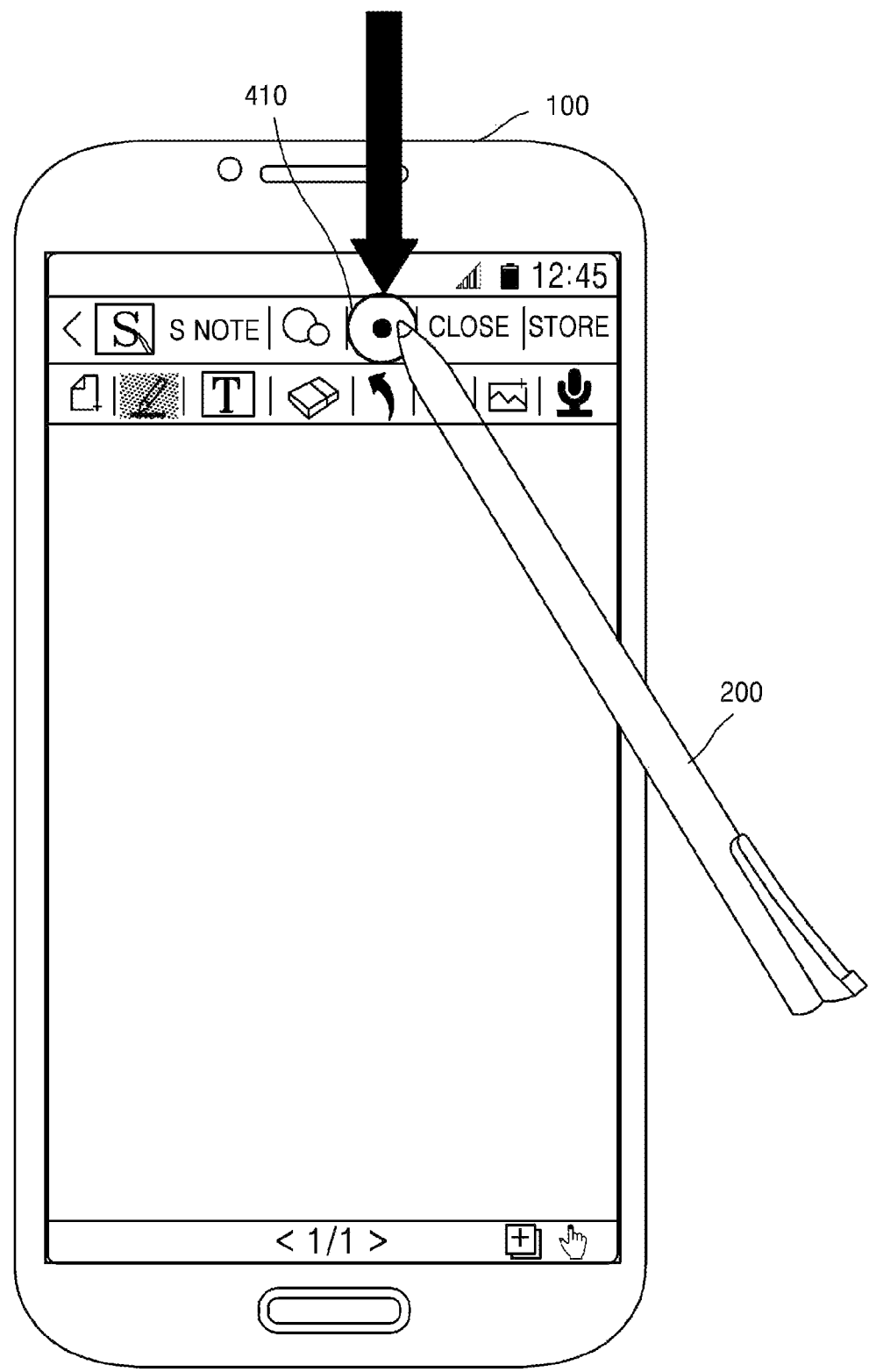
FIGS. 4A through 4C are diagrams for describing an example of creating, by a device, handwritten content, according to an exemplary embodiment.
Figure 4B:
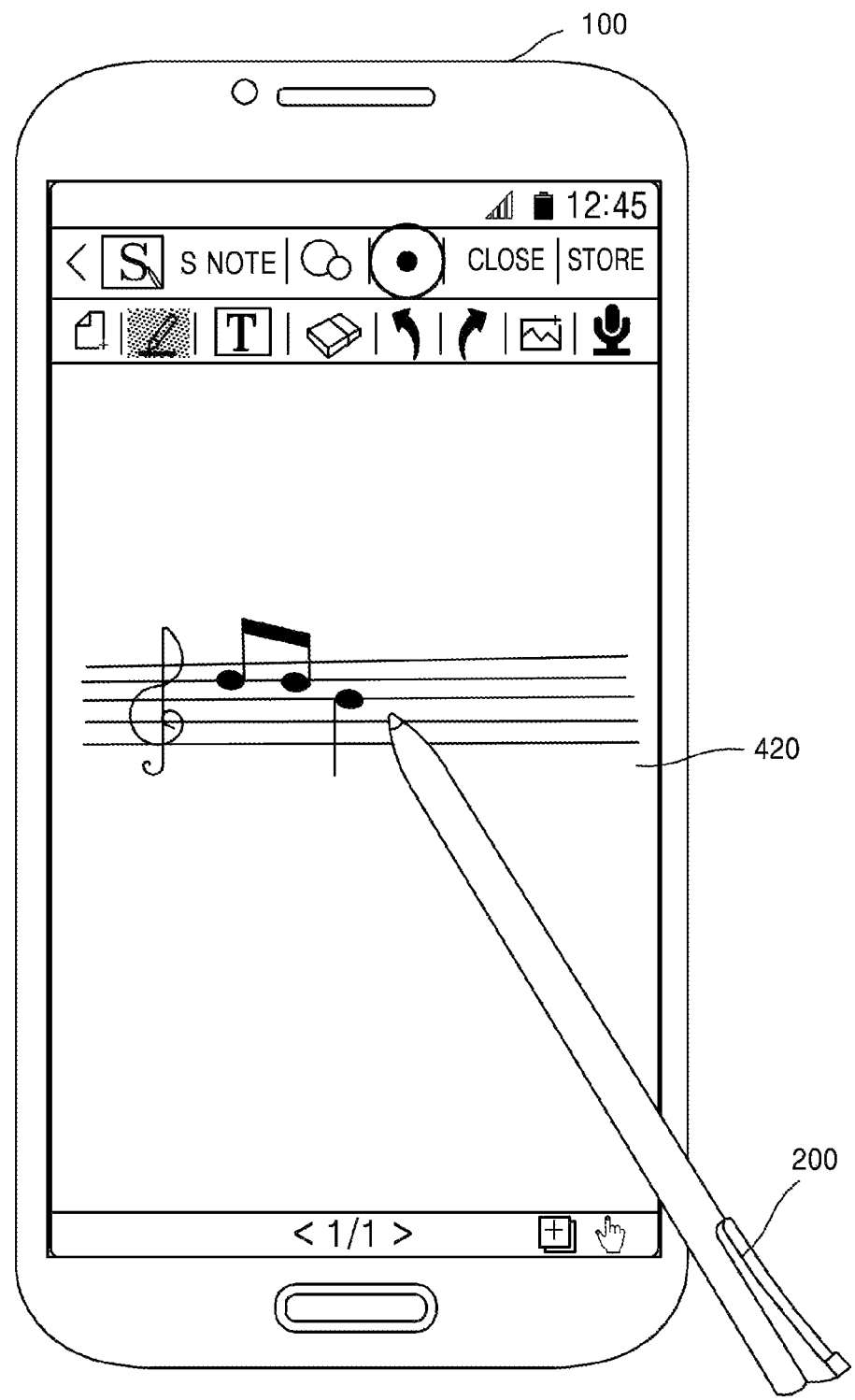
Figure 4C:
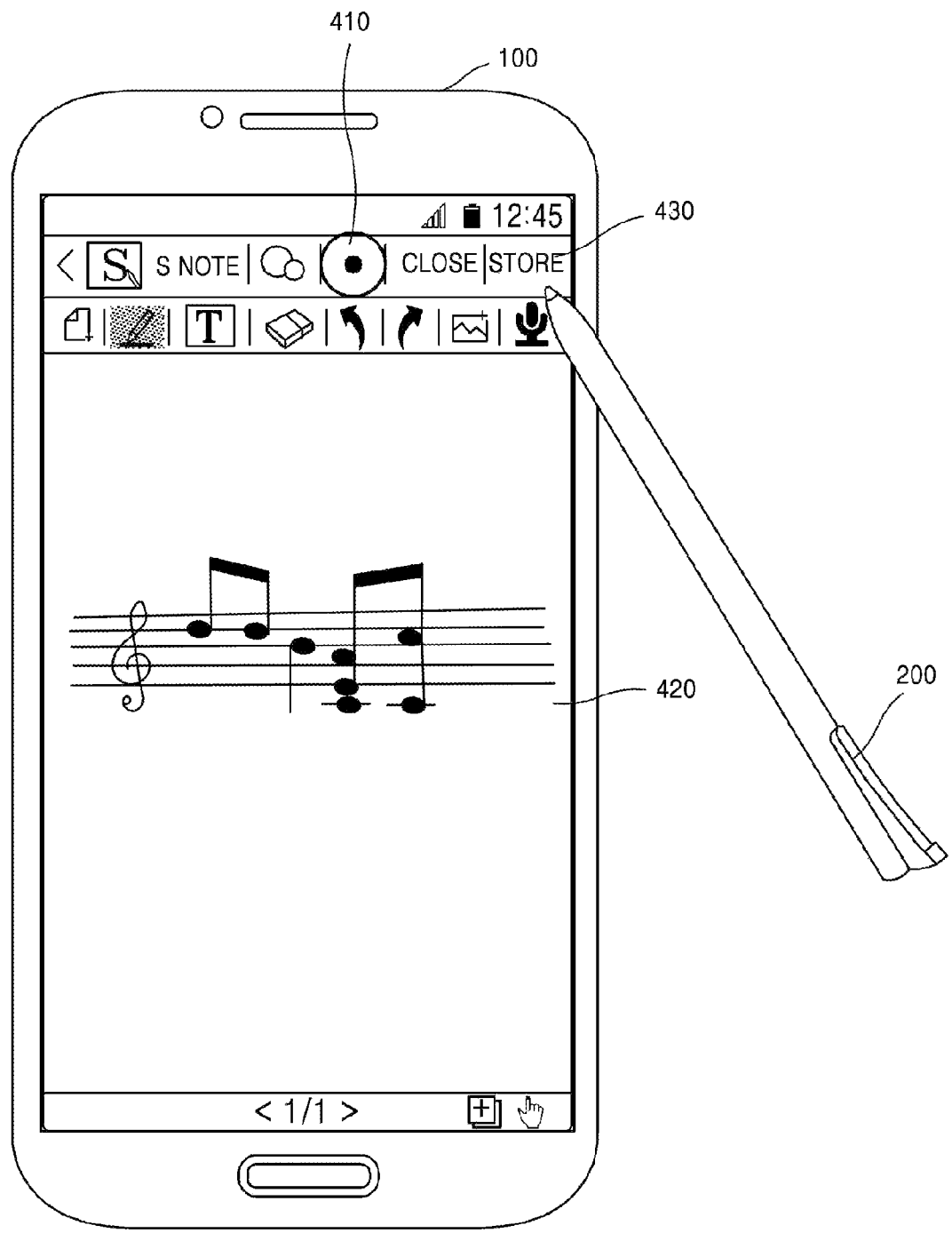

FIGS. 4A through 4C are diagrams for describing an example of creating, by the device 100, handwritten content, according to an exemplary embodiment.

Referring to FIG. 4A, the device 100 may execute a note application and display an execution window of the note application. Here, the device 100 may receive a user input for activating a sketch record button 410 included in the execution window of the note application. In response to the user input, the device 100 may start sketch recording. For example, after the sketch record button 410 is activated, the device 100 may record timestamp information and coordinate information of strokes input from the user. Alternatively, the note application may automatically record timestamp information and coordinate information, in response to startup of the note application.

Referring to FIG. 4B, the device 100 may receive an input of drawing a musical score 420 from the user. For example, the device 100 may sequentially receive an input of drawing a manuscript paper, an input of drawing a G clef, and inputs of drawing musical notes. Here, the device 100 may sequentially record timestamp information and coordinate information of strokes performed by the user for creating each of the manuscript paper, the G clef, and the musical notes.

Referring to FIG. 4C, after the user completes the score 420, the user may select the sketch record button 410 again. In this case, the device 100 may end the sketch recording. When the user activates a store button 430, the device 100 stores the timestamp information and the coordinate information of the strokes of each of the manuscript paper, the G clef, and the musical notes, thereby creating handwritten content corresponding to the score 420. Again, the device 100 may automatically record strokes, and the record button 410 and store button 430 may be optional.

Meanwhile, the device 100 creating the handwritten content is not limited to the example of FIGS. 4A through 4C. According to an exemplary embodiment, the electronic pen 200 may record timestamp information and coordinate information of strokes for creating the handwritten content. In this case, the electronic pen 200 may transmit the handwritten content to the device 100 via a communication link.

Figure 5:
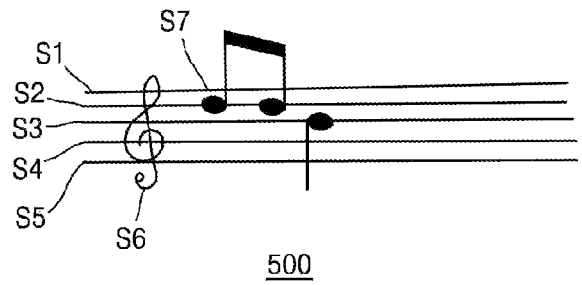
FIG. 5 is a diagram for describing an example of a storage format of handwritten content.

FIG. 5 is a diagram for describing an example of a storage format of handwritten content.

In FIG. 5, it is assumed that the device 100 creates handwritten content 500, in which a manuscript paper, a G clef, and musical notes are sequentially drawn by the user.

When a stroke input is received, the device 100 may store a table in which identification (ID) information 510 and first timestamp information 520 of a stroke are mapped to each other. For example, the device 100 may assign, according to an input order, a first timestamp (for example, 002525) to a first stroke S1, a second timestamp (for example, 002688) to a second stroke S2, a third timestamp (for example, 003900) to a third stroke S3, and a fourth timestamp (for example, 004566) to a fourth stroke S4.

Also, the device 100 may record coordinate information 530 according to strokes. Here, the device 100 may store a table in which coordinate values included in the coordinate information 530 are mapped to second timestamp information 540. For example, the device 100 may map a first coordinate value (for example, x0, y0) at a point of time when the first stroke S1 is input and a 1-1st timestamp (for example, '000000') to each other, a second coordinate value (for example, x1, y1) of the first stroke S1 and a 1-2nd timestamp (for example, '000003') to each other, and a third coordinate value (for example, x2, y2) of the first stroke S1 and a 1-3rd timestamp (for example, '00004') to each other.

According to an exemplary embodiment, the device 100 may calculate drawing speeds of strokes by using the coordinate information 530 and the second timestamp information 540. For example, the device 100 may calculate a drawing speed from the first coordinate value (for example, x0, y0) to the second coordinate value (for example, x1, y1) by using a distance between the first coordinate value (for example, x0, y0) and the second coordinate value (for example, x1, y1), the 1-1st timestamp (for example, '000000') corresponding to the first coordinate value (for example, x0, y0), and the 1-2nd timestamp (for example '000003') corresponding to the second coordinate value (for example, x1, y1).

Figure 6:
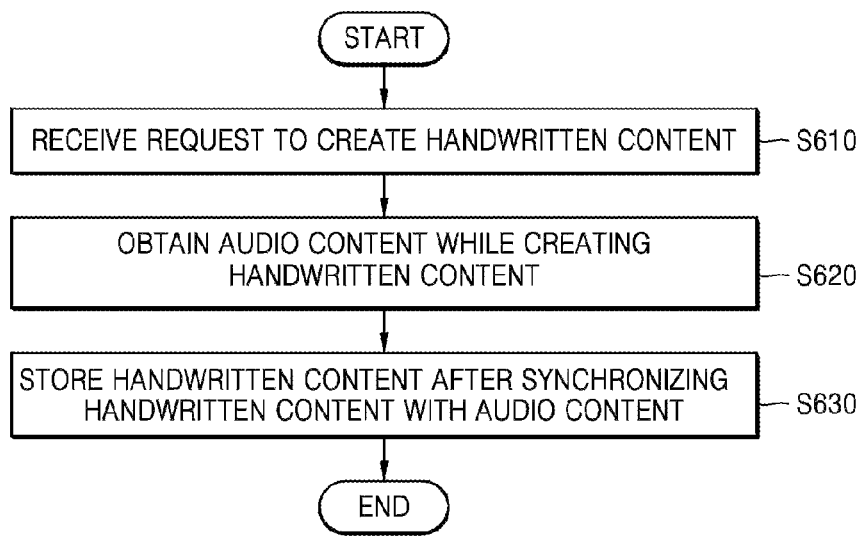
FIG. 6 is a flowchart of a method of synchronizing and storing, by a device, handwritten content and audio content, according to an exemplary embodiment.

FIG. 6 is a flowchart of a method of the device 100 synchronizing and storing handwritten content and audio content, according to an exemplary embodiment.

In operation S610, the device 100 may receive a request to create handwritten content.

For example, the device 100 may receive an input for activating a predetermined button corresponding to the request to create the handwritten content. Alternatively, the device 100 may recognize predetermined voice or a predetermined motion corresponding to the request to create the handwritten content.

According to an exemplary embodiment, the device 100 may obtain timestamp information and coordinate information corresponding to each of a plurality of strokes input during a predetermined period of time, in response to the request.

In operation S620, the device 100 may obtain audio content while creating the handwritten content. According to an exemplary embodiment, the audio content may be voice or music, but is not limited thereto. Here, the voice may be voice of a user who is handwriting, or voice of another user, such as a teacher or a professor.

For example, the device 100 may detect external sound via a microphone while detecting the handwriting of the user via a touch screen.

In operation S630, the device 100 may store the handwritten content after synchronizing the handwritten content with the audio content. For example, when a first stroke and first voice are simultaneously input at a first point of time, the device 100 may store a table in which first stroke information (for example, ID information and coordinate information of the first stroke) and first voice information are mapped to each other. The method of FIG. 6 will be described in detail with reference to FIGS. 7A through 7E.

FIGS. 7A through 7E are diagrams for describing an example of the device 100 synchronizing and storing handwritten content 700 and audio content.

In FIGS. 7A through 7E, it is assumed that the handwritten content 700 is an illustration of Pythagoras' theorem and area formulas of figures.

Referring to FIG. 7A, the device 100 may execute a note application and display an execution window of the note application. Here, the device 100 may receive a user input for activating a sketch record button 710 included in the execution window of the note application. In response, the device 100 may start sketch recording and record strokes of input handwritten content.

Figure 7B:
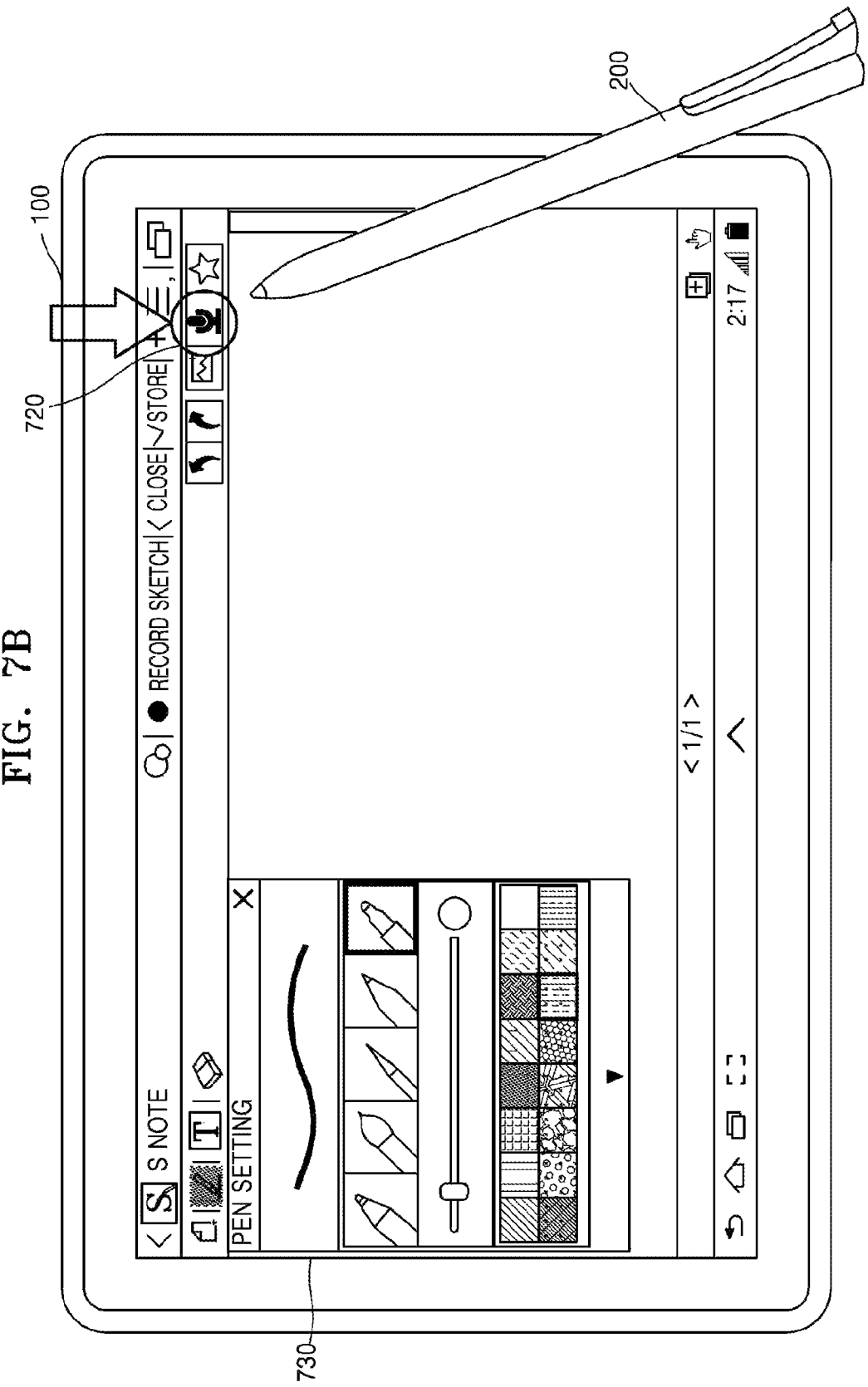

Referring to FIG. 7B, the device 100 may receive a user input for activating a sound record button 720. In response, the device 100 may activate a microphone. The device 100 may detect external sound via the activated microphone.

Also, the device 100 may provide a palette tool 730. In this case, the user may select a pencil type, a color, and a thickness through the palette tool 730.

Figure 7D:
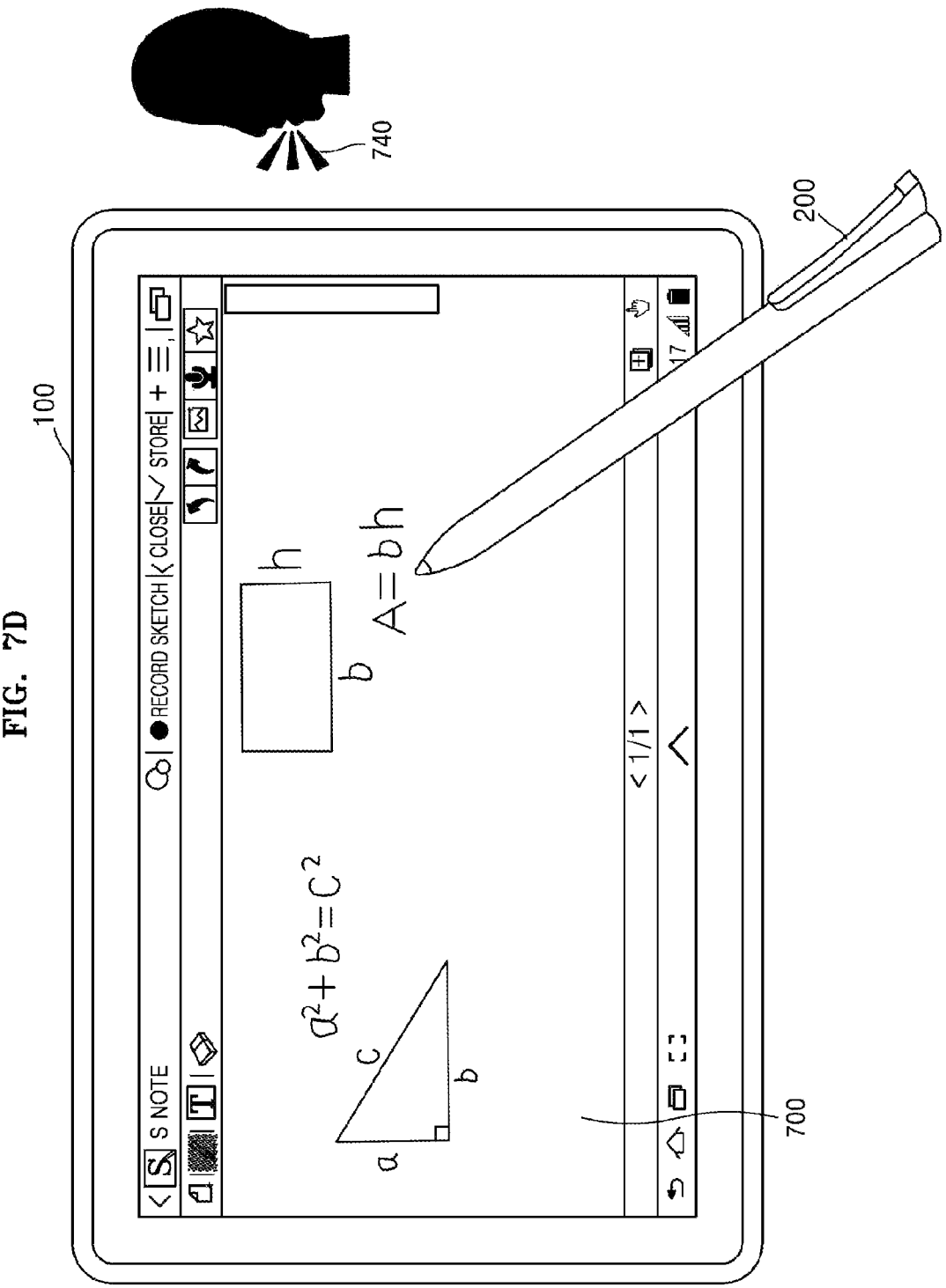

Referring to FIGS. 7C and 7D, the device 100 may sequentially receive, from the user, an input of drawing a right triangle, an input of writing Pythagoras' theorem (for example, $a^2+b^2=c^2$), an input of drawing a rectangle, and an input of writing an area formula of a rectangle (for example, $A=bh$). Here, the device 100 may sequentially record timestamp information and coordinate information of strokes of each of the right triangle, Pythagoras' theorem, the rectangle, and the area formula.

Meanwhile, the device 100 may detect external voice 740, for example, "Pythagoras' theorem can be written as an equation relating the lengths of the sides a, b, and c, . . . " while sequentially receiving the input of drawing the right triangle and the input of writing Pythagoras' theorem (for example, $a^2+b^2=c^2$) from the user.

In this case, the device 100 may synchronize and record information (for example, timestamp information and coordinate information) of strokes corresponding to the right triangle and Pythagoras' theorem, and information about the recorded external voice 740.

Referring to FIG. 7E, after the user completes handwriting, the user may activate the sketch record button 710 again. In this case, the device 100 may end the sketch recording. When the user activates a store button 750, the device 100 stores timestamp information and coordinate information of each of the right triangle, Pythagoras' theorem, the rectangle, the area formula of the rectangle, a sphere, a volume formula of the sphere, a circle, an area formula of the circle, a parallelogram, and an area formula of the parallelogram, thereby creating the handwritten content 700.

Also, the device 100 may create audio content of the external voice 740 input via the microphone. Then, the device 100 may compare a point of time when the handwriting is input and a point of time when the external voice 740 is input to synchronize the audio content and the handwritten content 700.

However, the creating, by the device 100, of handwritten content is not limited to the example of FIGS. 7A through 7E. According to an exemplary embodiment, the electronic pen 200 may record timestamp information and coordinate information of strokes to create handwritten content. Also, the electronic pen 200 may detect external voice while creating the handwritten content, and may synchronize and store the handwritten content and audio content. The electronic pen 200 may transmit the handwritten content synchronized with the audio content to the device 100 via a communication link.

Figure 8:
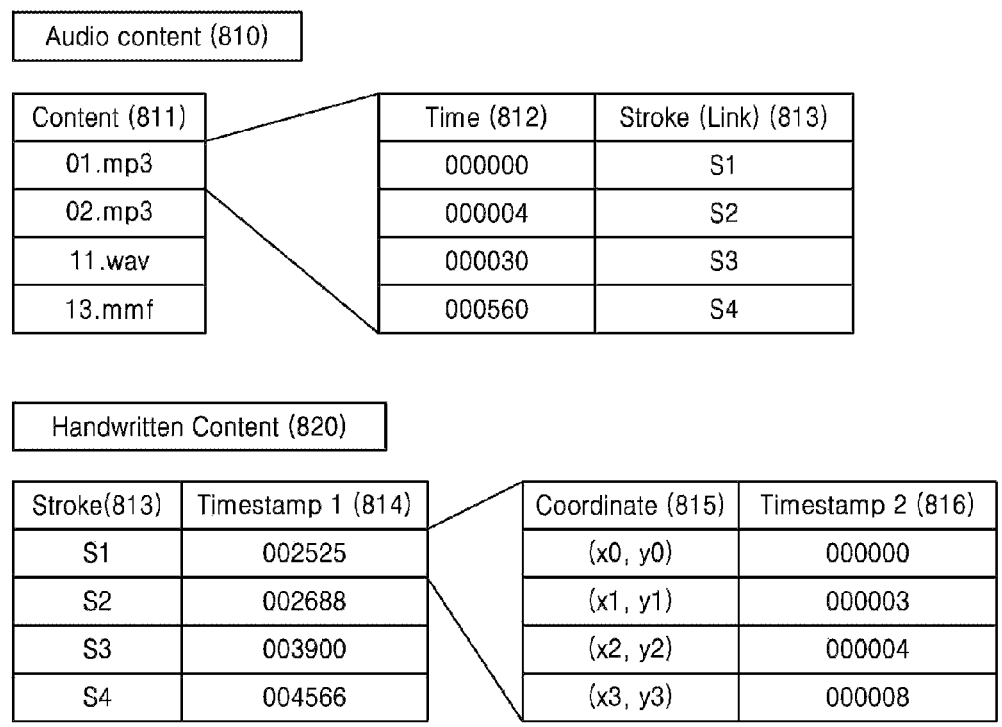
FIG. 8 is a diagram for describing an example of storage formats of handwritten content and audio content.

FIG. 8 is a diagram for describing an example of storage formats of handwritten content and audio content.

Referring to FIG. 8, when audio content 810 is obtained while creating handwritten content 820, the device 100 may map and store information of the audio content 810 and information of the handwritten content 820. For example, the device 100 may map and store ID information 811 of first audio content (for example, 01.mp3), timeline information 812, and ID information 813 of strokes included in the handwritten content 820.

When a stroke input is received, the device 100 may store a table in which the ID information 813 and first timestamp information 814 are mapped to each other. The device 100 may record coordinate information 815 according to strokes. Here, the device 100 may store a table in which coordinate values included in the coordinate information 815 and second timestamp information 816 are mapped to each other. Because descriptions about a storage format of the handwritten content 820 overlap those of FIG. 5, details thereof are not repeated here.

Figure 9:
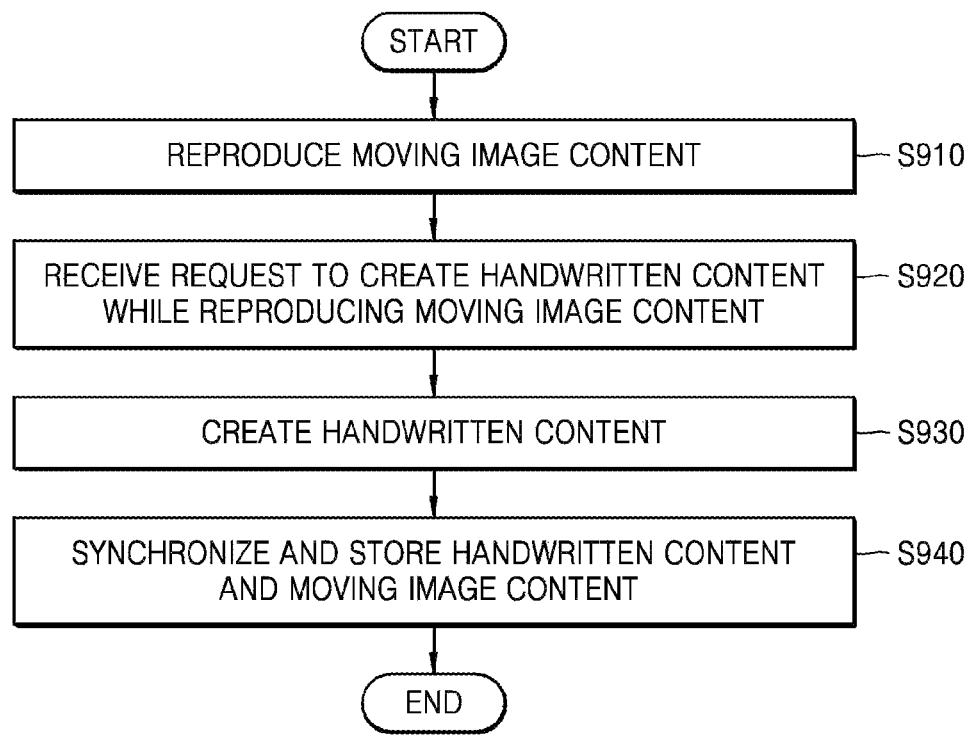
FIG. 9 is a flowchart of a method of synchronizing and storing, by a device, handwritten content and moving image content, according to an exemplary embodiment.

FIG. 9 is a flowchart of a method of synchronizing and storing, by the device 100, handwritten content and moving image content, according to an exemplary embodiment.

In operation S910, the device 100 may reproduce the moving image content. The moving image content may vary. For example, the moving image content may be an educational moving image (for example, a cooking class moving image or a math lecture moving image), an exercise-related moving image (for example, a Yoga moving image or a stretching moving image), a game moving image, a user created contents (UCC) moving image, a presentation image, a conference image, or a medical image, but the content is not limited thereto.

In operation S920, the device 100 may receive a request to create handwritten content while reproducing the moving image. For example, the device 100 may receive an input requesting to execute an application for a handwritten input. The device 100 may display an execution window of the application for a handwritten input, for example, a memo application, and receive a handwritten input through the execution window. The device 100 may display the execution window of the application for a handwritten input on the moving image content being reproduced, or may display the execution window of the application for a handwritten input not to overlap the moving image content being reproduced.

In operation S930, in response to the request to create the handwritten content, the device 100 may create the handwritten content including a plurality of strokes while reproducing the moving image content. For example, the device 100 may receive inputs of first through third strokes while reproducing a first segment of first moving image content. At this time, the device 100 may create handwritten content including the first through third strokes.

In operation S940, the device 100 may store the handwritten content after synchronizing the handwritten content with the moving image content. For example, when the input of the first stroke is received while reproducing the first segment of the first moving image content, the device 100 may store first stroke information (for example, ID information and coordinate information of the first stroke) after mapping the first stroke information to a timeline of the first segment. The method of FIG. 9 will be described in more detail with reference to FIGS. 10A and 10B. Although it is described above that audio content may be synchronized with handwritten content and moving image content may be synchronized with handwritten content, any number of various types of content may be associated with handwritten content. For example, both audio content and moving image content may be associated with handwritten content, or audio content and still image content may be associated with handwritten content.

Figure 10A:
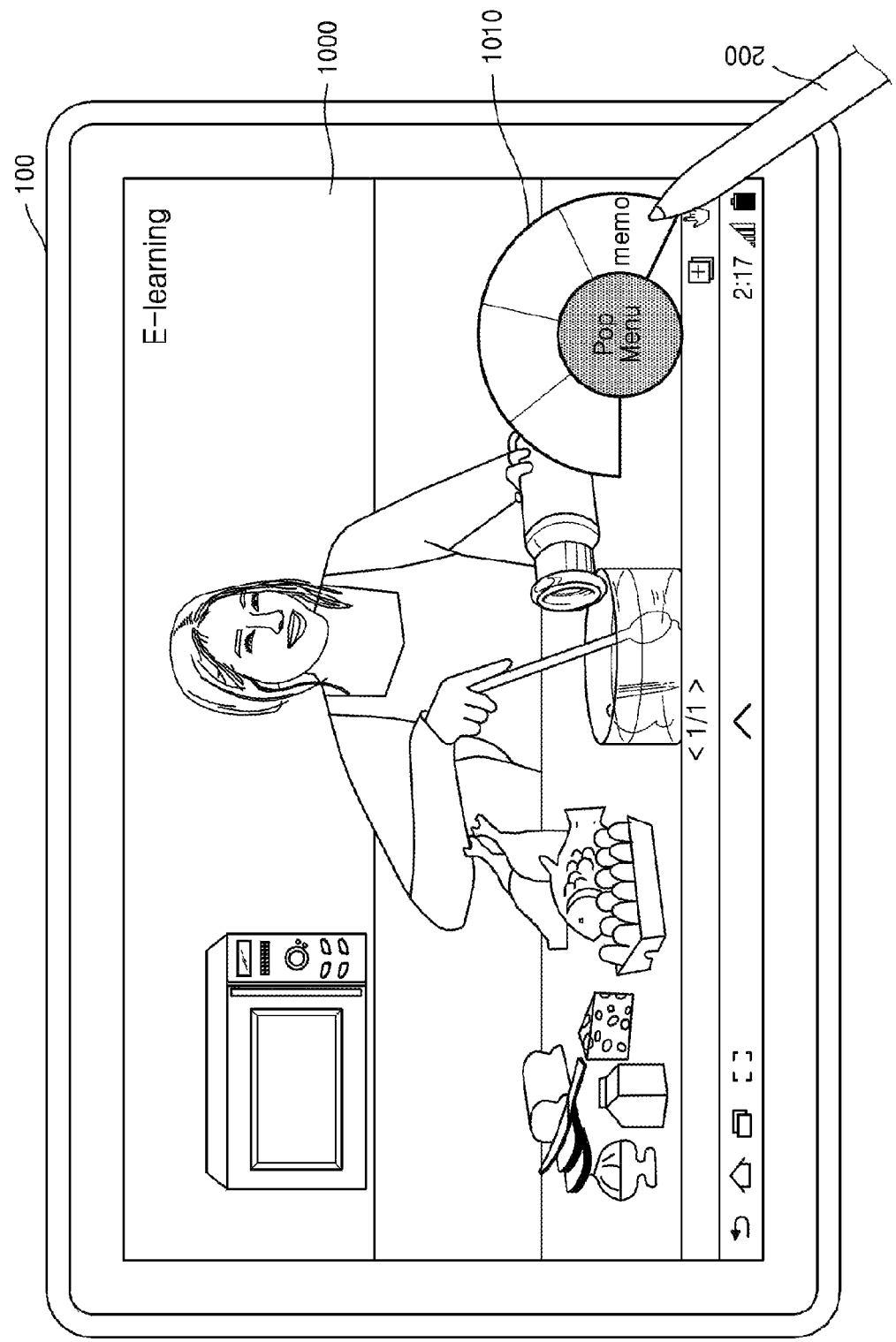

FIGS. 10A and 10B are diagrams for describing an example of the device 100 synchronizing and storing handwritten content and moving image content.

Referring to FIG. 10A, the device 100 may reproduce a cooking class moving image 1000 (video). At this time, when the user touches the screen of the device 100 for a predetermined period of time by using the electronic pen 200, the device 100 may provide a menu window 1010. When the user selects an icon of a memo application from the menu window 1010, the device 100 may execute the memo application. Alternatively, the memo application may be enabled by default.

Referring to FIG. 10B, the device 100 may display the cooking class moving image 1000 and an execution window 1020 of the memo application together by adjusting a size of the cooking class moving image 1000. Here, the device 100 may receive a handwritten input from the user via the execution window 1020 of the memo application. For example, the device 100 may receive a handwritten input of a recipe via the execution window 1020 of the memo application.

FIG. 11A is a diagram for describing an example of storage formats of handwritten content and moving image content.

Referring to FIG. 11A, when a handwritten input is received while reproducing a moving image, the device 100 may map and store information of video content 1110 and information of handwritten content 1120. For example, the device 100 may map and store ID information 1111 of first video content, for example, 01.avi, timeline information 1112, and ID information 1113 of strokes included in the handwritten content 1120.

When a stroke input is received, the device 100 may store a table in which the ID information 1113 of the strokes and first timestamp information 1114 are mapped to each other. The device 100 may record coordinate information 1115 according to strokes. At this time, the device 100 may store a table in which coordinate values included in the coordinate information 1115 are mapped to second timestamp information 1116. Because descriptions about a storage format of the handwritten content 1120 overlap those of FIG. 5, details thereof are not repeated here.

Figure 11B:
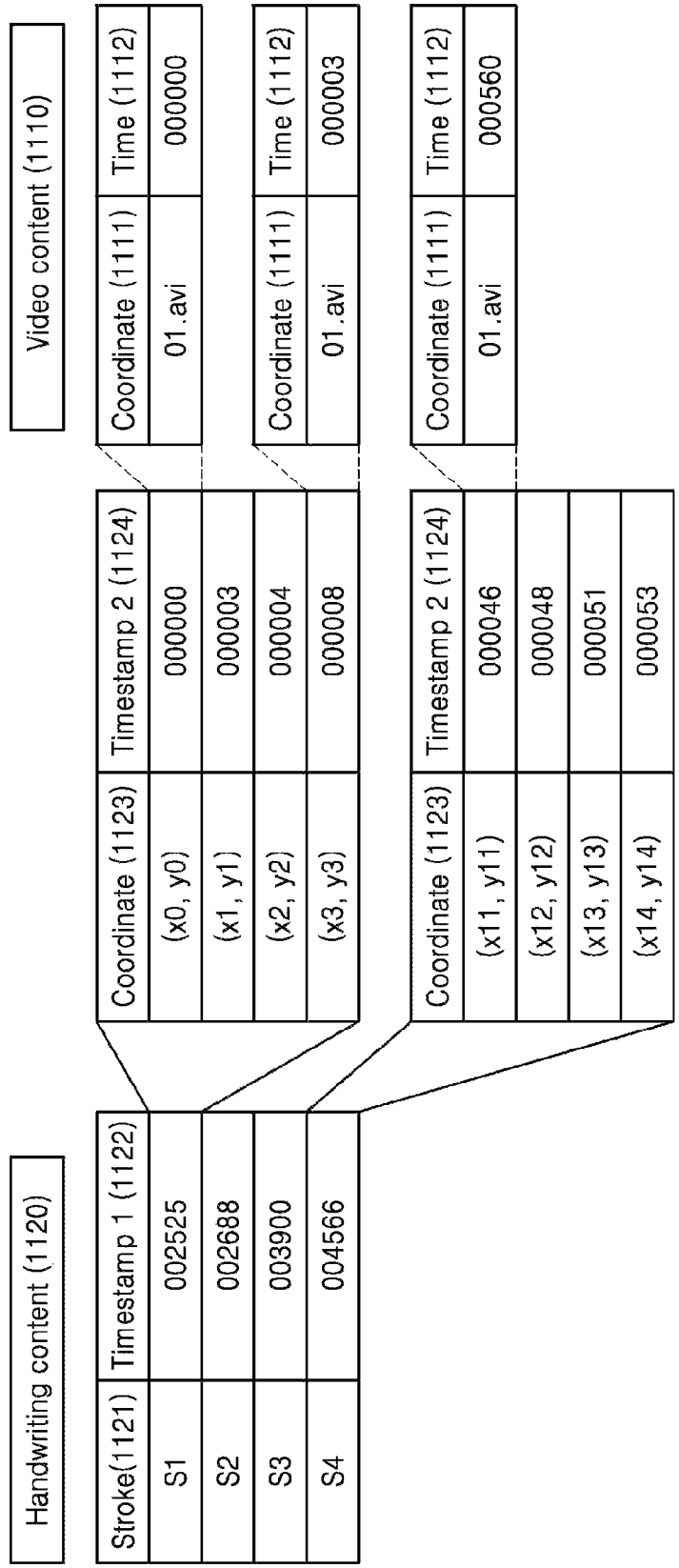
FIG. 11B is a diagram describing associating information for associating strokes of handwritten content with frames of moving image content.

FIG. 11B is a diagram describing associating information for associating strokes of handwritten content with frames of moving image content.

Referring to FIG. 11B, the device 100 may store connection information for connecting the strokes of the handwritten content 1120 and frames of the video content 1110.

For example, the device 100 may store connection information in which a start coordinate value (for example, x0, y0) of a first stroke (for example, S1) and a first frame (for example, a start frame, time: 000000) of first video content (for example, 01.avi) are associated with each other. Also, the device 100 may store connection information in which a last coordinate value (for example, x3, y3) of the first stroke (for example, S1) and a second frame (for example, time: 000003) of the first video content (for example, 01.avi) are associated with each other. The device 100 may store connection information in which a start coordinate value (for example, x11, y11) of a fourth stroke (for example, S4) and a third frame (for example, time: 000560) of the first video content (for example, 01.avi) are associated with each other.

According to an exemplary embodiment, the device 100 may associate a start (or an end) coordinate of a certain stroke to ID information of a certain frame. Therefore, when the user selects the certain stroke, the device 100 may extract the certain frame associated with the certain stroke. Alternatively, when the user selects the certain frame, the device 100 may extract the certain stroke associated with the certain frame.

Figure 12:
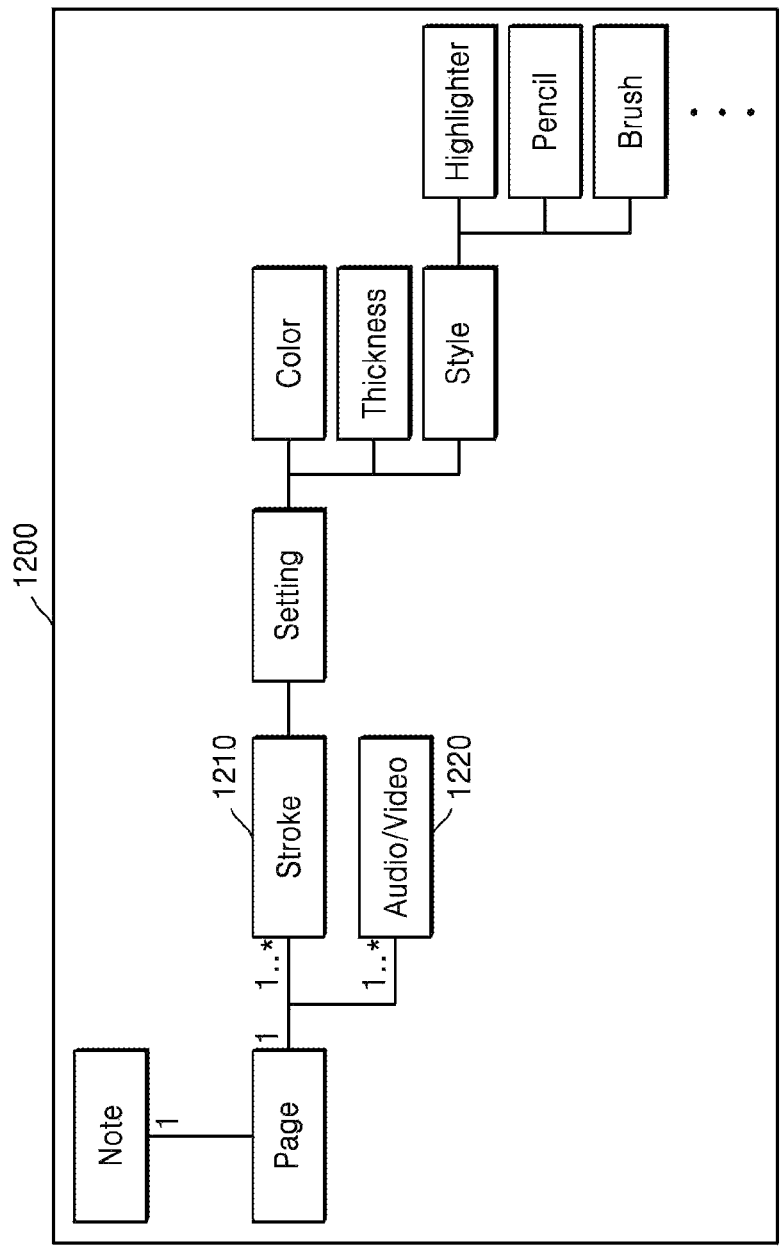
FIGS. 12, 13A, and 13B are diagrams for describing storing, by a device, of handwritten content, audio content, and moving image content.
Figure 13A:
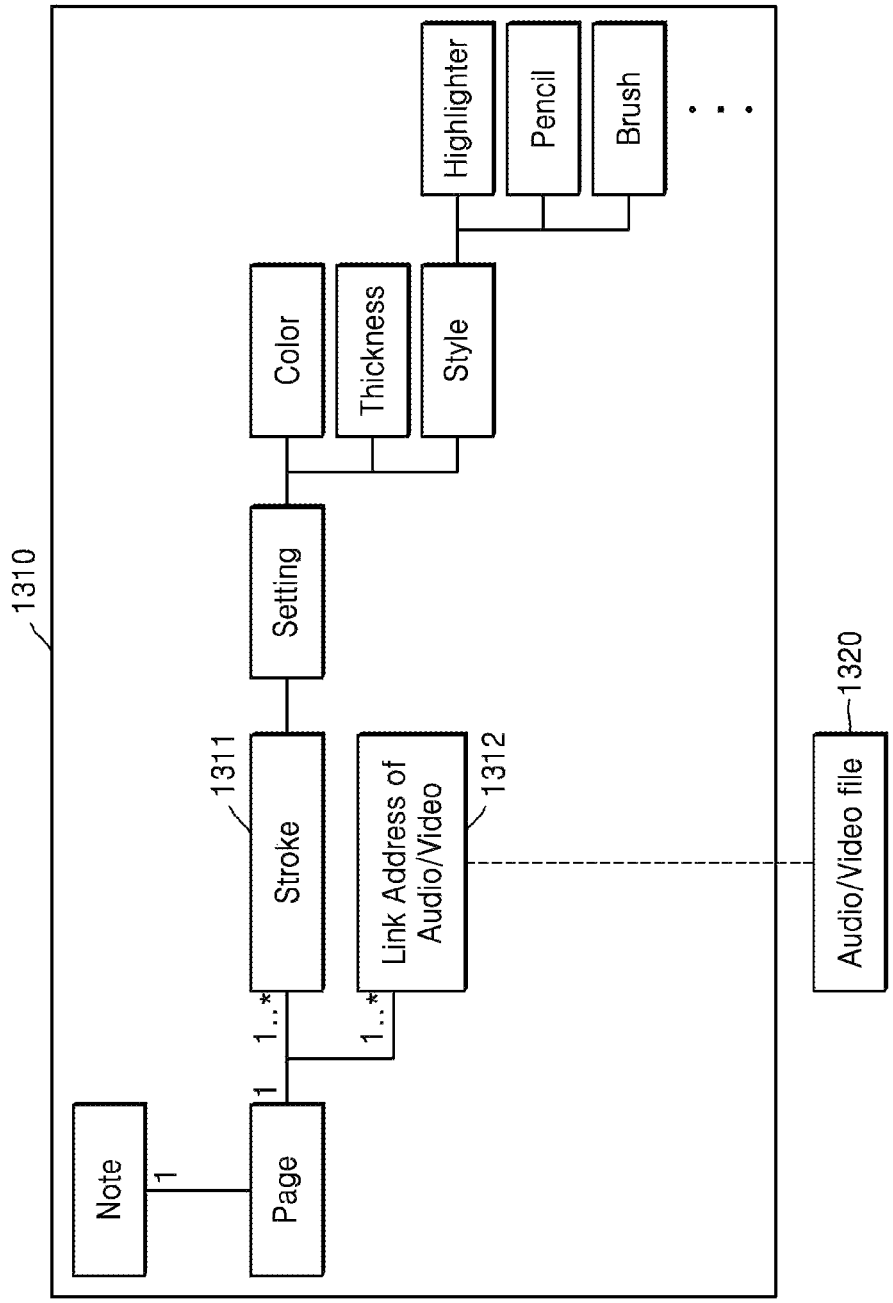
Figure 13B:
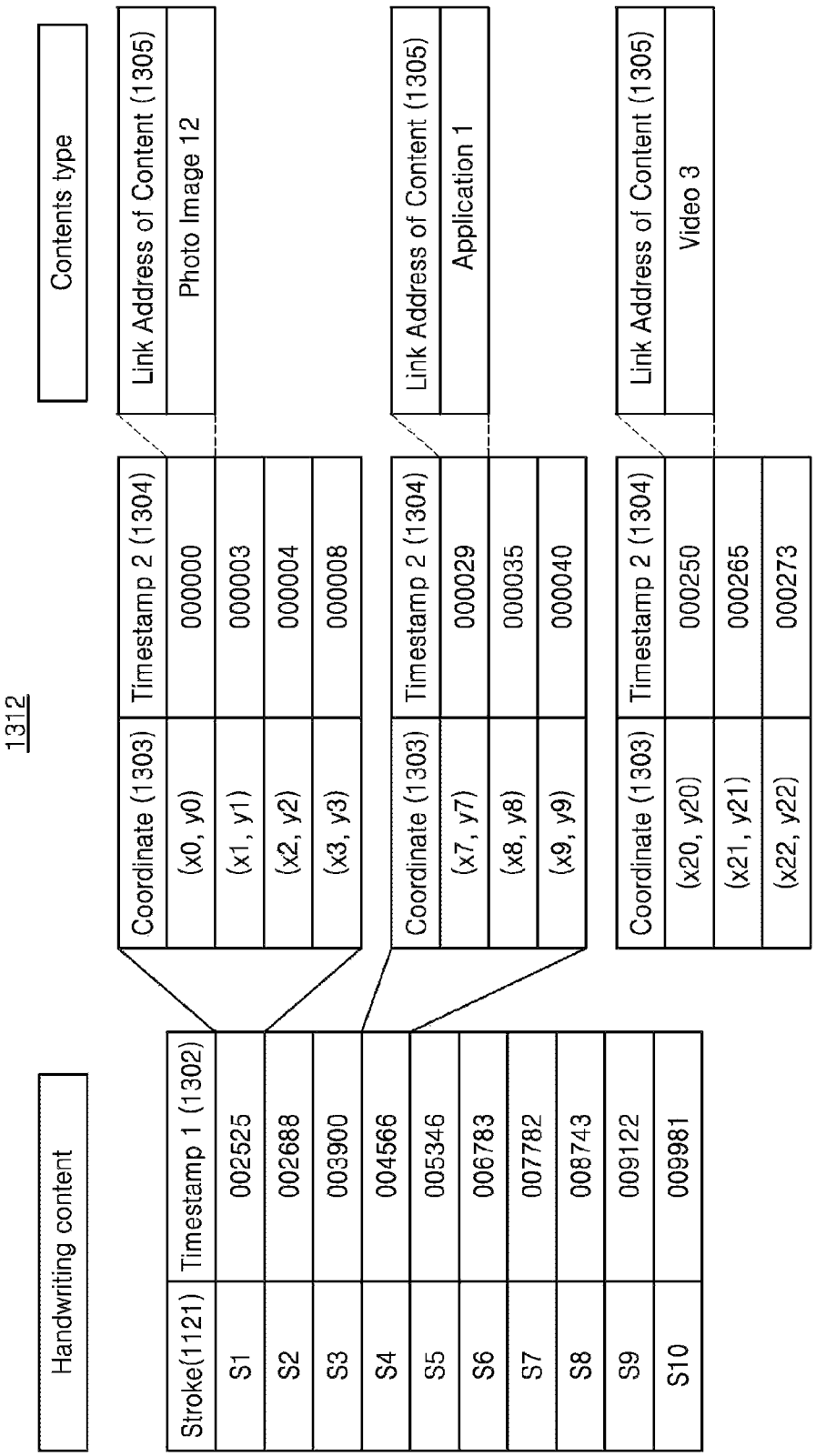

FIGS. 12, 13A, and 13B are diagrams for describing the device 100 storing handwritten content, audio content, and moving image content.

As shown in FIG. 12, according to an exemplary embodiment, the device 100 may store handwritten content in a page unit. Here, the device 100 may create one handwritten content file 1200 including stroke information 1210 and audio/video content information 1220. According to an exemplary embodiment, the stroke information 1210 may include coordinate information of each stroke, and a color value, a thickness value, and style values (for example, a highlighter, a pencil type, and a brush type) corresponding to each stroke.

According to an exemplary embodiment, the device 100 may map all coordinate values of a stroke to time stamps (or frames) of multimedia content. According to an exemplary embodiment, the device 100 may map one of coordinate values of a stroke to ID information of multimedia content. For example, the device 100 may map a start coordinate value (or a last coordinate value) of a stroke and ID information of certain multimedia content.

According to an exemplary embodiment, the device 100 may map ID information of a stroke and time stamp (or a frame) of multimedia content, or ID information of a stroke and ID information of multimedia content.

As shown in FIG. 13A, according to another exemplary embodiment, the device 100 may separately create a handwritten content file 1310 and an audio/video content file 1320. Here, the handwritten content file 1310 may include stroke information 1311 as well as link address information 1312 of audio/video content. According to an exemplary embodiment, the link address information 1312 may include ID information of the audio/video content and timeline information corresponding to each stroke.

In FIG. 13A, the handwritten content file 1310 includes the link address information 1312, but an exemplary embodiment is not limited thereto. For example, the audio/video content file 1320 may store line address information of strokes.

FIG. 13B is a diagram for describing the link address information 1312.

Referring to FIG. 13B, the device 100 may generate the link address information 1312 by mapping a part of coordinate values of a stroke included in handwritten content and ID information of at least one piece of content. The link address information 1312 may include a matching table in which the part of the coordinate values of the stroke included in the handwritten content and the ID information of the at least one piece of content are associated.

For example, when the user adds a memo about a twelfth photo image, the device 100 may map and store a start coordinate value (for example, x0, y0) of a first stroke (for example, S1) included in the memo and ID information (for example, photo image 12) of the twelfth photo image.

Also, when the user adds a memo to the device 100 in relation to a first application (or an icon), the device 100 may map and store ID information (for example, Application 1) of the first application (or the icon) and a start coordinate value (for example, x7, y7) of a fourth stroke (for example, S4) of handwritten content in the memo.

Meanwhile, when the user adds a memo to the device 100 in relation to moving image content, the device 100 may map and store ID information (for example, Video 3) of the moving image content and a start coordinate value (for example, x20, y20) of a ninth stroke (for example, S9) of handwritten content in the memo.

In FIG. 13B, a start coordinate value of a stroke and ID information of content are mapped to each other, but the mapping is not limited thereto. For example, the device 100 may map a time stamp of a stroke and ID information of content. Alternatively, the device 100 may map ID information of a stroke and ID information of content.

Then, according to an exemplary embodiment, when the user selects a certain stroke, the device 100 may extract certain content (for example, video, audio, an icon, an application, or a photo) associated with the certain stroke. Alternatively, when the user selects certain content, the device 100 may extract a certain stroke associated to the certain content.

Figure 14:
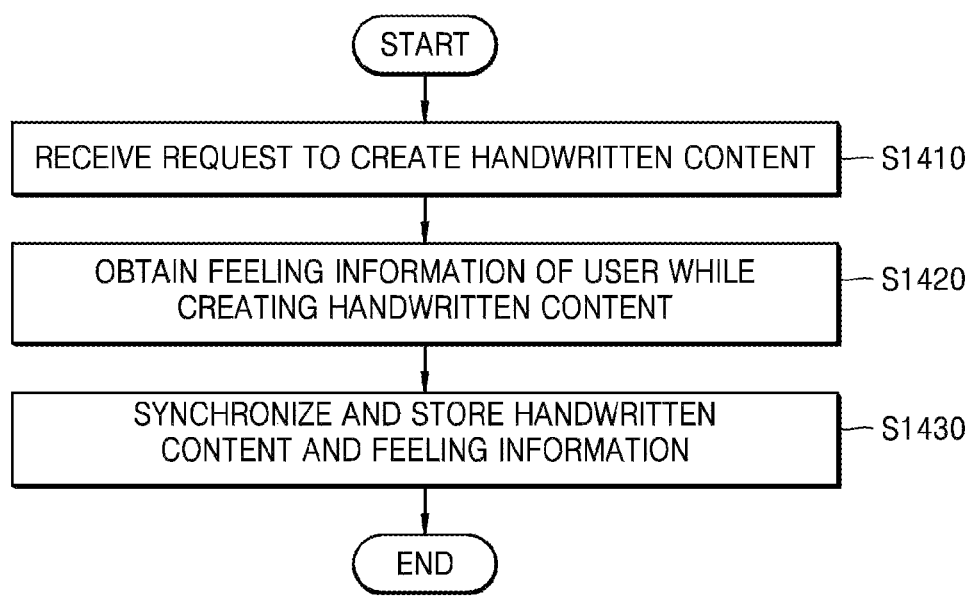
FIG. 14 is a flowchart of a method of synchronizing and storing, by a device, handwritten content and emotion information, according to an exemplary embodiment.

FIG. 14 is a flowchart of a method of the device 100 synchronizing and storing handwritten content and emotion information, according to an exemplary embodiment.

In operation S1410, the device 100 may receive a request to create handwritten content. For example, the device 100 may receive an input for activating a predetermined button corresponding to the request to create the handwritten content. Alternatively, the device 100 may recognize a predetermined voice or a predetermined motion corresponding to the request to create the handwritten content.

According to an exemplary embodiment, in response to the request, the device 100 may obtain timestamp information and coordinate information corresponding to each of a plurality of strokes input during a predetermined period of time.

In operation S1420, the device 100 may obtain emotion information of a user while creating the handwritten content. According to an exemplary embodiment, the emotion information may include mood information (for example, joy or sadness), biometric information (for example, pulse information, electrocardiogram information, temperature information), and facial expression information of the user.

According to an exemplary embodiment, the device 100 may receive pulse information, electrocardiogram information, and temperature information from an external wearable device. For example, the device 100 may receive pulse information and temperature information from a smart watch. According to an exemplary embodiment, the device 100 may receive pulse rate information from an external wearable device through a local area communication, for example, Bluetooth, near-field communication (NFC), or Wi-Fi.

Also, according to an exemplary embodiment, the device 100 may analyze a facial expression of the user by using an image sensor. For example, the device 100 may directly monitor the facial expression of the user by using the image sensor, or may monitor the facial expression of the user through an external wearable device, such as smart glasses.

According to an exemplary embodiment, the device 100 may obtain the emotion information of the user based on information input from the user. For example, the device 100 may analyze text or image input from the user, or analyze a voice pattern of the user. At this time, the device 100 may infer a emotion state of the user by comparing voice pattern information of the user and a pre-stored voice pattern template.

In operation S1430, the device 100 may synchronize and store the emotion information and the handwritten content.

For example, when inputting of a first stroke and obtaining of first emotion information are simultaneously performed at a first point of time, the device 100 may store a table in which first stroke information (for example, ID information and coordinate information of the first stroke) and the first emotion information are mapped to each other. The method of FIG. 14 will now be described in more detail with reference to FIG. 15.

Figure 15:
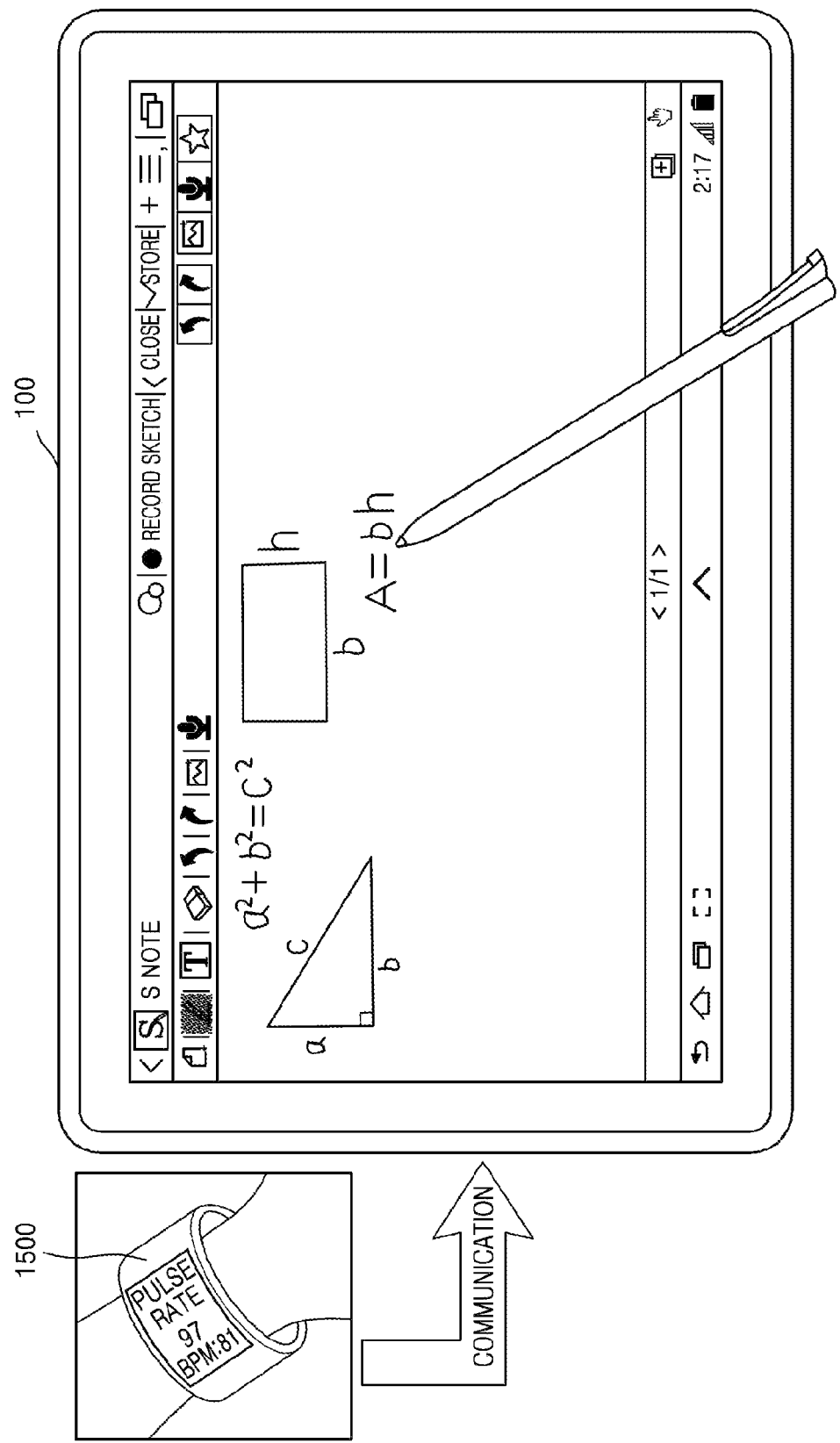
FIG. 15 is a diagram for describing an example of obtaining, by a device, emotion information while creating handwritten content.

FIG. 15 is a diagram for describing an example of the device 100 obtaining emotion information while handwritten content is created. In FIG. 15, it is assumed that the handwritten content is content of drawing Pythagoras' theorem and an area formula of a figure.

Referring to FIG. 15, the device 100 may execute a note application and display an execution window of the note application. At this time, the device 100 may receive a user input of activating a sketch record button included in the execution window of the note application. In response to the user input, the device 100 may start sketch recording.

For example, the device 100 may sequentially receive, from a user, an input of drawing a right triangle, an input of writing Pythagoras' theorem (for example, $a^2+b^2=c^2$), an input of drawing a rectangle, and an input of writing an area formula of the rectangle (for example, A=bh). At this time, the device 100 may sequentially record timestamp information and coordinate information of each of the right triangle, Pythagoras' theorem, the rectangle, and the area formula of the rectangle.

Meanwhile, the device 100 may receive biometric information of the user from an external wearable device 1500 while sequentially receiving the input of drawing the right triangle and the input of writing Pythagoras' theorem (for example, $a^2+b^2=c^2$) from the user. For example, the device 100 may receive pulse rate information measured by the external wearable device 1500 from the external wearable device 1500.

At this time, the device 100 may synchronize and record information (for example, timestamp information and coordinate information) of strokes corresponding to the right triangle and Pythagoras' theorem, and the pulse rate information.

Figure 16:
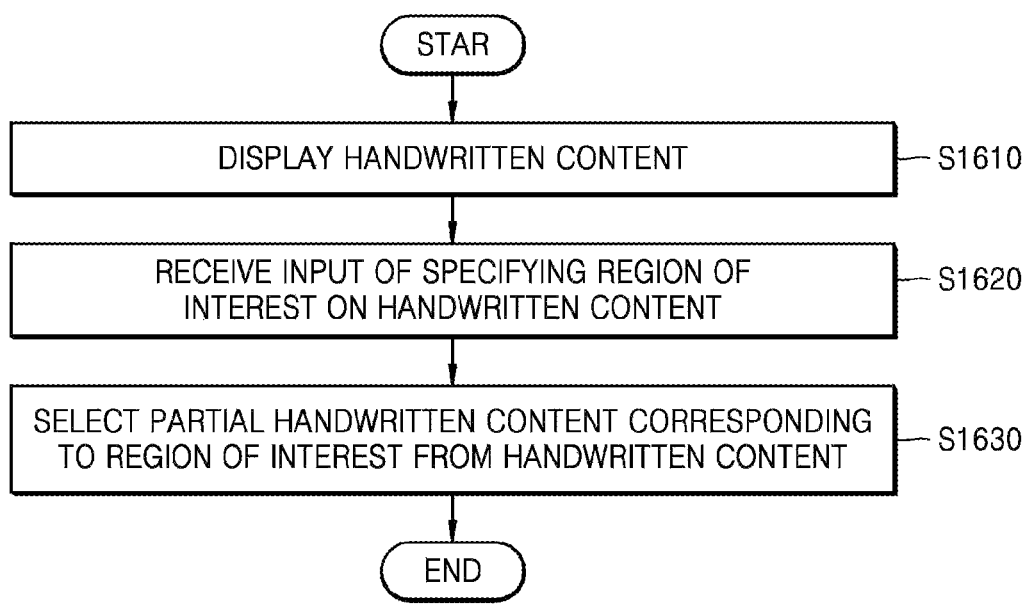
FIG. 16 is a flowchart of a method of selecting, by a device, partial handwritten content corresponding to a region of interest, according to an exemplary embodiment.

FIG. 16 is a flowchart of a method of selecting, by the device 100, partial handwritten content corresponding to a region of interest (RoI), according to an exemplary embodiment.

In operation S1610, the device 100 may display handwritten content. According to an exemplary embodiment, the device 100 may display the handwritten content on an execution window of a predetermined application. According to an exemplary embodiment, the device 100 may receive a selection on certain handwritten content from a user, and display the selected certain handwritten content.

In operation S1620, the device 100 may receive an input of specifying a region of interest on the handwritten content displayed on the screen.

According to an exemplary embodiment, a user input of selecting a region of interest may vary. For example, the user input may be at least one of a key input, a touch input (for example, tap, double-tap, touch-and-drag, flick, or swipe), a voice input, a motion input, and a multi-input, but is not limited thereto.

According to an exemplary embodiment, a shape of the region of interest may vary. For example, the shape of the region of interest may be a circle, an oval, a rectangle, or a free curve, but is not limited thereto. Also, a color and a pattern of the region of interest may vary.

In operation S1630, the device 100 may select partial handwritten content corresponding to the region of interest.

According to an exemplary embodiment, the device 100 may select the partial handwritten content corresponding to the region of interest based on a stroke unit or a coordinate unit. For example, when the partial handwritten content is selected based on a stroke unit, the device 100 may extract strokes located within the region of interest or strokes overlapping the region of interest. When the partial handwritten content is selected based on a coordinate unit, the device 100 may select coordinate values overlapping the region of interest as the partial handwritten content. An input of specifying a region of interest will now be described in detail with reference to FIGS. 17 through 20B.

Figure 17:
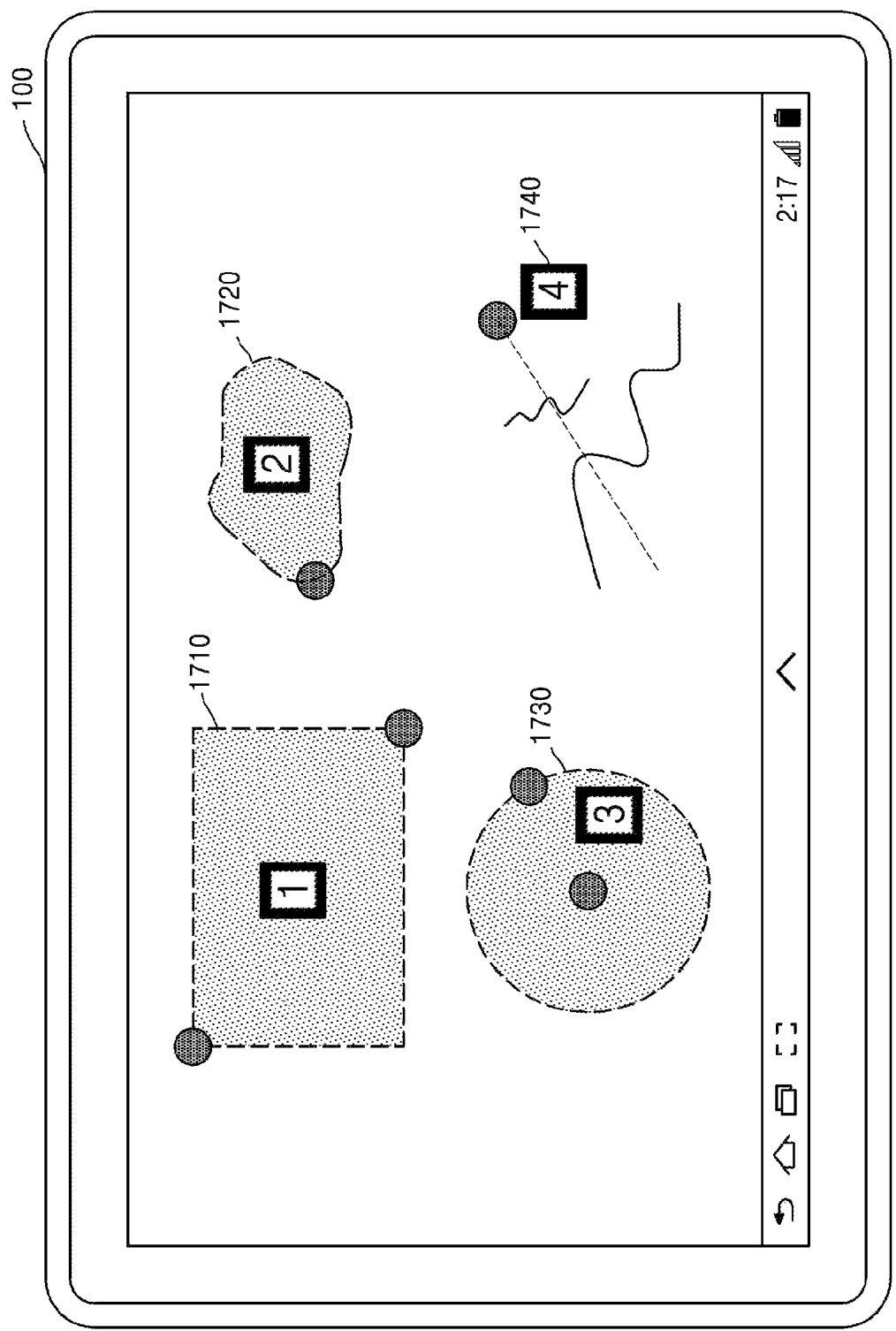
FIG. 17 is a diagram for describing an example of an input for specifying a region of interest.

FIG. 17 is a diagram for describing an example of an input for specifying a region of interest.

Referring to FIG. 17, the device 100 may specify a rectangular region 1710 based on two points as a region of interest. For example, when a user touches the two points on handwritten content, the device 100 may specify the rectangular region 1710 formed based on the two points as the region of interest.

When the user draws a free curve on the handwritten content, the device 100 may specify a closed region 1720 formed by connecting the free curve as the region of interest.

Also, the device 100 may specify a circular region 1730 drawn based on a center point and a radius as the region of interest.

Meanwhile, when the user draws a line on the handwritten content, the device 100 may specify a region 1740 where strokes crossing the line are displayed as the region of interest.

FIGS. 18, 19, 20A, and 20B are diagrams for describing an example of a user interface (UI) for specifying a region of interest. In FIGS. 18, 19, 20A, and 20B, it is assumed that a user wants to specify a region including a circle and an area formula of the circle as a region of interest.

Figure 18:
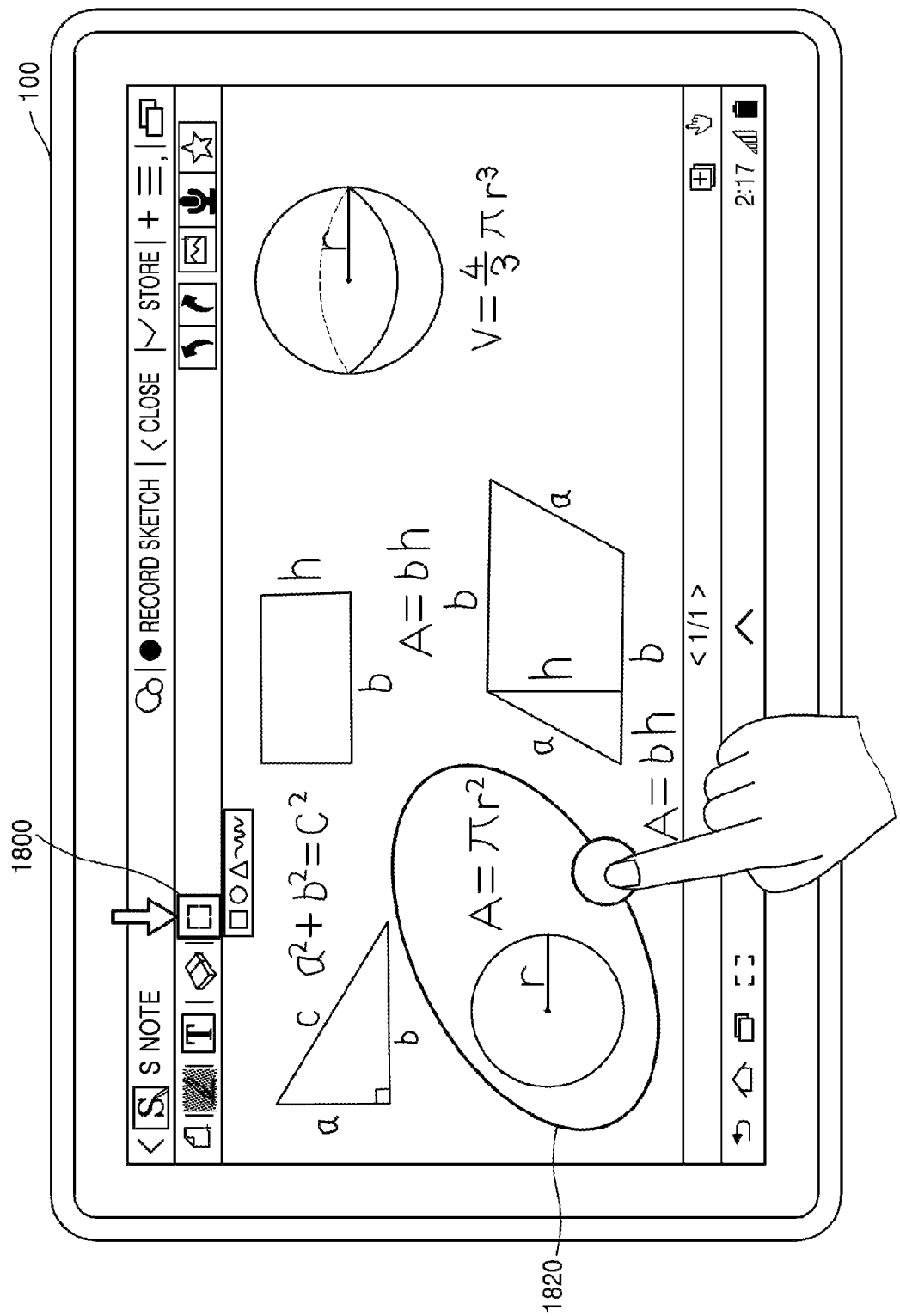
FIGS. 18, 19, 20A, and 20B are diagrams for describing an example of a user interface (UI) for specifying a region of interest.

As shown in FIG. 18, the device 100 may provide a tool bar including a button 1800 for specifying a region of interest. In order to specify a region of interest, the user may activate the button 1800 on the tool bar. At this time, the user may further select a shape (for example, a rectangle, a circle, a triangle, or a free curve) of a region of interest. For example, the user may select a circle for a shape of a region of interest.

The device 100 may specify a circular region 1820 including the circle and the area formula of the circle as a region of interest based on a touch input of the user.

Figure 19:
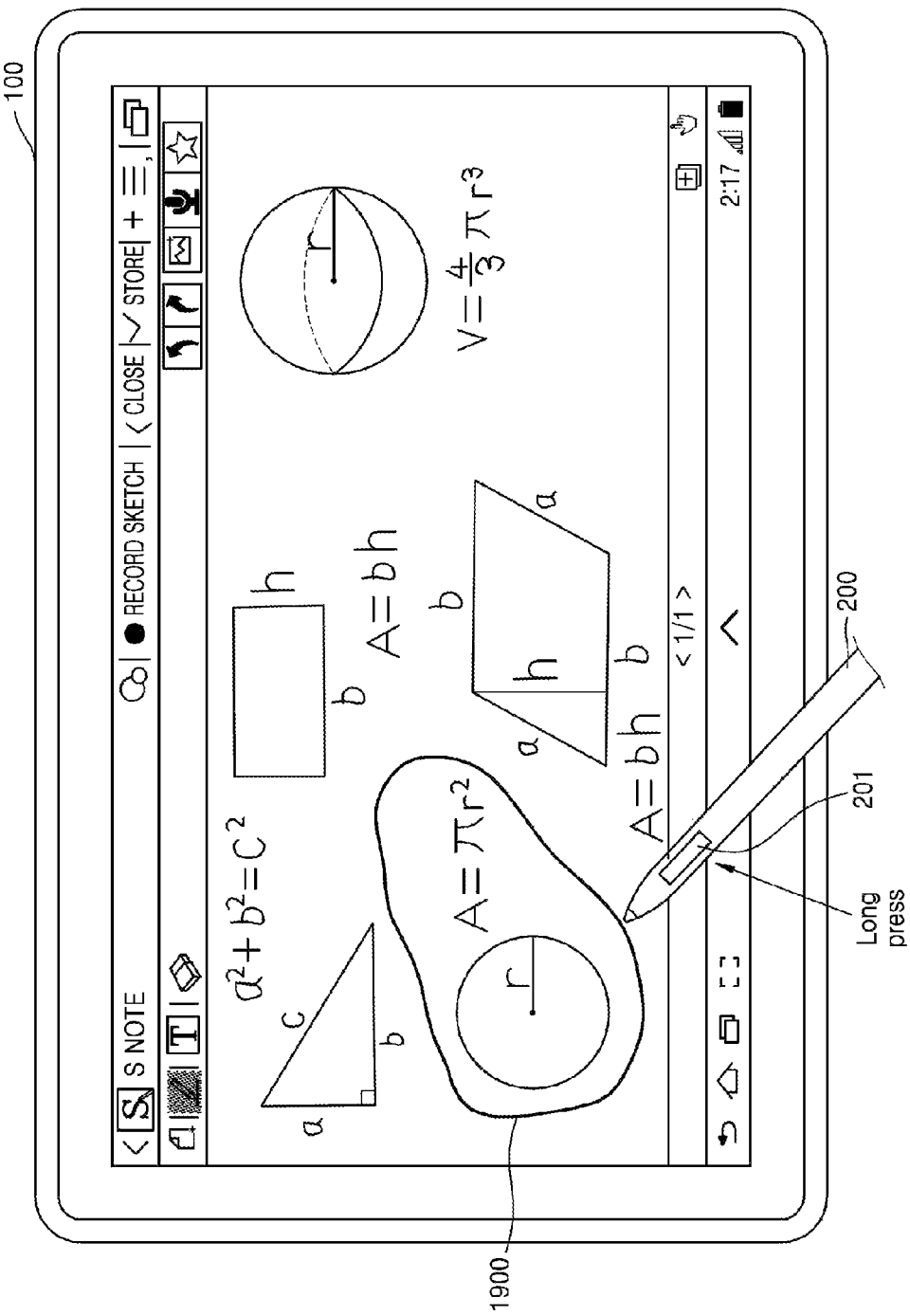

As shown in FIG. 19, according to an exemplary embodiment, the user may draw a free curve to include the circle and the area formula of the circle while pressing a certain button 201 attached to the electronic pen 200. In this case, the device 100 may select a closed region formed by the free curve as a region of interest.

Figure 20A:
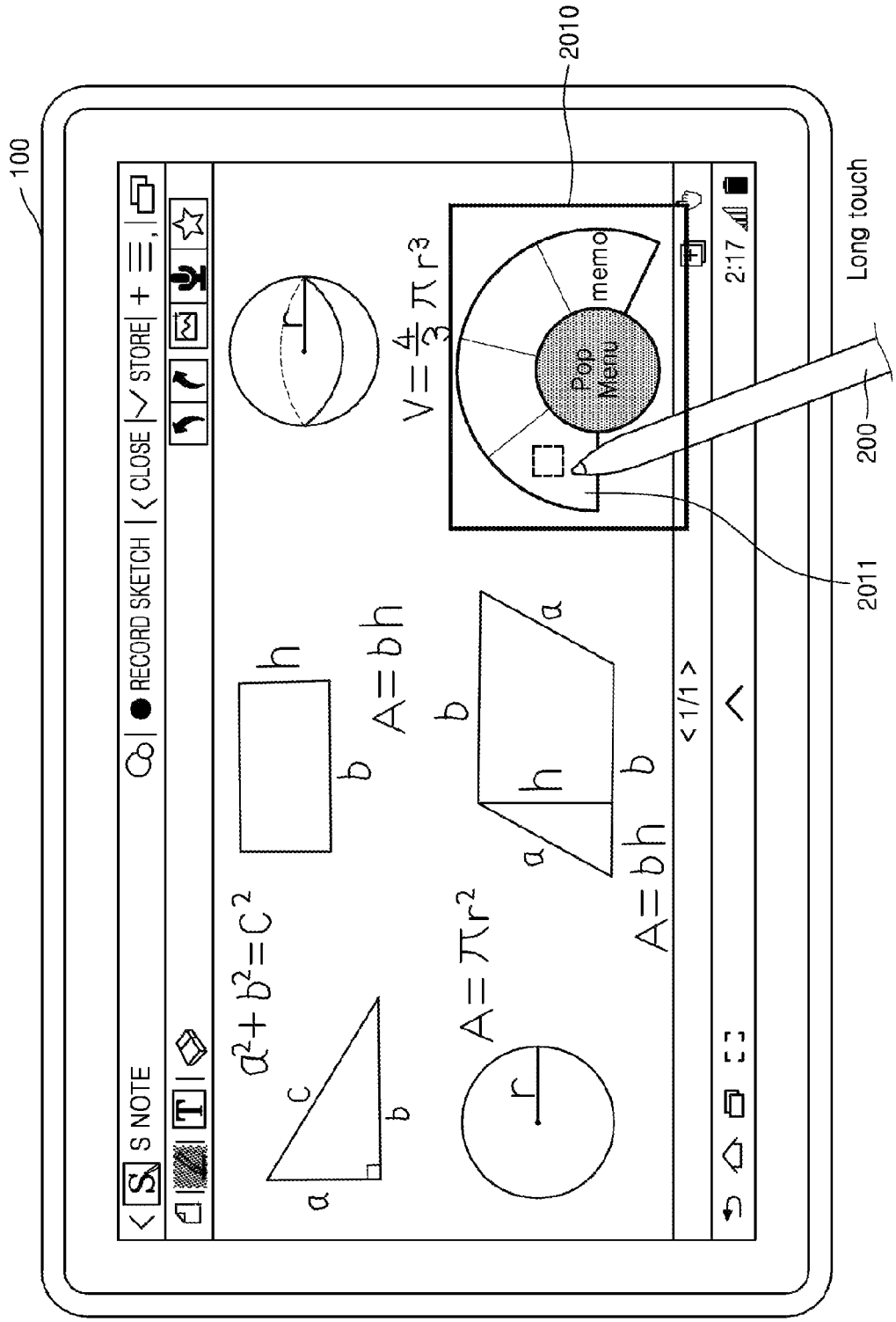

As shown in FIG. 20A, according to an exemplary embodiment, the user may touch the screen of the device 100 by using the electronic pen 200 for at least a predetermined period of time, for example, for at least 2 seconds. In this case, the device 100 may display a menu window 2010 including an icon 2011 for specifying a region of interest within a predetermined distance based on a touched point.

Figure 20B:
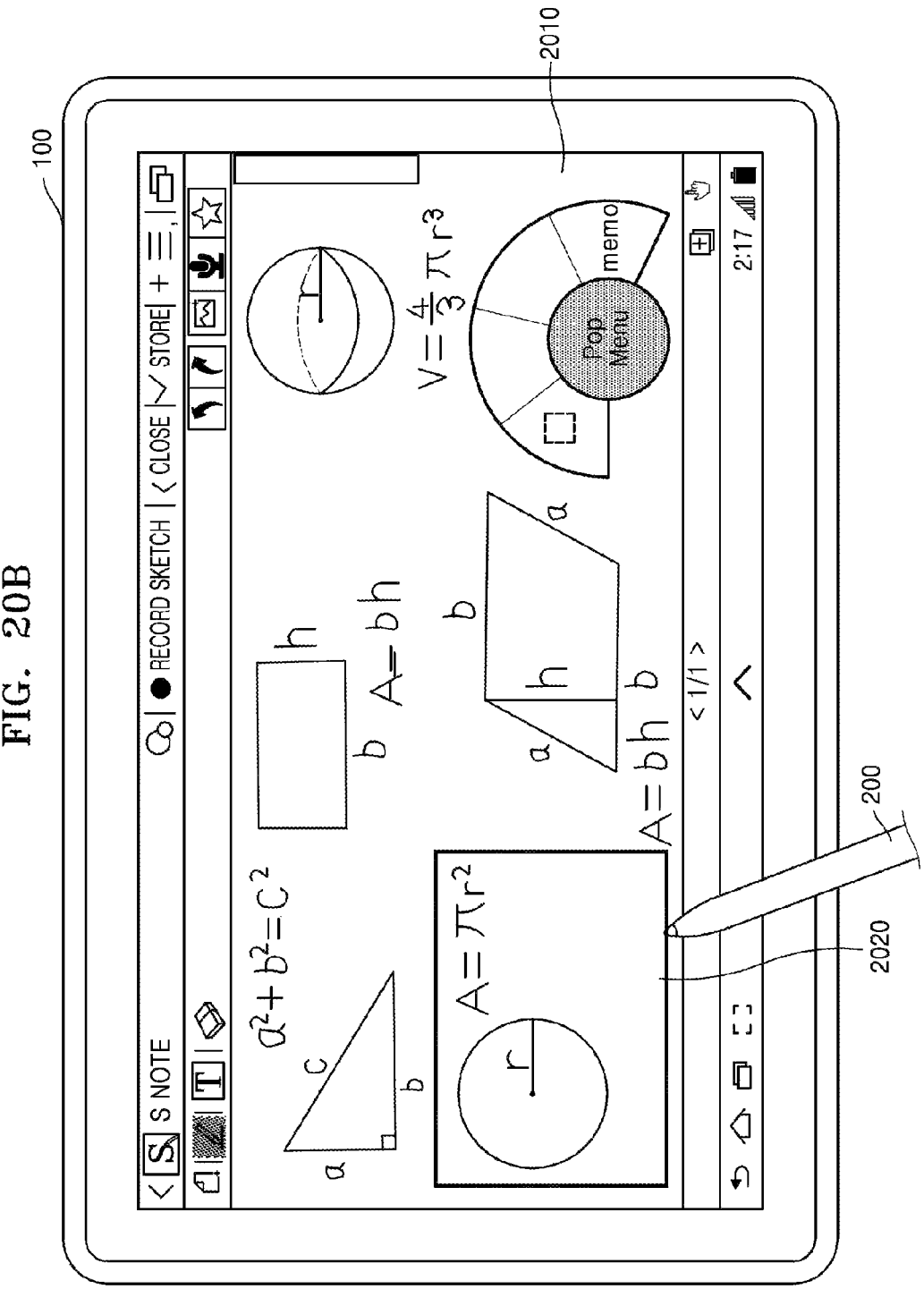

Referring to FIG. 20B, the user may select the icon 2011 included in the menu window 2010 by using the electronic pen 200. In this case, the device 100 may provide a rectangle 2020 for setting a region of interest. The user may move the rectangle 2020 to include the circle and the area formula of the circle. Alternatively, the user may expand or contract the region of interest to adjust the region of interest area.

Figure 21:
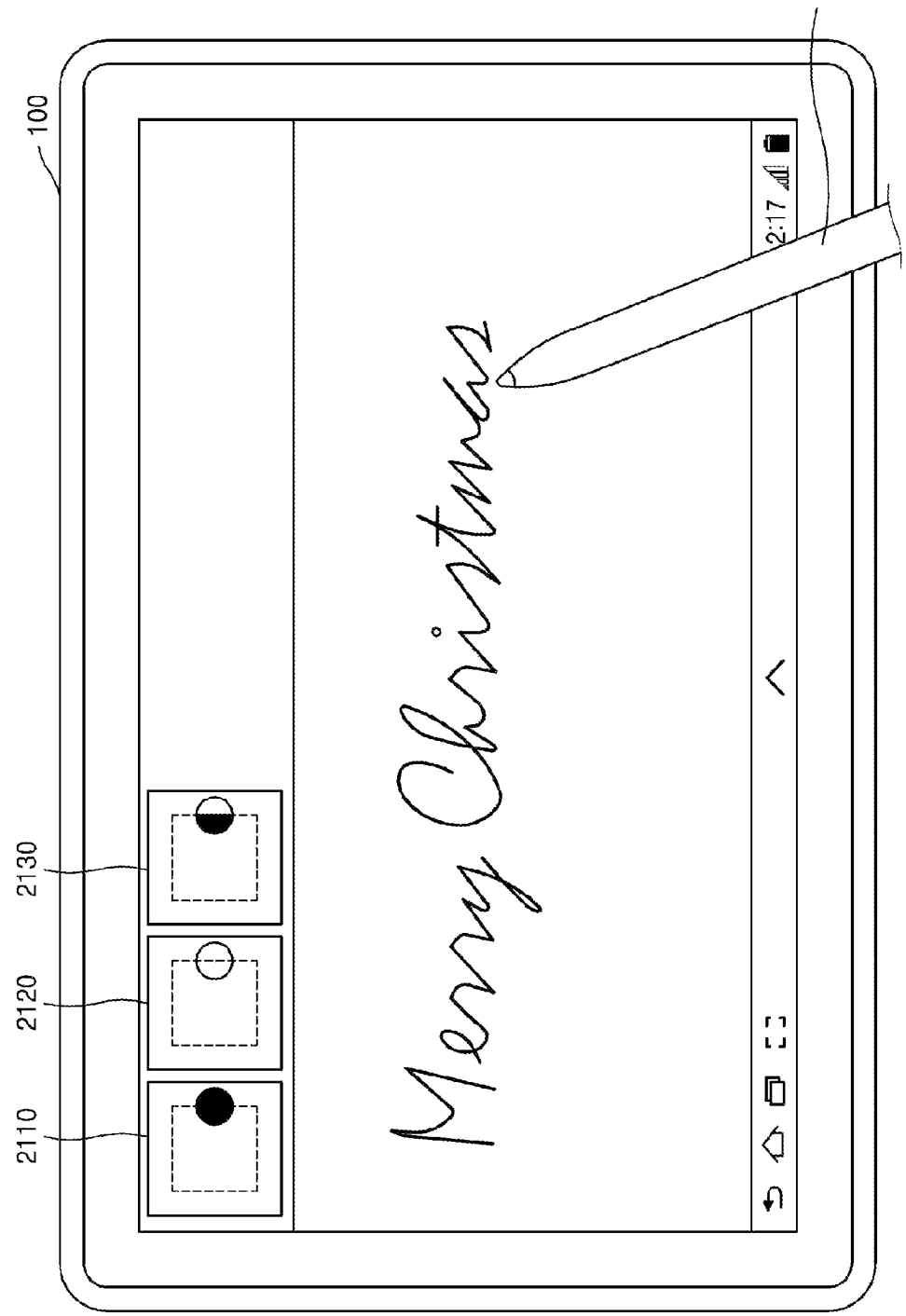

FIGS. 21 and 22 are diagrams of an example of a graphical user interface (GUI) for determining partial handwritten content corresponding to a region of interest. In FIG. 21, it is assumed that 'M' is a first stroke and 'erry' is a second stroke.

According to an exemplary embodiment, the device 100 may provide menus corresponding to methods for determining strokes corresponding to a region of interest.

For example, the device 100 may provide a first menu 2110 for selecting strokes overlapping a region of interest as partial handwritten content corresponding to the region of interest, a second menu 2120 for selecting strokes entirely included in a region of interest as partial handwritten content corresponding to the region of interest, and a third menu 2130 for selecting coordinate values in a region of interest as partial handwritten content corresponding to the region of interest.

Referring to reference numeral 2210 of FIG. 22, a user may select the first menu 2110 and locate a region of interest 2200 to only include 'Merr' from entire handwritten content, for example, Merry Christmas. In this case, the device 100 may select the first stroke ('M') and the second stroke ('erry') overlapping the region of interest 2200 as partial handwritten content corresponding to the region of interest 2200.

Referring to reference numeral 2220 of FIG. 22, a user may select the second menu 2120 and locate the region of interest 2200 to only include 'Merr'' from the entire handwritten content, i.e., Merry Christmas. In this case, the device 100 may select only the first stroke ('M') entirely included in the region of interest 2200 as partial handwritten content corresponding to the region of interest 2200.

Referring to reference numeral 2230 of FIG. 22, a user may select the third menu 2130 and locate the region of interest 2200 to only include 'Merr' from the entire handwritten content, i.e., Merry Christmas. In this case, the device 100 may select 'Merr' included in the region of interest 2200 as partial handwritten content corresponding to the region of interest 2200 based on coordinate information.

Alternatively, the device 100 may select strokes based on a dictionary. In this regard, the device 100 may determine that the strokes 'Merr' corresponding to the region of interest form a word 'Merry'. Accordingly, the device 100 may select all of the corresponding strokes of the word 'Merry', even if strokes of the word are outside of the region of interest. The device 100 may, therefore, refer to strokes stored prior to or subsequent to strokes in the region of interest to determine whether strokes within a selected region of interest are part of a word.

Still further, the device 100 may determine whether the strokes within a region of interest correspond to strokes of a phrase. Accordingly, the device 100 may select all strokes corresponding to the phrase. In this case, the device 100 may select the strokes corresponding to the phrase 'Merry Christmas' when the region of interest in FIG. 22 is selected.

As noted above, a portion of handwriting content may be selected through the region of interest. Accordingly, a word, sentence, character, phrase, paragraph, or group of characters may be selected.

Figure 23A:
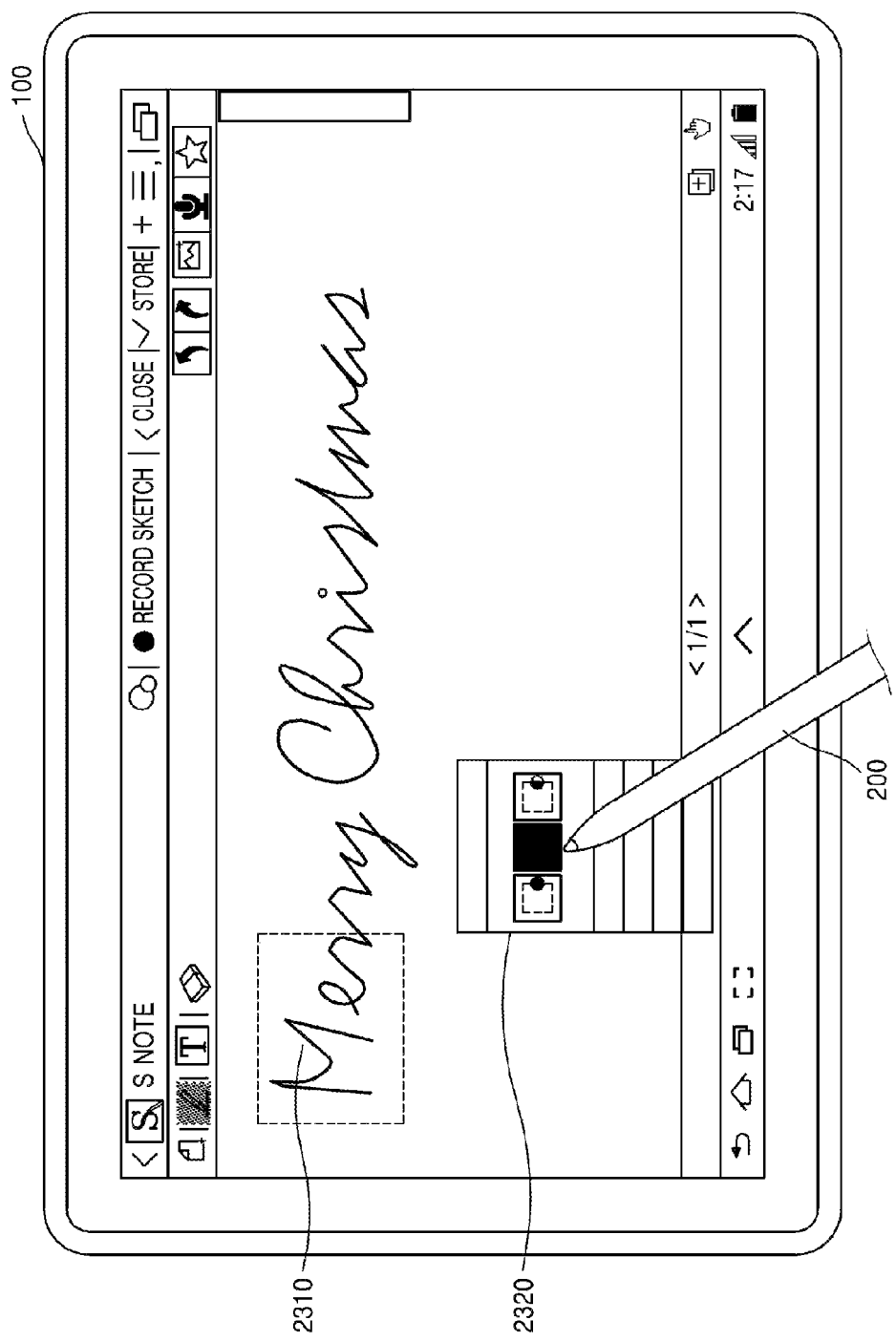
FIG. 23A is a diagram of an example of displaying, by a device, a GUI for determining a stroke corresponding to a region of interest on a pop-up window.

FIG. 23A is a diagram of an example of the device 100 displaying a GUI for determining a stroke corresponding to a region of interest 2310 on a pop-up window 2320. In FIG. 23A, it is assumed that 'M' is a first stroke and 'erry' is a second stroke.

Referring to FIG. 23A, the device 100 may receive an input of locating the region of interest 2310 only to include 'Merr' from entire handwritten content, for example, Merry Christmas.

In response to the input of locating the region of interest 2310, the device 100 may provide the pop-up window 2320 including the first through third menus 2110 through 2130. According to an exemplary embodiment, the device 100 may display the pop-up window 2320 within a predetermined distance from the region of interest 2310.

For example, the user may locate the region of interest 2310 to only include 'Merr' from the entire handwritten content, i.e., Merry Christmas. Here, the device 100 may display the first through third menus 2110 through 2130 around the region of interest 2310.

The user may select one of the first through third menus 2110 through 2130 from the pop-up window 2320. For example, the user may select the second menu 2120 from the pop-up window 2320. In this case, the device 100 may select only the first stroke ('M') entirely included in the region of interest 2310 as partial handwritten content corresponding to the region of interest 2310.

FIG. 23B is a diagram of an example of displaying, by the device 100, a guide image for guiding specifying of a region of interest.

As shown in FIG. 23B, the device 100 may receive an input of locating a first region of interest 2330 to only include 'Merr' and 'Ch' from entire handwritten content (for example, Merry Christmas). Here, the device 100 may guide a user to set a region 2340 including all strokes (for example, Merry Christmas) overlapping the first region of interest 2330 as a region of interest. For example, the device 100 may display a guide image 2350 guiding the user to increase a size of the first region of interest 2330.

Figure 24:
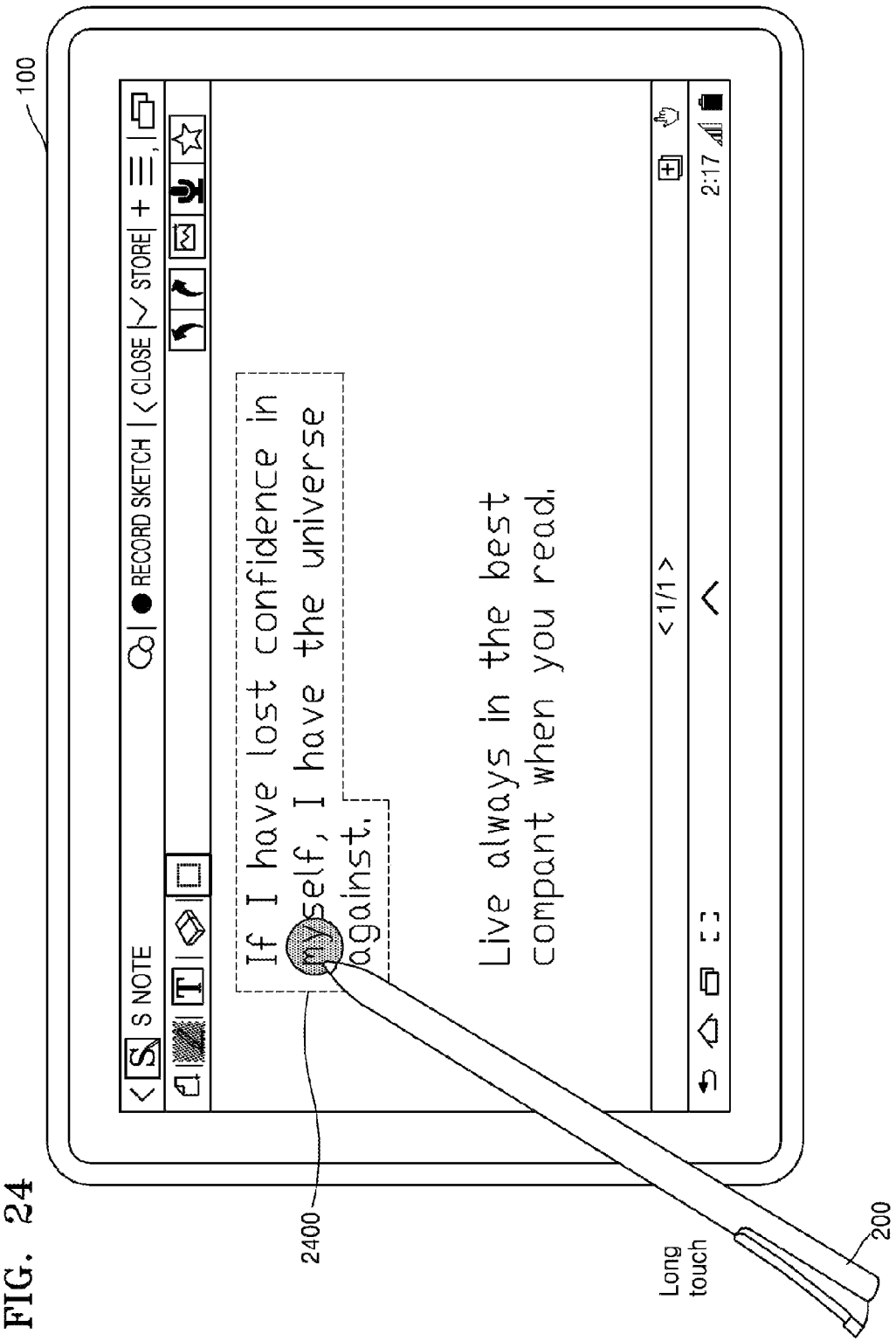
FIG. 24 is a diagram of an example of a UI for selecting partial handwritten content in a segment unit.

FIG. 24 is a diagram of an example of a UI for selecting partial handwritten content in a segment unit.

Referring to FIG. 24, the device 100 may semi-automatically select a region of interest 2400. According to an exemplary embodiment, the device 100 may receive a selection on a certain point from a user. For example, the device 100 may receive an input of touching a region displaying 'my' from among entire handwritten content for at least a predetermined period of time, for example, at least 2 seconds.

According to an exemplary embodiment, the device 100 may parse the entire handwritten content and extract a paragraph (for example, "If I have lost confidence in myself, I have the universe against.") including the certain point, for example, my. For example, the device 100 may extract the paragraph including the certain point based on a paragraph sign, for example, a comma or an enter). The device 100 may specify the region of interest 2400 to include the extracted paragraph. Alternatively, the device 100 may specify a word, phrase, or sentence.

According to another exemplary embodiment, the device 100 may select the region of interest 2400 having a predetermined size (for example, 10 pixels or 5 cm$^2$) based on the certain point selected by the user. The predetermined size may be pre-set by the user or the device 100.

Figure 25:
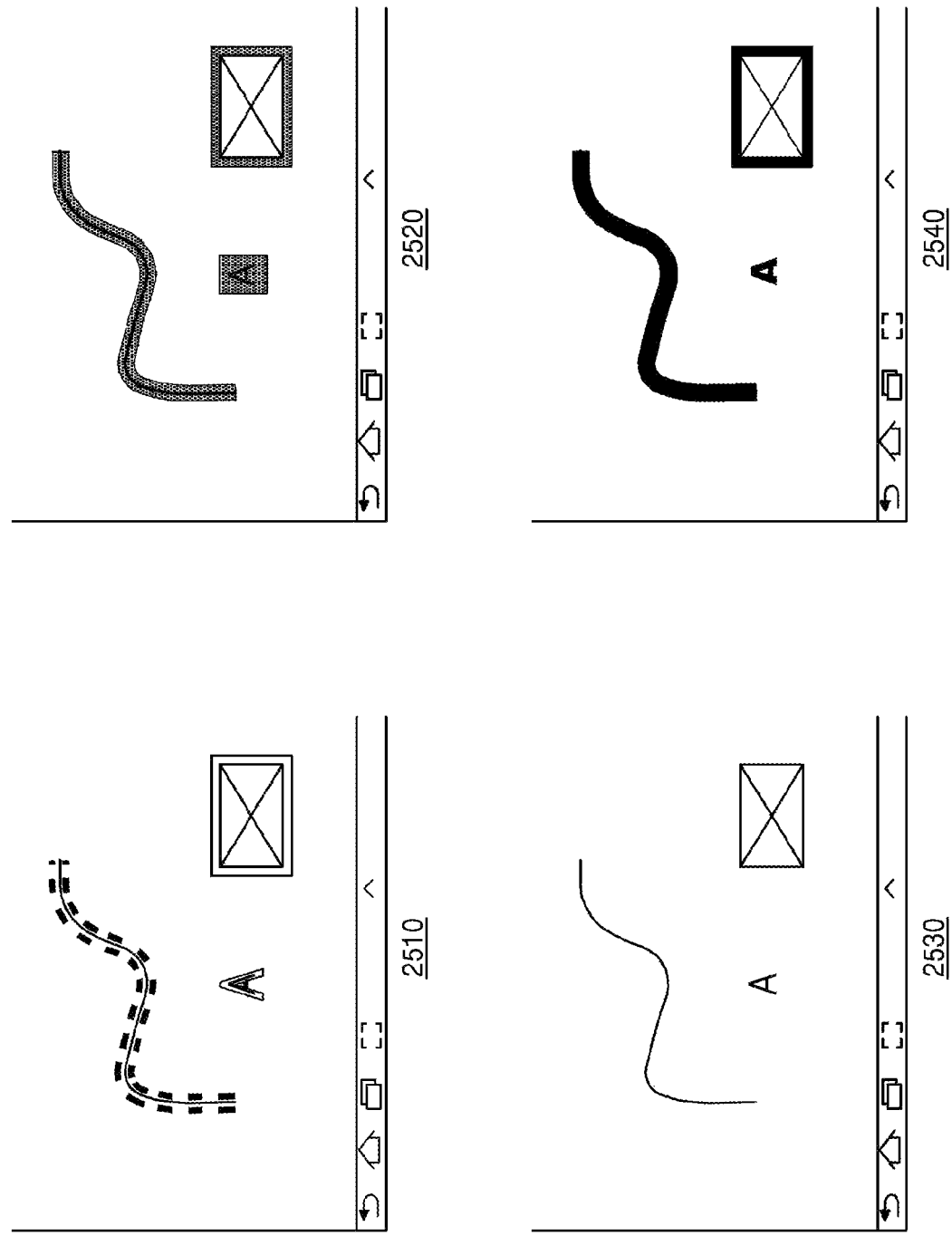
FIG. 25 is a diagram of an example of distinguishably displaying, by a device, selected strokes to be distinguished from other strokes.

FIG. 25 is a diagram of an example of the device 100 distinguishably displaying selected strokes to be distinguished from other strokes.

According to an exemplary embodiment, the device 100 may distinguishably display partial written content to be distinguished from entire handwritten content.

For example, referring to a reference numeral 2510 of FIG. 25, the device 100 may display dotted lines around a stroke included in the partial handwritten content.

Referring to a reference numeral 2520 of FIG. 25, the device 100 may add a certain color around a stroke included in the partial handwritten content.

Referring to a reference numeral 2530 of FIG. 25, the device 100 may change a color of a stroke included in the partial handwritten content.

Referring to a reference numeral 2540 of FIG. 25, the device 100 may change a thickness of a stroke included in the partial handwritten content.

The method of distinguishing a stroke is not limited to the above examples. Rather, any method for distinguishing selected strokes from unselected strokes may be employed.

Figure 26:
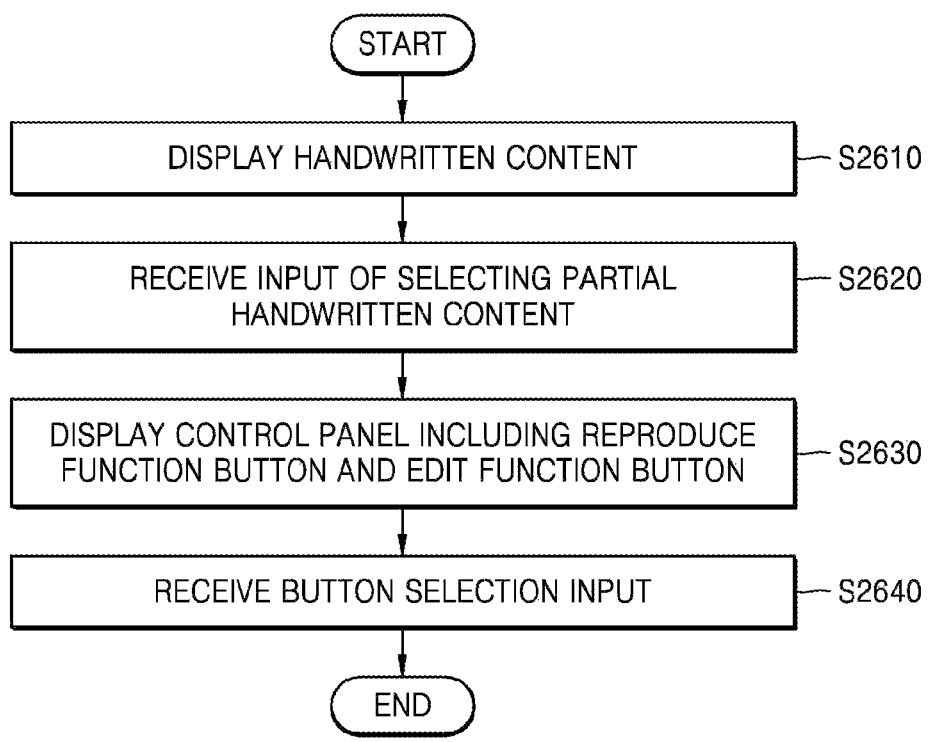
FIG. 26 is a flowchart of a method of receiving, by a device, a reproduce request via a control panel, according to an exemplary embodiment.

FIG. 26 is a flowchart of a method of the device 100 receiving a request to reproduce handwritten content via a control panel, according to an exemplary embodiment.

In operation S2610, the device 100 may display handwritten content.

According to an exemplary embodiment, the handwritten content may include a plurality of strokes input in an order. Shapes of the plurality of strokes included in the handwritten content may vary. For example, thicknesses, colors, brightness, chroma, and transparency of the plurality of strokes may be different from each other.

According to an exemplary embodiment, the device 100 may display the handwritten content on an execution window of a predetermined application. According to an exemplary embodiment, the device 100 may receive a selection on certain handwritten content from a user, and display the selected certain handwritten content.

In operation S2620, the device 100 may receive an input of selecting partial handwritten content from the handwritten content. For example, the device 100 may receive a user input of specifying a region of interest, and select the partial handwritten content corresponding to the region of interest. Alternatively, the device 100 may receive a user input of sequentially touching a plurality of strokes while a predetermined button of the electronic pen 200 is pressed. Here, the device 100 may select the plurality of strokes touched by the electronic pen 200 as the partial handwritten content.

In operation 2630, when the partial handwritten content is selected, the device 100 may display a control panel. According to an exemplary embodiment, the device 100 may display the control panel within a predetermined distance from the partial handwritten content.

According to an exemplary embodiment, the control panel may include at least one of a reproduce function button and an edit function button. According to an exemplary embodiment, the reproduce function button may include at least one of a reproduce button, a pause button, a fast forward button, a rewind button, and a reproduction speed control button.

Also, according to an exemplary embodiment, the edit function button may include at least one of an undo button, a redo button, an optical character recognition (OCR) button, an add button, and an exchange button.

Meanwhile, according to an exemplary embodiment, the control panel may include a search bar for searching for a partial segment of the partial handwritten content.

According to an exemplary embodiment, the control panel may be displayed on the same layer as the layer where the handwritten content is displayed, or may be separately displayed on another layer.

In operation S2640, the device 100 may receive a button selection input from the user via the control panel. For example, the device 100 may receive a user input of activating the reproduction function button from the control panel. The control panel will now be described in detail with reference to FIGS. 27A and 27B.

FIGS. 27A and 27B are diagrams for describing an example of the device 100 providing a control panel including a reproduce function button or an edit function button.

As shown in FIG. 27A, the device 100 may display handwritten content 2710 including a cat image on the screen. Here, a user may activate a button 2700 for specifying a region of interest 2720 from a tool bar by using the electronic pen 200. Then, the user may specify a region including a head of a cat as the region of interest 2720 by using the electronic pen 200.

As shown in FIG. 27B, the device 100 may change colors and thicknesses of strokes 2740 included in the region of interest 2720 based on the user input of specifying the region of interest 2720. For example, the cat image is in black, but the strokes 2740 of the head included in the region of interest 2720 may be shown in blue.

According to an exemplary embodiment, the device 100 may display a virtual control panel 2730 below the region of interest 2720. The virtual control panel 2730 may include at least one of a reproduce function button and an edit function button.

According to an exemplary embodiment, when the user activates a predetermined button on the virtual control panel 2730 by using the electronic pen 200, the device 100 may reproduce or edit the strokes 2740 of the head included in the region of interest 2720.

According to another exemplary embodiment, when the user touches an inside of the region of interest 2720 for at least a predetermined time, the device 100 may output a semitransparent window including the head of the cat. When the user moves the semitransparent window to a location of the certain button in the virtual control panel 2730 while maintaining a touch input on the semitransparent window, the device 100 may reproduce or edit the strokes 2740 of the head included in the region of interest 2720.

Figure 28:
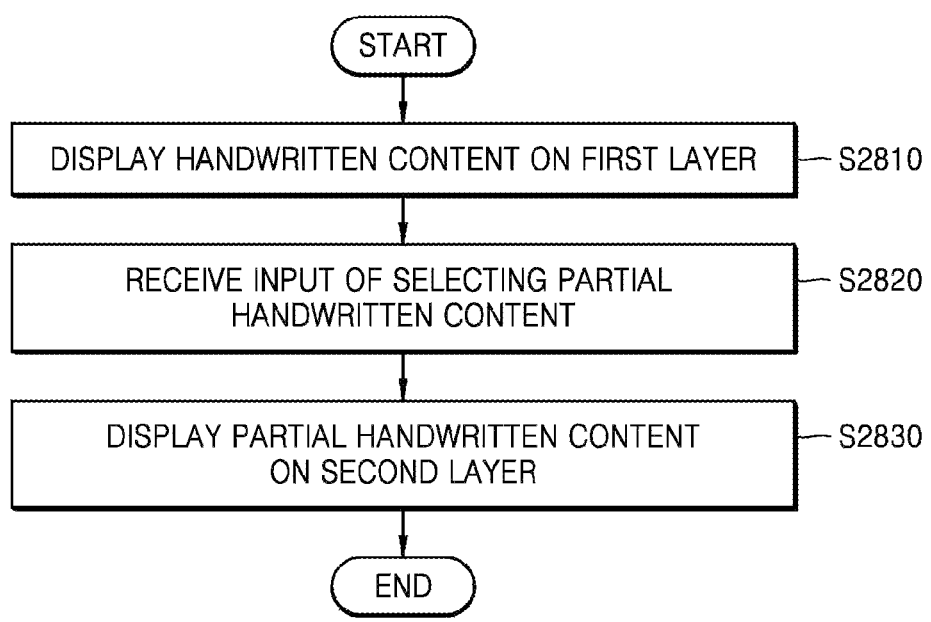
FIG. 28 is a flowchart of a method of displaying, by a device, partial handwritten content selected by a user on a separate layer, according to an exemplary embodiment.

FIG. 28 is a flowchart of a method of displaying, by the device 100, partial handwritten content selected by a user on a separate layer, according to an exemplary embodiment.

In operation 2810, the device 100 may display handwritten content on a first layer.

In operation S2820, the device 100 may receive an input of selecting partial handwritten content from the displayed handwritten content.

Because operations S2810 and S2820 correspond to operations S2610 and S2620 of FIG. 26, details thereof are not repeated here.

In operation S2830, the device 100 may display the partial handwritten content on a second layer that is distinguished from the first layer where the handwritten content is displayed. For example, the device 100 may display the partial handwritten content selected by the user from the handwritten content on a pop-up window. The pop-up window may include a virtual control panel. For example, the pop-up window may include at least one of a reproduce function button, an edit function button, and a search bar. The method of FIG. 28 will now be described in detail with reference to FIG. 29.

Figure 29:
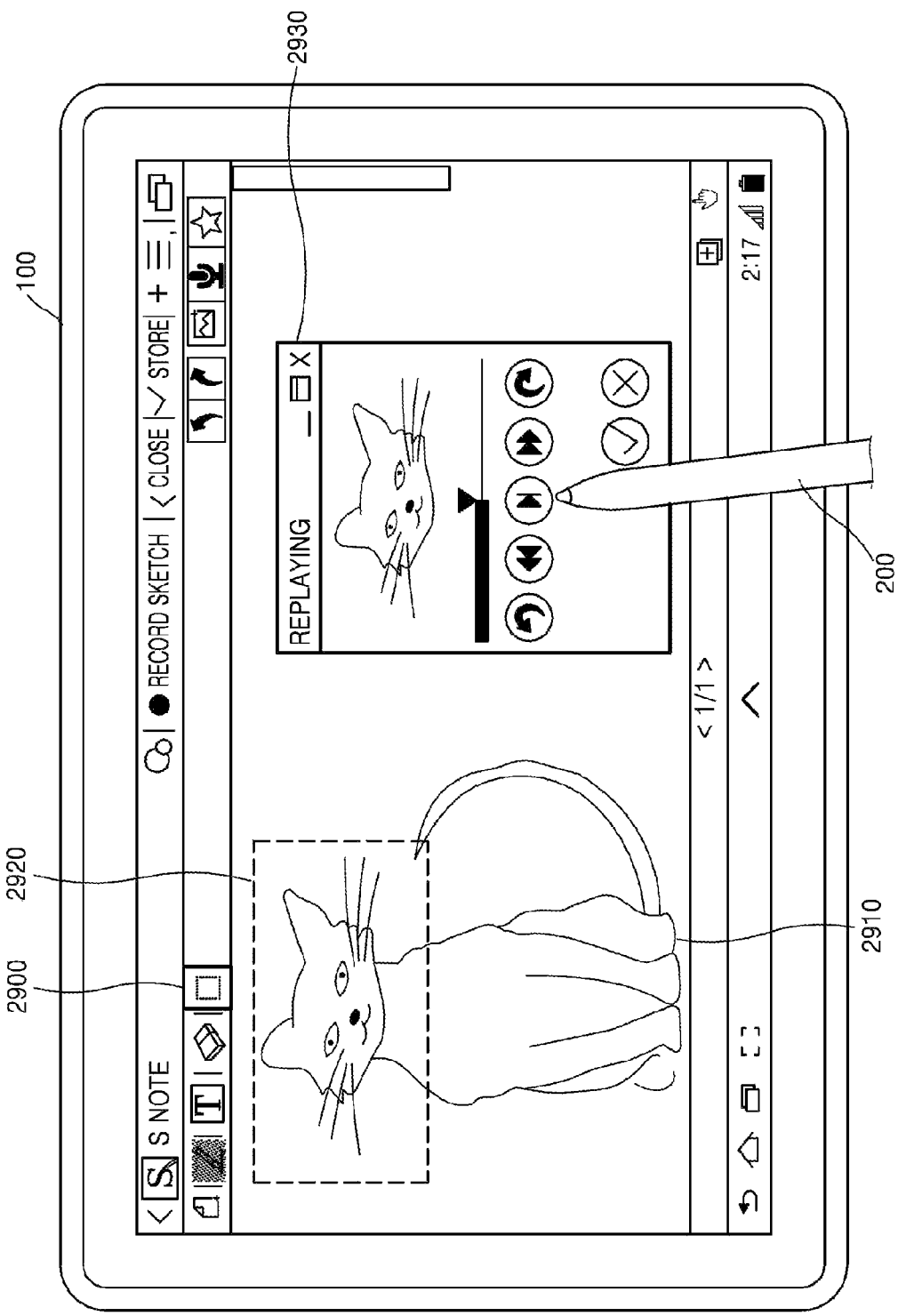
FIG. 29 is a diagram of an example of displaying, by a device, partial handwritten content selected by a user on a separate layer.

FIG. 29 is a diagram of an example of displaying, by the device 100, partial handwritten content selected by a user on a separate layer.

As shown in FIG. 29, the device 100 may display handwritten content 2910 including a cat image on the screen. Here, a user may activate a button 2900 for specifying a region of interest 2920 from a tool bar by using the electronic pen 200. Then, the user may specify a region including a head of a cat as the region of interest 2920 by using the electronic pen 200.

The device 100 may display strokes included in the region of interest 2920 on a separate pop-up window 2930 based on a user input for specifying the region of interest 2920. The pop-up window 2930 may include at least one of a reproduce function button, an edit function button, and a search bar.

According to an exemplary embodiment, when the user activates a predetermined button on the separate pop-up window 2930 by using the electronic pen 200, the device 100 may reproduce or edit strokes 2940 of the head of the cat included in the region of interest 2920.

Figure 30:
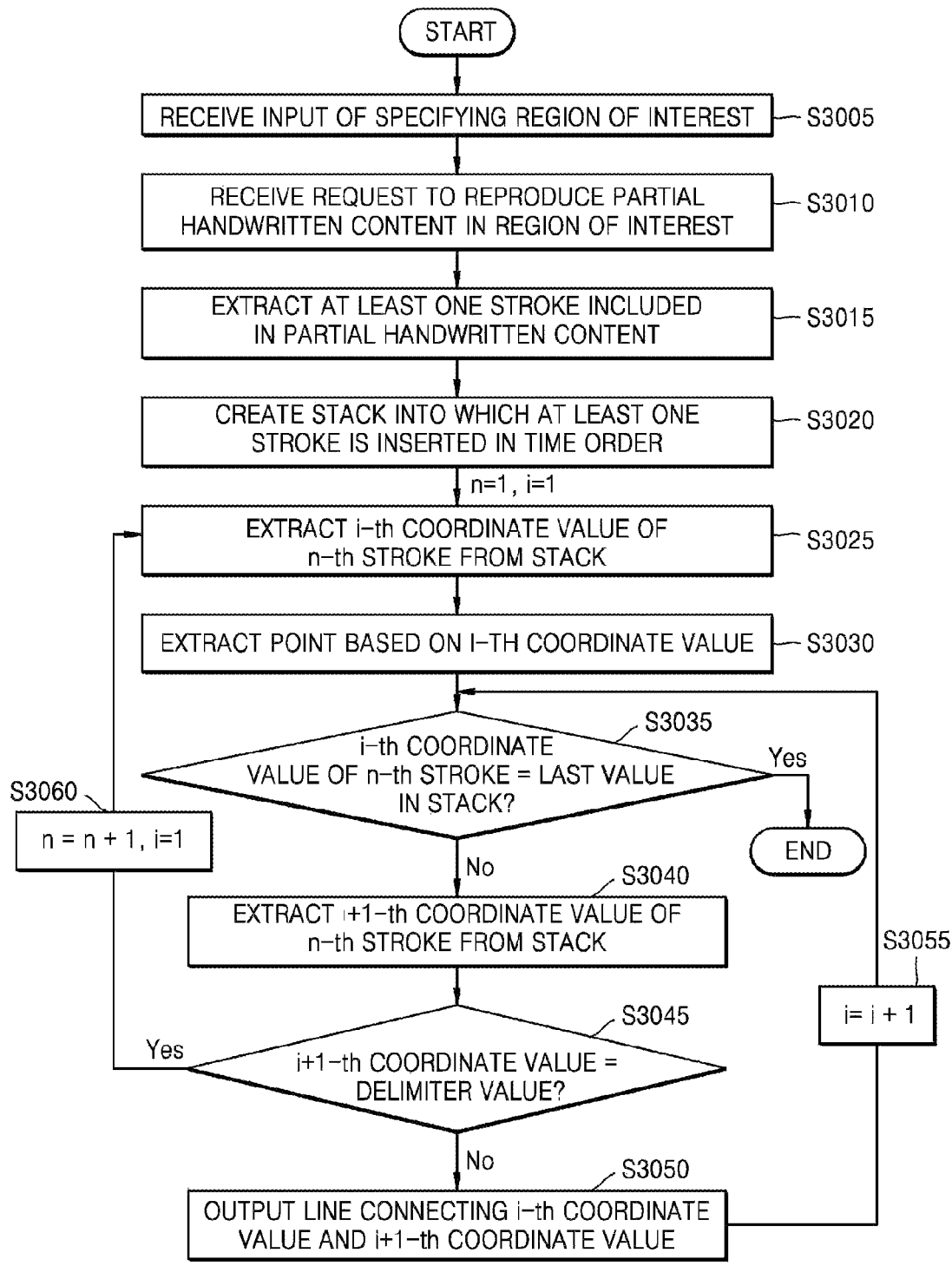
FIG. 30 is a flowchart of a method of reproducing, by a device, partial handwritten content by using time information of strokes in a region of interest, according to an exemplary embodiment.

FIG. 30 is a flowchart of a method of reproducing, by the device 100, partial handwritten content by using time information of strokes in a region of interest, according to an exemplary embodiment.

In operation S3005, the device 100 may receive an input of specifying a region of interest from handwritten content. Because an operation of specifying, by the device 100, a region of interest based on a user input has been described in detail above, descriptions thereof are not repeated here.

In operation S3010, the device 100 may receive an input of requesting to reproduce partial handwritten content in the region of interest.

For example, the device 100 may display a virtual control panel including a reproduce button in response to the input. A user may activate the reproduce button from the virtual control panel to request reproduction of the partial handwritten content.

Alternatively, the user may activate a physical reproduce button to request reproduction of the partial handwritten content. For example, the device 100 may detect an input of pressing a home button at least a predetermined number of times (for example, at least twice), or an input of pressing a side button for at least a predetermined period of time (for example, at least 3 seconds). Here, the device 100 may determine the detected input to be an input requesting to reproduce the partial handwritten content.

Meanwhile, according to an exemplary embodiment, the user may request to reproduce the partial handwritten content via a voice command.

In operation S3015, the device 100 may extract at least one stroke included in the partial handwritten content. For example, the device 100 may extract information (for example, ID information of strokes, timestamp information of strokes, and coordinate information of strokes) of strokes included in the partial handwritten content from a memory.

In operation S3020, the device 100 may create a stack into which the at least one stroke is inserted in a chronological order. For example, the device 100 may compare timestamp information between extracted strokes, and determine a relative chronological order of the extracted strokes. The device 100 may insert a stroke that is created first from among the extracted strokes into an uppermost layer of the stack, and a stroke that is created last from among the extracted strokes into a lowermost layer of the stack. In this regard, the order of the strokes may be determined.

In operation S3025, the device 100 may extract an i-th coordinate value of an n-th stroke from the stack. According to an exemplary embodiment, the device 100 may extract coordinate values from the uppermost layer to the lowermost layer of the stack. For example, the device 100 may first extract a first coordinate value of a first stroke from the stack. Here, the first coordinate value of the first stroke may be an uppermost value of the stack and the first stroke may be the stroke that is created first from among the extracted strokes.

In operation S3030, the device 100 may output a point based on the i-th coordinate value. For example, the device 100 may output the first coordinate value of the first stroke, which is the uppermost value in the stack, as a first point.

In operation S3035, the device 100 may determine whether the i-th coordinate value of the n-th stroke is the last value in the stack. For example, when it is determined that the first coordinate value of the first stroke is the last value in the stack, the device 100 may only output the point and end a reproduction operation of the partial handwritten content.

When it is determined that the i-th coordinate value of the n-th stroke is not the last value in the stack, the device 100 may extract an i+1-th coordinate value of the n-th stroke from the stack in operation S3040. For example, the device 100 may extract a second coordinate value of the first stroke.

In operation S3045, the device 100 may determine whether the i+1-th coordinate value of the n-th stroke is a delimiter value. For example, the delimiter value may be a maximum value in a timestamp.

When it is determined that the i+1-th coordinate value of the n-th stroke is not the delimiter value, the device 100 may output a line connecting the i-th coordinate value and the i+1-th coordinate value in operation S3050.

For example, when it is determined that the second coordinate value of the first stroke is not a delimiter value, the device 100 may output a line connecting the first and second coordinate values of the first stroke. According to an exemplary embodiment, the device 100 may output the line connecting the first and second coordinate values by interpolating between the first and second coordinate values by using the first coordinate value, the second coordinate value, timestamp information corresponding to the first coordinate value, and timestamp information corresponding to the second coordinate value. In this regard, the stroke may be output in the same temporal manner in which the stroke was input and recorded.

In operation S3055, the device 100 may increase a value of i to i+1 and then perform operation S3035. For example, the device 100 may determine whether the i+1-th coordinate value of the n-th stroke is the last value in the stack. For example, the device 100 may determine whether the second coordinate value of the first stroke is the last value in the stack.

When it is determined that the i+1-th coordinate value of the n-th stroke is not the last value in the stack, the device 100 may extract a i+2-th coordinate value of the n-th stroke and determine whether the i+2-th coordinate value of the n-th stroke is a delimiter value. For example, when the second coordinate value of the first stroke is not the last value in the stack, the device 100 may extract a third coordinate value of the first stroke and determine whether the third coordinate value of the first stroke is a delimiter value.

When it is determined that the i+1-th coordinate value of the n-th stroke is the delimiter value, the device 100 may increase a value of n to n+1 and initialize the value of i in operation S3060. For example, when it is determined that the third coordinate value of the first stroke is the delimiter value, the device 100 may output the first stroke and sequentially extract coordinate values of a second stroke from a first coordinate value.

In some embodiments, an order of operations S3005 through S3360 may be changed. For example, operations S3015 and S3020 may be performed before operation S3010. An operation of the device 100 reproducing partial handwritten content, will now be described in detail with reference to FIGS. 31 through 34.

As described above, strokes may be output in the same temporal manner in which the strokes were input, based on the position information and timestamp information. Thus, by combining multiple strokes, handwritten information may be output in the same temporal manner in which the handwritten information was input. As a result, a virtual replay of the handwriting may be output to the user on the device 100.

FIG. 31 is a diagram of an example of selecting, by the device 100, strokes in a region of interest 3100.

As shown in FIG. 31, the device 100 may display handwritten content including a first stroke 3101, a second stroke 3102, a third stroke 3103, and a fourth stroke 3104.

A user may specify the region of interest 3100 such that the first stroke 3101 and the third stroke 3103 are included from the handwritten content.

Figure 32A:
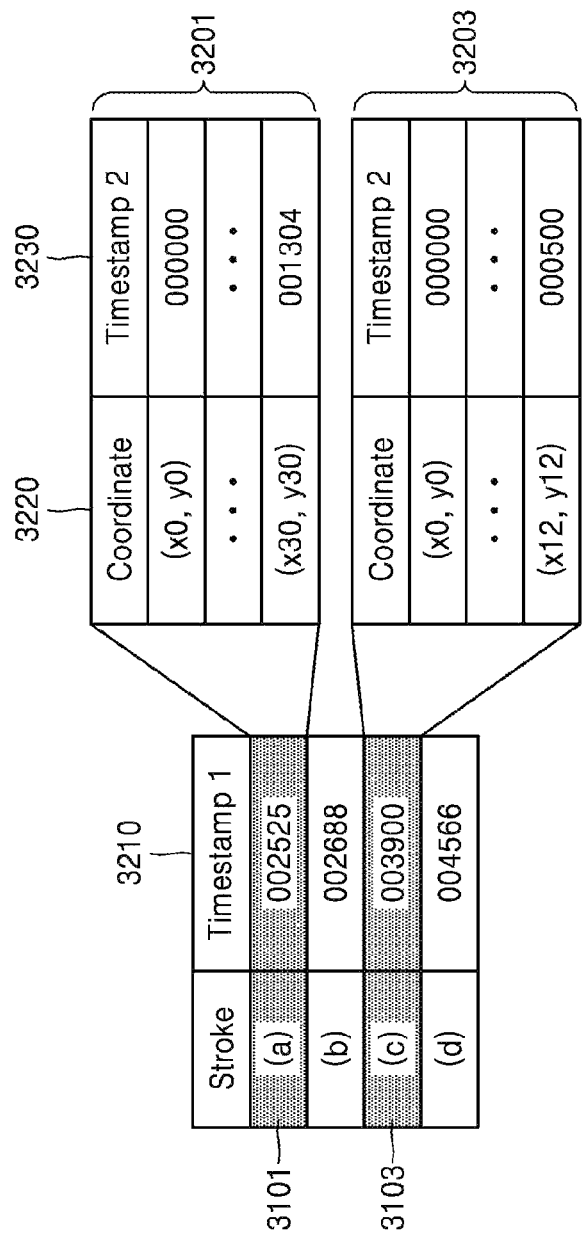
FIG. 32A is a diagram of an example of extracting, by a device, information about strokes in a region of interest.

FIG. 32A is a diagram of an example of extracting, by the device 100, information about strokes in the region of interest 3100.

Referring to FIG. 32A, the device 100 may extract timestamp information 3210 of strokes included in the region of interest 3100. For example, the device 100 may extract timestamp information (for example, 002525) of the first stroke 3101 and timestamp information (for example, 003900) of the third stroke 3103.

Also, the device 100 may extract coordinate information (for example, coordinate values 3220 and timestamp information 3230 corresponding to the coordinate values 3220) of the strokes. For example, the device 100 may extract coordinate information 3201 of the first stroke 3103 and coordinate information 3203 of the third stroke 3103.

FIG. 32B is a diagram of an example of the device creating a stack 3200 by using information about strokes in a region of interest.

Referring to FIG. 32B, the device 100 may first compare the timestamp information (for example, 002525) of the first stroke 3101 and the timestamp information (for example, 003900) of the third stroke 3103. Because the timestamp information (for example, 002525) of the first stroke 3101 is earlier than the timestamp information (for example, 003900) of the third stroke 3103, the device 100 may create the stack 3200 such that the coordinate information 3201 of the first stroke 3101 is located above the coordinate information 3203 of the third stroke 3103.

Here, the device 100 may adjust the timestamp information 3230 corresponding to a coordinate value of the third stroke 3103 such that a value obtained by adding 1 to a timestamp value (for example, 001304) corresponding to a last coordinate value (for example, x30, y30) of the first stroke 3101 is equal to a timestamp value (for example, 001305) corresponding to a first coordinate value (for example, x0, y0) of the third stroke 3103.

Meanwhile the device 100 may insert a delimiter value 3240 between the coordinate information 3201 of the first stroke 3103 and the coordinate information 3203 of the third stroke 3103. For example, the device 100 may use a maximum value (for example, 999999) of a timestamp as the delimiter value 3240.

FIGS. 33A through 33D are diagrams of an example of the device 100 reproducing partial handwritten content by using information about strokes included in a stack.

Figure 33A:
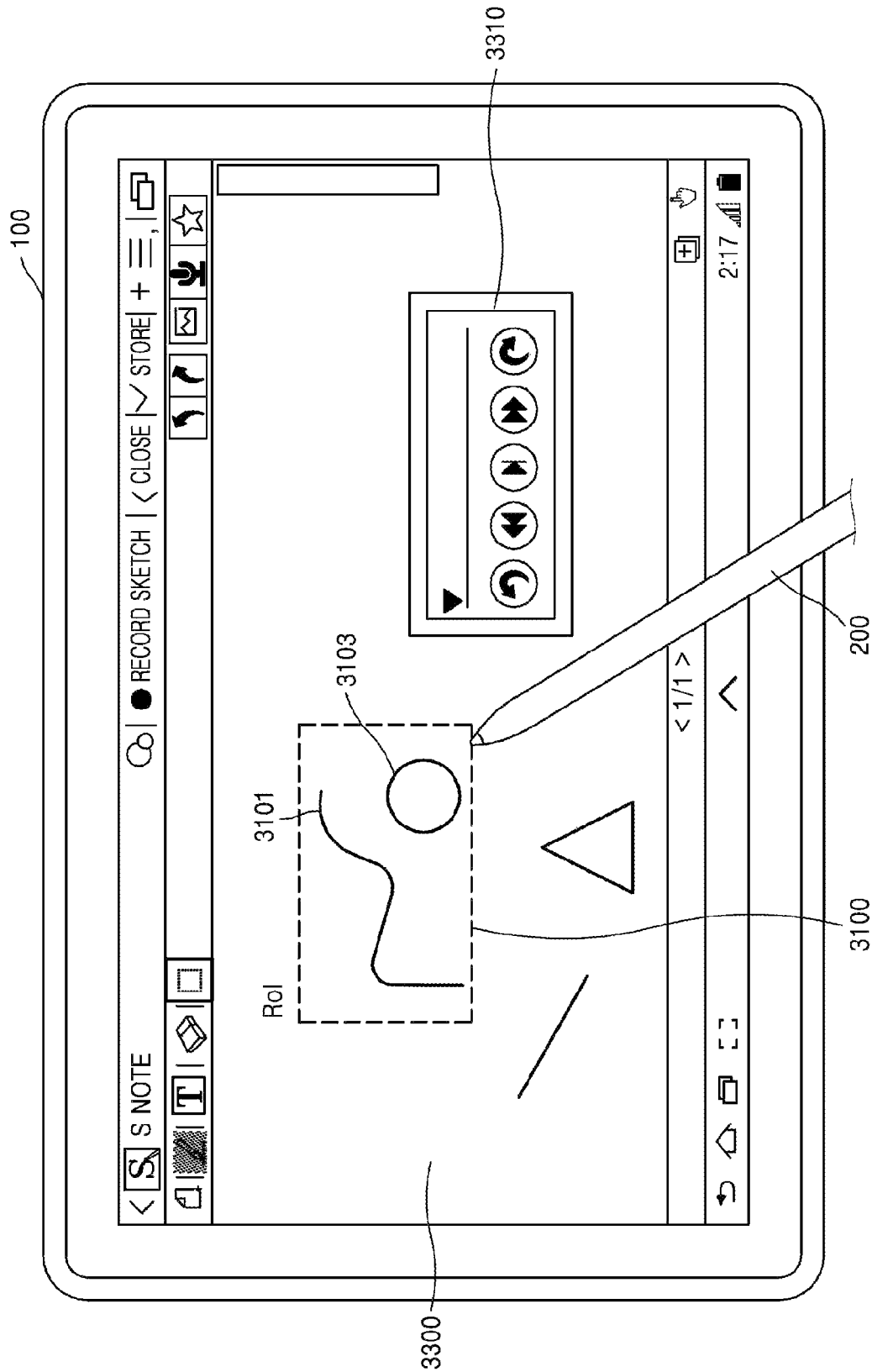
FIGS. 33A through 33D are diagrams of an example of reproducing, by a device, partial handwritten content by using information about strokes included in a stack.

Referring to FIG. 33A, the device 100 may display handwritten content 3300. Here, a user may specify the region of interest 3100 such that the first and second strokes 3101 and 3103 are included.

In response to an input of specifying the region of interest 3100, the device 100 may provide a virtual control panel 3310.

Figure 33B:
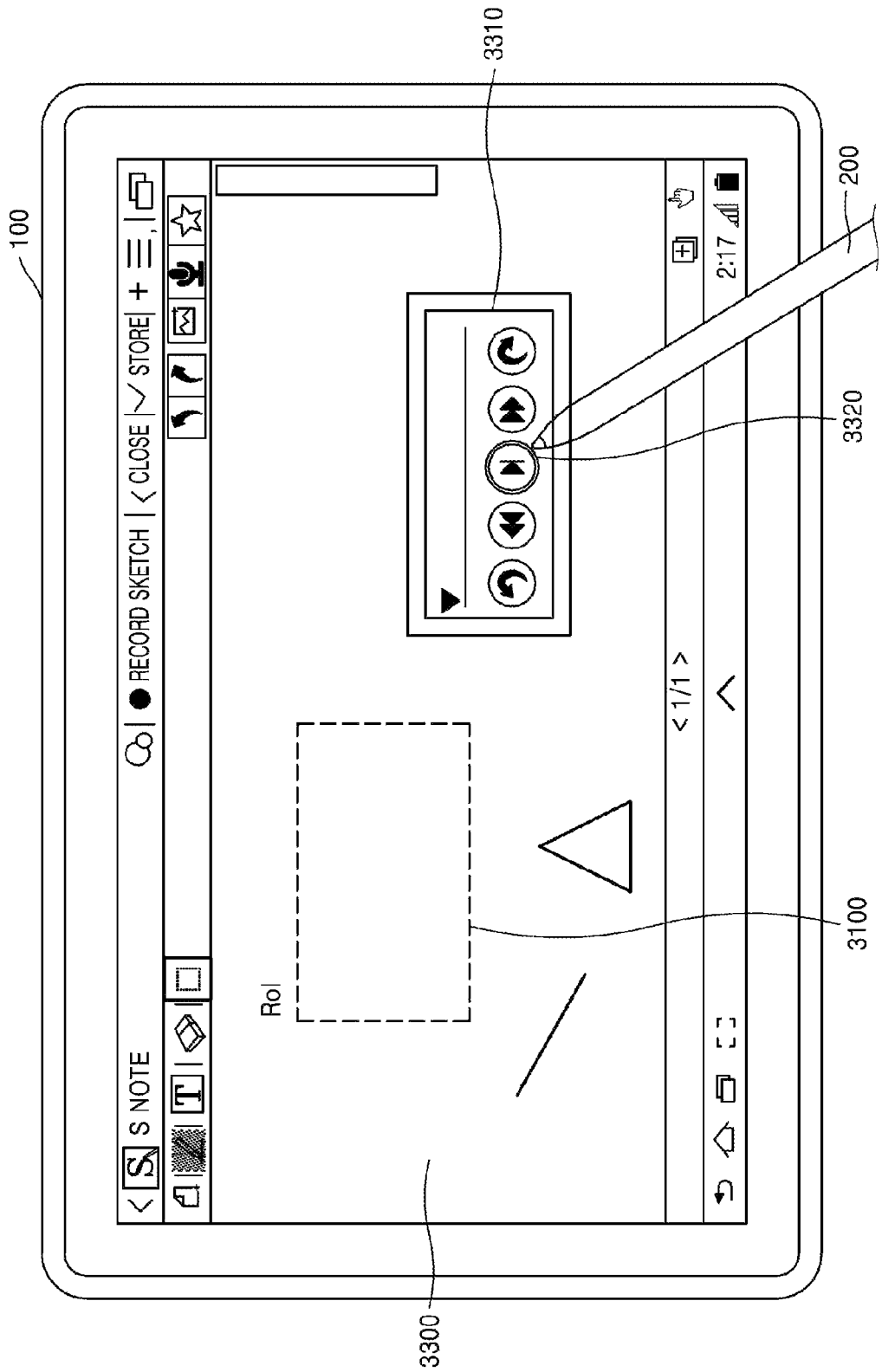

Referring to FIG. 33B, the device 100 may receive an input of activating a reproduce button 3320 from the virtual control panel 3310. In this case, the device 100 may create the stack 3200 shown in FIG. 32B by extracting information about the first stroke 3101 and information about the third stroke 3103.

The device 100 may erase the first and third strokes 3101 and 3103 displayed in the region of interest 3100 based on the input of activating the reproduce button 3320. Then, the device 100 may newly reproduce drawing processes of the first and third strokes 3101 and 3103.

Figure 33C:
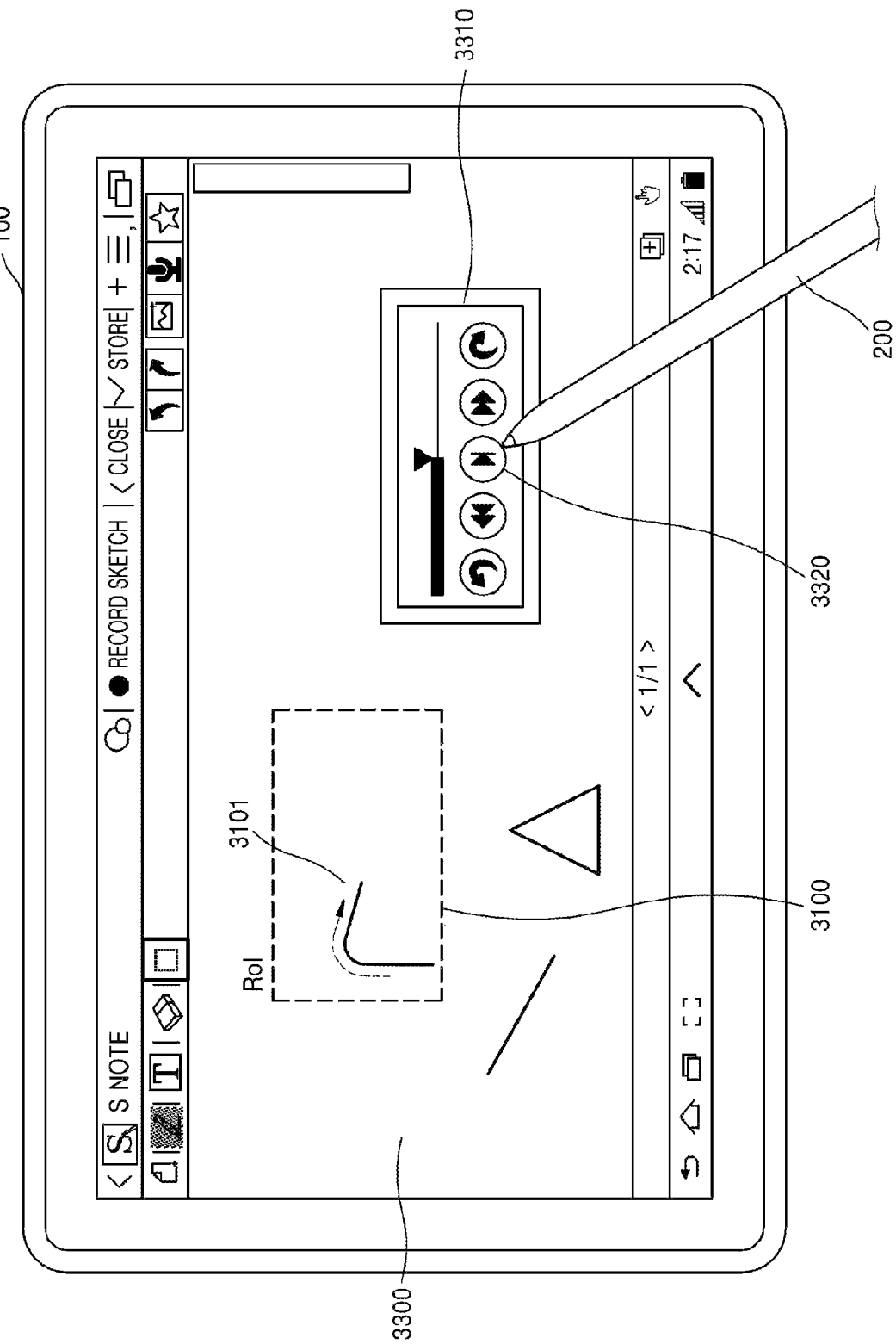
Figure 33D:
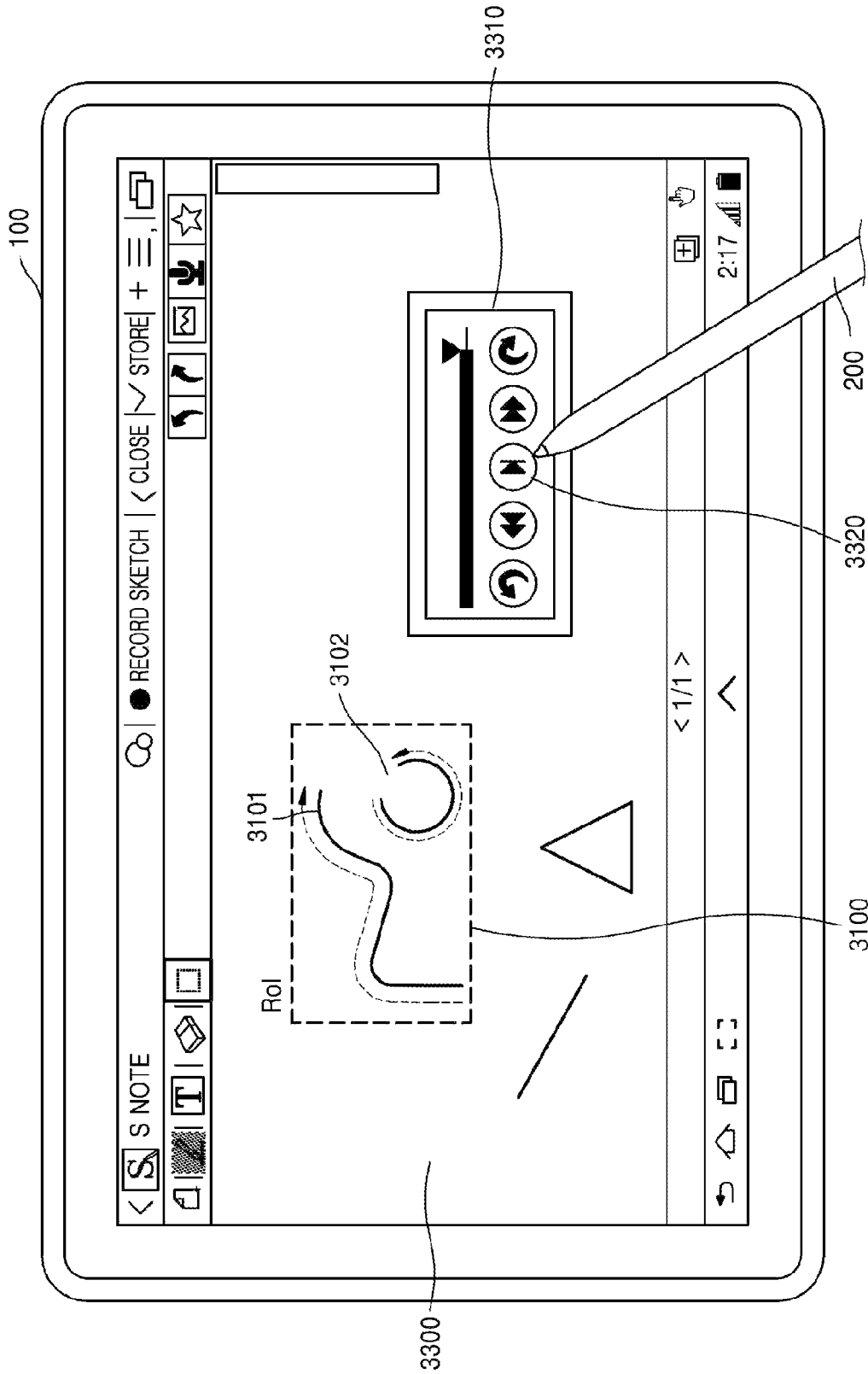

Referring to FIGS. 33C and 33D, the device 100 may extract the first coordinate value (for example, x0, y0) of the first stroke 3101 from the stack 3200, and output a point at a location corresponding to the first coordinate value (for example, x0, y0). Then, the device 100 may extract the second coordinate value (for example, x1, y1) of the first stroke 3101, and output a line connecting the first coordinate value (for example, x0, y0) and the second coordinate value (for example, x1, y1). Also, the device 100 may extract each of third coordinate value (for example, x2, y2) through 31st coordinate value (for example, x30, y30) of the first stroke 3101. The device 100 may reproduce the drawing process of the first stroke 3101 by outputting lines connecting the third coordinate value (for example, x2, y2) through the 31st coordinate value (for example, x30, y30) of the first stroke 3101 to a previous coordinate value.

The device 100 may extract a coordinate value (for example, 0,0) after the 31st coordinate value (for example, x30, y30) of the first stroke 3101. Because a timestamp corresponding to the coordinate value (for example, 0,0) after the 31st coordinate value (for example, x30, y30) of the first stroke 3101 is '999999', the device 100 may determine that the coordinate value (for example, 0,0) after the 31st coordinate value (for example x30, y30) of the first stroke 3101 is a delimiter value. In this case, the device 100 may determine that the drawing process of the first stroke 3101 is completed, and continuously output the drawing process of the third stroke 3103.

The device 100 may extract the first coordinate value (for example, x0, y0) of the third stroke 3103, and newly output a point at a location corresponding to the first coordinate value (for example, x0, y0) of the third stroke 3103. Then, the device 100 may extract each of second coordinate value (for example, x1, y1) through 13th coordinate value (for example, x12, y12) of the third stroke 3103. The device 100 may reproduce the drawing process of the third stroke 3103 by outputting lines connecting the second coordinate value (for example, x1, y1) through the 13th coordinate value (for example, x12, y12) of the third stroke 3103 to a previous coordinate value.

According to an exemplary embodiment, the device 100 may use the timestamp information 3230 corresponding to each coordinate value to adjust a reproduction speed of the partial handwritten content (for example, the first and third strokes 3101 and 3103) to match an actual drawing speed of the user.

According to an exemplary embodiment, the device 100 may reproduce only drawing processes of the partial handwritten content in which the user is interested from among entire handwritten content.

Additionally, as described above, the device 100 may reproduce handwritten content by drawing lines between coordinates. Here, the device 100 may interpolate positions of unrecorded coordinates from positions of coordinates. Accordingly, the speed of reproduction of handwritten content may be reduced.

Still further, the device 100 may interpolate positions of coordinates to reduce memory storage requirements. As such, a rate of capturing coordinates may be reduced.

Figure 34:
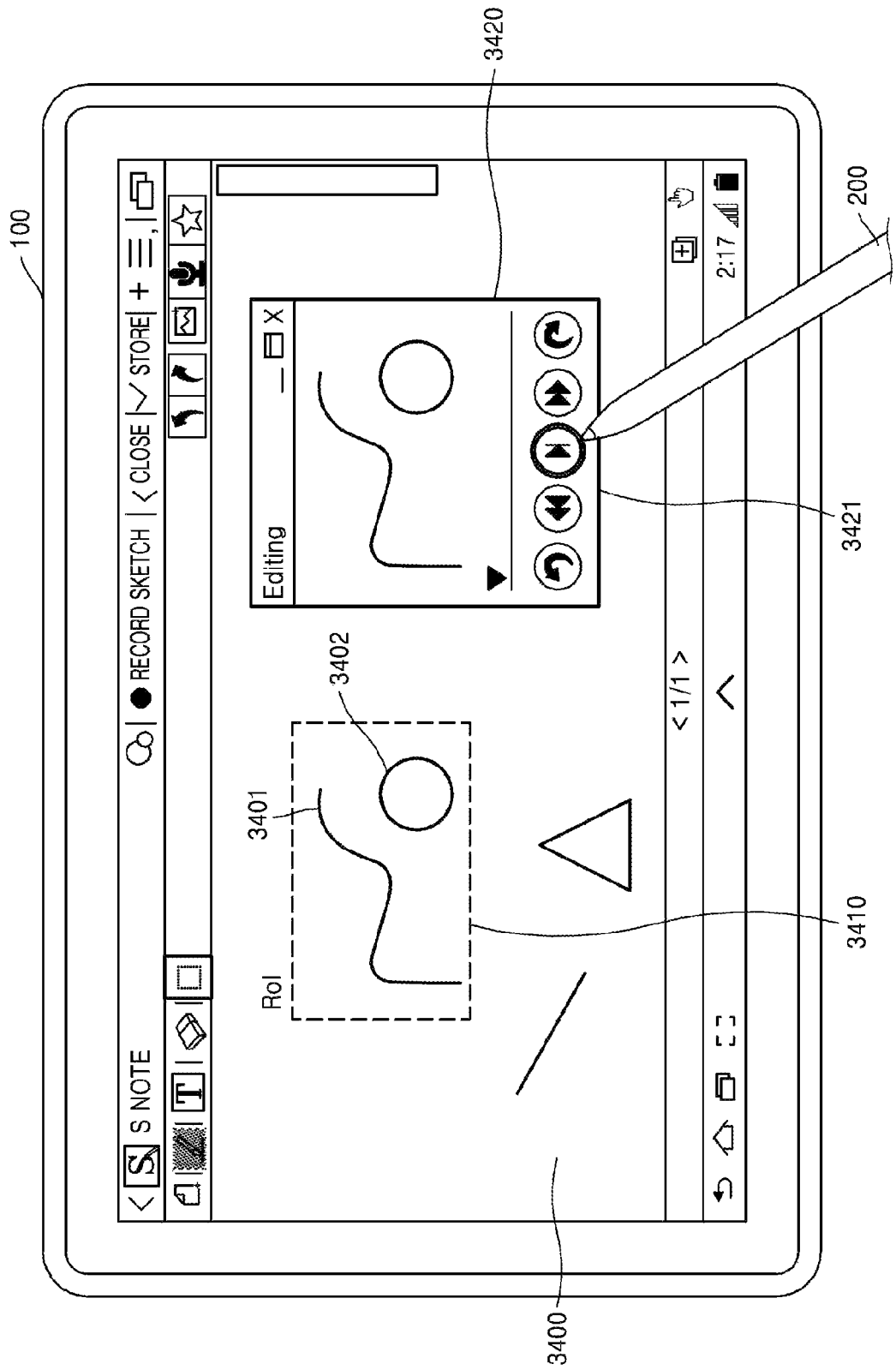
FIG. 34 is a diagram of an example of reproducing, by a device, partial handwritten content on a separate window by using information about strokes included in a stack.

FIG. 34 is a diagram of an example of the device 100 reproducing partial handwritten content on a separate window by using information about strokes included in a stack.

As shown in FIG. 34, according to an exemplary embodiment, the device 100 may display strokes 3401 and 3402 included in a region of interest 3410 on a separate pop-up window 3420, based on a user input of specifying the region of interest 3410. The pop-up window 4320 may include at least one of a reproduce function button, an edit function button, and a search bar.

According to an exemplary embodiment, when a user activates a reproduce button 3421 on the separate pop-up window 3420 by using the electronic pen 200, the device 100 may reproduce drawing processes of the strokes 3401 and 3402 displayed on the separate pop-up window 3420, on the separate pop-up window 3420.

Meanwhile, in FIGS. 30 through 34, the device 100 uses a stack to reproduce drawing processes of partial handwritten content, but an exemplary embodiment is not limited thereto. For example, the device 100 may create a table by gathering link information for accessing coordinate information of strokes. Then, the device 100 may reproduce drawing processes of partial handwritten content by using the table including the link information.

An operation of editing, by the device 100, partial handwritten content based on a user input will now be described with reference to FIG. 35.

Figure 35:
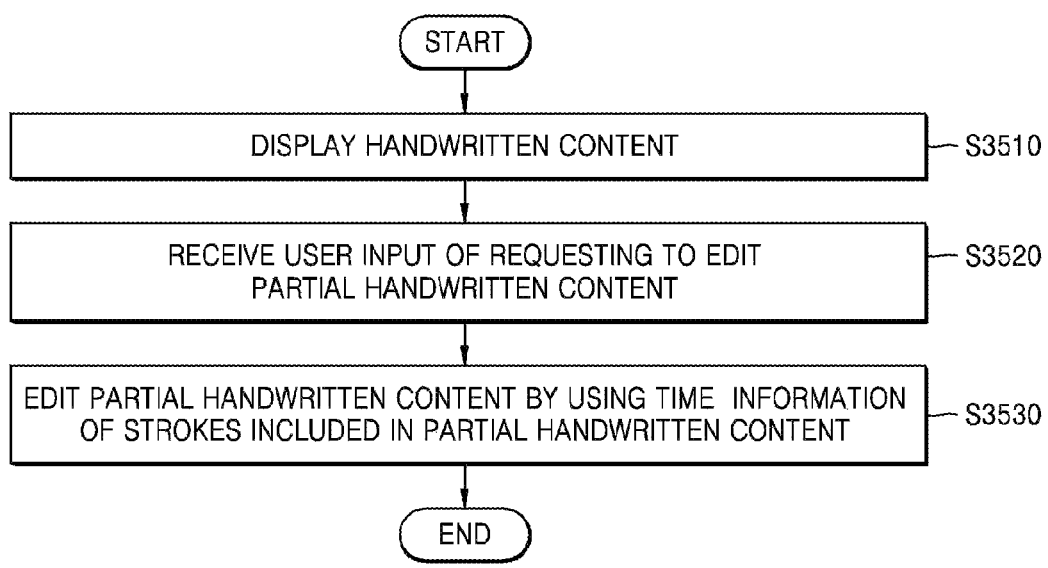
FIG. 35 is a flowchart of a method of editing, by a device, partial handwritten content, according to an exemplary embodiment.

FIG. 35 is a flowchart of a method of editing, by the device 100, partial handwritten content, according to an exemplary embodiment.

In operation S3510, the device 100 may display handwritten content.

According to an exemplary embodiment, the handwritten content may include a plurality of strokes drawn in an order. Shapes of the plurality of strokes included in the handwritten content may vary. For example, thicknesses, colors, brightness, chroma, and transparency of the plurality of strokes may be different from each other.

According to an exemplary embodiment, the device 100 may display the handwritten content on an execution window of a predetermined application. According to an exemplary embodiment, the device 100 may receive a selection on certain handwritten content from a user and display the selected certain handwritten content.

In operation S3520, the device 100 may receive a user input of requesting to edit partial handwritten content from the displayed handwritten content.

According to an exemplary embodiment, the user input of requesting to edit the partial handwritten content may vary.

For example, the device 100 may receive a user input of selecting the partial handwritten content from the handwritten content. At this time, the device 100 may display a virtual control panel including an edit function button (for example, an undo button, a redo button, an OCR button, an add button, or an exchange button). The device 100 may receive a user input of activating the edit function button through the virtual control panel.

Alternatively, the device 100 may receive a gesture corresponding to an edit command. For example, when the user selects the partial handwritten content via a drag input, and then double-taps the selected partial handwritten content with two fingers, the device 100 may determine that an undo request on the partial handwritten content is received.

Alternatively, the user may input an edit command regarding the partial handwritten content to the device 100 by using a touch input and a voice input. For example, the user may select the partial handwritten content via a touch input, and input an instruction requesting to edit the partial handwritten content to the device 100 via voice.

In operation S3530, the device 100 may edit the partial handwritten content by using time information of strokes included in the partial handwritten content.

According to an exemplary embodiment, the time information of the strokes may include at least one of relative chronological order information between the strokes and timestamp information corresponding to each of the strokes. Meanwhile, timestamp information may be absolute time information (for example, a year, a month, a day, an hour, a minute, a second, 2014.05.18.08.53.36) of the device 100 while creating a stroke, an arbitrarily assigned number (for example, 0001, 0002, or 0003), or an offset from a base time.

According to an exemplary embodiment, the device 100 may extract the strokes included in the partial handwritten content. The device 100 may determine an order of the extracted strokes by using the timestamp information of the extracted strokes. For example, the device 100 may determine a first stroke that is input first from among the extracted strokes as a start position, and an n-th stroke that is input last from among the extracted strokes as an end position, wherein n is an integer higher than 1. The device 100 may edit the extracted strokes by using timestamp information and coordinate information of the extracted strokes. An operation of editing, by the device 100, partial handwritten content will now be described in more detail with reference to FIG. 36.

Figure 36:
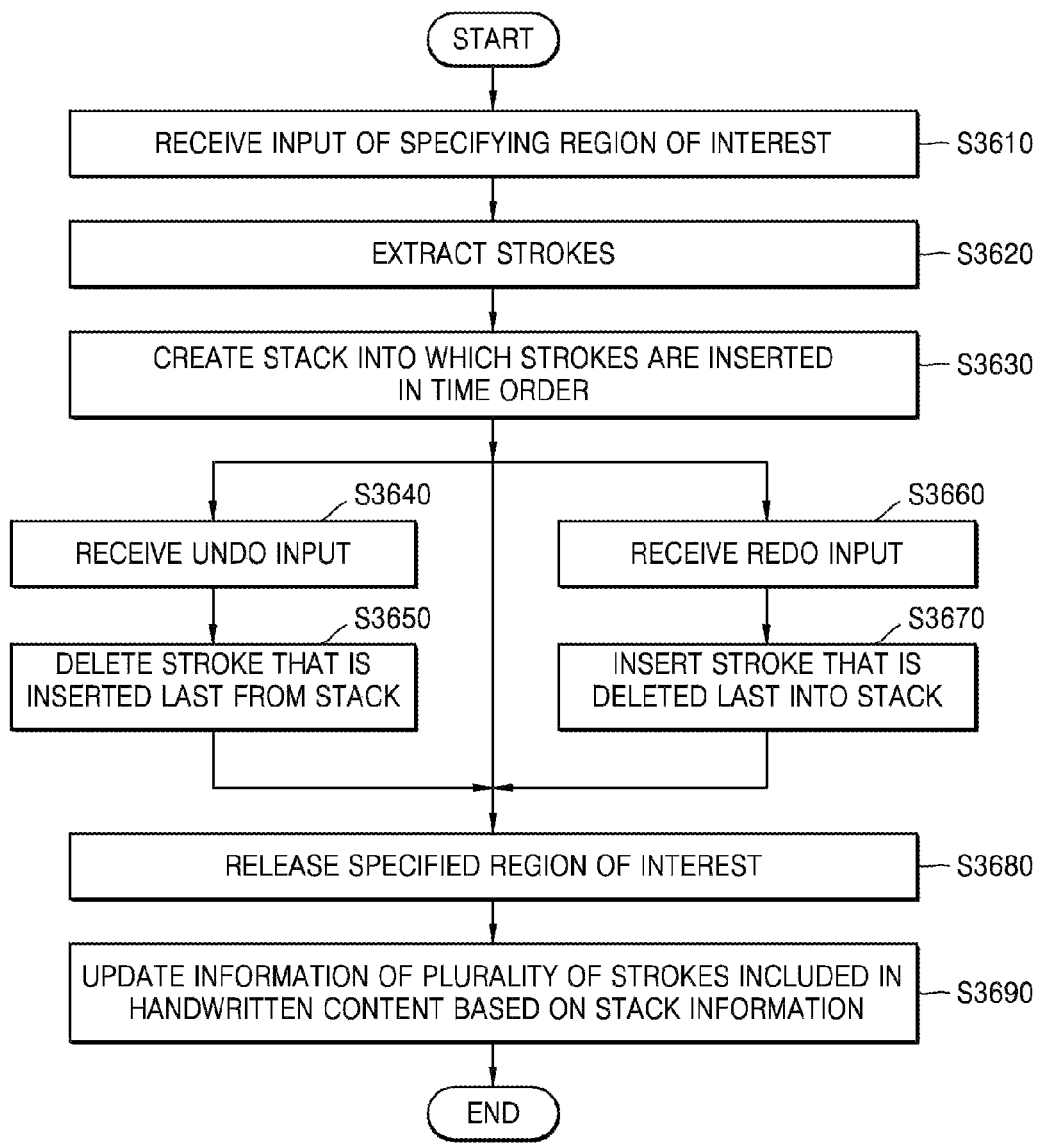
FIG. 36 is a flowchart of a method of performing an undo or redo function, by a device, on partial handwritten content, according to an exemplary embodiment.

FIG. 36 is a flowchart of a method of performing an undo or redo function, by the device 100, on partial handwritten content, according to an exemplary embodiment.

In operation S3610, the device 100 may receive an input of specifying a region of interest regarding handwritten content displayed on the screen. Because an operation of specifying, by the device 100, a region of interest based on a user input has been described in detail above, descriptions thereof are not repeated here. According to an exemplary embodiment, the device 100 may select partial handwritten content corresponding to the region of interest.

In operation S3620, the device 100 may extract strokes included in the partial handwritten content corresponding to the region of interest.

For example, the device 100 may extract information (for example, ID information of the strokes, timestamp information of the strokes, and coordinate information of the strokes) of the strokes included in the partial handwritten content from a memory.

In operation S3630, the device 100 may create a stack into which the strokes are inserted in a chronological order.

For example, the device 100 may create a first stack that stores the information about strokes in the region of interest, and a second stack that stores information about deleted strokes. Hereinafter, for convenience of description, a stack that stores information about strokes included in partial handwritten content is defined as a first stack, and a stack that stores information about deleted strokes is defined as a second stack.

The device 100 may determine a relative chronological order of the extracted strokes by comparing timestamp information between the extracted strokes. The device 100 may insert a stroke that is created first from among the extracted strokes into a bottom of the first stack, and insert a stroke that is created last from among the extracted strokes into a top of the first stack.

In operation S3640, the device 100 may receive an undo input regarding the partial handwritten content. For example, the device 100 may receive a user input of activating an undo button displayed on a control panel.

Alternatively, the device 100 may receive a gesture corresponding to an undo command. For example, when a user double-taps the partial handwritten content with two fingers, the device 100 may determine that an undo request regarding the partial handwritten content is received. Alternatively, the device 100 may recognize voice including an undo command regarding the partial handwritten content.

In operation S3650, the device 100 may delete a stroke that is inserted last from the stack based on the undo input. For example, the device 100 may delete first stroke information located in an uppermost layer of the first stack from the first stack. Then, the device 100 may insert the first stroke information into the second stack. An operation of performing, by the device 100, an undo function on partial handwritten content will be described in more detail later with reference to FIGS. 37 through 39B.

In operation S3660, the device 100 may receive a redo input regarding the partial handwritten content. For example, the device 100 may receive a user input of activating a redo button displayed on a virtual control panel.

Alternatively, the device 100 may receive a pre-set gesture corresponding to a redo command. For example, when the user touches the partial handwritten content for at least a predetermined period of time (for example, at least two seconds) with two fingers, the device 100 may determine that a redo request regarding the partial handwritten content is received. Alternatively, the device 100 may recognize voice including a redo command regarding the partial handwritten content.

In operation S3670, the device 100 may insert a stroke that is deleted last into the stack again based on the redo input.

For example, the device 100 may delete the first stroke information located in an uppermost layer of the second stack from the second stack, according to the redo input. Then, the device 100 may insert the first stroke information into the uppermost layer of the first stack.

An operation of performing, by the device 100, a redo function on partial handwritten content will be described in more detail later with reference to FIGS. 40A through 40C.

In operation S3680, the device 100 may receive an input of releasing the specified region of interest. For example, the user may release the specified region of interest when editing of the partial handwritten content is completed.

In operation S3690, the device 100 may update information of a plurality of strokes included in handwritten content based on stack information at a point of time when the specified region of interest is released. For example, the device 100 may amend a list of information of strokes included in pre-stored handwritten content based on edit details (for example, information about deleted strokes and information about added strokes).

Figure 37:
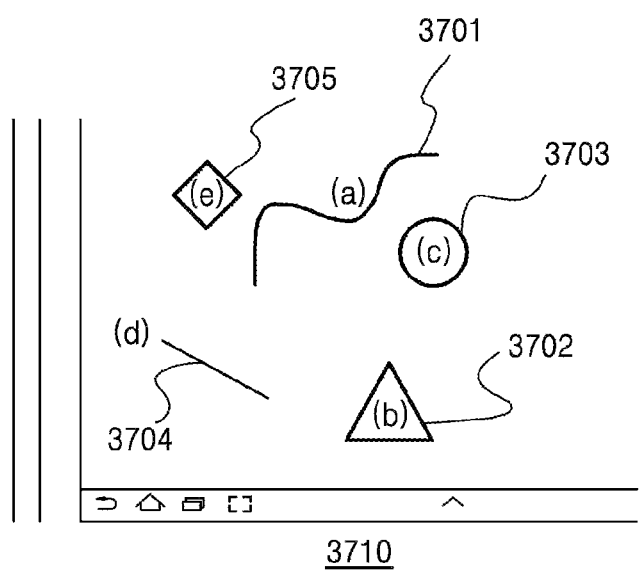
FIG. 37 is a diagram of a list of a plurality of strokes included in handwritten content, according to an exemplary embodiment.

FIG. 37 is a diagram of a list of a plurality of strokes included in handwritten content, according to an exemplary embodiment.

As shown in FIG. 37, according to an exemplary embodiment, when handwritten content 3710 is created, the device 100 may store a list 3720 of a plurality of strokes included in the handwritten content 3710. ID information, timestamp information, and coordinate information of the strokes may be mapped to each other and stored in the list 3720.

The handwritten content 3710 may include a first stroke 3701, a second stroke 3702, a third stroke 3703, a fourth stroke 3704, and a fifth stroke 3705.

Figure 38:
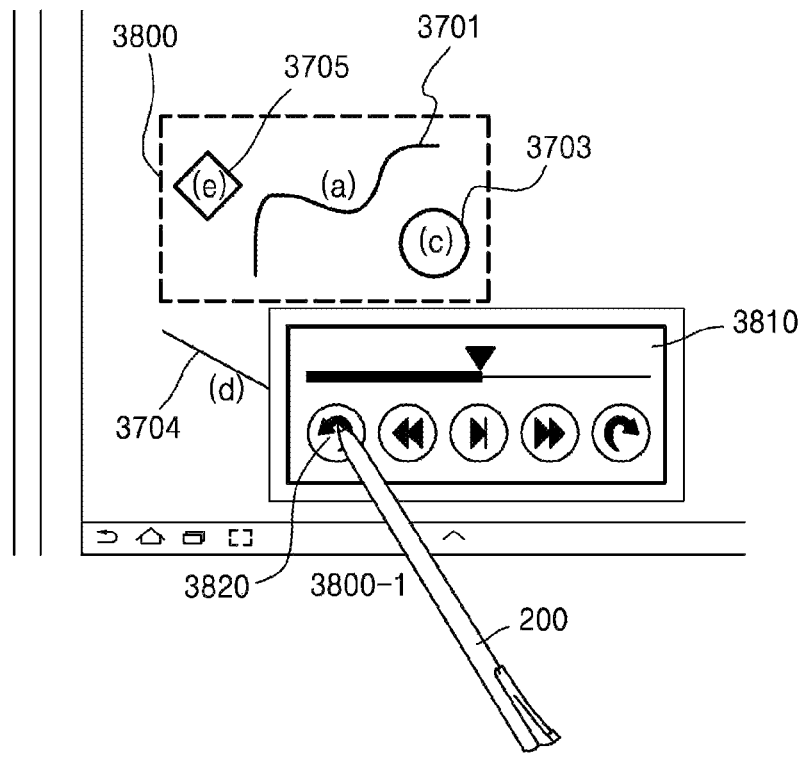
FIG. 38 is a diagram of an example of a first stack including information about strokes in a region of interest, and a second stack including information about deleted strokes, according to an exemplary embodiment.

FIG. 38 is a diagram of an example of a first stack including information about strokes in a region of interest, and a second stack including information about deleted strokes, according to an exemplary embodiment.

Referring to a reference numeral 3800-1 of FIG. 38, a user may specify a region of interest 3800 such that the region of interest 3800 includes the first stroke 3701, the third stroke 3703, and the fifth stroke 3705 from the handwritten content 3710.

The device 100 may extract information about the first, third, and fifth strokes 3701, 3703, and 3705 included in the region of interest 3800 from the list 3720 of the plurality of strokes included in the handwritten content 3710. The device 100 may create a first stack 3800-2 including the extracted information about the first, third, and fifth strokes 3701, 3703, and 3705. For example, the device 100 may compare timestamp information of the first, third, and fifth strokes 3701, 3703, and 3705, and insert the first stroke 3701 that is drawn first into a bottom of the first stack 3800-2, and then sequentially insert the third and fifth strokes 3703 and 3705 on the first stroke 3701.

Meanwhile, according to an exemplary embodiment, the device 100 may create a second stack 3800-3 that stores information about deleted strokes.

According to an exemplary embodiment, the device 100 may provide a virtual control panel 3810 including at least one edit function button.

An operation of performing, by the device 100, an undo function based on an input of activating an undo button 3820 from the virtual control panel 3810 will now be described in detail with reference to FIGS. 39A and 39B.

Figure 39A:
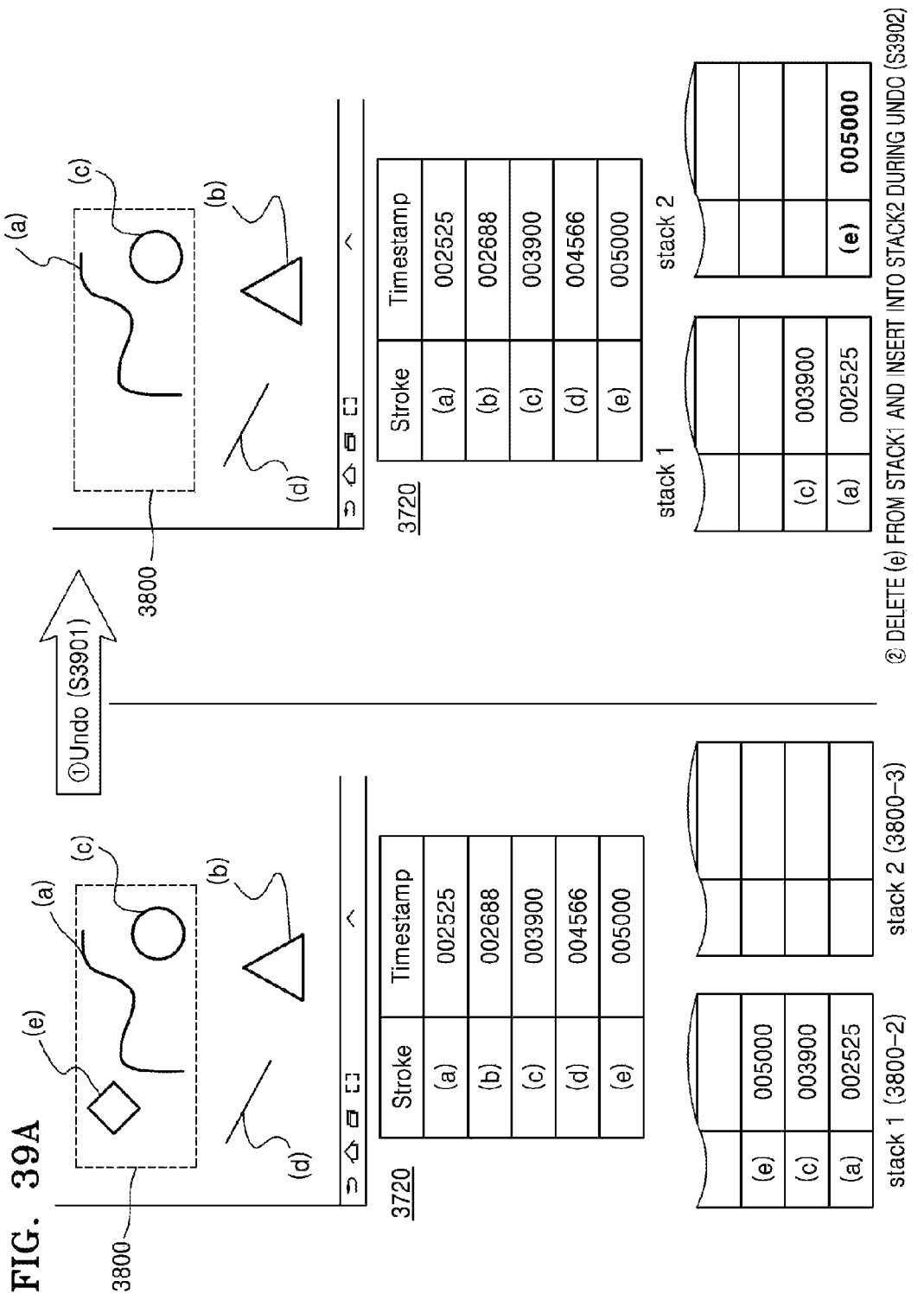
FIGS. 39A and 39B are diagrams of first and second stacks changing according to an undo input of a user.
Figure 39B:
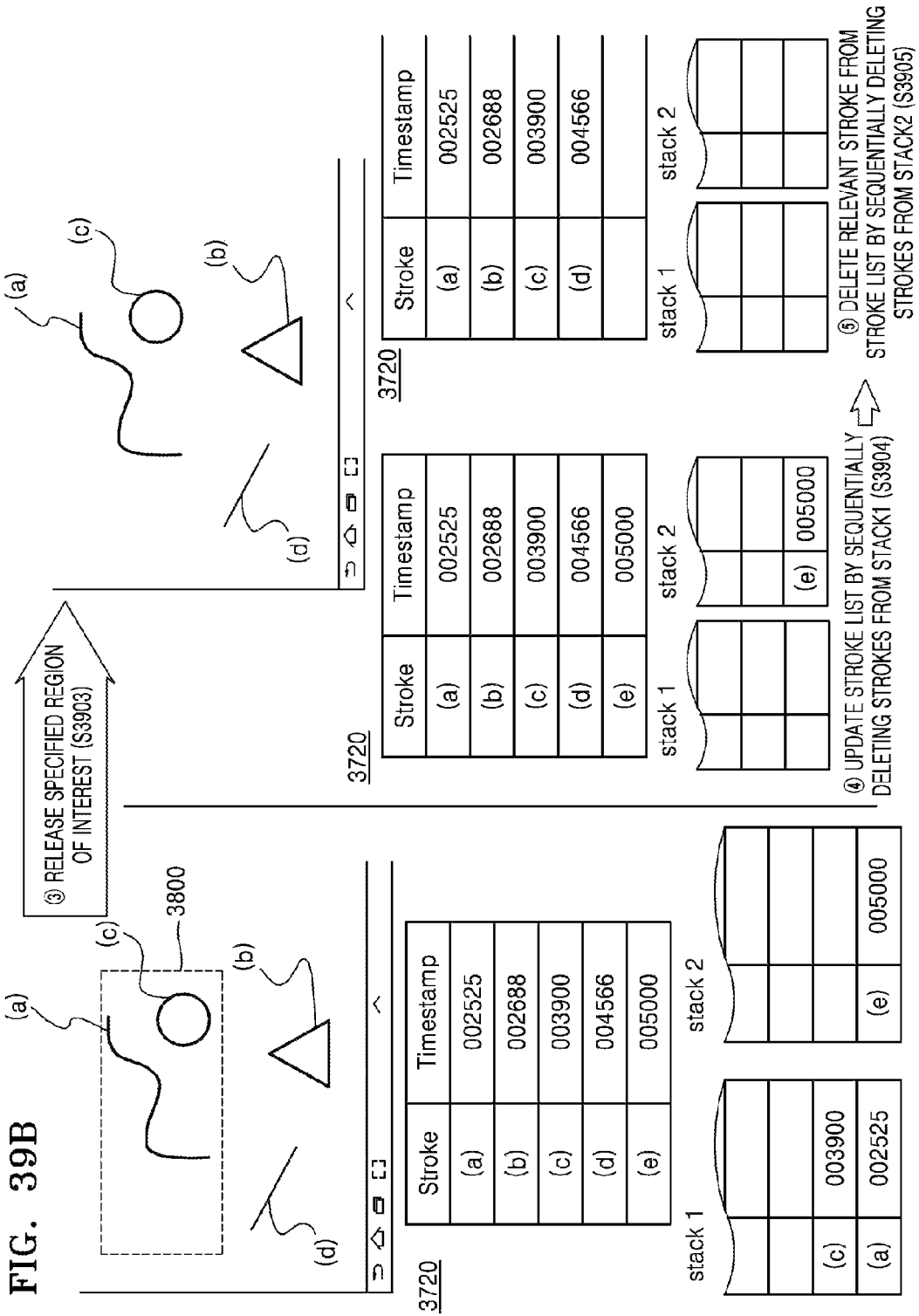

FIGS. 39A and 39B are diagrams of the first and second stacks 3800-2 and 3800-3 changing according to an undo input of a user. In FIGS. 39A and 39B, it is assumed that information about a first stroke 'a', about a third stroke 'c', and about a fifth stroke 'e' are included in the first stack 3800-2, as the region of interest 3800 is specified.

In operation S3901, the device 100 may receive an undo request regarding partial handwritten content in the region of interest 3800.

In operation S3902, in response to the undo request, the device 100 may delete the information about the fifth stroke 'e', which is inserted into an upper layer portion of the first stack 3800-2, from the first stack 3800-2. Then, the device 100 may insert the information about the fifth stroke 'e' into the second stack 3800-3.

In operation S3903, the device 100 may receive an input of releasing the specified region of interest 3800.

In operation S3904, the device 100 may update the list 3720 of the plurality of strokes included in the handwritten content 3710 based on the input of releasing the specified region of interest 3800. For example, the device 100 may reflect information of the first stack 3800-2 to the list 3720 of the plurality of strokes included in the handwritten content 3710.

In operation S3905, the device 100 may delete the information about the fifth stroke 'e' included in the second stack 3800-3 from the list 3720 of the plurality of strokes included in the handwritten content 3710.

According to an exemplary embodiment, the device 100 may delete a plurality of strokes included in partial handwritten content from a stroke that is relatively recently drawn, based on an undo request regarding the partial handwritten content.

Figure 40A:
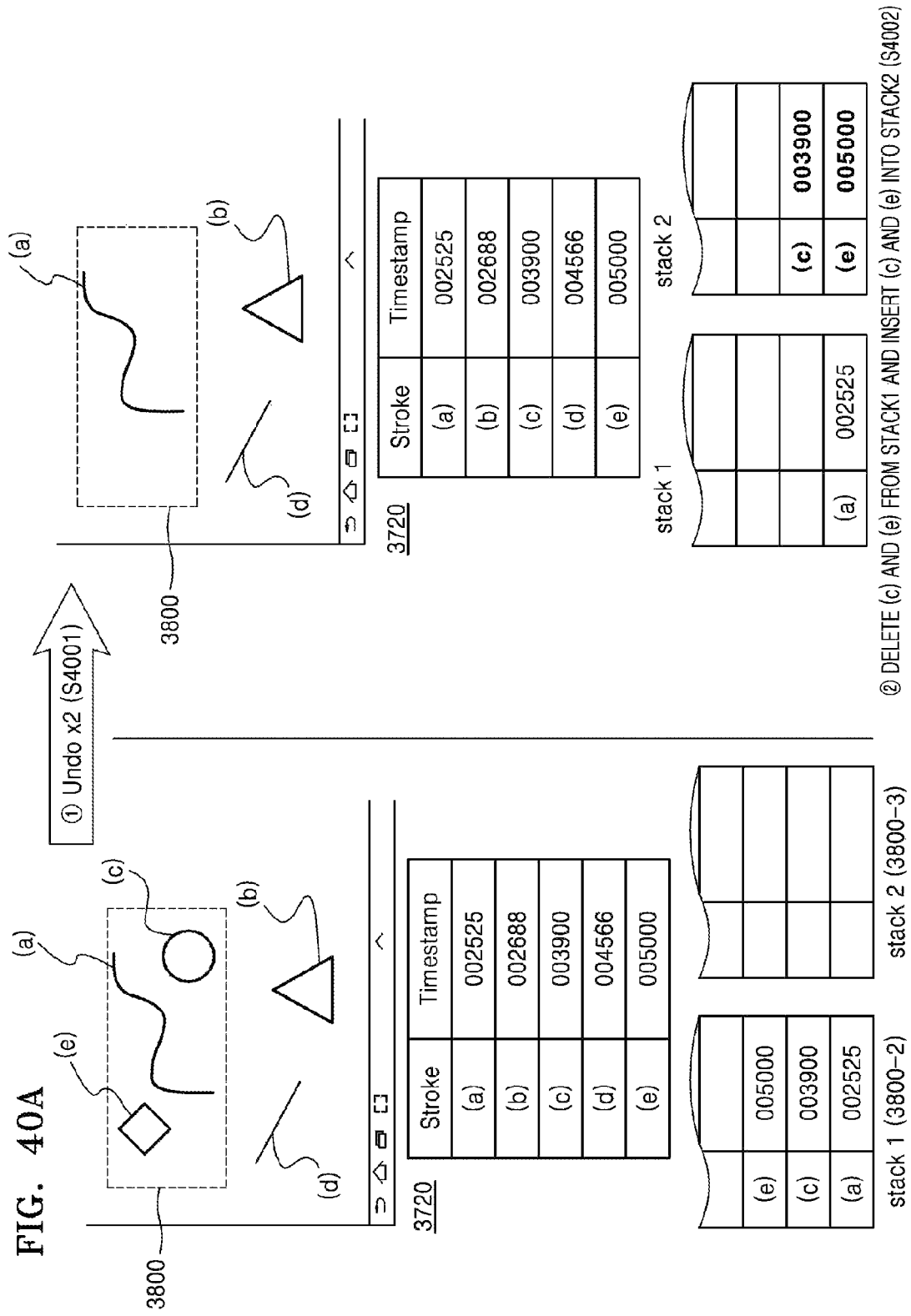
FIGS. 40A through 40C are diagrams for describing an example of performing an undo function and a redo function, by a device, on partial handwritten content.
Figure 40B:
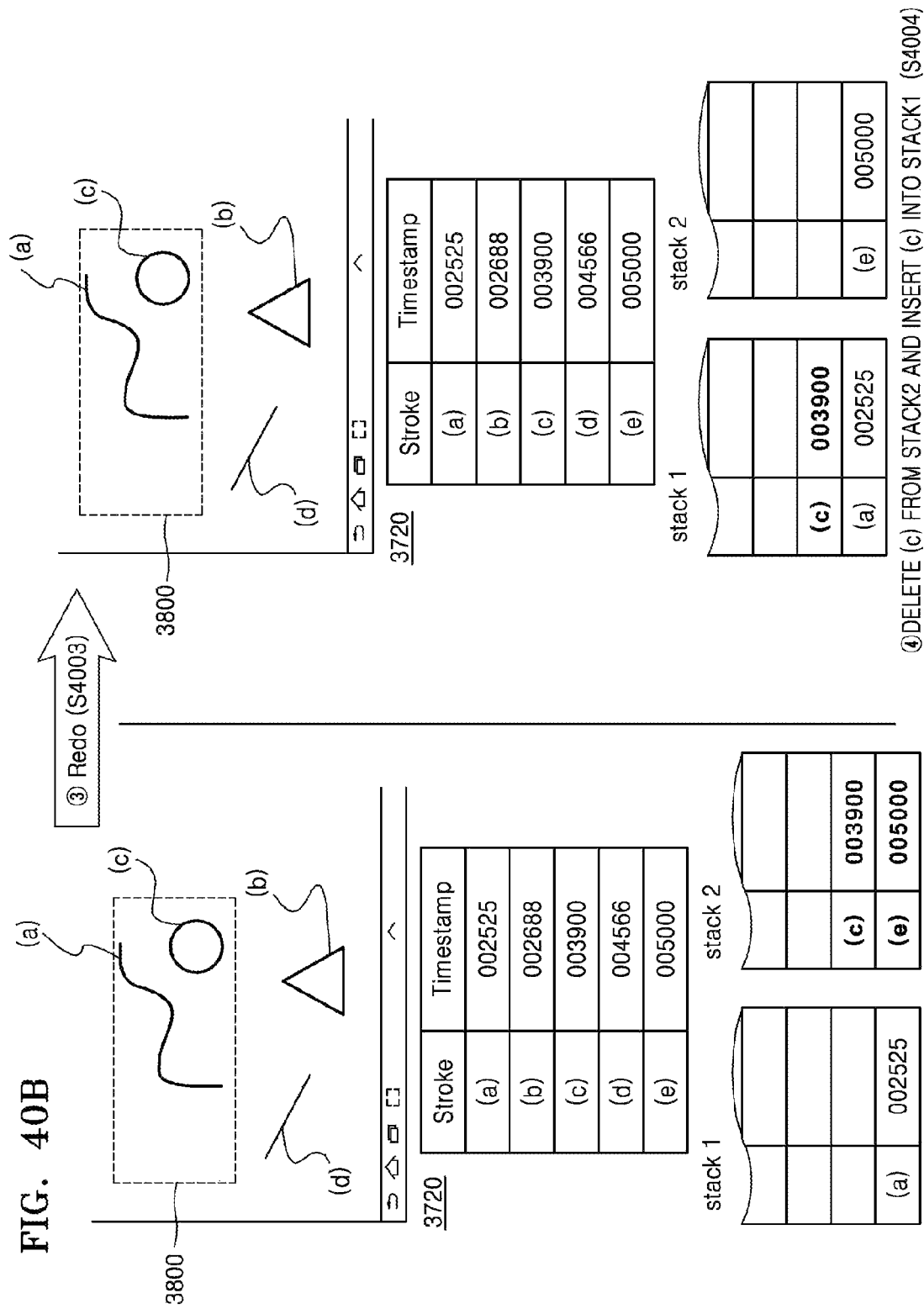
Figure 40C:
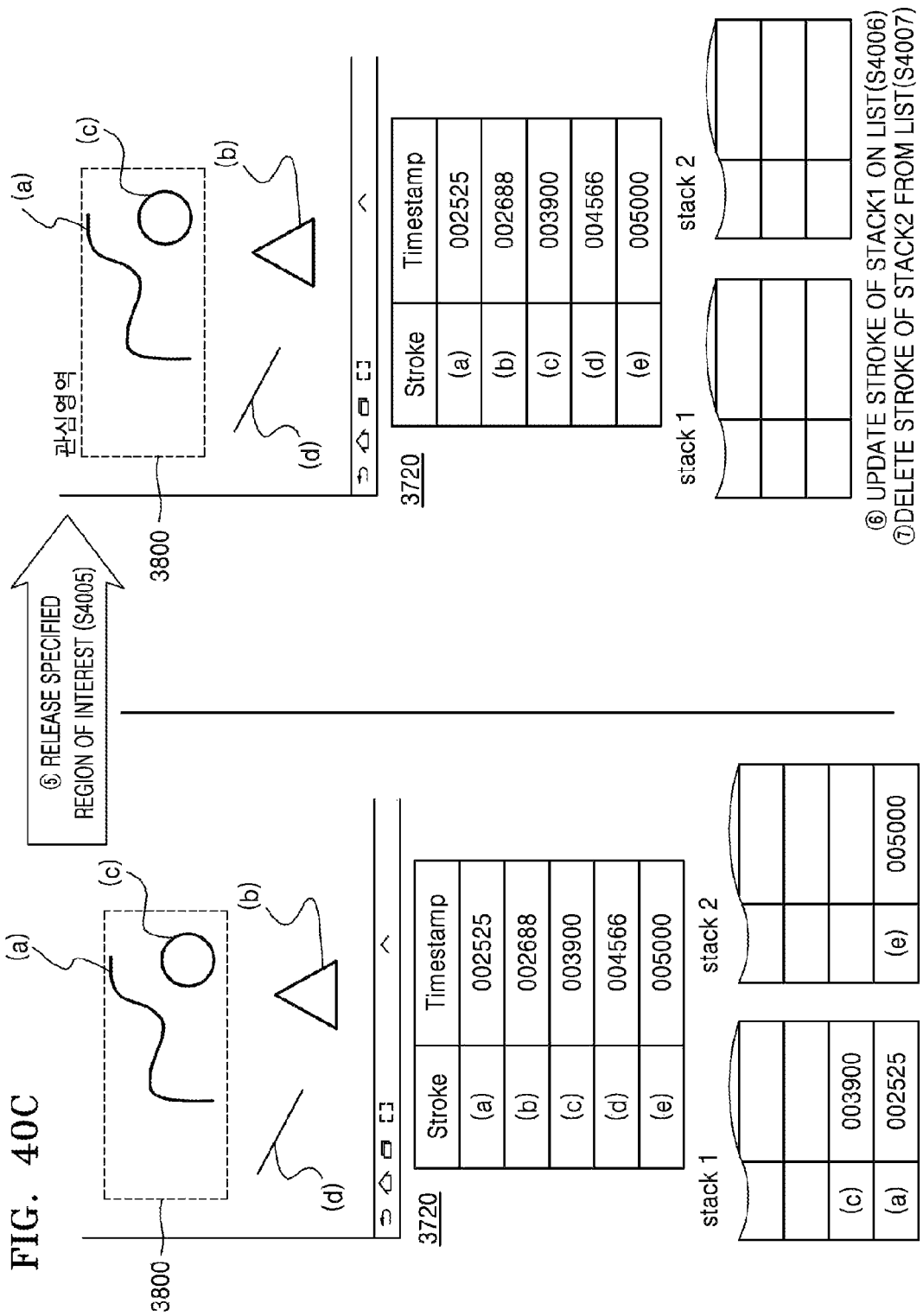

FIGS. 40A through 40C are diagrams for describing an example of performing an undo function and a redo function, by the device 100, on partial handwritten content. In FIGS. 40A through 40C, it is assumed that the first stack 3800-2 includes the information about the first, third, and fifth strokes 'a', 'c', and 'e', as the region of interest 3800 is specified.

In operation S4001, the device 100 may receive two undo requests regarding partial handwritten content in the region of interest 3800.

In operation S4002, in response to the first undo request, the device 100 may delete the information about the fifth stroke 'e', which is inserted into the upper layer portion of the first stack 3800-2, from the first stack 3800-2, and insert the information about the fifth stroke 'e' into the second stack 3800-3.

Then, in response to the second undo request, the device 100 may delete the information about the third stroke 'c', which is inserted into the upper layer portion of the first stack 3800-2, from the first stack 3800-2. Next, the device 100 may insert the information about the third stroke 'c' into the second stack 3800-3 above the information about the fifth stroke 'e'.

In operation S4003, the device 100 may receive a redo request.

In operation S4004, in response to the redo request, the device 100 may delete the information about the third stroke 'c', which inserted into an upper layer portion of the second stack 3800-3, from the second stack 3800-3, and insert the information about the third stroke 'c' into the upper layer portion of the first stack 3800-2.

In operation S4005, the device 100 may receive an input of releasing the specified region of interest 3800.

In operation S4006, the device 100 may update the list 3720 of the plurality of strokes included in the handwritten content 3710, based on the input of releasing the specified region of interest 3800. For example, the device 100 may reflect the information about the first stack 3800-2 to the list 3720 of the plurality of strokes included in the handwritten content 3710.

In operation S4007, the device 100 may delete the information about the fifth stroke 'e', which is included in the second stack 3800-3, from the list 3720 of the plurality of strokes included in the handwritten content 3710.

FIGS. 41A and 41B are diagrams for describing an example of performing an undo function and a stroke adding function, by a device, on partial handwritten content.

In FIGS. 41A and 41B, it is assumed that the information about the first, third, and fifth strokes 'a', 'c', and 'e' are included in the first stack 3800-2, as the region of interest 3800 is specified.

In operation S4101, the device 100 may receive two undo requests regarding the partial handwritten content in the region of interest 3800.

In operation S4102, in response to the first undo request, the device 100 may delete the information about the fifth stroke 'e', which is inserted into the upper layer portion of the first stack 3800-2, from the first stack 3800-2, and insert the information about the fifth stroke 'e' into the second stack 3800-3.

Then, in response to the second undo request, the device 100 may delete the information about the third stroke 'c', which is inserted into the upper layer portion of the first stack 3800-2, from the first stack 3800-2. Next, the device 100 may insert the information about the third stroke 'c' into the second stack 3800-3 above the information about the fifth stroke e.

In operation S4103, the device 100 may receive an input of adding a sixth stroke 'f'.

In operation 4104, the device 100 may insert information about the sixth stroke 'f' into the upper layer portion of the first stack 3800-2, according to the input of adding the sixth stroke 'f'.

In operation S4105, the device 100 may receive an input of releasing the specified region of interest 3800.

In operation S4106, the device 100 may update the list 3720 of the plurality of strokes included in the handwritten content 3710, according to the input of releasing the specified region of interest 3800. For example, the device 100 may reflect the information of the first stack 3800-2 to the list 3720 of the plurality of strokes included in the handwritten content 3710.

In operation S4007, the device 100 may delete the information about the fifth and third strokes 'e' and 'c', which is included in the second stack 3800-3, from the list 3720 of the plurality of strokes included in the handwritten content 3710.

Figure 42:
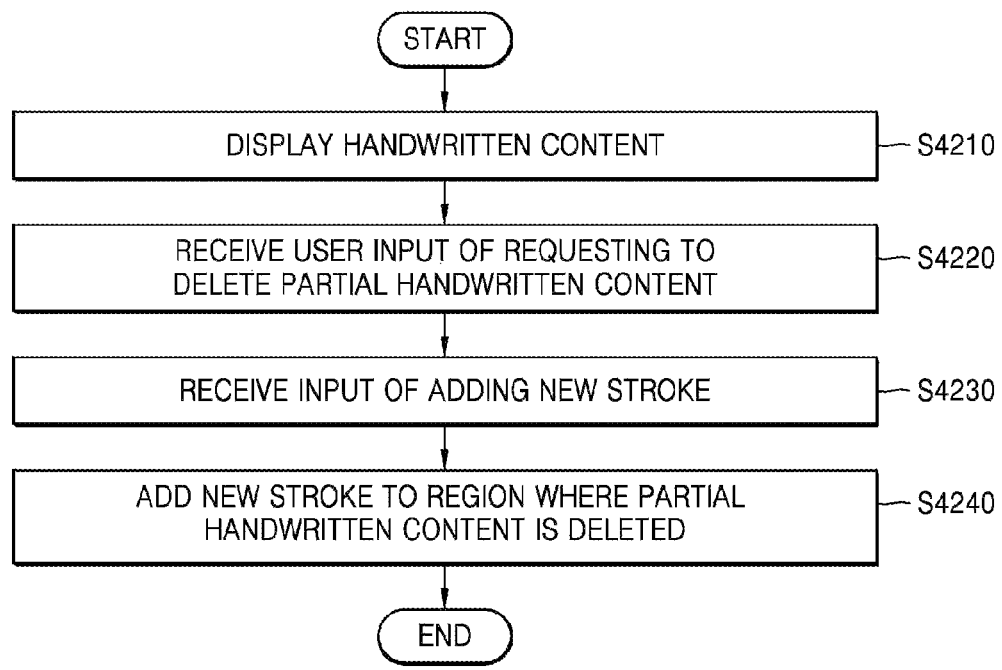
FIG. 42 is a flowchart of a method of replacing, by a device, partial handwritten content by external handwritten content, according to an exemplary embodiment.

FIG. 42 is a flowchart of a method of the device 100 replacing partial handwritten content by external handwritten content, according to an exemplary embodiment.

In operation S4210, the device 100 may display handwritten content.

In operation S4220, the device 100 may receive a user input of requesting to delete partial handwritten content. For example, the device 100 may display a virtual control panel including an edit function button. The device 100 may receive a user input of activating a delete button through the virtual control panel.

In operation S4230, the device 100 may receive an input of adding external handwritten content. For example, the device 100 may receive an input of drawing a new stroke in a region where the partial handwritten content is deleted.

In operation S4240, the device 100 may add the new stroke to the region where the partial handwritten content is deleted.

According to an exemplary embodiment, the device 100 may add information about the new stroke to a timeline corresponding to the deleted partial handwritten content from the list 3720 of the plurality of strokes. According to another exemplary embodiment, the device 100 may add the information about the new stroke to at the end of the list 3720 of the plurality of strokes.

According to an exemplary embodiment, partial handwritten content may be replaced by external handwritten content based on a user input, as will now be described in detail with reference to FIGS. 43A through 43D.

FIGS. 43A through 43D are diagrams for describing an example of replacing, by the device 100, partial handwritten content by external handwritten content. In FIGS. 43A through 43D, it is assumed that handwritten content 4310 is synchronized with moving image content 4320.

Figure 43A:
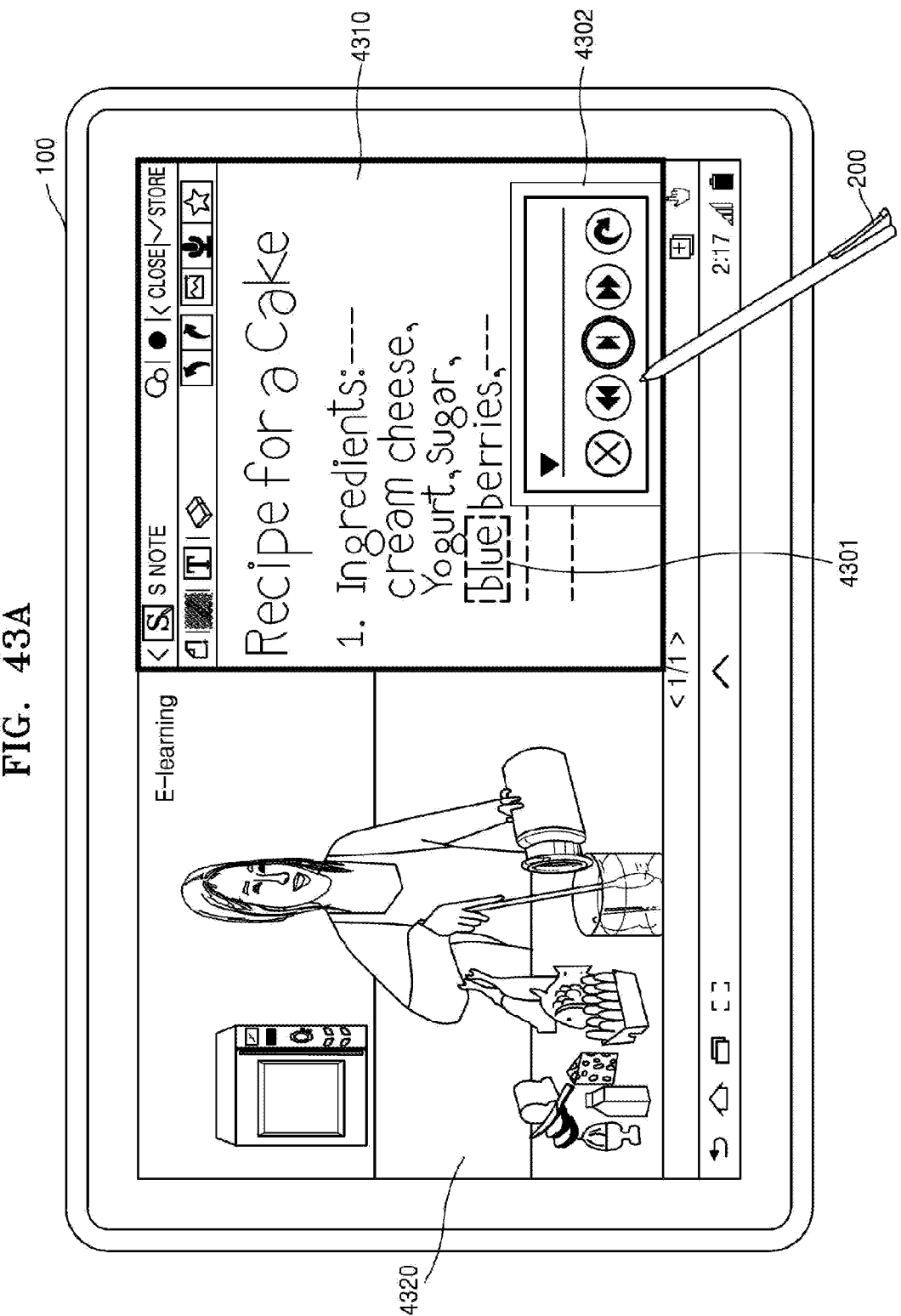
FIGS. 43A through 43D are diagrams for describing an example of replacing, by a device, partial handwritten content by external handwritten content.

As shown in FIG. 43A, the device 100 may display the handwritten content 4310 in which a cake recipe is recorded, on the screen. A user may specify a region the user wants to change, for example, blue, from the cake recipe as a region of interest 4301. The device 100 may display a virtual control panel 4302 in response to an input of specifying the region of interest 4301.

According to an exemplary embodiment, the device 100 may automatically provide the virtual control panel 4302 when the region of interest 4301 is specified. According to another exemplary embodiment, the device 100 may provide the virtual control panel 4302 upon receiving a user input of requesting for the virtual control panel 4302.

Figure 43B:
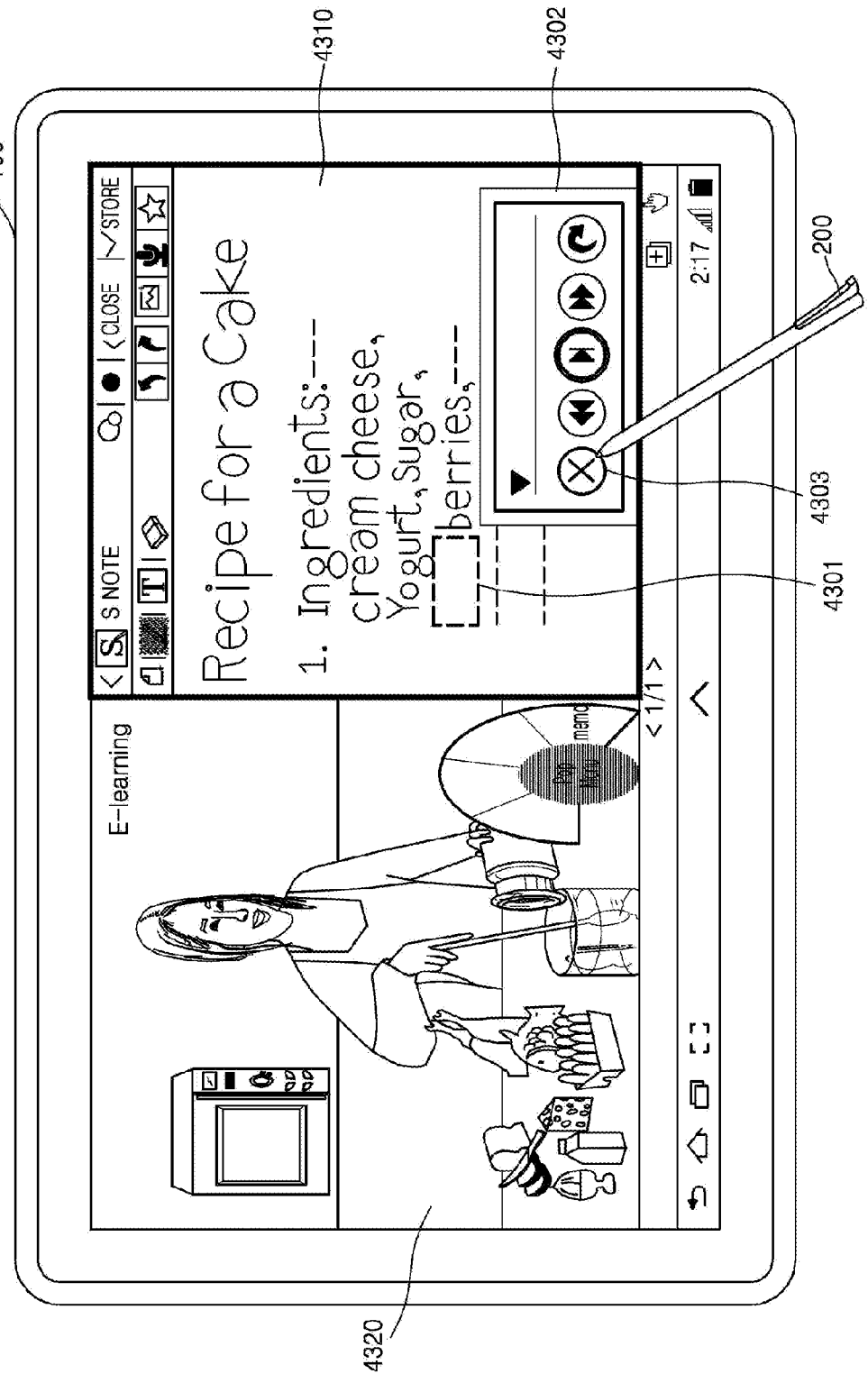

As shown in FIG. 43B, the device 100 may receive a user input of activating a delete button 4303 from the virtual control panel 4302.

Based on the user input of activating the delete button 4303, the device 100 may delete strokes, for example, blue, included in the region of interest 4301.

Figure 43C:
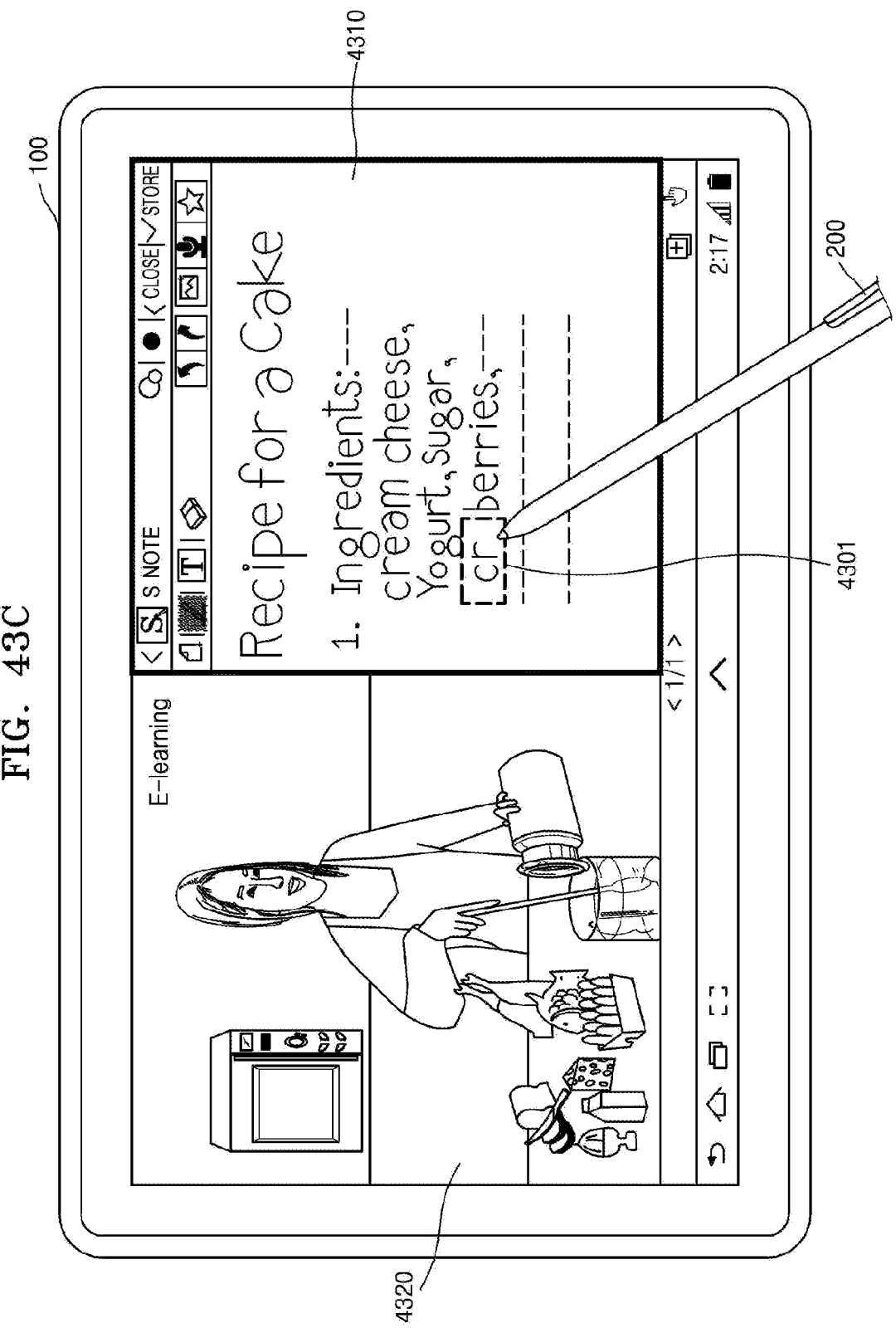
Figure 43D:
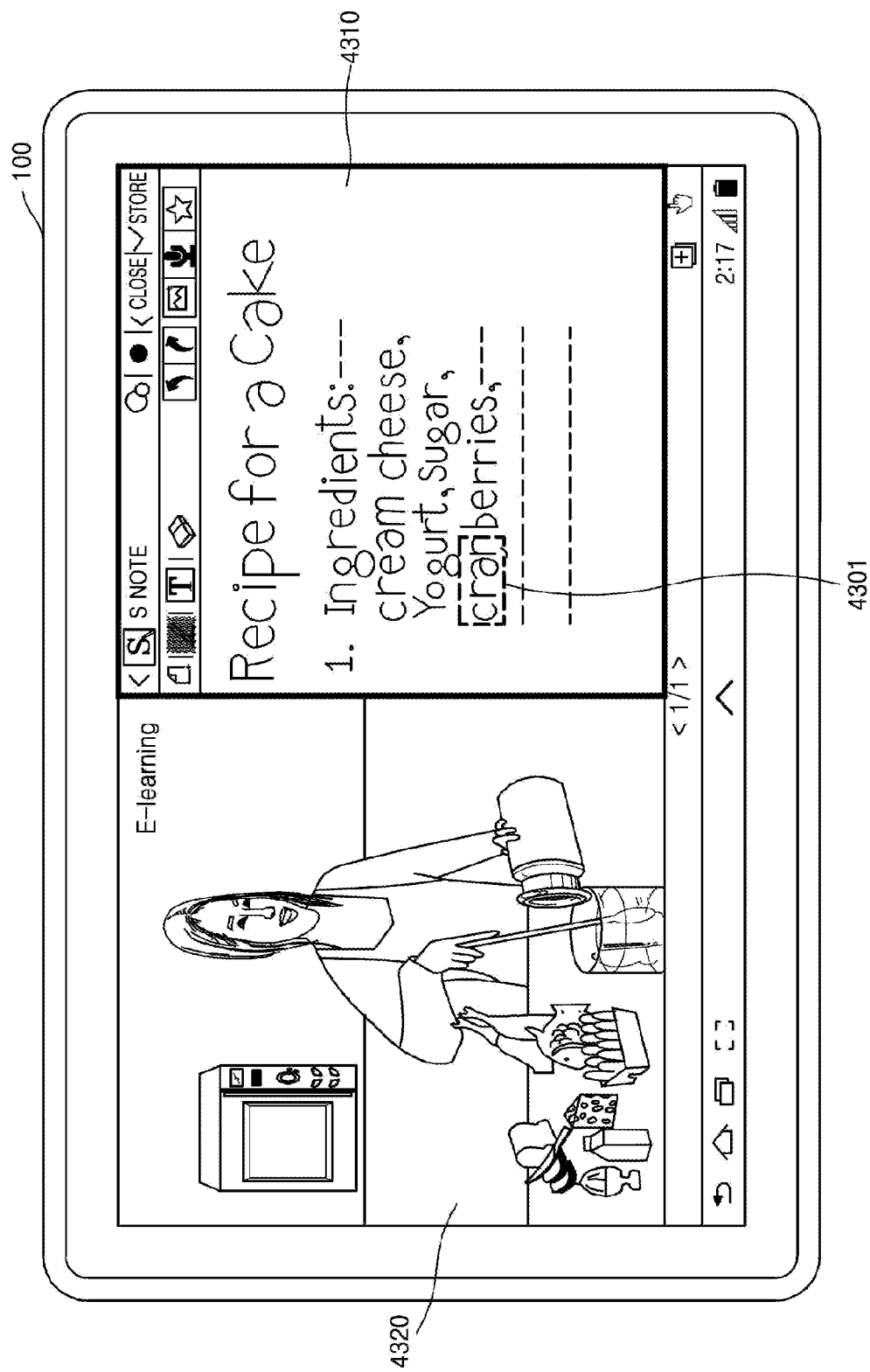

As shown in FIGS. 43C and 43D, the device 100 may receive an input of new strokes. For example, the user may newly input 'cran' in a region where 'blue' is deleted.

According to an exemplary embodiment, the device 100 may update the handwritten content 4310 by reflecting information about the new strokes, for example, 'cran'. For example, according to an exemplary embodiment, the device 100 may add information about strokes corresponding to 'cran' to a timeline between 'Sugar' and 'berries'.

According to another exemplary embodiment, the device 100 may add a tag indicating that information about strokes corresponding to 'blue' is deleted, and add the information about the strokes corresponding to 'cran' to the end of a list of a plurality of strokes included in the handwritten content 4310. Here, the device 100 may display that 'blue' has been replaced by 'cran' by adding link information of 'cran' to the information about the strokes corresponding to 'blue'.

Meanwhile, according to an exemplary embodiment, when partial handwritten content is changed (for example, when 'blue' is changed to 'cran'), the device 100 may synchronize the moving image content 4320 and the handwritten content 4310 with each other again.

Figure 44:
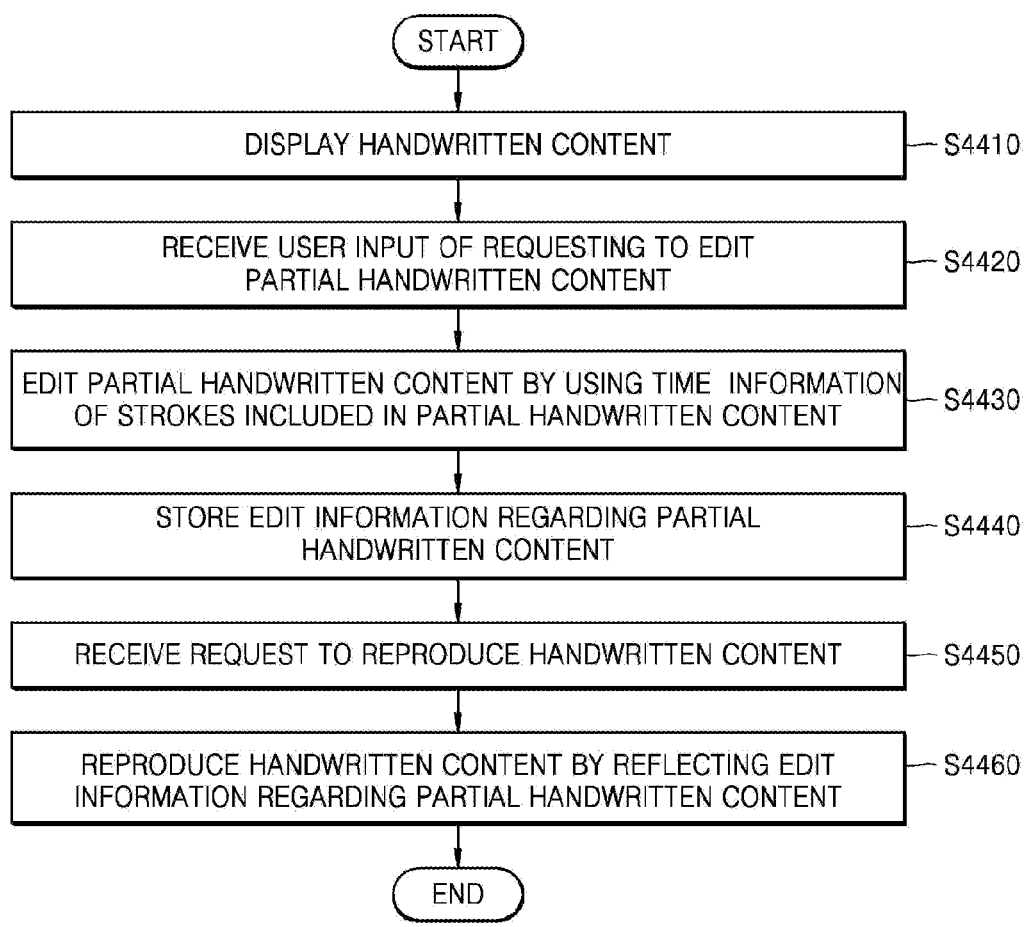
FIG. 44 is a flowchart of a method of reproducing, by a device, entire handwritten content by reflecting edit information about partial handwritten content, according to an exemplary embodiment.

FIG. 44 is a flowchart of a method of the device 100 reproducing entire handwritten content by reflecting edit information about partial handwritten content, according to an exemplary embodiment.

In operation S4410, the device 100 may display handwritten content. In operation S4420, the device 100 may receive a user input of requesting to edit partial handwritten content. In operation S4430, the device 100 may edit the partial handwritten content by using time information of strokes included in the partial handwritten content. Because operations S4410 through S4430 correspond to operations S3510 through S3530 of FIG. 35, details thereof are not repeated here.

In operation S4440, the device 100 may store edit information regarding the partial handwritten content. For example, the device 100 may apply the edit information to the handwritten content to store edited handwritten content in one file. Alternatively, the device 100 may store the edit information separately from the handwritten content.

Meanwhile, according to an exemplary embodiment, the device 100 may synchronize the handwritten content, to which the edit information regarding the partial handwritten content is reflected, again with audio/video content.

In operation S4450, the device 100 may receive a request to reproduce the edited handwritten content. According to an exemplary embodiment, the device 100 may display a virtual control panel including a reproduce function button. The device 100 may receive a user input of activating the reproduce function button via the virtual control panel.

Alternatively, the device 100 may receive a pre-set touch input corresponding to a reproduce command, or may receive an input of activating a physical button corresponding to the reproduce command. Meanwhile, the user may input an instruction requesting to reproduce the handwritten content to the device 100 via voice.

In operation S4460, the device 100 may reproduce the handwritten content by reflecting the edit information regarding the partial handwritten content. For example, the device 100 may reproduce drawing processes of the handwritten content while the edit information is reflected.

According to an exemplary embodiment, the device 100 may additionally reproduce an edit process after reproducing drawing processes of original handwritten content. Alternatively, the device 100 may provide a selection window for selecting whether to reflect edit information regarding partial handwritten content. Each of the above cases will now be described in detail with reference to FIGS. 45A through 45C.

Figure 45A:
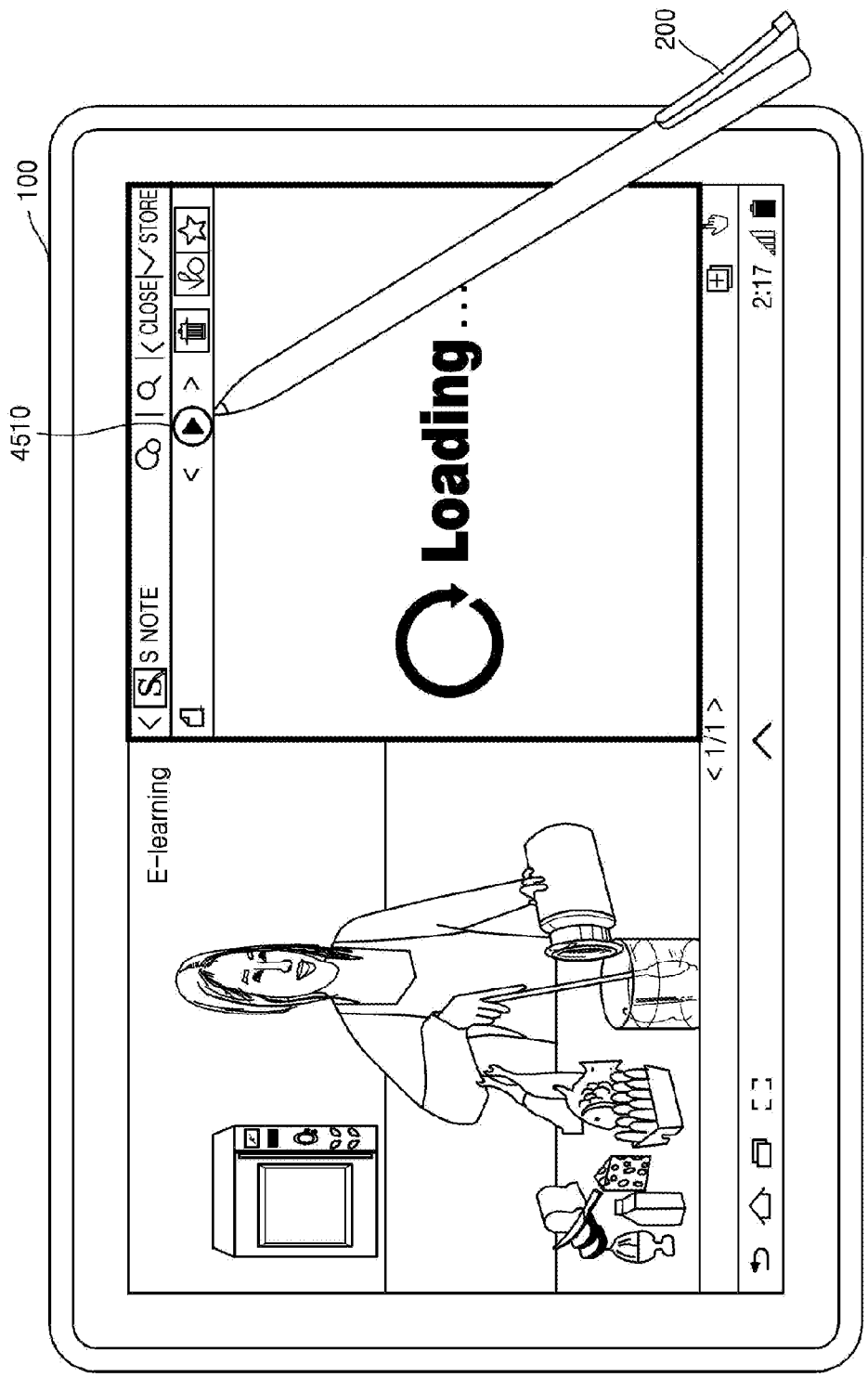
Figure 45C:
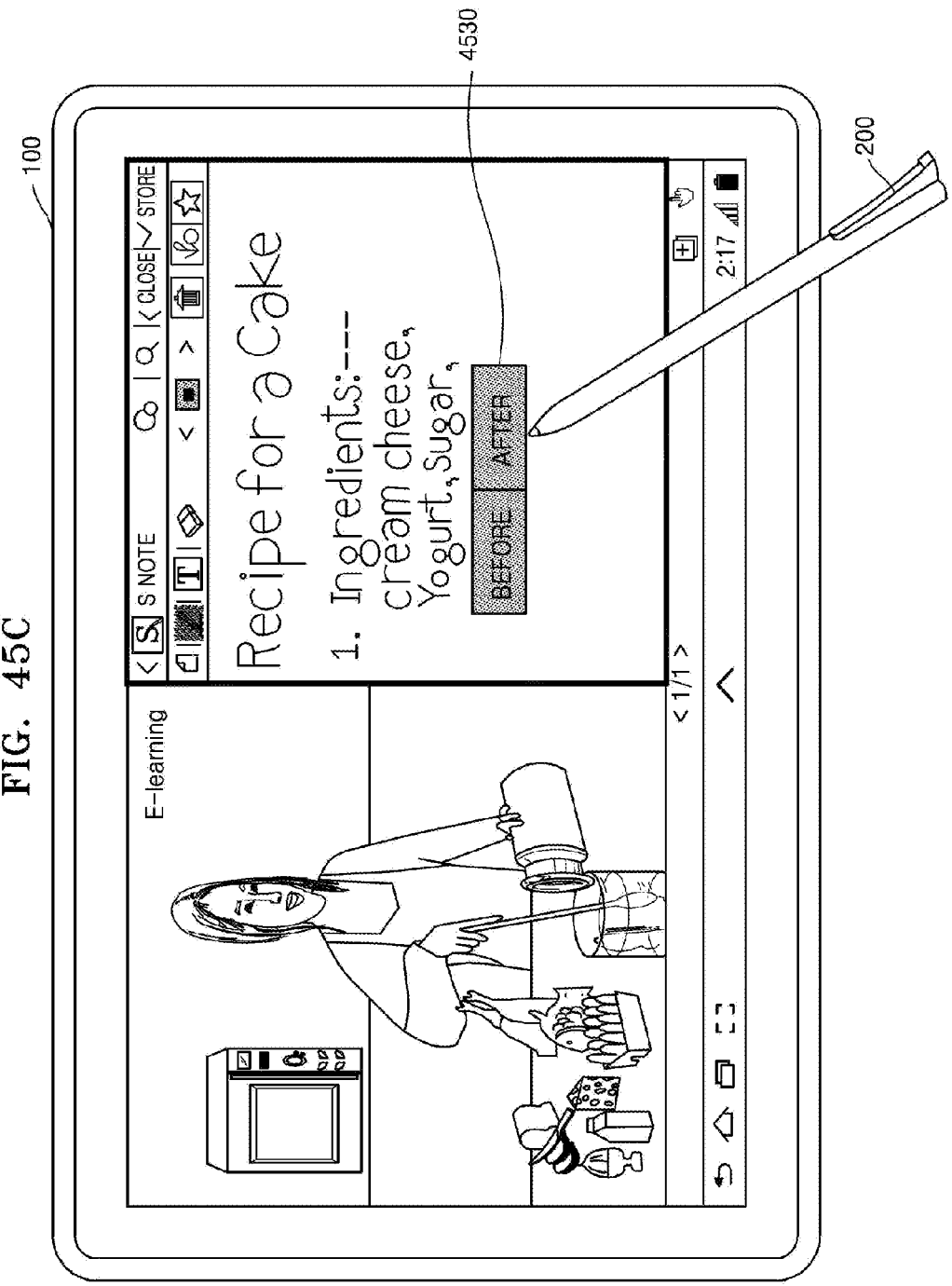

FIGS. 45A through 45C are diagrams for describing an example of reproducing, by the device 100, entire handwritten content by reflecting edit information about partial handwritten content.

Referring to FIG. 45A, the device 100 may receive a user input of requesting to reproduce handwritten content. For example, the device 100 may receive an input of activating a reproduce button 4510 from a tool bar.

Referring to FIG. 45B, the device 100 may reproduce drawing processes of the handwritten content by reflecting edit information. For example, when 'blue' berries are changed to 'cran' berries, the device 100 may reproduce drawing processes of strokes corresponding to 'cran' during a period of time when drawing processes of strokes corresponding to 'blue' have to be reproduced.

Referring to FIG. 45C, when 'blue' berries are changed to 'cran' berries, the device 100 may stop reproducing the handwritten content during the period of time when the drawing processes of the strokes corresponding to 'blue' have to be reproduced, and provide a selection window 4530 for selecting whether to reflect the edit information.

When a user selects 'before', the device 100 may output the drawing processes of the strokes corresponding to 'blue'. When the user selects 'after', the device 100 may output the drawing processes of the strokes corresponding to 'cran'.

Figure 46:
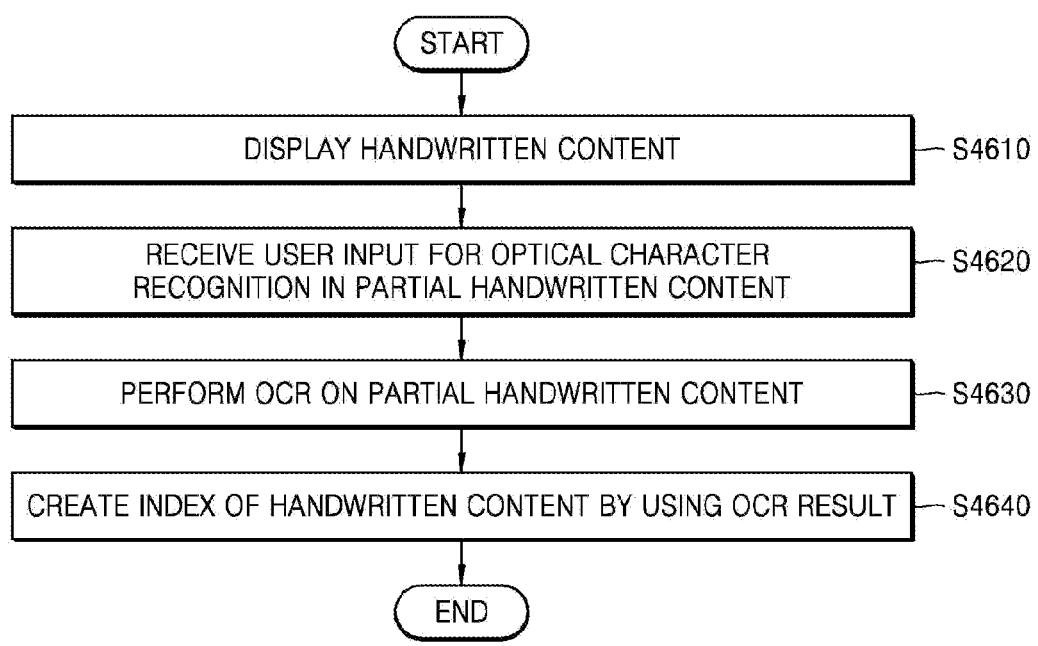
FIG. 46 is a flowchart of a method of performing optical character recognition (OCR), by a device, on partial handwritten content, according to an exemplary embodiment.

FIG. 46 is a flowchart of a method of the device 100 performing OCR on partial handwritten content, according to an exemplary embodiment.

In operation S4610, the device 100 may display handwritten content.

In operation S4620, the device 100 may receive a user input of requesting for optical character recognition (OCR) in the displayed handwritten content. Here, OCR is a technology of converting a Korean, English, or number font in an image document to an editable text.

According to an exemplary embodiment, the device 100 may display a virtual control panel including an OCR function button. The device 100 may receive a user input of activating the OCR function button via the virtual control panel.

Alternatively, the device 100 may receive a touch input corresponding to an OCR command, or may receive an input of activating a physical button corresponding to the OCR command. Alternatively, the user may input an instruction requesting for OCR regarding partial handwritten content to the device 100 via voice.

In operation S4630, the device 100 may perform OCR on partial handwritten content. For example, the device 100 may perform OCR on a plurality of strokes included in the partial handwritten content selected by the user.

In operation S4640, the device 100 may create an index of the handwritten content by using an OCR result. According to an exemplary embodiment, the device 100 may store the index in a name regarding the handwritten content. According to an exemplary embodiment, the user may use the index as a search word for searching for the handwritten content.

Figure 47A:
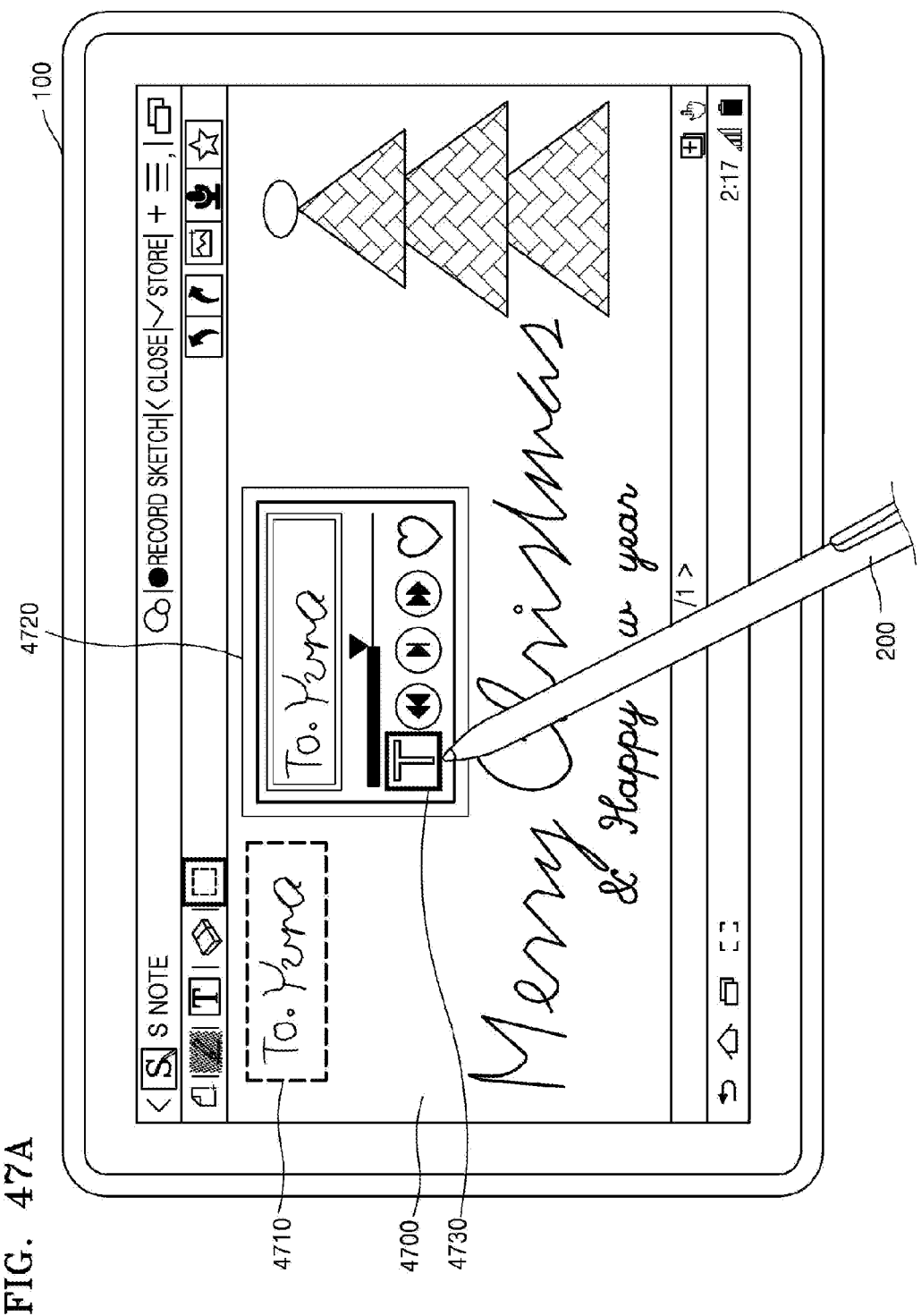
FIGS. 47A and 47B are diagrams for describing an example of performing OCR, by a device, on partial handwritten content.
Figure 47B:
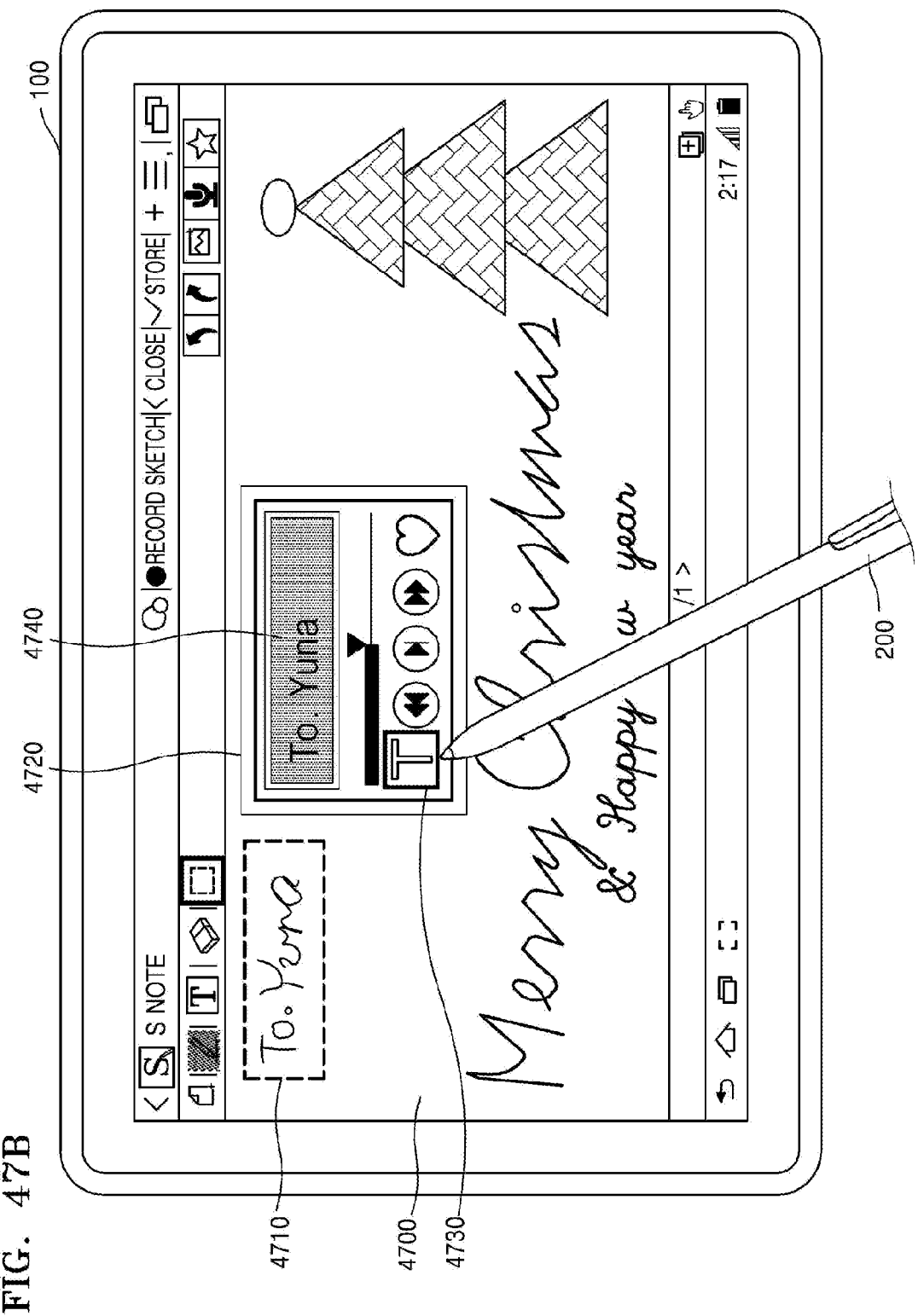

FIGS. 47A and 47B are diagrams for describing an example of performing OCR, by the device 100, on partial handwritten content.

Referring to FIG. 47A, the device 100 may display handwritten content 4700 including a Christmas card on the screen. A user may specify a region of interest 4710 from the handwritten content 4700.

The device 100 may display a virtual control panel 4720 in response to an input of specifying the region of interest 4710.

According to an exemplary embodiment, the device 100 may automatically provide the virtual control panel 4720 when the region of interest 4710 is specified. According to another exemplary embodiment, the device 100 may provide the virtual control panel 4720 when a user input of requesting for the virtual control panel 4720 is received.

According to an exemplary embodiment, the device 100 may receive an input of activating an OCR function button 4730 from the virtual control panel 4720.

Referring to FIG. 47B, the device 100 may perform an OCR function on partial handwritten content, for example, 'To, Yuna', included in the region of interest 4710, based on the input of activating the OCR function button 4730.

According to an exemplary embodiment, the device 100 may display an OCR result 4740 on the virtual control panel 4720. According to an exemplary embodiment, the device 100 may store the OCR result 4740 as an index of the handwritten content 4700 based on a user request.

Figure 48:
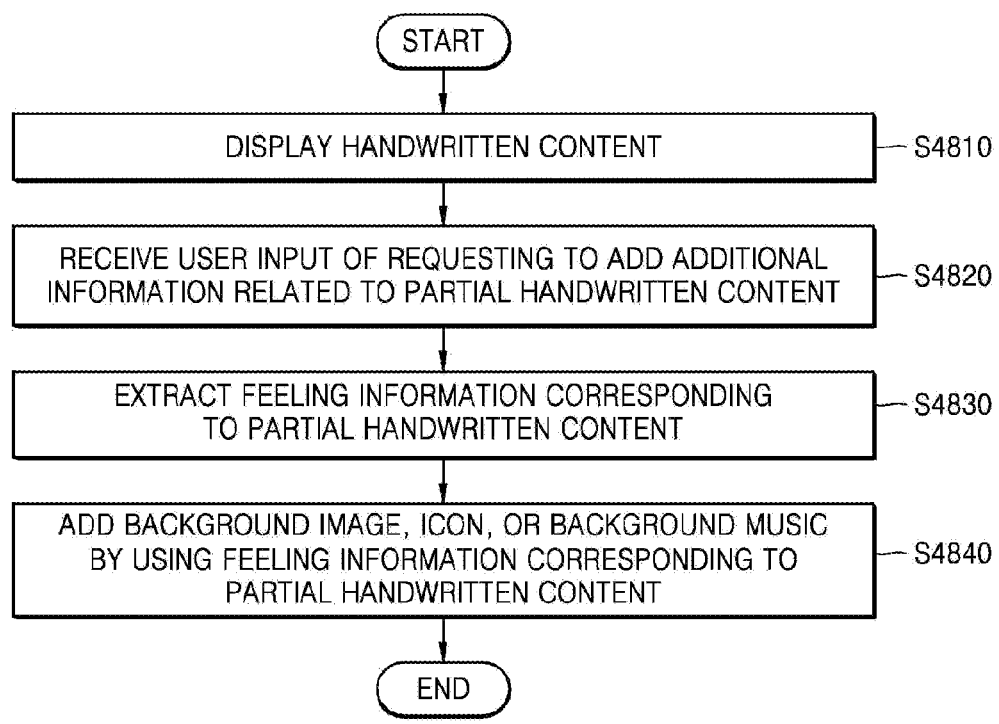
FIG. 48 is a flowchart of a method of adding, by a device, a background image, an icon, or background music, by using emotion information corresponding to partial handwritten content, according to an exemplary embodiment.

FIG. 48 is a flowchart of a method of the device 100 adding a background image, an icon, or background music, by using emotion information corresponding to partial handwritten content, according to an exemplary embodiment.

In operation S4810, the device 100 may display handwritten content. According to an exemplary embodiment, the device 100 may receive a user input of selecting partial handwritten content from the handwritten content.

In operation S4820, the device 100 may receive a user input of requesting to add additional information related to the partial handwritten content. For example, the device 100 may receive an input of requesting to add a background image, an icon, or background music related to the partial handwritten content.

In operation S4830, the device 100 may extract emotion information corresponding to the partial handwritten content based on the user input of requesting to add the additional information. For example, the device 100 may extract mood information (for example, joy or sadness), biometric information (for example, pulse information, electrocardiogram information, or temperature information), or facial expression information of a user.

In operation S4840, the device 100 may add at least one of the background image, the icon, and the background music by using the emotion information corresponding to the partial handwritten content. For example, the device 100 may add an icon corresponding to a facial expression of the user while creating the partial handwritten content.

Figure 49:
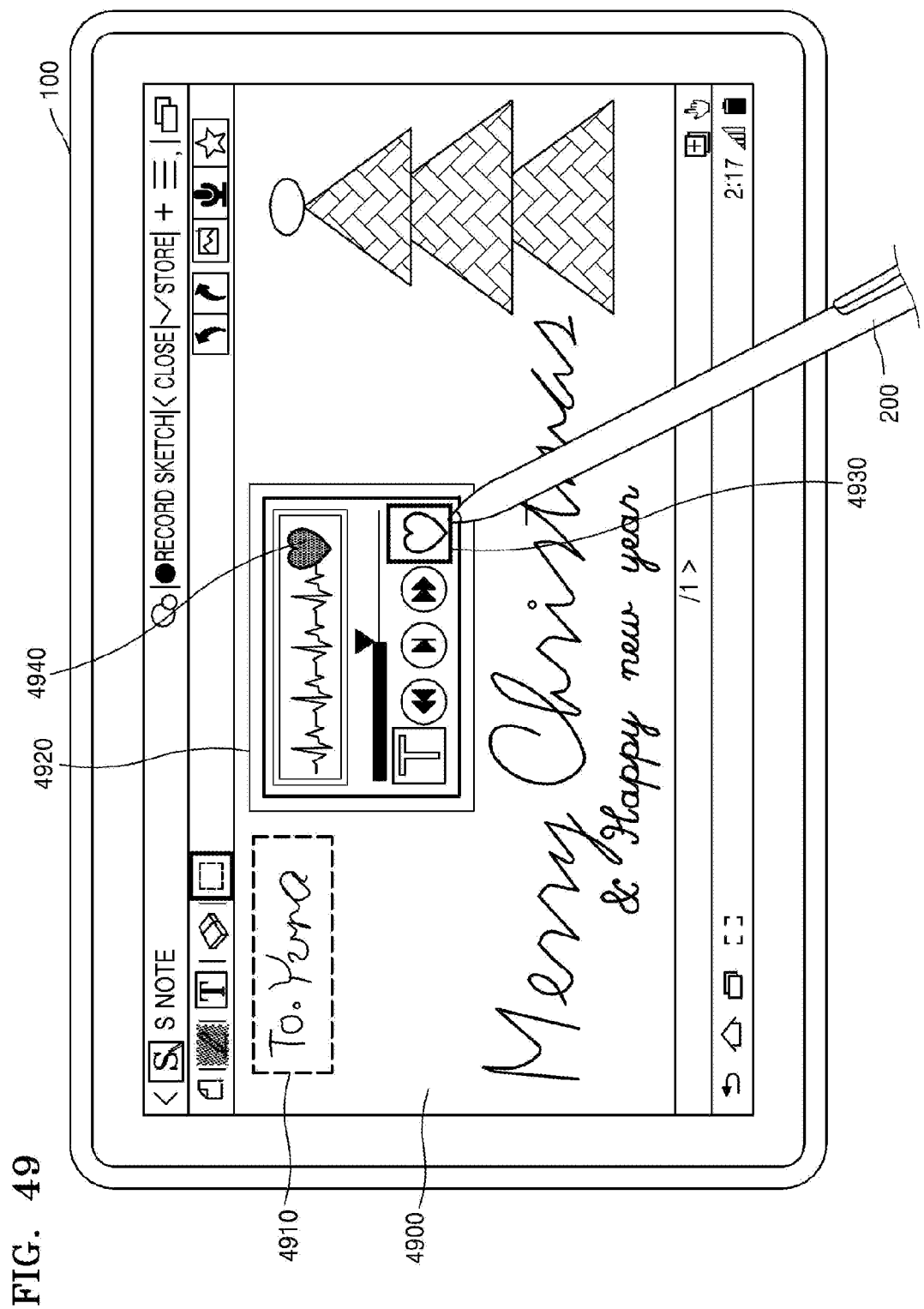
FIG. 49 is a diagram of an example of displaying, by a device, pulse information corresponding to partial handwritten content.

FIG. 49 is a diagram of an example of the device 100 displaying pulse information corresponding to partial handwritten content.

Referring to FIG. 49, the device 100 may display handwritten content 4900 including a Christmas card on the screen. A user may specify a region of interest 4910 from the handwritten content 4900.

The device 100 may display a virtual control panel 4920 in response to an input of specifying the region of interest 4910.

According to an exemplary embodiment, the device 100 may automatically provide the virtual control panel 4920 while the region of interest 4910 is specified. According to another exemplary embodiment, the device 100 may provide the virtual control panel 4920 when a user input of requesting for the virtual control panel 4920 is received.

According to an exemplary embodiment, the device 100 may receive an input of activating a emotion information output button 4930 from the virtual control panel 4920. Based on the user input of activating the emotion information output button 4930, the device 100 may extract pulse rate information corresponding to partial handwritten content (for example, 'To. Yuna') included in the region of interest 4910.

According to an exemplary embodiment, the device 100 may display an image 4940 corresponding to the pulse rate information on the virtual control panel 4920. According to an exemplary embodiment, the device 100 may add the image 4940 corresponding to the pulse rate information to the handwritten content 4900 based on a user request.

Although not shown in FIG. 49, according to an exemplary embodiment, the device 100 may insert heart beating sound to the handwritten content 4900 based on heart rate information corresponding to the partial handwritten content (for example, 'To. Yuna').

Figure 50:
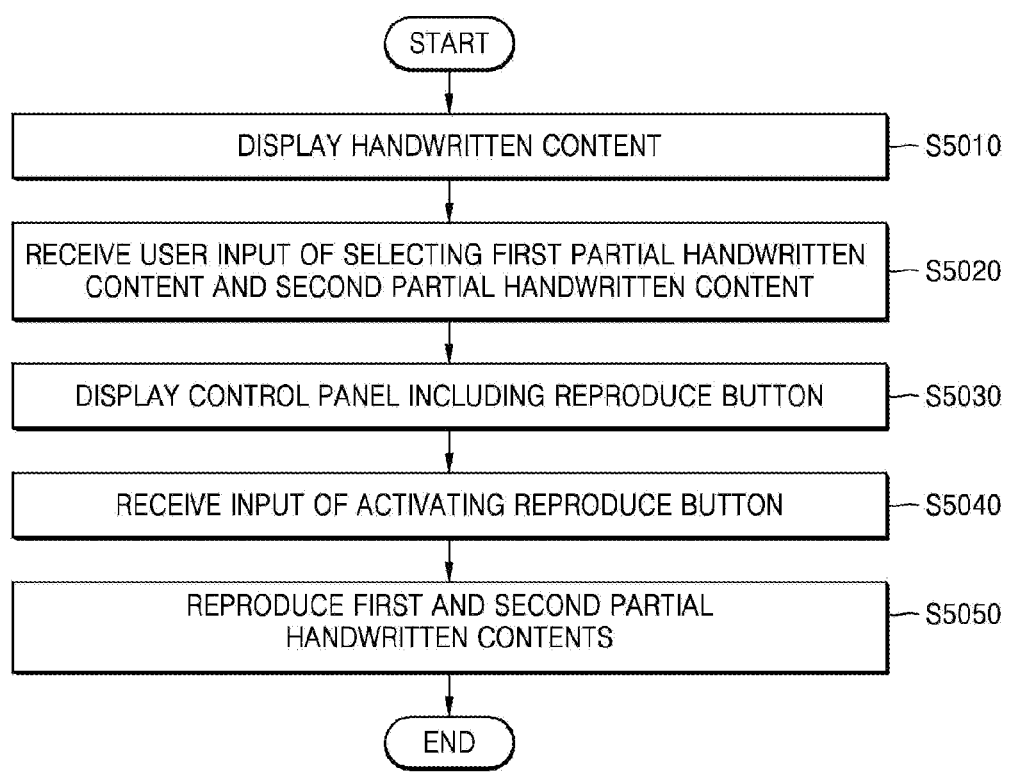
FIG. 50 is a flowchart of a method of reproducing, by a device, a plurality of partial handwritten contents, according to an exemplary embodiment.

FIG. 50 is a flowchart of a method of reproducing, by the device 100, a plurality of partial handwritten contents, according to an exemplary embodiment.

In operation S5010, the device 100 may display handwritten content on the screen. Because operation S5010 corresponds to operation S210 of FIG. 2, details thereof are not repeated here.

In operation S5020, the device 100 may receive a user input of selecting first partial handwritten content and second partial handwritten content from the handwritten content displayed on the screen. For example, the device 100 may receive a user input of specifying a plurality of regions of interest. Here, the device 100 may extract the first and second partial handwritten contents respectively corresponding to the plurality of regions of interest.

In operation S5030, the device 100 may display a control panel. For example, the device 100 may display the control panel in response to the user input of specifying the plurality of regions of interest. Here, the control panel may include a reproduce button.

In operation S5040, the device 100 may receive an input of activating the reproduce button via the control panel.

In operation S5050, the device 100 may reproduce the first and second partial handwritten contents based on the input of activating the reproduce button.

According to an exemplary embodiment, the device 100 may reproduce the first and second partial handwritten contents by using first time information of first strokes included in the first partial handwritten content and second time information of second strokes included in the second partial handwritten content.

For example, the device 100 may extract the first strokes included in the first partial handwritten content and the second strokes included in the second partial handwritten content. The device 100 may determine relative chronological orders of the first and second strokes by comparing timestamp information between the first and second strokes. The device 100 may create a stack such that a stroke that is created first from among the first and second strokes is inserted into an uppermost layer and a stroke that is created last from among the first and second strokes is inserted into a lowermost layer.

The device 100 may reproduce the first and second partial handwritten contents included in the plurality of regions of interest according to drawing chronological orders, by using coordinate values of the first and second strokes included in the stack.

Figure 51A:
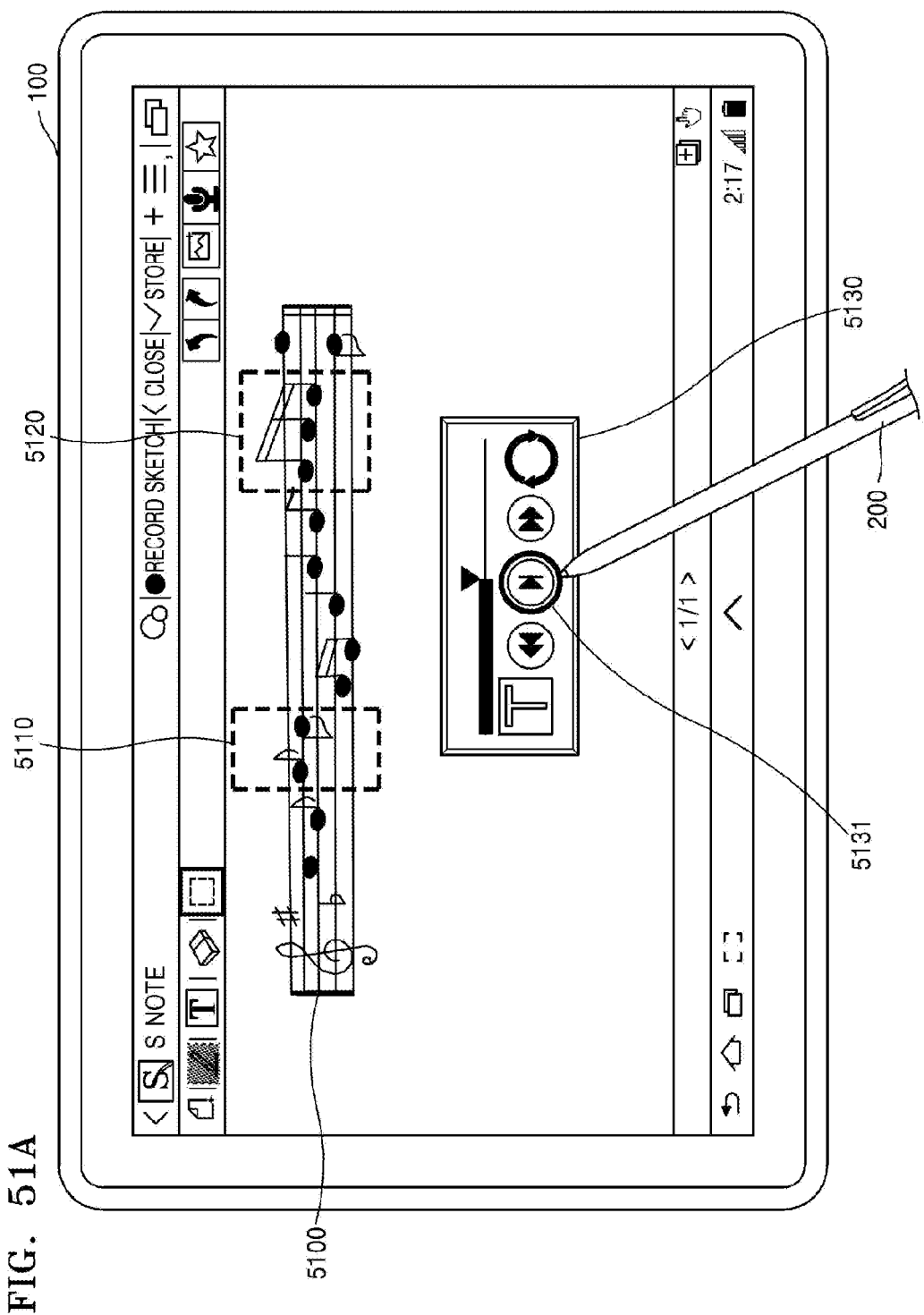
FIG. 51A is a diagram for describing an example of reproducing, by a device, a plurality of partial handwritten contents.

FIG. 51A is a diagram for describing an example of reproducing, by the device 100, a plurality of partial handwritten contents.

Referring to FIG. 51A, the device 100 may display score handwritten content 5100. A user may specify a first region of interest 5110 and a second region of interest 5120 from the score handwritten content 5100.

The device 100 may provide a virtual control panel 5130. The device 100 may receive an input of activating a reproduce button 5131 on the virtual control panel 5130. In this case, the device 100 may extract stroke information of first musical notes included in the first region of interest 5110 and stroke information of second musical notes included in the second region of interest 5120. Stroke information may include ID information, timestamp information, and coordinate information of a stroke.

The device 100 may erase the first and second musical notes displayed in the first and second regions of interest 5110 and 5120, based on the input of activating the reproduce button 5131. Then, the device 100 may newly reproduce drawing processes of the first and second musical notes.

Figure 51B:
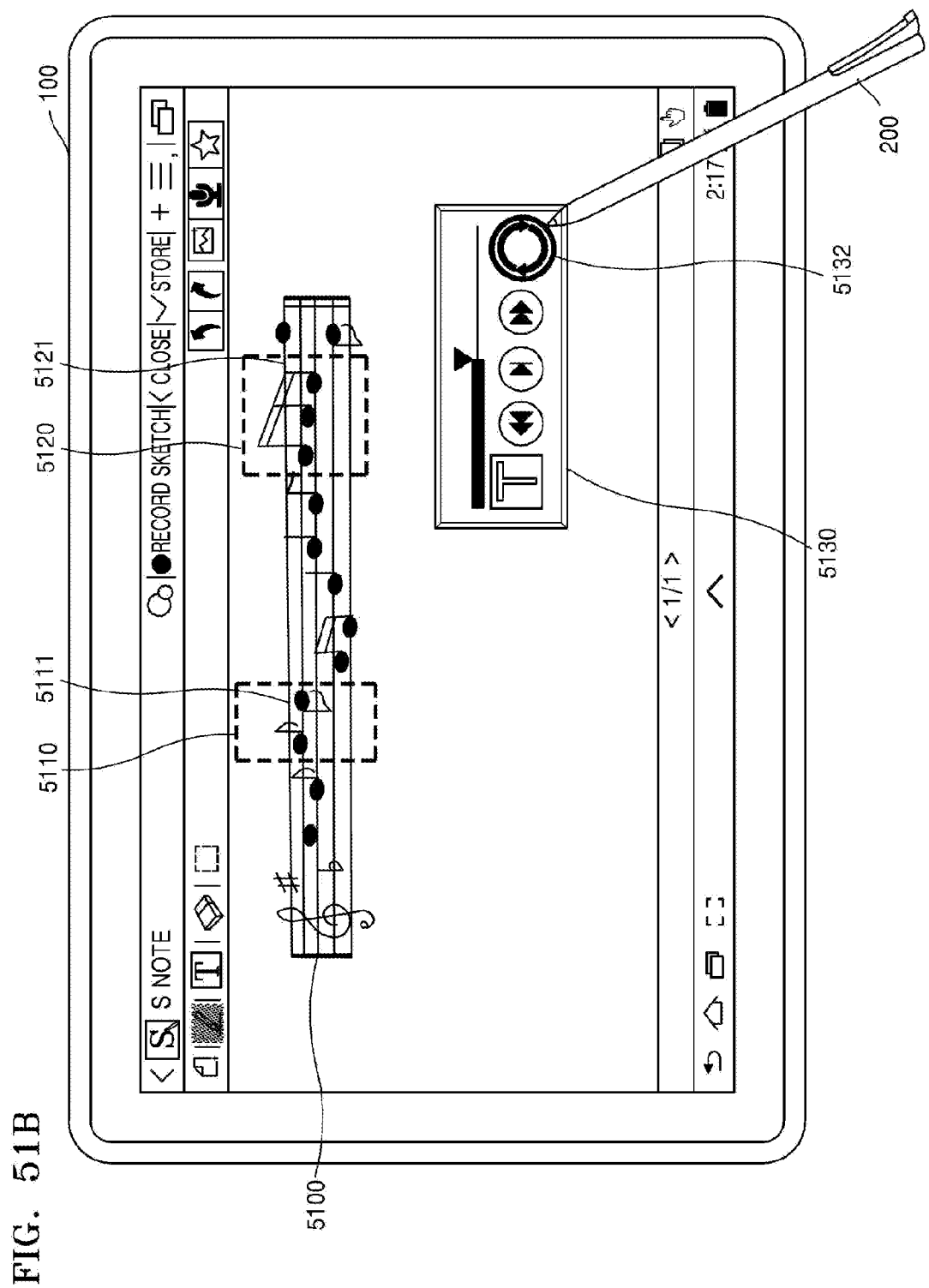
FIGS. 51B and 51C are diagrams for describing an example of switching, by a device, locations of a plurality of partial handwritten contents with each other.
Figure 51C:
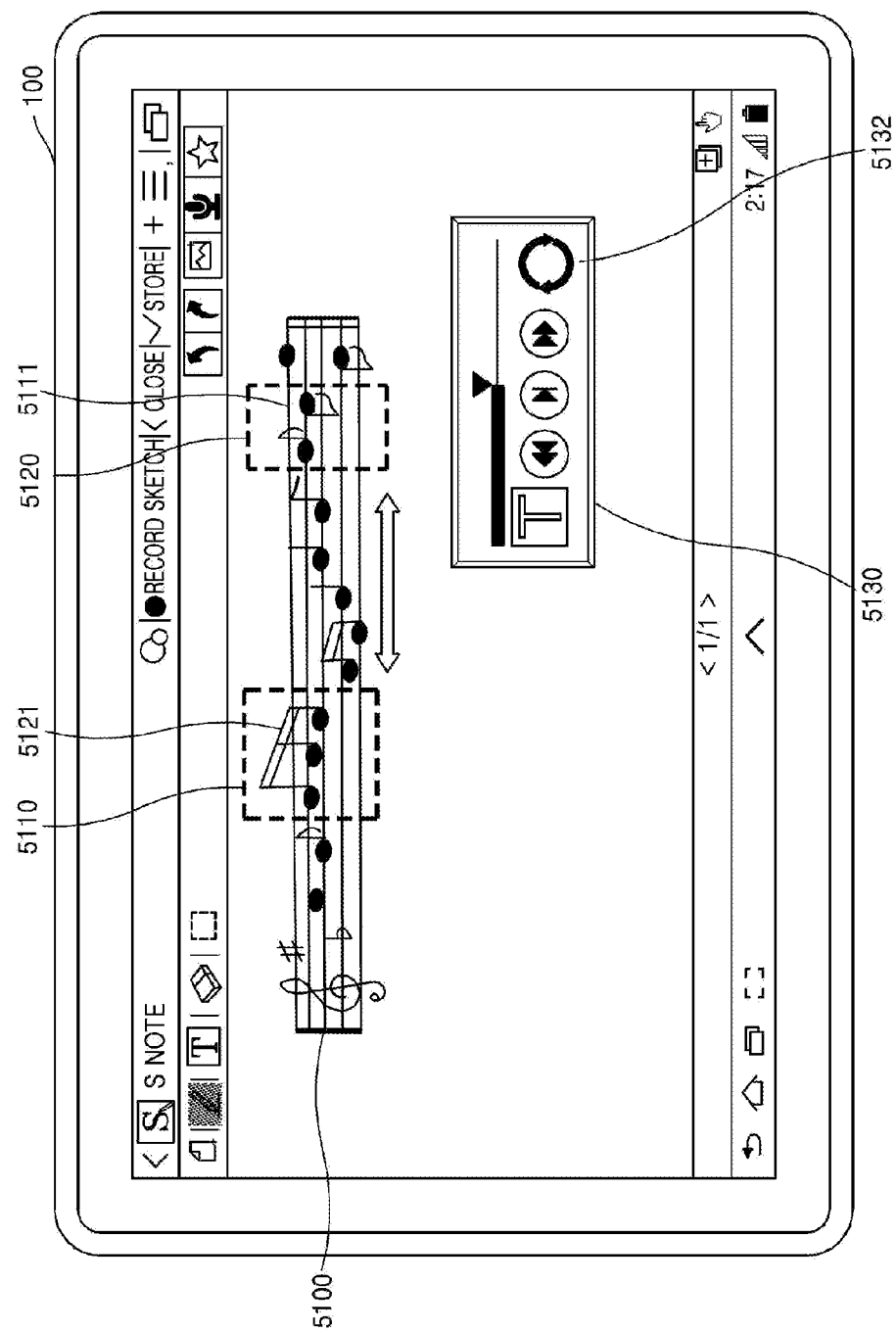

FIGS. 51B and 51C are diagrams for describing an example of the device 100 switching locations of a plurality of partial handwritten contents with each other.

Referring to FIG. 51B, the device 100 may receive an input of activating a switch button 5132 on the virtual control panel 5130. In this case, the device 100 may extract the stroke information of the first musical notes included in the first region of interest 5110 and the stroke information of the second musical notes included in the second region of interest 5120.

Referring to FIG. 51C, the device 100 may switch timestamp information and coordinate information of the first and second musical notes with each other based on the input of activating the switch button 5132.

Figure 52:
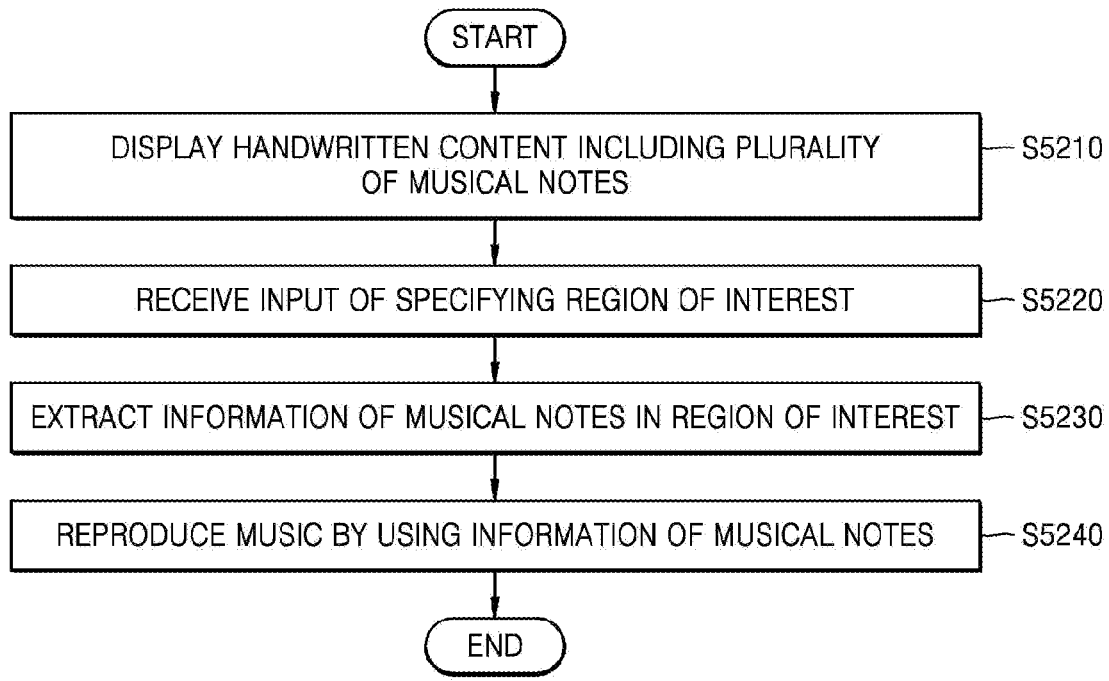
FIG. 52 is a flowchart of a method of reproducing, by a device, music by using information about strokes included in partial handwritten content, according to an exemplary embodiment.

FIG. 52 is a flowchart of a method of the device 100 reproducing music by using information about strokes included in partial handwritten content, according to an exemplary embodiment.

In operation S5210, the device 100 may display handwritten content including a plurality of musical notes.

In operation S5220, the device 100 may receive an input of specifying a region of interest from the handwritten content.

In operation S5230, the device 100 may extract information of musical notes in the region of interest. For example, the device 100 may extract coordinate information and timestamp information of the musical notes in the region of interest. Alternatively, the device 100 may extract lengths of the musical notes (for example, a quarter note or a semiquaver), scales of the musical notes (for example, mi, sol, or re), a meter, rest information, and theme symbol information (for example, a flat, a sharp, a natural sign, a double sharp, adagio, or allegro) by comparing coordinate values of a manuscript paper and coordinate values of the musical notes or by performing image-processing on the region of interest.

In operation S5240, the device 100 may reproduce music by using the information of the musical notes. According to an exemplary embodiment, the device 100 may provide a GUI for selecting a musical instrument. A type of the musical instrument may vary. Examples of the musical instruments include a piano, a guitar, a drum, a violin, a cello, and a flute, but are not limited thereto.

According to an exemplary embodiment, when a user selects a musical instrument via the GUI, the device 100 may reproduce the music with the musical instrument selected by the user, by using the information of the musical notes included in the region of interest.

Figure 53A:
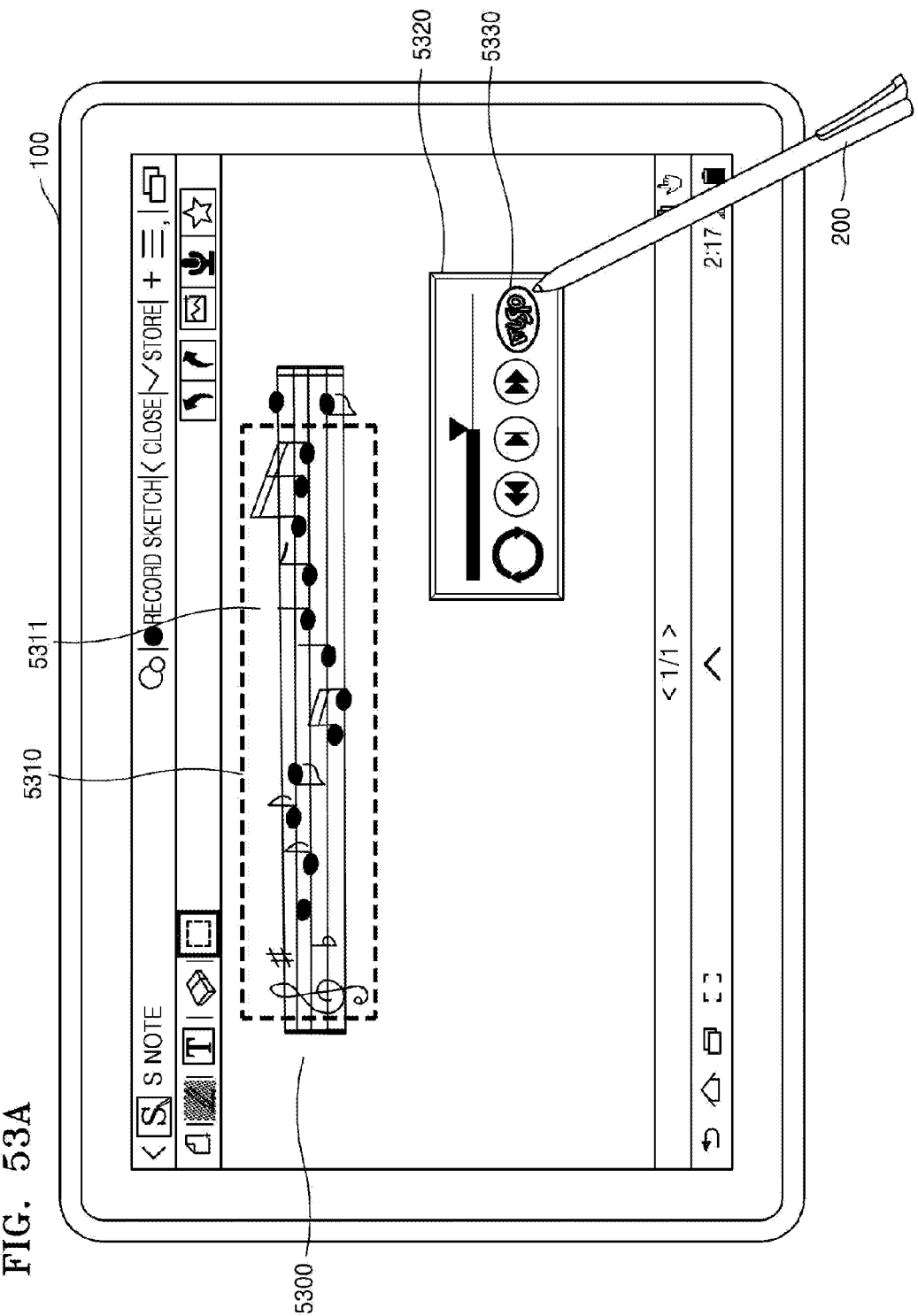
FIGS. 53A through 53C are diagrams for describing an example of reproducing, by a device, music by using information about strokes included in partial handwritten content.
Figure 53B:
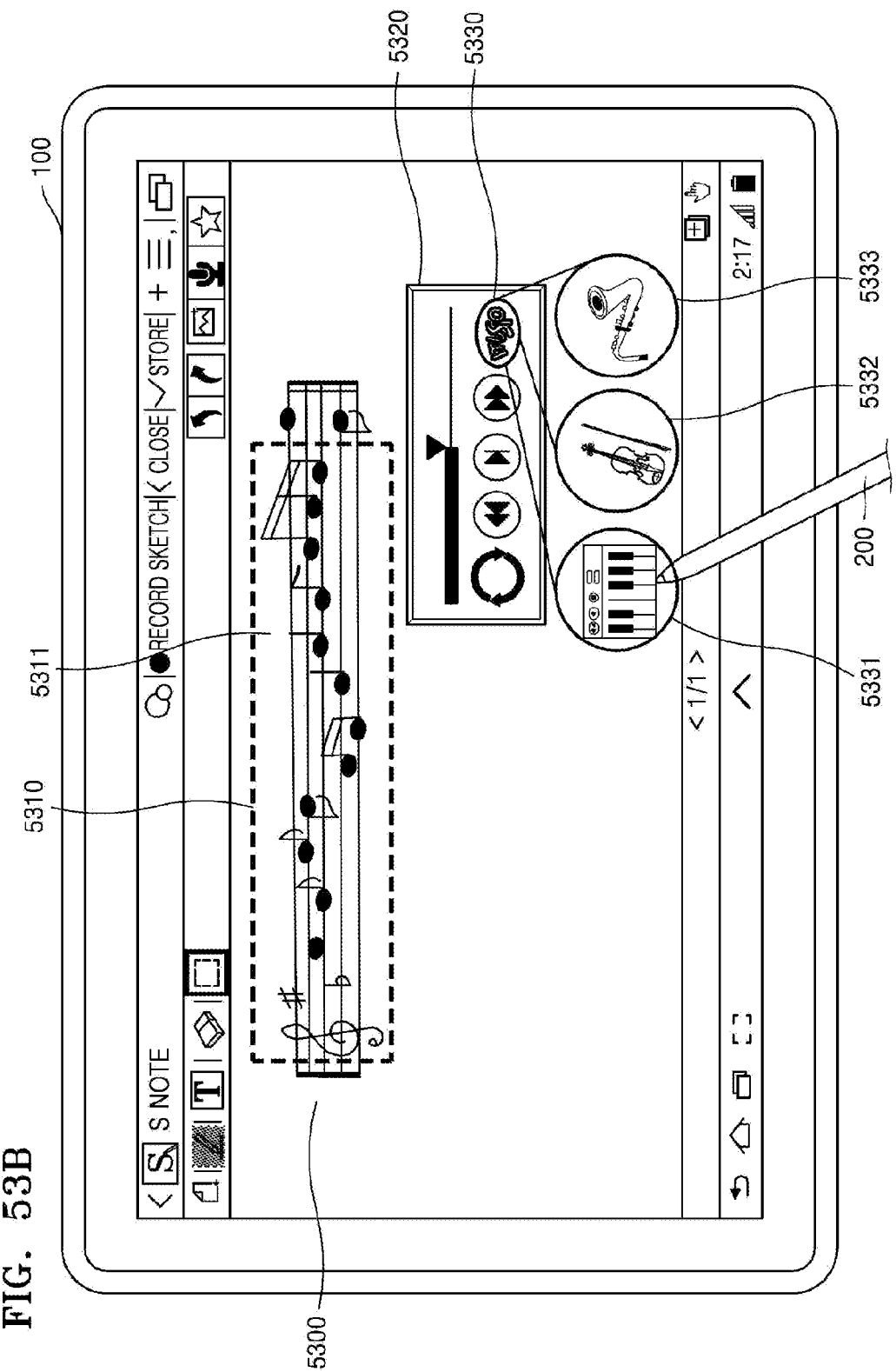
Figure 53C:
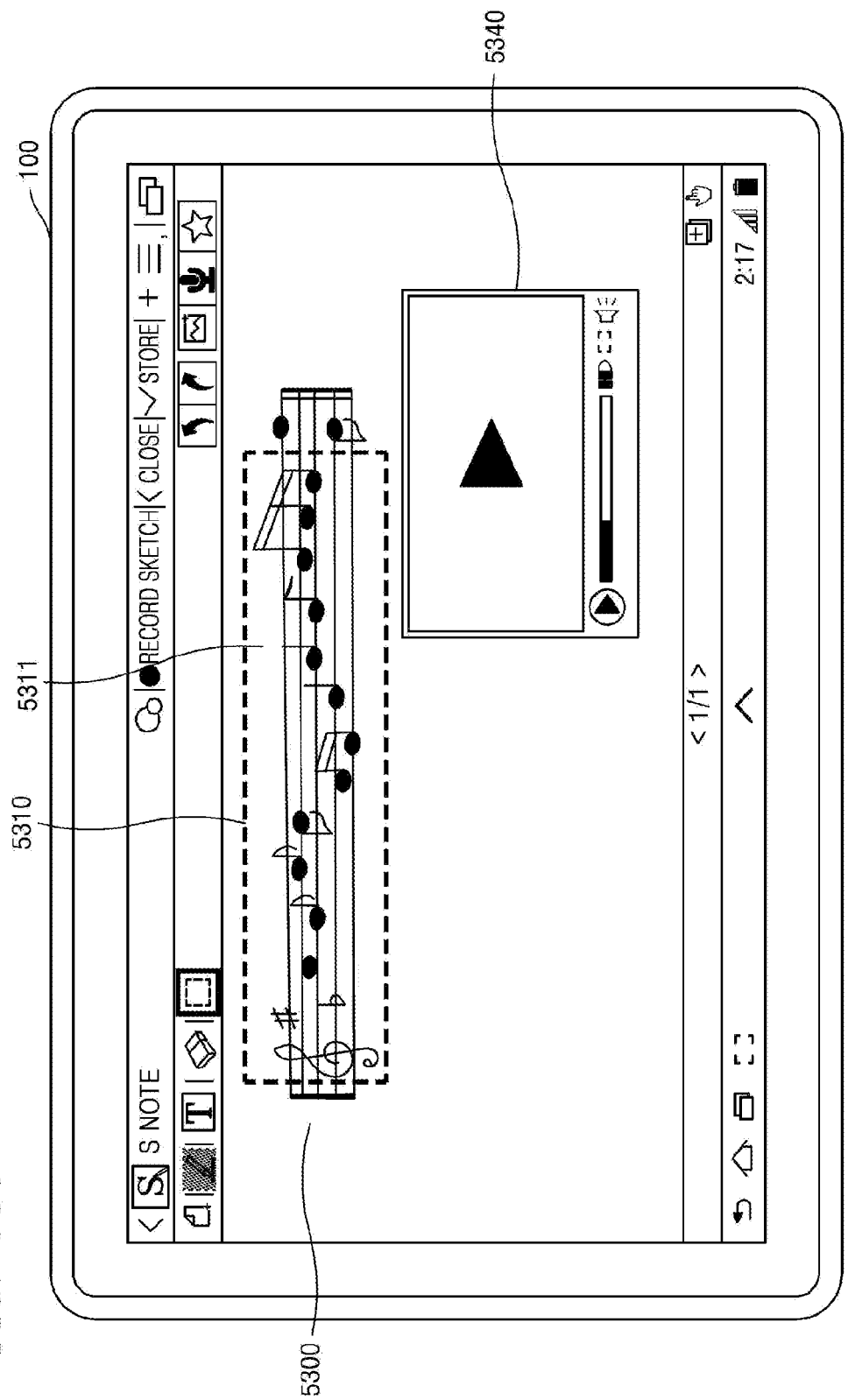

FIGS. 53A through 53C are diagrams for describing an example of reproducing, by the device 100, music by using information about strokes included in partial handwritten content.

Referring to FIG. 53A, the device 100 may display score handwritten content 5300. A user may specify a region of interest 5310 from the score handwritten content 5300. Here, the device 100 may provide a virtual control panel 5320. The device 100 may receive an input of activating a music button 5330 on the virtual control panel 5320. Here, the device 100 may extract information of musical notes 5311 included in the region of interest 5310. For example, the device 100 may extract timestamp information, coordinate information, lengths (for example, a quarter note or a semiquaver), scales (for example, mi, sol, re), a meter, rest information, and theme symbol information (for example, a flat, a sharp, a natural sign, a double sharp, adagio, or allegro) of the musical notes 5311 included in the region of interest 5310.

Referring to FIG. 53B, the device 100 may display musical instruments via the virtual control panel 5320. Then, the device 100 may select one of the musical instruments via the virtual control panel 5320. For example, the device 100 may receive an input of selecting a piano icon 5331.

Referring to FIG. 53C, the device 100 may reproduce piano performance 5340 by using the information of the musical notes 5311 included in the region of interest 5310.

Figure 54:
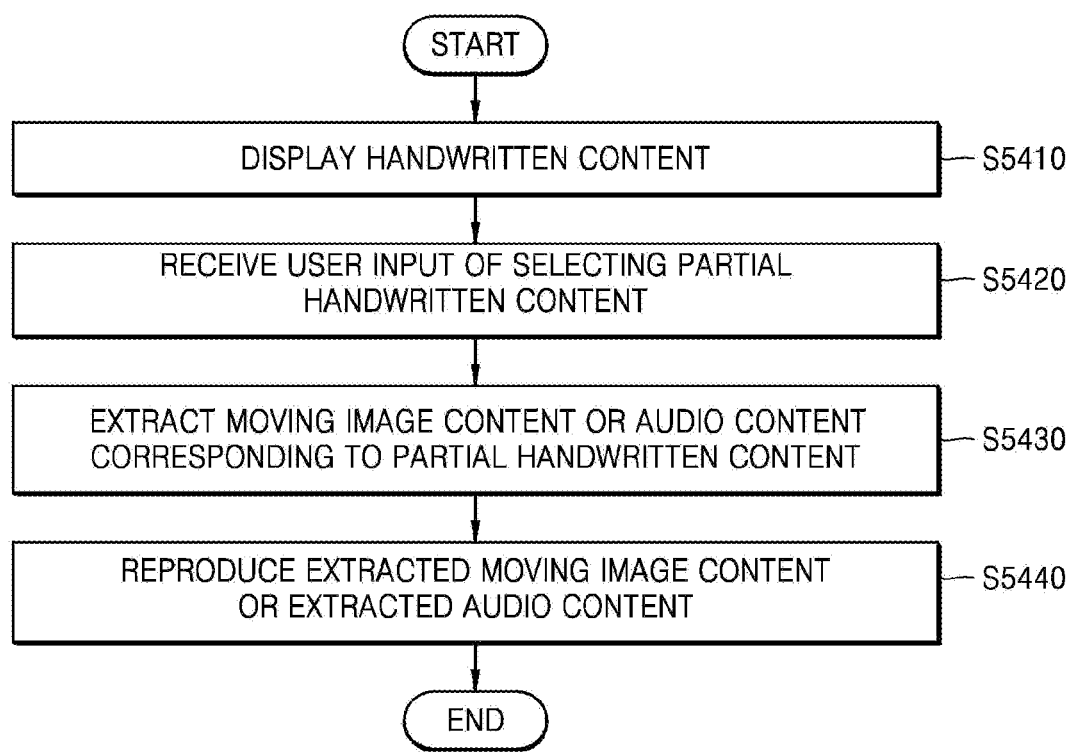
FIG. 54 is a flowchart of a method of extracting, by a device, moving image content or audio content corresponding to partial handwritten content, according to an exemplary embodiment.

FIG. 54 is a flowchart of a method of the device 100 extracting moving image content or audio content corresponding to partial handwritten content, according to an exemplary embodiment.

Referring to FIG. S5410, the device 100 may display handwritten content on the screen.

According to an exemplary embodiment, the handwritten content may include a plurality of strokes input in a predetermined order. Shapes of the plurality of strokes included in the handwritten content may vary. For example, thicknesses, colors, brightness, chroma, and transparency of the plurality of strokes may be different from each other.

According to an exemplary embodiment, the device 100 may display the handwritten content on an execution window of a predetermined application. For example, the device 100 may display the handwritten content on an execution window of a moving image reproducing application.

According to an exemplary embodiment, the device 100 may receive a selection on certain handwritten content from a user, and display the selected certain handwritten content. According to an exemplary embodiment, the device 100 may receive a selection on certain video content from the user, and display handwritten content corresponding to the selected certain video content.

In operation S5420, the device 100 may receive an input of selecting partial handwritten content from the handwritten content. For example, the device 100 may receive a user input of specifying a region of interest, and select partial handwritten content corresponding to the region of interest. Alternatively, the device 100 may receive a user input of sequentially touching a plurality of strokes while a predetermined button of the electronic pen 200 is pressed. At this time, the device 100 may select the plurality of strokes touched by the electronic pen 200 as the partial handwritten content.

In operation S5430, the device 100 may extract moving image content or audio content corresponding to the partial handwritten content. For example, the device 100 may select a partial segment (or partial frames) of a moving image or a partial segment of audio located on a timeline corresponding to a timeline of the partial handwritten content.

In operation S5440, the device 100 may reproduce the extracted moving image content or the extracted audio content. In some embodiments, a part of operations S5410 through S5440 may be omitted. An operation of extracting, by the device 100, moving image content corresponding to partial handwritten content will now be described in detail with reference to FIGS. 55A through 55C.

Figure 55A:
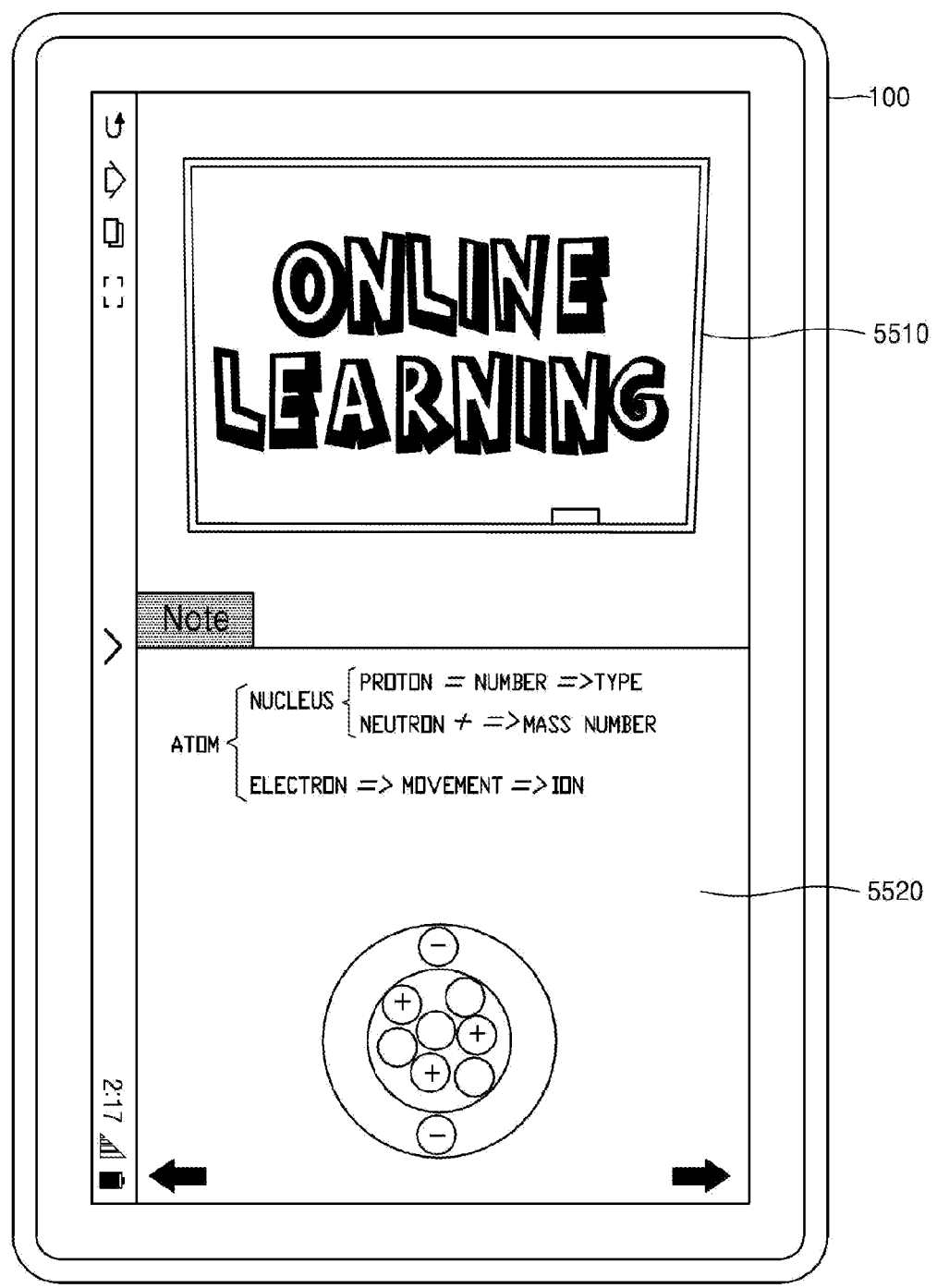
FIGS. 55A through 55C are diagrams for describing an example of extracting, by a device, moving image content corresponding to partial handwritten content.
Figure 55B:
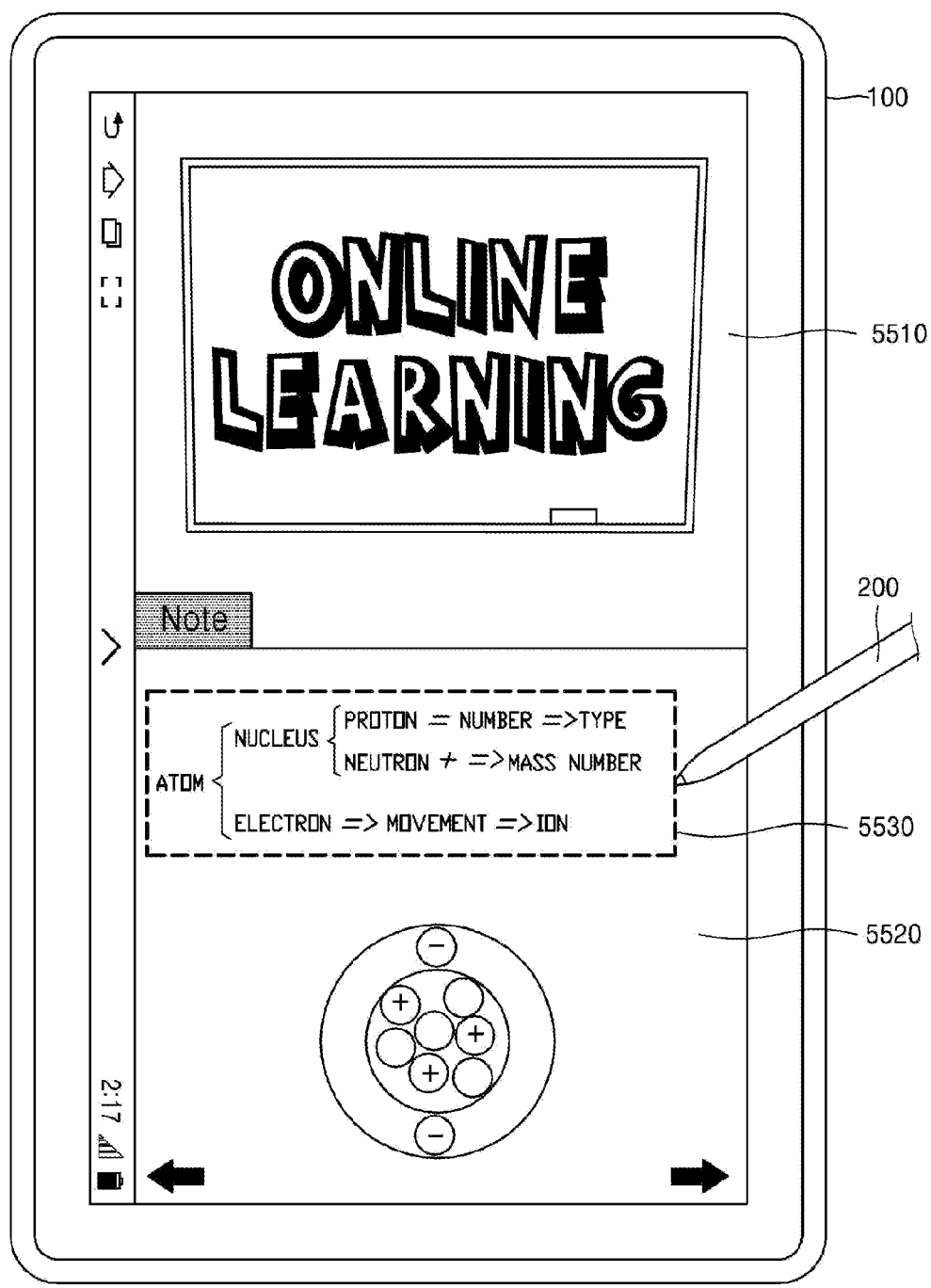
Figure 55C:
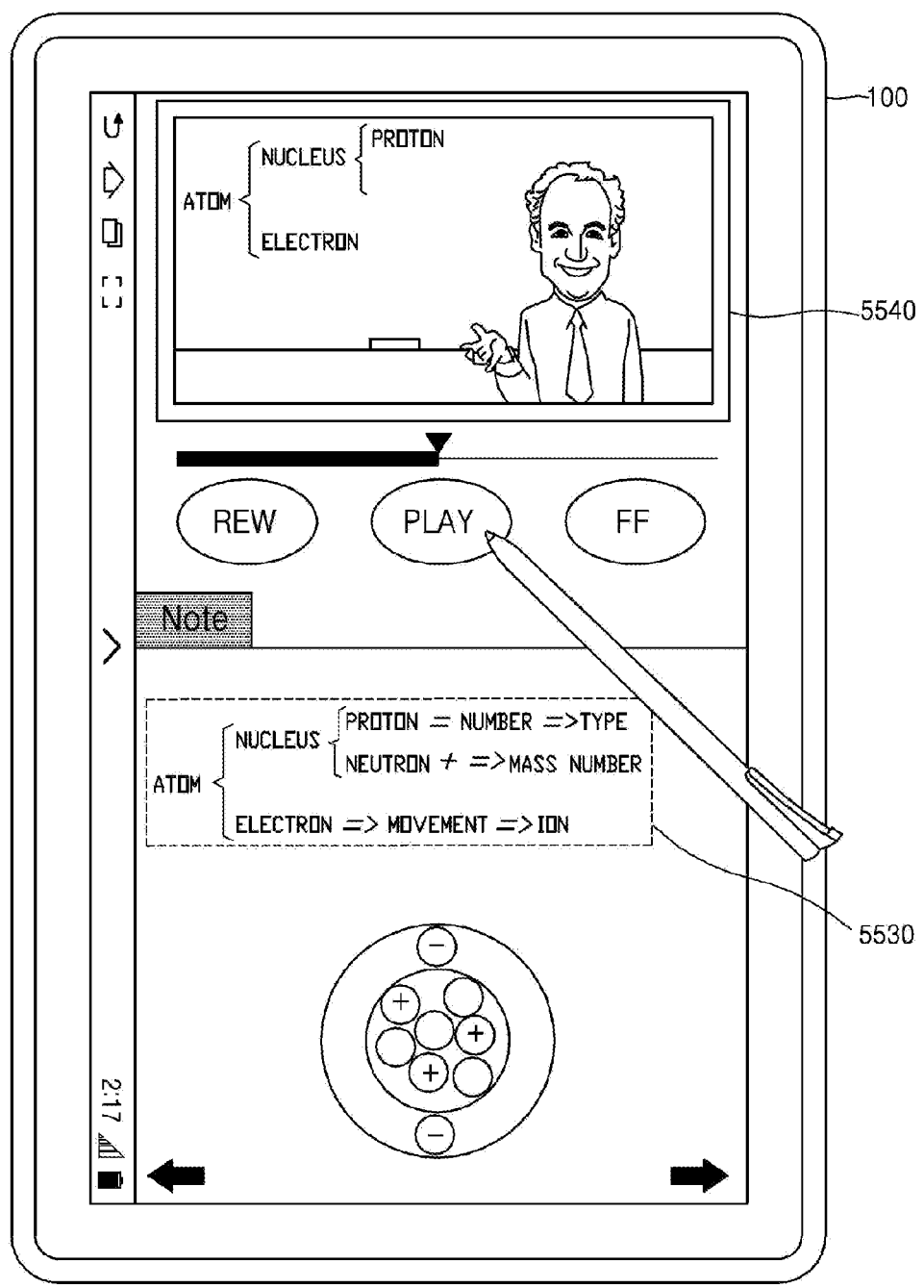

FIGS. 55A through 55C are diagrams for describing an example of extracting, by the device 100, moving image content corresponding to partial handwritten content. In FIGS. 55A through 55C, it is assumed that the device 100 creates handwritten content 5520 while reproducing online learning content 5510. The device 100 may store a mapping table (refer to FIG. 11) in which information of the online learning content 5510 and information of the handwritten content 5520 are mapped to each other.

Referring to FIG. 55A, the device 100 may display a starting screen of the online learning content 5510 and the handwritten content 5520 created while reproducing the online learning content 5510, on the screen.

Referring to FIG. 55B, the device 100 may receive an input of selecting partial handwritten content from the handwritten content 5520. For example, the device 100 may receive an input of specifying a region of interest 5530.

Referring to FIG. 55C, the device 100 may select a partial moving image segment 5540 corresponding to the partial handwritten content based on information of strokes included in the partial handwritten content.

For example, the device 100 may extract stroke information (ID information, timestamp information, and coordinate information) of 'atom' that is first input from among strokes included in the region of interest 5530. The device 100 may extract a first frame (or a first timeline) corresponding to a first stroke that is first drawn in the region of interest 5530, by using the extracted stroke information and the mapping table in which the information of the online learning content 5510 and the information of the handwritten content 5520 are mapped to each other.

Also, the device 100 may extract stroke information (ID information, timestamp information, and coordinate information) of 'ion' that is input last from among the strokes included in the region of interest 5530. The device 100 may extract an n-th frame (or an n-th timeline) corresponding to an n-th stroke that is drawn last in the region of interest 5530, by using the extracted stroke information and the mapping table in which the information of the online learning content 5510 and the information of the handwritten content 5520 are mapped to each other.

The device 100 may select the partial moving image segment 5540 from the first frame (or the first time line) to the n-th frame (or the n-th timeline), from the online learning content 5510. Then, the device 100 may display or reproduce the selected partial moving image segment 5540.

According to an exemplary embodiment, a user is able to easily find a moving image segment the user wants to view again by specifying a region of interest including partial handwritten content from handwritten content.

Figure 56:
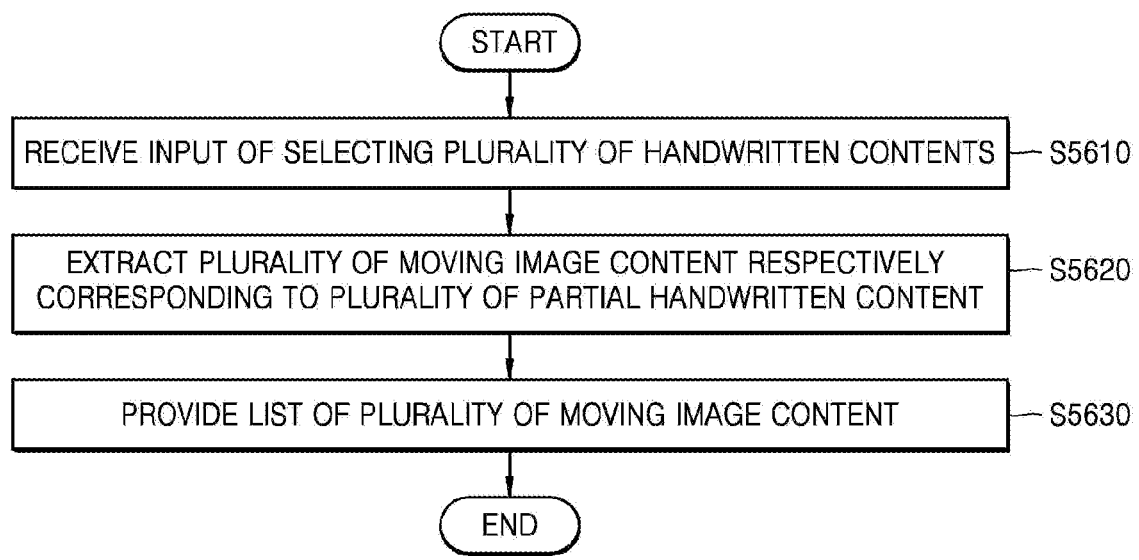
FIG. 56 is a flowchart of a method of providing, by a device, a list of a plurality of moving image contents corresponding to a plurality of partial handwritten contents, according to an exemplary embodiment.

FIG. 56 is a flowchart of a method of the device 100 providing a list of a plurality of moving image contents corresponding to a plurality of partial handwritten contents, according to an exemplary embodiment.

In operation S5610, the device 100 may receive an input of selecting a plurality of partial handwritten contents. According to an exemplary embodiment, the plurality of partial handwritten contents may be selected from handwritten content or different handwritten contents.

For example, the plurality of partial handwritten contents may be selected from first handwritten content synchronized with first moving image content. Alternatively, partial handwritten content may be selected from the first handwritten content synchronized with the first moving image content, and another partial handwritten content may be selected from second handwritten content synchronized with second moving image content.

In operation S5620, the device 100 may extract a plurality of moving image contents respectively corresponding to the plurality of partial handwritten contents. According to an exemplary embodiment, moving image content corresponding to partial handwritten content may be a partial segment corresponding to the partial handwritten content from an entire segment of the moving image content.

In operation S5630, the device 100 may provide a list of the plurality of moving image contents respectively corresponding to the plurality of partial handwritten contents. In this case, a user may gather and view only partial moving image segments in which the user is interested. Operation S5630 will now be described in detail with reference to FIG. 57.

Figure 57:
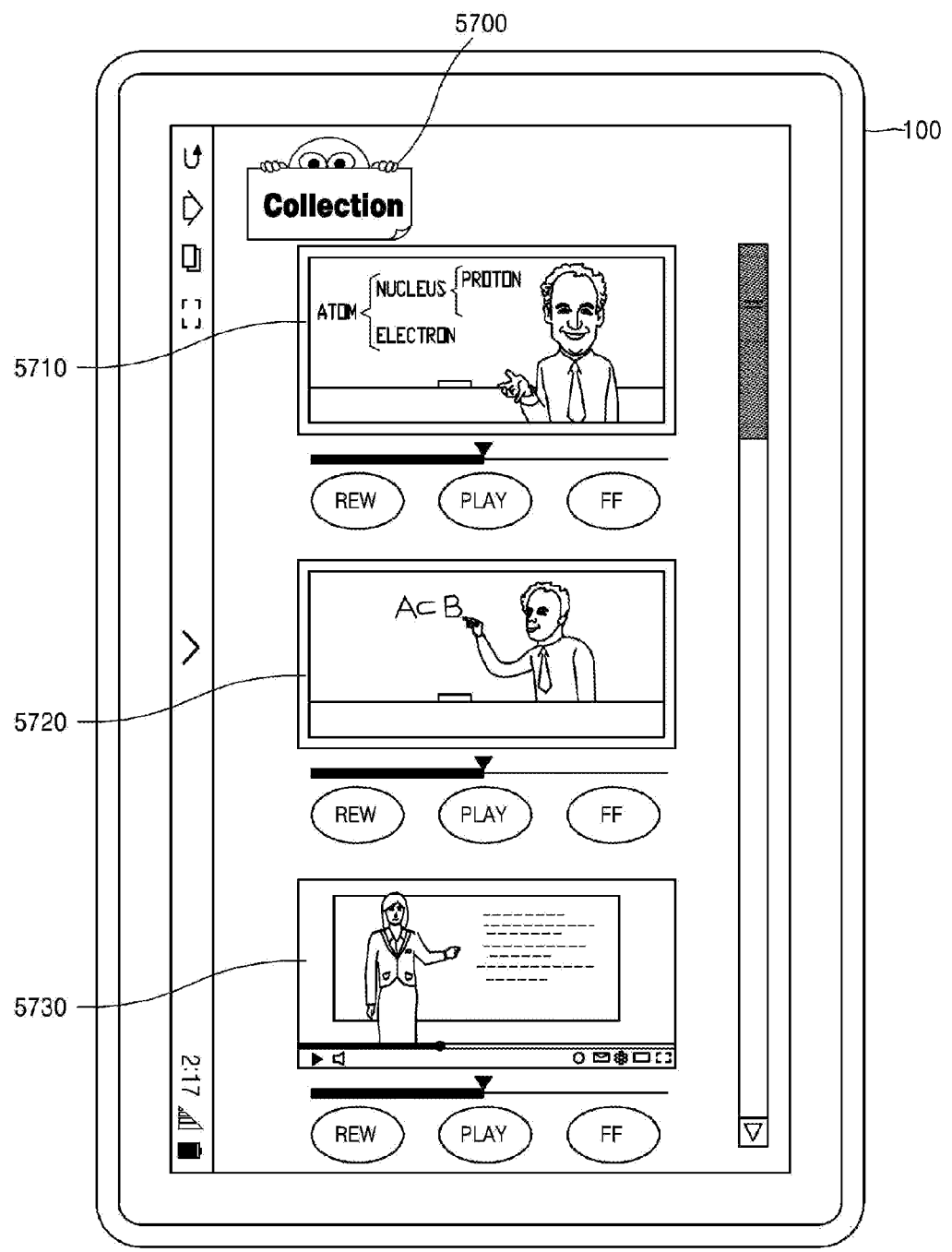
FIG. 57 is a diagram of a list of a plurality of moving image contents corresponding to a plurality of partial handwritten contents, according to an exemplary embodiment.

FIG. 57 is a diagram of a list of a plurality of moving image contents corresponding to a plurality of partial handwritten contents, according to an exemplary embodiment.

As shown in FIG. 57, the device 100 may provide a list of a plurality of moving image contents corresponding to a plurality of partial handwritten contents selected by a user. For example, when the user selects first partial handwritten content from first handwritten content synchronized with first moving image content, the device 100 may extract a first moving image segment 5710 corresponding to the first partial handwritten content, from the first moving image content. Here, the device 100 may receive a request to store the first moving image segment 5710, and store information about the first moving image segment 5710 in a history management page 5700.

Also, when the user selects second partial handwritten content from the first handwritten content synchronized with the first moving image content, the device 100 may extract a second moving image segment 5720 corresponding to the second partial handwritten content, from the first moving image content. Here, the device 100 may receive a request to store the second moving image segment 5720, and store information about the second moving image segment 5720 in the history management page 5700.

When the user selects third partial handwritten content from second handwritten content synchronized with second moving image content, the device 100 may extract a third moving image segment 5730 corresponding to the third partial handwritten content, from the second moving image content. Here, the device 100 may receive a request to store the third moving image segment 5730, and store information about the third moving image segment 5730 in the history management page 5700.

According to an exemplary embodiment, the device 100 may display the history management page 5700 according to a user request. Here, the device 100 may provide the list of the plurality of moving image contents including the information about the first moving image segment 5710, the information about the second moving image segment 5720, and the information about the third moving image segment 5730 through the history management page 5700.

FIG. 58 is a flowchart of a method of providing, by the device 100, a plurality of handwritten contents received from a plurality of external devices, according to an exemplary embodiment.

In operation S5805, the device 100 may establish with a first external device 5810. For example, the device 100 may form a local area communication link with the first external device 5810, or may form a mobile communication link, such as 3G, 4G, or 5G. Examples of local area communication include Bluetooth, Bluetooth low energy (BLE), Wi-Fi direct, ultra wideband (UWB), Zigbee, near field communication (NFC), or Ant+, but are not limited thereto.

In operation S5810, the device 100 may form a communication connection with a second external device 5820. For example, the device 100 may form a local area communication link with the second external device 5820, or may form a mobile communication link, such as 3G, 4G, or 5G.

In operation S5815, the first external device 5810 may create first handwritten content. The first external device 5810 may obtain timestamp information and coordinate information corresponding to each of a plurality of strokes input for a predetermined period of time. For example, the first external device 5810 may obtain the timestamp information and the coordinate information corresponding to each of the plurality of strokes by tracking coordinate values of strokes drawn on the first external device 5810. The first external device 5810 may create the first handwritten content by using the timestamp information and the coordinate information corresponding to each of the plurality of strokes.

In operation S5820, the first external device 5810 may transmit the first handwritten content to the device 100. For example, the first external device 5810 may transmit the timestamp information and the coordinate information of the strokes included in the first handwritten content to the device 100. According to an exemplary embodiment, the first external device 5810 may transmit the first handwritten content to the device 100 by using the local area communication link or the mobile communication link.

In operation S5825, the second external device 5820 may create second handwritten content. The second external device 5820 may obtain timestamp information and coordinate information corresponding to each of a plurality of strokes input for a predetermined period of time. For example, the second external device 5820 may obtain the timestamp information and the coordinate information corresponding to each of the plurality of strokes by tracking coordinate values of strokes drawn on the second external device 5820. The second external device 5820 may create the second handwritten content by using the timestamp information and the coordinate information corresponding to each of the plurality of strokes.

In operation S5830, the second external device 5820 may transmit the second handwritten content to the device 100. For example, the second external device 5820 may transmit the timestamp information and the coordinate information of the strokes included in the second handwritten content to the device 100. According to an exemplary embodiment, the second external device 5820 may transmit the second handwritten content to the device 100 by using the local area communication link or the mobile communication link.

In operation S5835, the device 100 may display the first handwritten content received from the first external device 5810 and the second handwritten content received from the second external device 5820. The first and second handwritten contents may each include the plurality of strokes that are input in a predetermined order.

According to an exemplary embodiment, the device 100 may receive a user input of requesting to reproduce partial handwritten content from the first handwritten content. In this case, the device 100 may reproduce the partial handwritten content by using time information of strokes included in the partial handwritten content.

Meanwhile, according to an exemplary embodiment, the device 100 may receive a request to share the first and second handwritten contents.

In operation S5840, based on the request to share the first and second handwritten contents, the device 100 may transmit the second handwritten content to the first external device 5810. For example, the device 100 may transmit the timestamp information and the coordinate information of the strokes included in the second handwritten content to the first external device 5810.

In operation S5845, based on the request to share the first and second handwritten contents, the device 100 may transmit the first handwritten content to the second external device 5820. For example, the device 100 may transmit the timestamp information and the coordinate information of the strokes included in the first handwritten content to the second external device 5820.

In operation S5850, the first external device 5810 may display the first and second handwritten contents on a screen. In operation S5855, the second external device 5820 may also display the first and second handwritten contents on a screen.

FIG. 59 is a diagram of an example of providing, by the device, a plurality of handwritten contents received from a plurality of external devices. In FIG. 59, it is assumed the device 100 is a teacher's terminal and the students input Pythagoras' theorem.

As shown in FIG. 59, when a first student handwrites Pythagoras' theorem on a first device 5910, the first device 5910 may record a handwriting process of the first student and create first handwritten content 5901. Then, the first device 5910 may transmit the first handwritten content 5901 to the device 100, i.e., the teacher's terminal.

When a second student handwrites Pythagoras' theorem on a second device 5920, the second device 5920 may record a handwriting process of the second student and create second handwritten content 5902. Then, the second device 5920 may transmit the second handwritten content 5902 to the device 100, i.e., the teacher's terminal.

When a third student handwrites Pythagoras' theorem on a third device 5930, the third device 5930 may record a handwriting process of the third student and create third handwritten content 5903. Then, the third device 5930 may transmit the third handwritten content 5903 to the device 100, i.e., the teacher's terminal.

When a fourth student handwrites Pythagoras' theorem on a fourth device 5940, the fourth device 5940 may record a handwriting process of the fourth student and create fourth handwritten content 5904. Then, the fourth device 5940 may transmit the fourth handwritten content 5904 to the device 100, i.e., the teacher's terminal.

The device 100 may display the first through fourth handwritten contents 5901 through 5904. Here, the device 100 may provide a control panel including a reproduce button for reproducing each of the first through fourth handwritten contents 5901 through 5904. The teacher may select the reproduce button on the control panel to reproduce certain handwritten content or a part of the certain handwritten content of the first through fourth students.

Figure 60A:
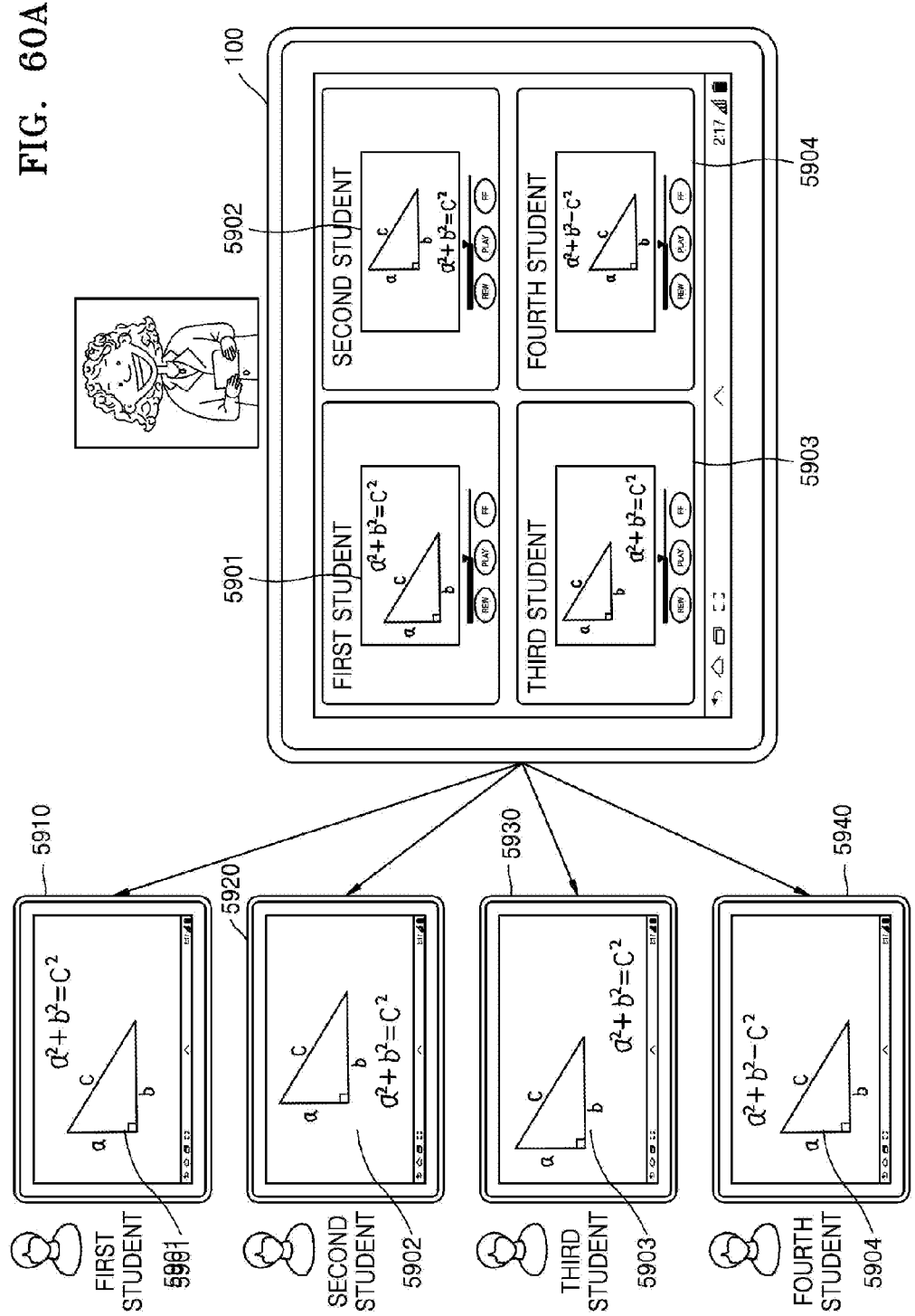
FIGS. 60A and 60B are diagrams for describing an example of transmitting, by a device, a plurality of handwritten contents to each of a plurality of external devices.
Figure 60B:
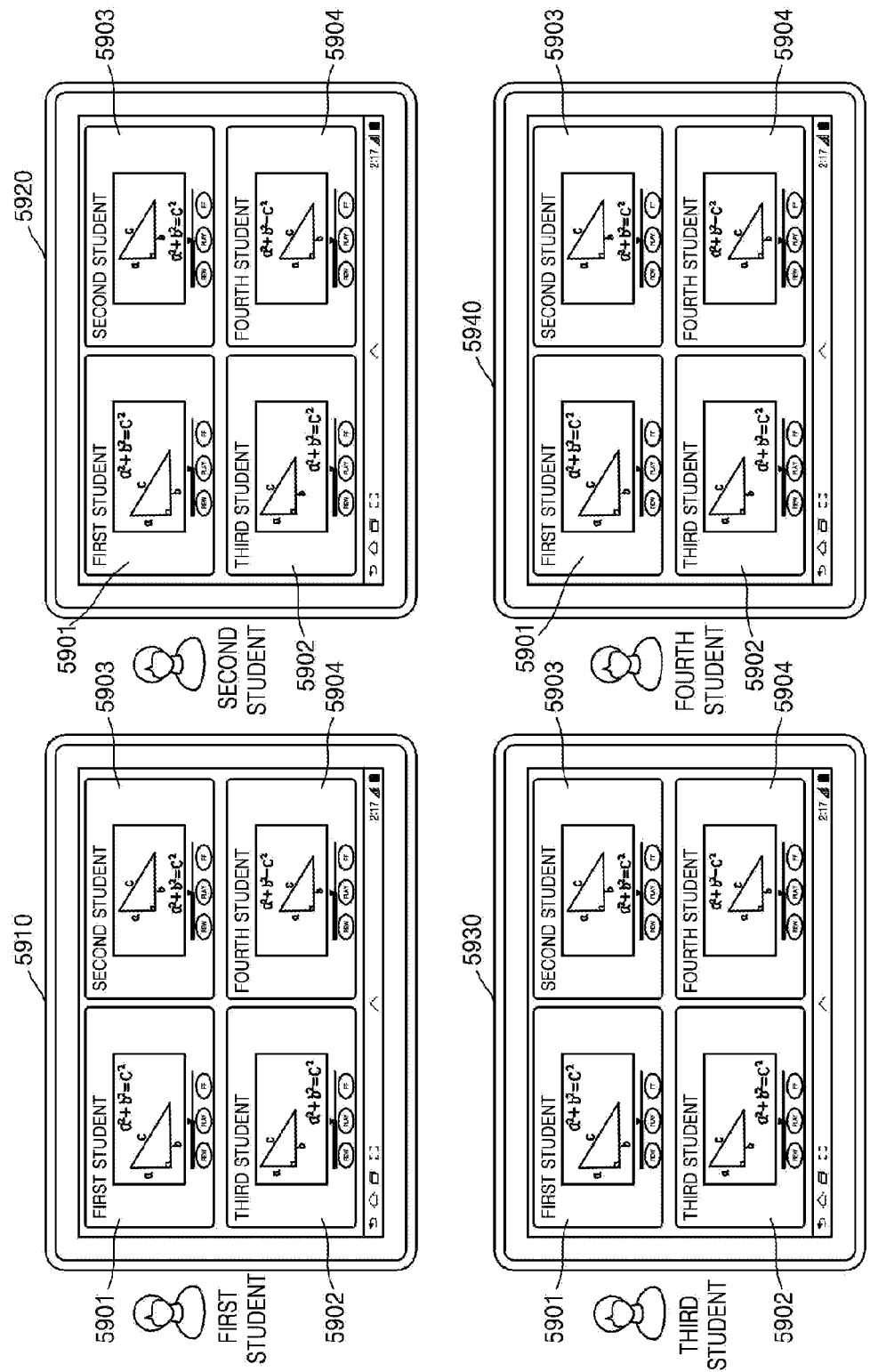

FIGS. 60A and 60B are diagrams for describing an example of the device 100 transmitting a plurality of handwritten contents to each of a plurality of external devices. In FIGS. 60A and 60B, it is assumed that the device 100 is a teacher's terminal and students submitted tasks of inputting Pythagoras' theorem to the teacher's terminal.

The device 100 may share the first through fourth handwritten contents 5901 through 5904 with the first device 5910 of the first student. For example, the device 100 may transmit the second through fourth handwritten contents 5902 through 5904 to the first device 5910 of the first student.

The device 100 may share the first through fourth handwritten contents 5901 through 5904 with the second device 5920 of the second student. For example, the device 100 may transmit the first, third, and fourth handwritten contents 5901, 5903, and 5904 to the second device 5920.

The device 100 may share the first through fourth handwritten contents 5901 through 5904 with the third device 5930 of the third student. For example, the device 100 may transmit the first, second, and fourth handwritten contents 5901, 5902, and 5904 to the third device 5930.

The device 100 may share the first through fourth handwritten contents 5901 through 5904 with the fourth device 5940 of the fourth student. For example, the device 100 may transmit the first through third handwritten contents 5901 through 5903 to the fourth device 5940.

According to an exemplary embodiment, the first through fourth devices 5910 through 5940 may share the first through fourth handwritten contents 5901 through 5904 with the device 100 via downloading or streaming.

According to an exemplary embodiment, the first through fourth devices 5910 through 5940 may share the screen of the device 100 where the first through fourth handwritten contents 5901 through 5904 are displayed, via a screen mirroring technology.

Referring to FIG. 60B, each of the first through fourth devices 5910 through 5940 may display the first through fourth handwritten contents 5901 through 5904.

According to an exemplary embodiment, the first student may check results of the tasks performed by the second through fourth students by using the first device 5910.

Also, when the first student activates a reproduce button, the first device 5910 may reproduce at least one of the second through fourth handwritten contents 5902 through 5904. For example, when the first student activates a reproduce all button, the first device 5910 may simultaneously reproduce the second through fourth handwritten contents 5902 through 5904. When the first student activates a reproduce button for the second handwritten content 5902, the first device 5910 may reproduce only the second handwritten content 5902. When the first student specifies a region of interest including a part of the third handwritten content 5903 and activates a reproduce button, the first device 5910 may reproduce only partial handwritten content included in the region of interest from the third handwritten content 5903.

Figure 61:
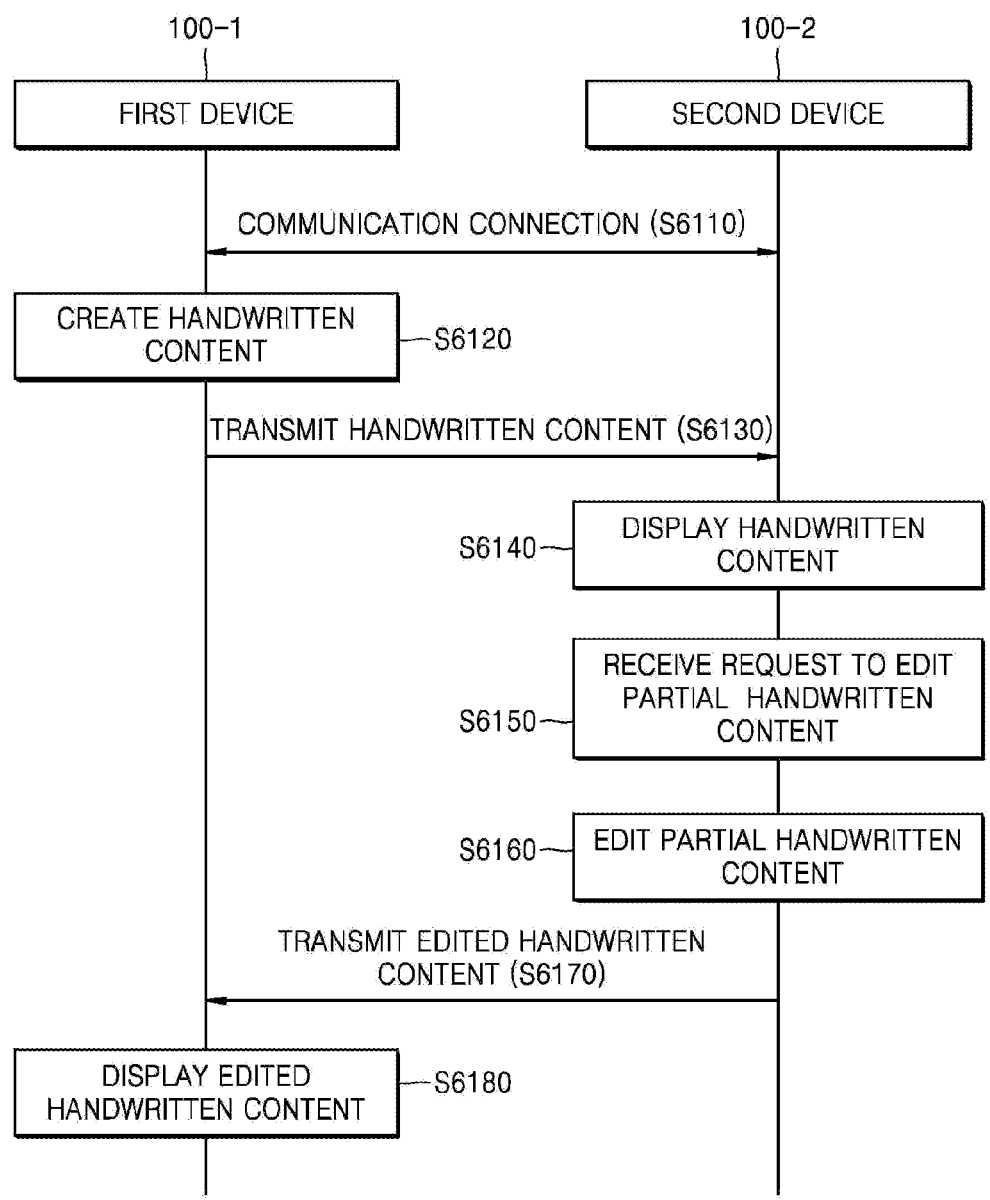
FIG. 61 is a flowchart of a method of receiving, by a first device, handwritten content edited by a second device, according to an exemplary embodiment.

FIG. 61 is a flowchart of a method of receiving, by a first device 100-1, handwritten content edited by a second device 100-2, according to an exemplary embodiment.

In operation S6110, the first device 100-1 may form a communication connection with the second device 100-2. For example, the first device 100-1 may form a local communication link with the second device 100-2 or a mobile communication link, such as 3G, 4G, or 5G). Examples of a local area communication include Bluetooth, BLE, Wi-Fi direct, UWB, Zigbee, NFC, and Ant+, but are not limited thereto.

In operation S6120, the first device 100-1 may create handwritten content.

The first device 100-1 may obtain timestamp information and coordinate information corresponding to each of a plurality of strokes input for a predetermined period of time. For example, the first device 100-1 may obtain the timestamp information and the coordinate information corresponding to each of the plurality of strokes by tracking coordinate values of the strokes drawn on the first device 100-1. The first device 100-1 may create the handwritten content by using the timestamp information and the coordinate information corresponding to each of the plurality of strokes.

In operation S6130, the first device 100-1 may transmit the handwritten content to the second device 100-2. For example, the first device 100-1 may transmit the timestamp information and the coordinate information of the strokes included in the handwritten content to the second device 100-2.

According to an exemplary embodiment, the first device 100-1 may transmit the handwritten content to the second device 100-2 by using the local area communication link or the mobile communication link.

In operation S6140, the second device 100-2 may display the handwritten content received from the first device 100-1. The handwritten content may include the plurality of strokes input in an order.

In operation S6150, the second device 100-2 may receive a request to edit partial handwritten content.

According to an exemplary embodiment, a user input of requesting to edit the partial handwritten content may vary. For example, the second device 100-2 may receive a user input of selecting the partial handwritten content from the handwritten content. Here, the second device 100-2 may display a virtual control panel including an edit function button, such as an undo button, a redo button, an OCR button, an add button, or an exchange button. The second device 100-2 may receive a user input of activating the edit function button via the virtual control panel.

Alternatively, the second device 100-2 may receive a gesture corresponding to an edit command. For example, when a user selects the partial handwritten content via a drag input and then double-taps the selected partial handwritten content with two fingers, the second device 100-2 may determine that a request to undo the partial handwritten content is received.

Alternatively, the user may input an edit command regarding the partial handwritten content to the second device 100-2 by using a touch input and a voice input. For example, the user may select the partial handwritten content via a touch input, and input an instruction requesting to edit the partial handwritten content to the second device 100-2 via voice.

In operation S6160, the second device 100-2 may edit the partial handwritten content. According to an exemplary embodiment, the second device 100-2 may edit the partial handwritten content by using time information of the strokes included in the partial handwritten content.

According to an exemplary embodiment, the second device 100-2 may extract the strokes included in the partial handwritten content. The second device 100-2 may determine an order of the extracted strokes by using timestamp information of the extracted strokes. For example, the second device 100-2 may determine a first stroke that is input first from among the extracted strokes as a start position, and an n-th stroke that is input last from among the extracted strokes as an end position, wherein n is an integer greater than 1.

According to an exemplary embodiment, the second device 100-2 may edit the extracted strokes by using the timestamp information and the coordinate information of the extracted strokes. For example, the second device 100-2 may undo, redo, or delete the extracted strokes, or may add other strokes.

In operation S6170, the second device 100-2 may transmit edited handwritten content to the first device 100-1. According to an exemplary embodiment, the second device 100-2 may transmit an original file of the handwritten content and an edit file including edit information to the first device 100-1. Alternatively, the second device 100-2 may create one file by applying the edit information to the handwritten content, and transmit the created one file to the first device 100-1.

According to an exemplary embodiment, the second device 100-2 may transmit the edited handwritten content to the first device 100-1 by using the local area communication link or the mobile communication link.

In operation S6180, the first device 100-1 may display the handwritten content edited by the second device 100-2.

According to an exemplary embodiment, the first device 100-1 may receive a request to reproduce the edited handwritten content. For example, the first device 100-1 may display a virtual control panel including a reproduce function button. The first device 100-1 may receive a user input of activating the reproduce function button via the virtual control panel.

Alternatively, the first device 100-1 may receive a pre-set touch input corresponding to a reproduce command, or may receive an input of activating a physical button corresponding to the reproduce command. Meanwhile, the user may input an instruction requesting to reproduce the edited handwritten content to the first device 100-1 via voice.

According to an exemplary embodiment, the first device 100-1 may reproduce the handwritten content by reflecting the edit information of the partial handwritten content. For example, the device 100-1 may reproduce drawing processes of the handwritten content while the edit information is reflected.

According to an exemplary embodiment, the first device 100-1 may reproduce drawing processes of the original handwritten content, and the additionally reproduce edit processes. Alternatively, the first device 100-1 may provide a selection window for selecting whether to apply the edit information of the partial handwritten content. The reproduction of the handwritten content will now be described in more detail with reference to FIGS. 62A through 62C.

Figure 62A:
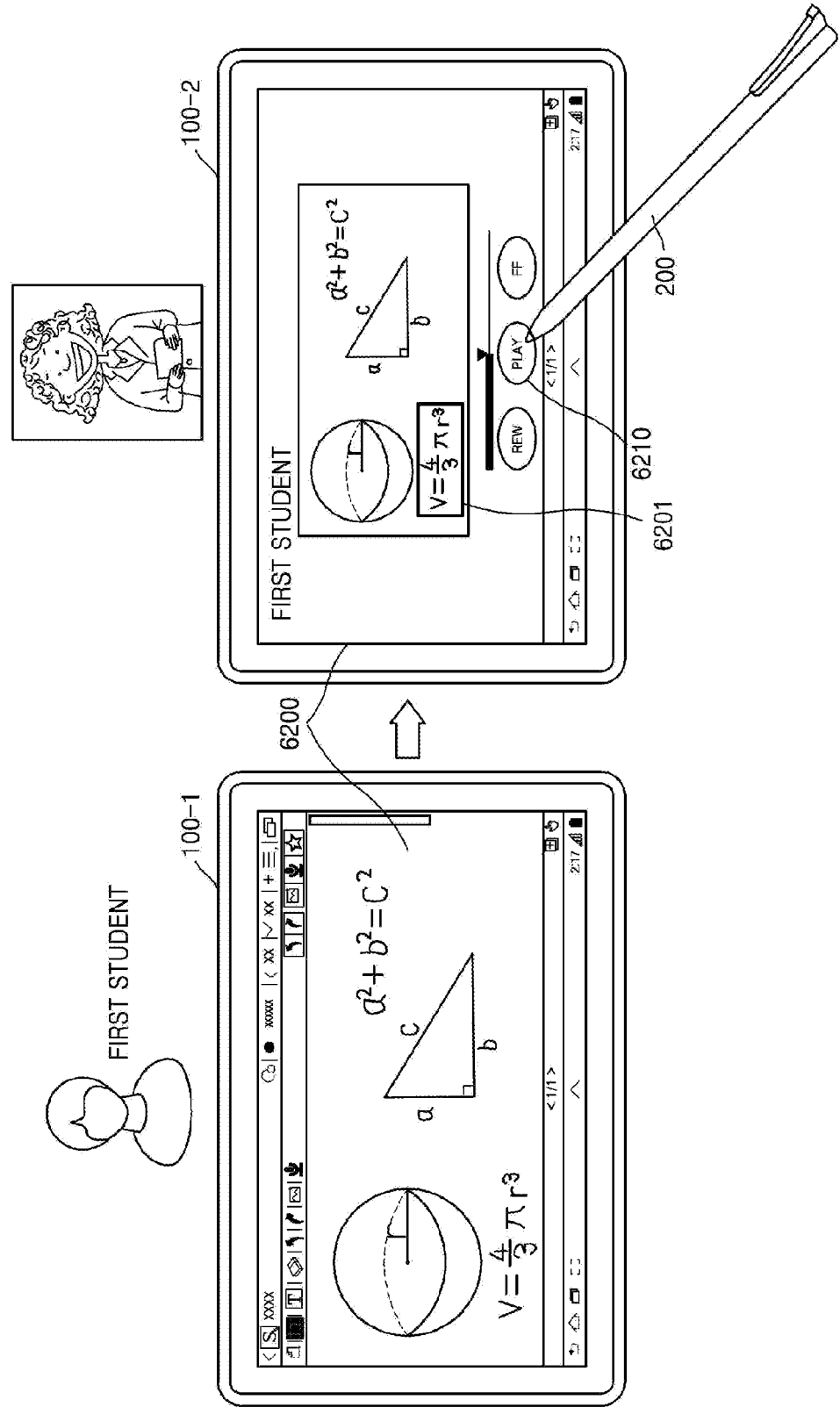
FIG. 62A is a diagram of an example of reproducing, by a second device, handwritten content received from a first device.
Figure 62B:
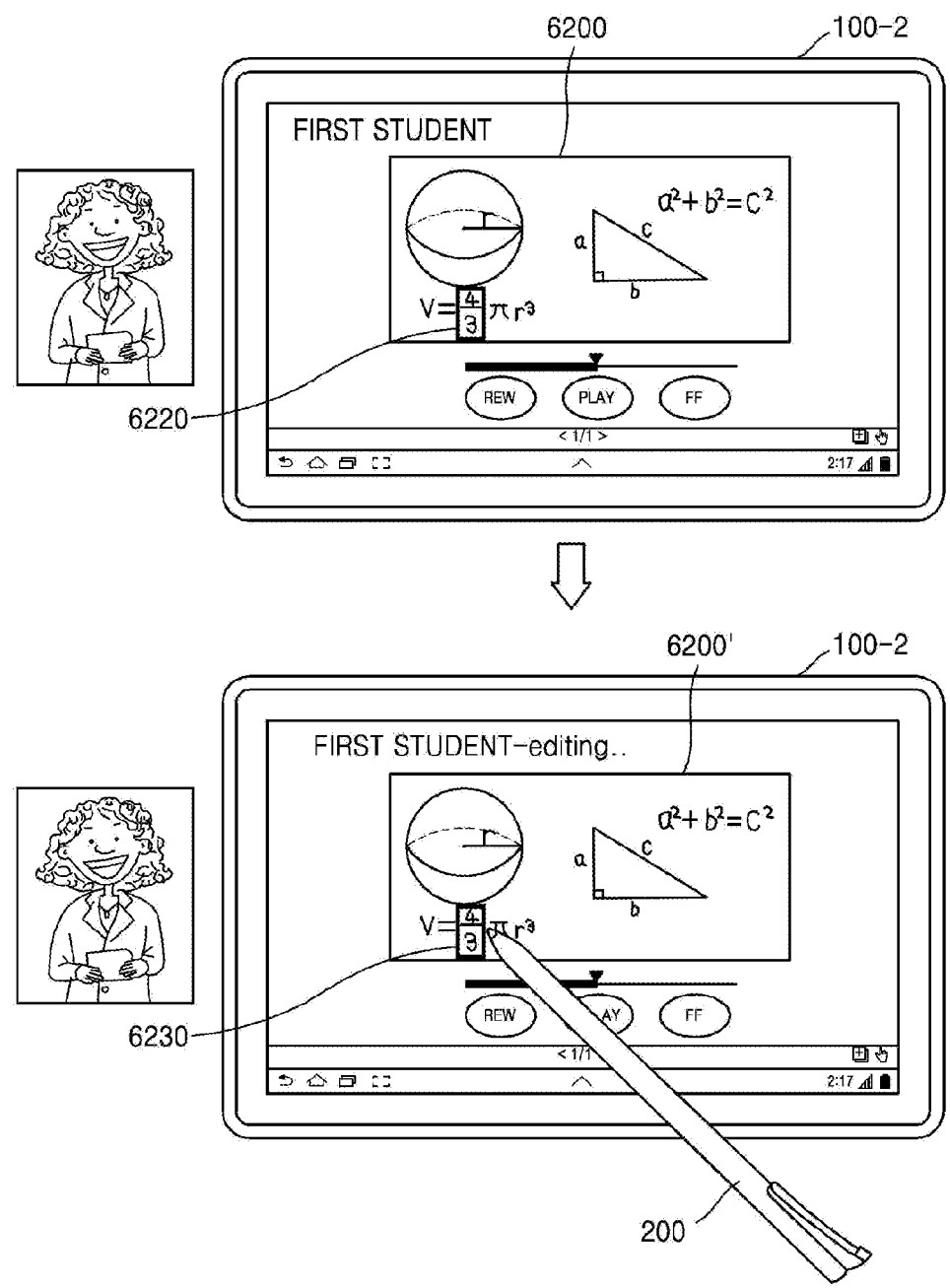
FIG. 62B is a diagram of an example of editing, by a second device, partial handwritten content.
Figure 62C:
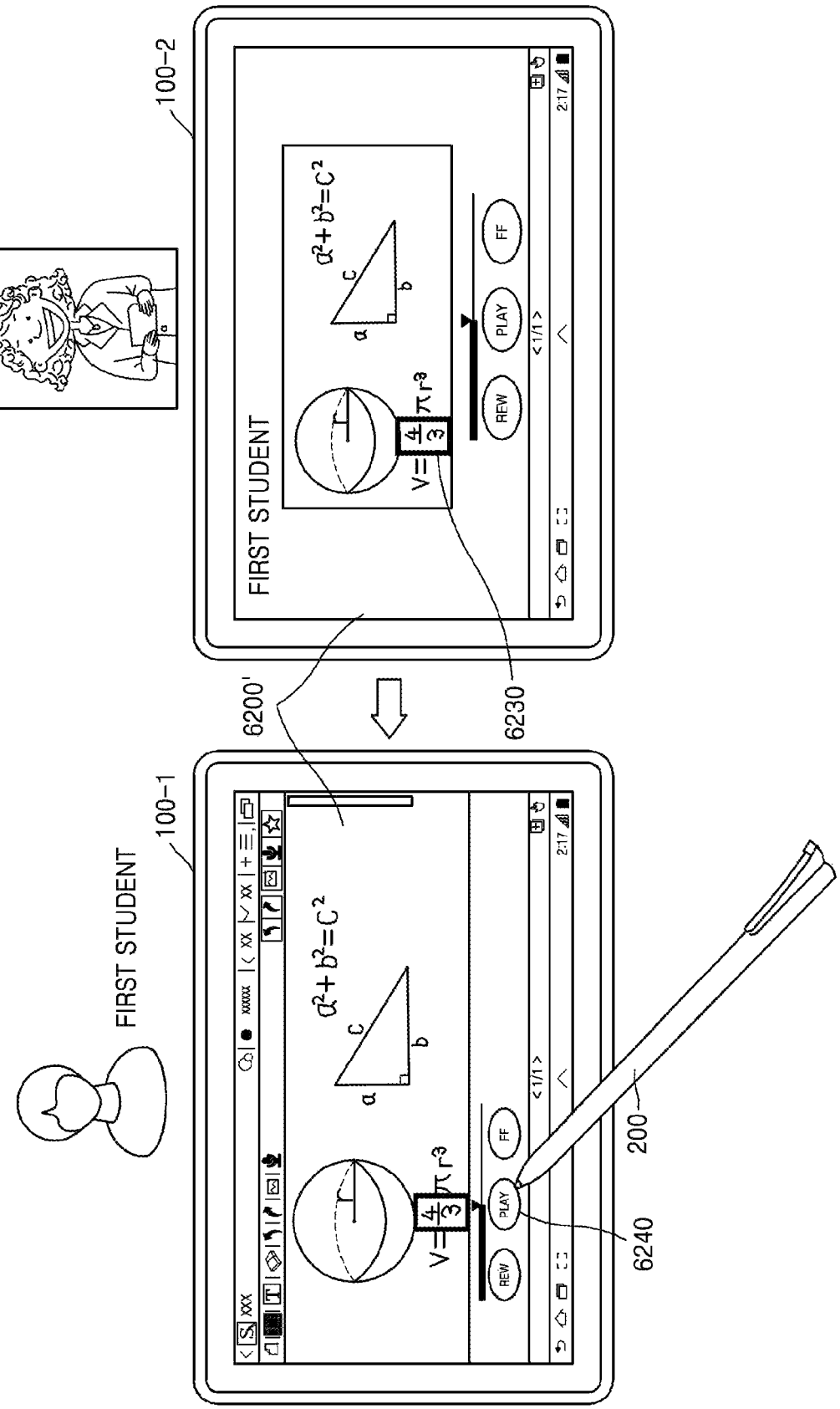
FIG. 62C is a diagram of an example of reproducing, by a first device, entire handwritten content by reflecting edit information regarding partial handwritten content.

FIG. 62A is a diagram of an example of reproducing, by the second device 100-2, handwritten content received from the first device 100-1. In FIGS. 62A through 62C, it is assumed that the first device 100-1 is a student's terminal and the second device 100-2 is a teacher's terminal.

As shown in FIG. 62A, when a first student handwrites a volume formula of a sphere and Pythagoras' theorem on the first device 100-1, the first device 100-1 may record handwriting processes of the first student and create first handwritten content 6200. Then, the first device 100-1 may transmit the first handwritten content 6200 to the second device 100-2.

The second device 100-2 may display the first handwritten content 6200 received from the first device 100-1 on a screen. According to an exemplary embodiment, the second device 100-2 may provide a virtual control panel including a reproduce function button.

According to an exemplary embodiment, when a teacher specifies a region of interest 6201 including 'v=3/4$\pi r^3$', and activates a reproduce button 6210 included in a control panel, the second device 100-2 may reproduce drawing processes of partial handwritten content, i.e., 'v=3/4$\pi r^3$', by using time information of strokes included in the region of interest 6201. For example, the second device 100-2 may output from v that is drawn first in the region of interest 6201.

FIG. 62B is a diagram of an example of editing, by the second device 100-2, partial handwritten content.

Referring to FIG. 62B, the second device 100-2 may receive an input of specifying a region of interest 6220 including '3/4', and provide a control panel including a cancel button and an add button. The second device 100-2 may receive an input of amending '3/4' to '4/3' through the control panel. At this time, the second device 100-2 may delete information of strokes corresponding to '3/4' from a list of a plurality of strokes included in the first handwritten content 6200, and add information of strokes corresponding to '4/3', thereby editing the first handwritten content 6200. Alternatively, according to an exemplary embodiment, the second device 100-2 may edit the first handwritten content 6200 by adding a delete tag without having to delete the information of the strokes corresponding to '3/4'.

FIG. 62C is a diagram of an example of reproducing, by the first device 100-1, entire handwritten content by reflecting edit information regarding partial handwritten content.

Referring to FIG. 62C, the second device 100-2 may transmit edited handwritten content 6200' to the first device 100-1.

According to an exemplary embodiment, the first device 100-1 may display the edited handwritten content 6200' on the screen. Here, the first device 100-1 may receive an input of activating a reproduce button 6240 on a virtual control panel.

According to an exemplary embodiment, the first device 100-1 may reproduce the edited handwritten content 6200' by reflecting edit information (for example, amending '3/4' to '4/3') regarding partial handwritten content. For example, the first device 100-1 may reproduce the edited handwritten content 6200' such that '4/3' is drawn instead of '3/4'.

According to an exemplary embodiment, the first device 100-1 may reproduce the drawing processes of the first handwritten content 6200, and then reproduce edit processes (for example, deleting '3/4' and adding '4/3'). Alternatively, the first device 100-1 may provide a selection window for selecting whether to reflect the edit information regarding the partial handwritten content.

Hereinabove, it is described that content displayed on the device 100 is handwritten content, but the content is not limited thereto. According to an exemplary embodiment, the device 100 may display a transcript obtained by changing voice to text. An operation of providing, by the device 100, a transcript will be described in detail with reference to FIG. 69 later.

In FIG. 62C, the first device 100-1 reproduces the edited handwritten content 6200' when the reproduce button 6240 is activated, but an exemplary embodiment is not limited thereto. For example, even when the first device 100-1 receives an input activating the reproduce button 6240, the second device 100-2 may reproduce the edited handwritten content 6200'.

An example of the second device 100-2 reproducing handwritten content (or a part of the handwritten content) selected on the first device 100-1 will now be described in detail with reference to FIG. 63.

Figure 63:
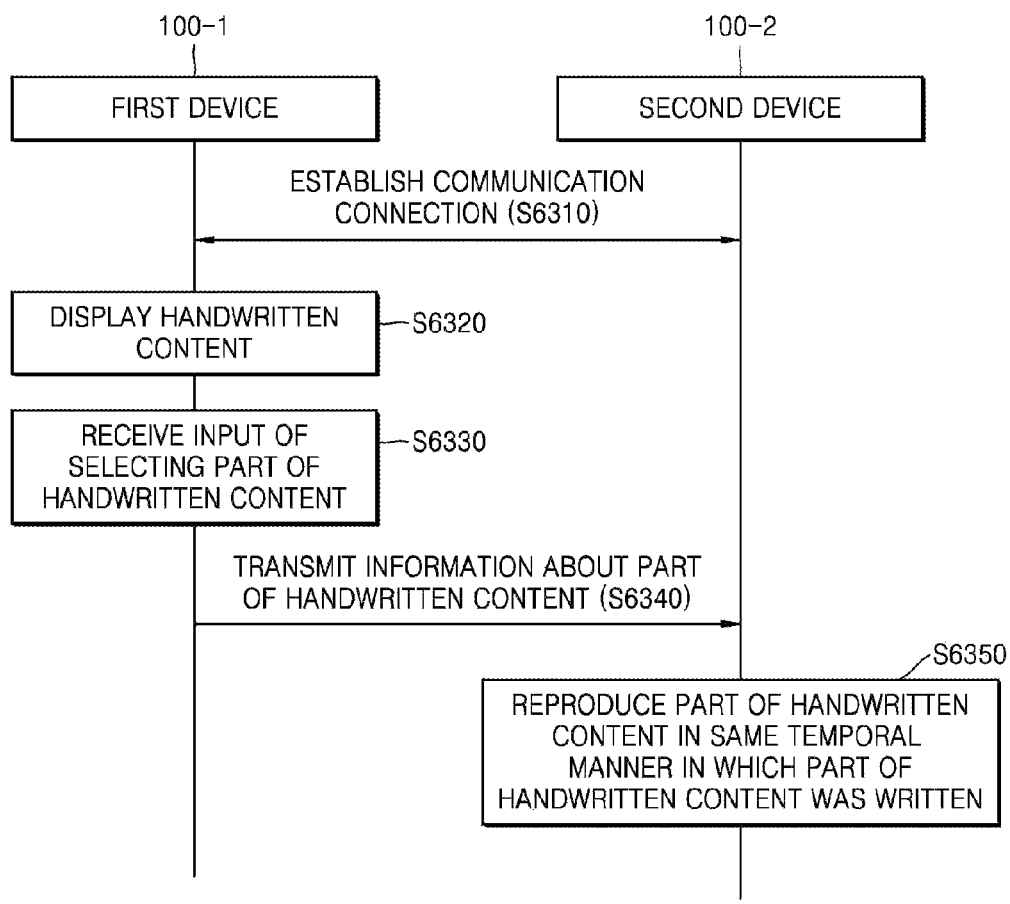
FIG. 63 is a flowchart of a method of reproducing, by a second device, a part of handwritten content selected on a first device, according to an exemplary embodiment.

FIG. 63 is a flowchart of a method of reproducing, by the second device 100-2, a part of handwritten content selected on the first device 100-1, according to an exemplary embodiment.

In operation S6310, the first device 100-1 may establish a communication connection with the second device 100-2. For example, the first device 100-1 may communicate with the second device 100-2 in a local area network (directly or through a network access point), or may communicate with the second device 100-2 over a mobile network, such as 3G, 4G, or 5G. Examples of local area communication include Bluetooth, BLE, Wi-Fi direct, UWB, Zigbee, NFC, or Ant+, but are not limited thereto.

In operation S6320, the first device 100-1 may display handwritten content. According to an exemplary embodiment, the handwritten content may include a plurality of strokes that are input in a certain temporal order. The plurality of strokes may have different shapes. For example, the plurality of strokes may have different thicknesses, different colors, different brightness, different saturations, or different transparencies.

According to an exemplary embodiment, the handwritten content displayed on the screen of the first device 100-1 may be original handwritten content or edited handwritten content, but the displayed handwritten content is not limited thereto.

In operation S6330, the first device 100-1 may receive an input of selecting a part of the handwritten content (hereinafter, referred to as partial handwritten content). For example, the first device 100-1 may receive a user input of assigning a region of interest, and select partial handwritten content corresponding to the region of interest. Alternatively, the first device 100-1 may receive a user input of sequentially touching, by the electronic pen 200, a plurality of strokes while a certain button of the electronic pen 200 is pressed. At this time, the first device 100-1 may select the touched plurality of strokes as the partial handwritten content.

In operation S6340, the first device 100-1 may transmit information indicating the partial handwritten content to the second device 100-2. The first device 100-1 may transmit the information about the partial handwritten content to the second device 100-2 via a local area communication link or a mobile communication link.

According to an exemplary embodiment, the first device 100-1 may transmit information (for example, stroke ID information, time stamp information, or coordinate information) about strokes included in the partial handwritten content. According to an exemplary embodiment, the first device 100-1 may transmit the information about the strokes included in the partial handwritten content to the second device 100-2 after compressing or encoding the information. At this time, the first device 100-1 may use any one of various compression or encoding algorithms.

According to an exemplary embodiment, the first device 100-1 may transmit the information about the partial handwritten content to the second device 100-2 while reproducing the partial handwritten content. Alternatively, the first device 100-1 may transmit the information about the partial handwritten content to the second device 100-2 while not reproducing the partial handwritten content.

In operation S6350, the second device 100-2 may reproduce the partial handwritten content in a temporal manner that is the same as a temporal manner in which the partial handwritten content was written. For example, the second device 100-2 may reproduce the partial handwritten content by using the information about the partial handwritten content received from the first device 100-1.

According to an exemplary embodiment, the second device 100-2 may create a stack into which at least one stroke included in the partial handwritten content is inserted in chronological order. For example, the second device 100-2 may compare time stamp information of extracted strokes to determine a relative chronological order of the extracted strokes. The second device 100-2 may insert an oldest stroke from among the extracted strokes to a top of a stack and insert a recent stroke from among the extracted stroke to a bottom of the stack. The second device 100-2 may reproduce the partial handwritten content in the temporal manner that is the same as the temporal manner in which the partial handwritten content was written by using the created stack.

According to an exemplary embodiment, when the partial handwritten content is reproduced by the first device 100-1, the second device 100-2 may receive streaming data of the partial handwritten content from the first device 100-1. Then, the second device 100-2 may reproduce the partial handwritten content in the temporal manner that is the same as the temporal manner in which the partial handwritten content was written by using the received streaming data.

Figure 64:
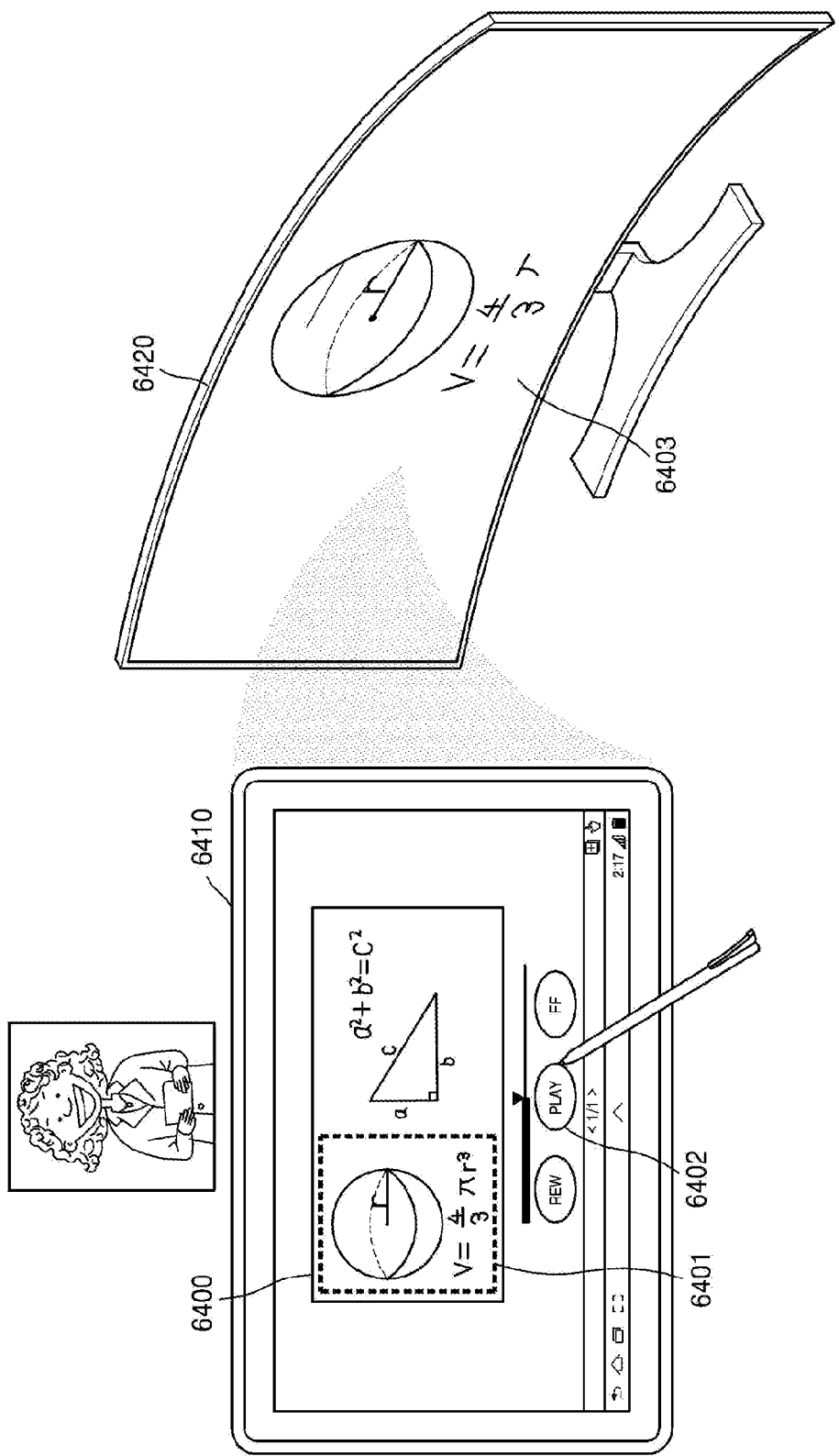
FIG. 64 is a diagram of an example of reproducing, by an external display device, a part of content selected on a device.

FIG. 64 is a diagram of an example of reproducing, by an external display device 6420, a part of content selected on a device 6410.

Referring to FIG. 64, the device 6410 may display handwritten content 6400. Here, the handwritten content 6400 may include data in which processes of writing a formula for calculating the volume of a sphere and Pythagoras' theorem are recorded.

The device 6410 may receive an input of assigning a region of interest 6401 including a shape of the sphere and $v=4/3\pi r^3$ from the handwritten content 6400, and an input of activating a reproduce button 6402 included in a control panel.

In response to activating the reproduce button 6402, the device 6410 may transmit information about partial handwritten content (for example, the shape of the sphere and $v=4/3\pi r^3$) included in the region of interest 6401 to the external display device 6420 while requesting (or commanding) the external display device 6420 to reproduce the partial handwritten content. For example, when the device 6410 is a tablet PC, the tablet PC may control a smart TV that has a display of larger size than the tablet PC to reproduce partial handwritten content selected by a user.

In this case, the external display device 6420 may reproduce drawing processes 6403 of the partial handwritten content by using time information of strokes included in the region of interest 6401. For example, the external display device 6420 may first draw the sphere, then draw a straight line and r in the sphere, and then draw $v=4/3\pi r^3$, based on an order in which the partial handwritten content was written.

An example of reproducing, by the second device 100-2, a part of handwritten content selected on the first device 100-1, will now be described with reference to FIG. 65.

Figure 65:
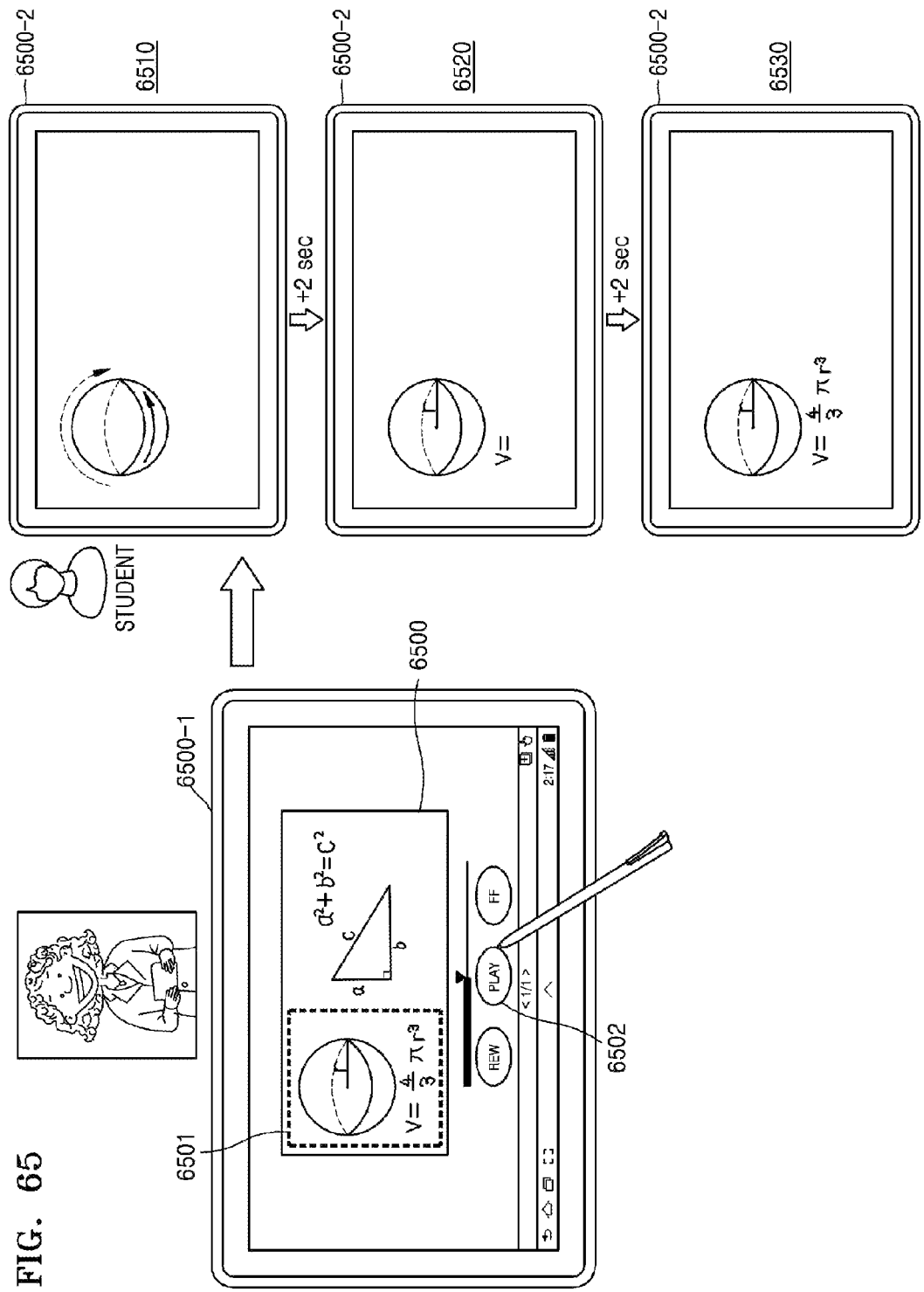
FIG. 65 is a diagram of an example of reproducing, by a second device, a part of handwritten content selected on a first device, in a temporal manner that is the same as the temporal manner in which the part of handwritten content was written.

FIG. 65 is a diagram of an example of reproducing, by the second device 100-2, a part of handwritten content selected on the first device 100-1, in the temporal manner that is the same as the temporal manner in which the part of handwritten content was written. In FIG. 65, the first device 100-1 is a teacher's terminal 6500-1 and the second device 100-2 is a student's terminal 6500-2.

Referring to FIG. 65, the teacher's terminal 6500-1 may display handwritten content 6500. Here, the handwritten content 6500 may include data in which processes of writing a formula for calculating the volume of a sphere and Pythagoras' theorem are recorded.

The teacher's terminal 6500-1 may receive an input of assigning a region of interest 6501 including a shape of the sphere and $v=4/3\pi r^3$ from the handwritten content 6600, and an input of activating a reproduce button 6502 included in a control panel.

In response activating the reproduce button 6502, the teacher's terminal 6500-1 may transmit information about partial handwritten content (for example, the shape of the sphere and $v=4/3\pi r^3$) included in the region of interest 6501 to the student's terminal 6500-2 connected to the teacher's terminal 6500-1. At this time, the teacher's terminal 6500-1 may request (or command) the student's terminal 6500-2 to reproduce the partial handwritten content.

In this case, the student's terminal 6500-2 may reproduce drawing processes of the partial handwritten content by using time information of strokes included in the region of interest 6501, according to the request (or command) to reproduce the partial handwritten content. For example, the student's terminal 6500-2 may first output a process of drawing the sphere according to an order in which the partial handwritten content was written, in operation 6510. Then, the student's terminal 6500-2 may output processes of drawing a straight line and r in the sphere and drawing v in operation 6520. Next, the student's terminal 6500-2 may sequentially draw '$=4/3\pi r^3$'.

Figure 66:
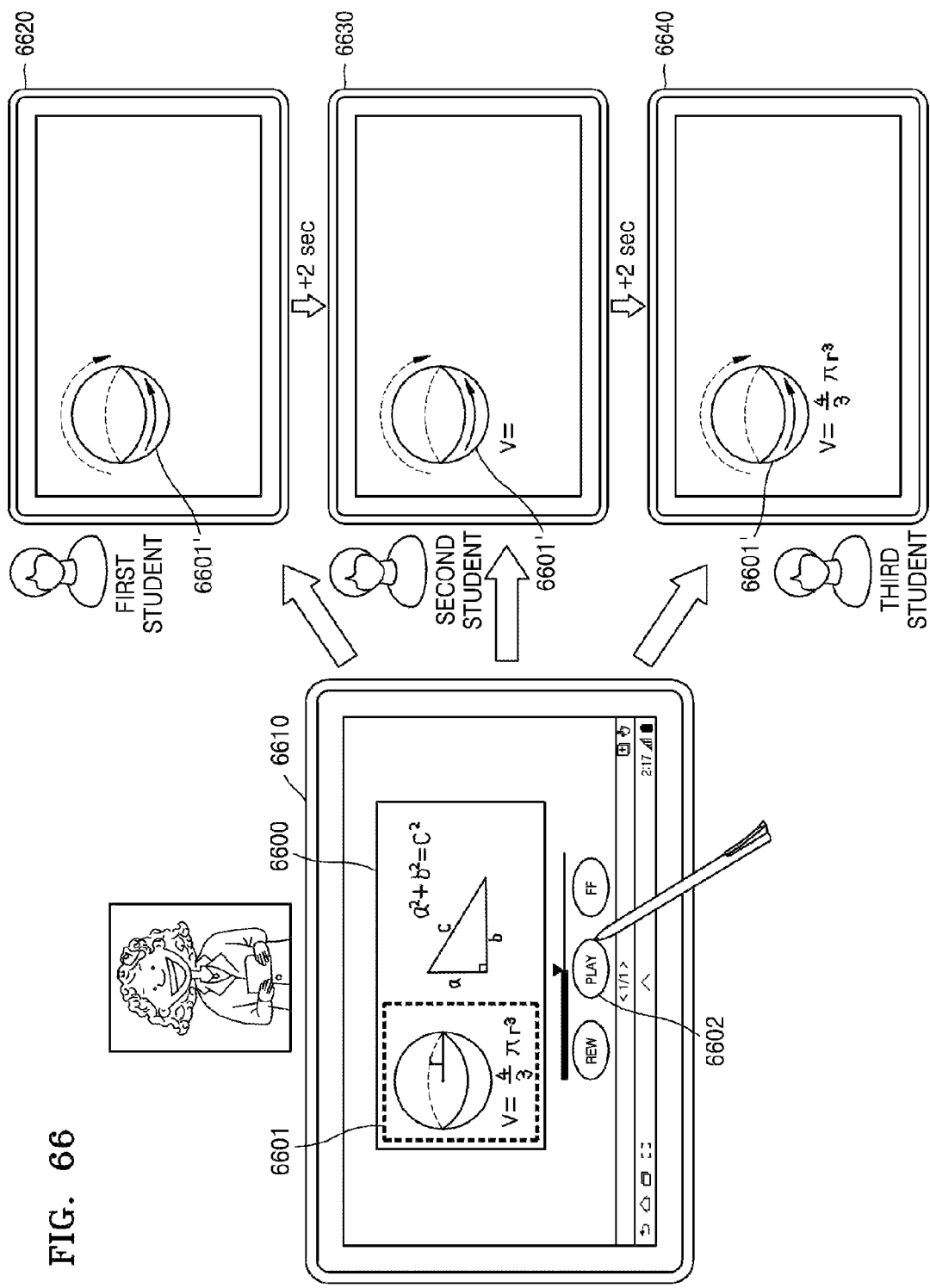
FIG. 66 is a diagram of an example of reproducing, by a plurality of external devices, a part of handwritten content selected on a first device.

FIG. 66 is a diagram of an example of reproducing, by a plurality of external devices, a part of handwritten content selected on the first device 100-1. In FIG. 66, the first device 100-1 is a teacher's terminal 6610 and the plurality of external devices are a plurality of first through third students' terminals 6620 through 6640.

Referring to FIG. 66, the teacher's terminal 6610 may display handwritten content 6600. Here, the teacher's terminal 6610 may receive an input of assigning a region of interest 6601 including a shape of the sphere and $v=4/3\pi r^3$ from the handwritten content 6600, and an input of activating a reproduce button 6602 included in a control panel.

In response to the input of activating the reproduce button 6602, the teacher's terminal 6610 may transmit information about partial handwritten content (for example, the shape of the sphere and $v=4/3\pi r^3$) included in the region of interest 6601 to the first through third student's terminals 6620 through 6640 connected to the teacher's terminal 6610. At this time, the teacher's terminal 6610 may request (or command) the first through third student's terminals 6620 through 6640 to reproduce the partial handwritten content.

In this case, each of the first through third student's terminals 6620 through 6640 may reproduce drawing processes of the partial handwritten content by using time information of strokes included in the region of interest 6601, according to the request (or command) to reproduce the partial handwritten content.

For example, the first student's terminal 6620 may draw the sphere, then a straight line and r in the sphere, and then $v=4/3\pi r^3$, according to an order in which the partial handwritten content was written. Also, the second student's terminal 6630 may draw the sphere, then the straight line and r in the sphere, and then $v=4/3\pi r^3$, according to the order in which the partial handwritten content was written. The third student's terminal 6640 may also draw the sphere, then the straight line and r in the sphere, and then $v=4/3\pi r^3$, according to the order in which the partial handwritten content was written.

Figure 67:
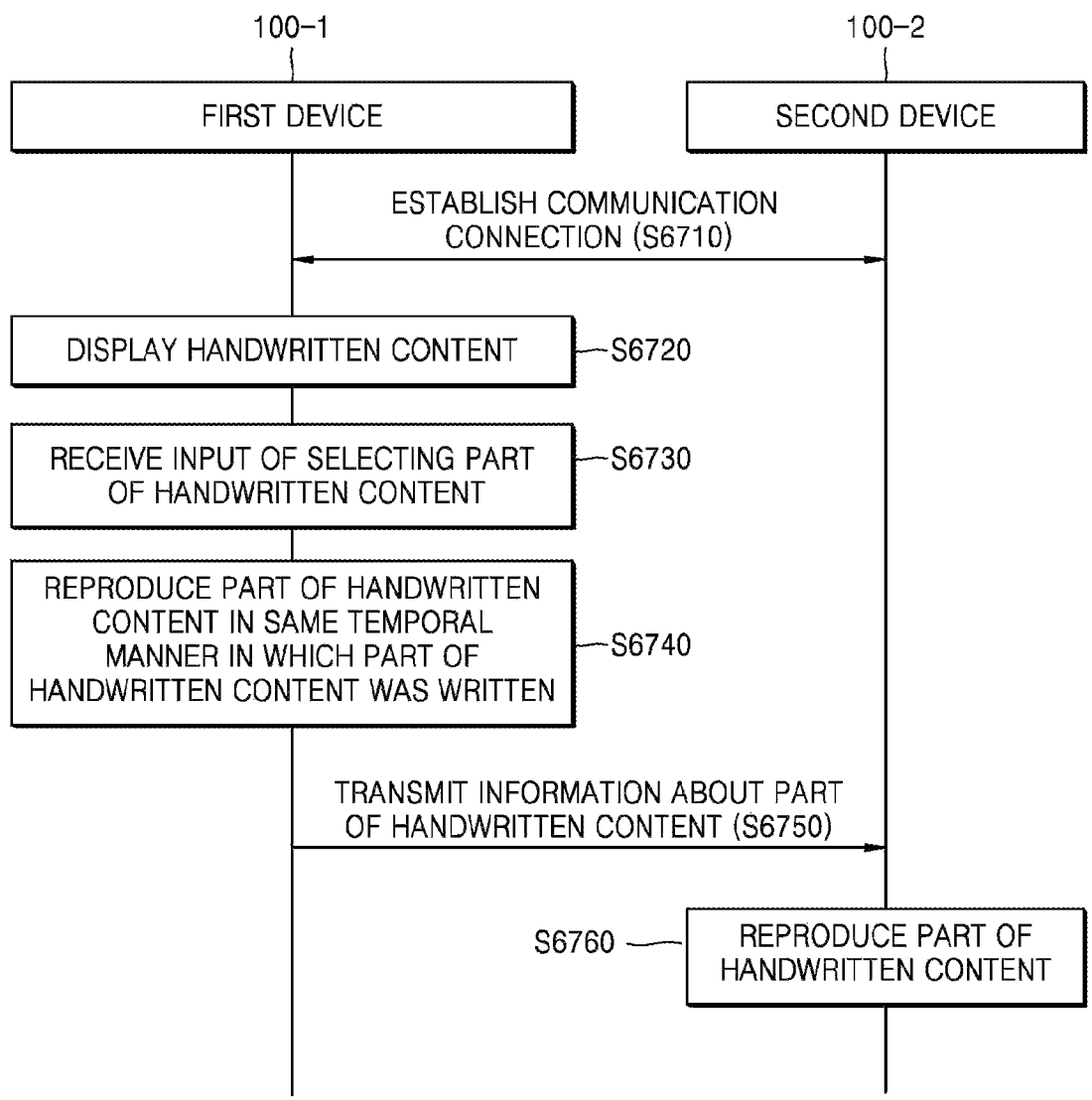
FIG. 67 is a flowchart of a method of reproducing, by each of a first device and a second device, a part of handwritten content selected on the first device.

FIG. 67 is a flowchart of a method of reproducing, by each of the first device 100-1 and the second device 100-2, a part of handwritten content selected on the first device 100-1.

In operation S6710, the first and the second devices 100-1 and 100-2 may establish a communication connection. For example, the first device 100-1 may communicate with the second device 100-2 over a local area network, or may communicate over a mobile network, such as 3G, 4G, or 5G. Examples of local area communication include Bluetooth, BLE, Wi-Fi direct, UWB, Zigbee, NFC, or Ant+, but are not limited thereto.

In operation S6720, the first device 100-1 may display handwritten content. According to an exemplary embodiment, the handwritten content may include a plurality of strokes input in a certain order. According to an exemplary embodiment, the handwritten content displayed on the screen of the first device 100-1 may be original handwritten content or edited handwritten content, but the handwritten content is not limited thereto.

In operation S6730, the first device 100-1 may receive an input of selecting a part of the handwritten content (hereinafter, referred to as partial handwritten content). For example, the first device 100-1 may receive a user input of assigning a region of interest, and select partial handwritten content corresponding to the region of interest. Alternatively, the first device 100-1 may receive a user input of sequentially touching, by the electronic pen 200, a plurality of strokes while a certain button of the electronic pen 200 is pressed. At this time, the first device 100-1 may select the touched plurality of strokes as the partial handwritten content.

In operation S6740, the first device 100-1 may reproduce the partial handwritten content in the temporal manner that is the same as the temporal manner in which the partial handwritten content was written.

According to an exemplary embodiment, the second device 100-2 may create a stack into which at least one stroke included in the partial handwritten content is inserted in chronological order. For example, the second device 100-2 may compare time stamp information of extracted strokes to determine a relative chronological order of the extracted strokes. The second device 100-2 may insert an oldest stroke from among the extracted strokes to a top of a stack and insert a most recent stroke from among the extracted strokes to a bottom of the stack. The second device 100-2 may reproduce the partial handwritten content in the temporal manner that is the same as the temporal manner in which the partial handwritten content was written by using the created stack.

In operation S6750, the first device 100-1 may transmit information about the partial handwritten content. For example, the first device 100-1 may transmit the information about the partial handwritten content to the second device 100-2 by using local area communication, a mobile communication, or a wireless LAN communication.

According to an exemplary embodiment, the first device 100-1 may transmit information (for example, stroke ID information, time stamp information, or coordinate information) about strokes included in the partial handwritten content. According to an exemplary embodiment, the first device 100-1 may transmit the information about the strokes included in the partial handwritten content to the second device 100-2 after compressing or encoding the information. At this time, the first device 100-1 may use any one of various compression or encoding algorithms.

According to an exemplary embodiment, the first device 100-1 may transmit streaming data about the partial handwritten content being reproduced to the second device 100-2 while reproducing the partial handwritten content.

According to an exemplary embodiment, the first device 100-1 may encode the partial handwritten content via a mirroring technology using Miracast, and transmit the encoded partial handwritten content to the second device 100-2 through a network channel. Examples of the network channel include WFD, Bluetooth, Zigbee, NFC, and BLE. Unlike Wi-Fi, Miracast provides bases for using content and services between devices through direct communication between the devices without an access point or a router for facilitating communication.

In operation S6760, the second device 100-2 may reproduce the partial handwritten content in the temporal manner that is the same as the temporal manner in which the partial handwritten content was written. For example, the second device 100-2 may reproduce the partial handwritten content by using the information about the partial handwritten content received from the first device 100-1.

According to an exemplary embodiment, the second device 100-2 may not store the information about the partial handwritten content, but may immediately reproduce the partial handwritten content by using a streaming method.

Alternatively, according to another exemplary embodiment, the second device 100-2 may store the information about the partial handwritten content by using a download method, and then reproduce the partial handwritten content by using the stored information about the partial handwritten content.

According to an exemplary embodiment, the screen of the first device 100-1, which reproduces the partial handwritten content, and the screen of the second device 100-2 may be synchronized with each other. An example of synchronizing the screens of the first and second devices 100-1 and 100-2 will now be described in detail with reference to FIG. 68.

Figure 68:
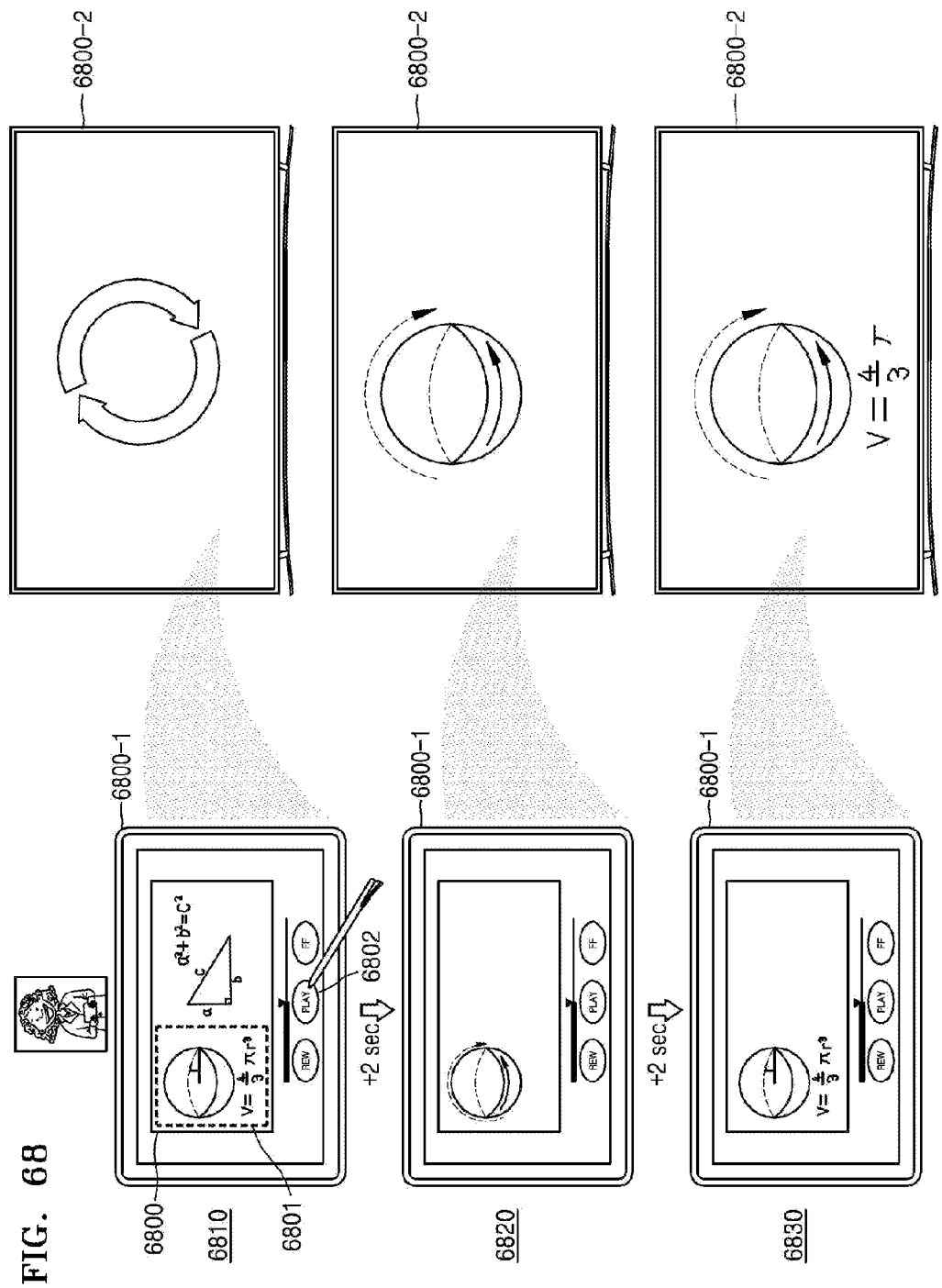
FIG. 68 is a diagram of an example of reproducing, by each of a first device and a second device, a part of handwritten content selected on the first device, in a manner that is the same as the temporal manner in which the part of handwritten content was written.

FIG. 68 is a diagram of an example of reproducing, by each of a first device 6800-1 and the second device 6800-2, a part of handwritten content 6800 selected on the first device 6800-1, in the temporal manner that is the same as the temporal manner in which the part of handwritten content 6800 was written.

Referring to operation 6810 of FIG. 68, the first device 6800-1 may display the handwritten content 6800. Here, the handwritten content 6800 may include data in which processes of writing a formula of calculating the volume of a sphere and Pythagoras' theorem are recorded.

The first device 6800-1 may receive an input of assigning a region of interest 6801 including a shape of the sphere and $v=4/3\pi r^3$ from the handwritten content 6800, and an input of activating a reproduce button 6802 included in a control panel.

Referring to operation 6820 of FIG. 68, in response to the input of activating the reproduce button 6802, the first device 6800-1 may reproduce processes of drawing partial handwritten content (the shape of the sphere and $v=4/3\pi r^3$). For example, the first device 6800-1 may first output a process of drawing the sphere according to an order in which the partial handwritten content was written, by using time information of strokes included in the region of interest 6801.

The second device 6800-2 may also output the process of drawing the sphere. For example, the first device 6800-1 may transmit information about the partial handwritten content included in the region of interest 6801 to the second device 6800-2 while requesting (or commanding) the second device 6800-2 to reproduce the partial handwritten content. In this case, the second device 6800-2 may first output the process of drawing the sphere, like in the first device 6800-1.

Also, the first device 6800-1 may periodically transmit data of the screen on which the partial handwritten content is displayed to the second device 6800-2 by using a mirroring technology. In this case, the second device 6800-2 may display a screen that is the same as the first device 6800-1.

Referring to operation 6830 of FIG. 68, after the sphere is drawn, the first device 6800-1 may display processes of drawing $v=4/3\pi r^3$. At this time, the second device 6800-2 may also display the processes of drawing $v=4/3\pi r^3$.

Figure 69:
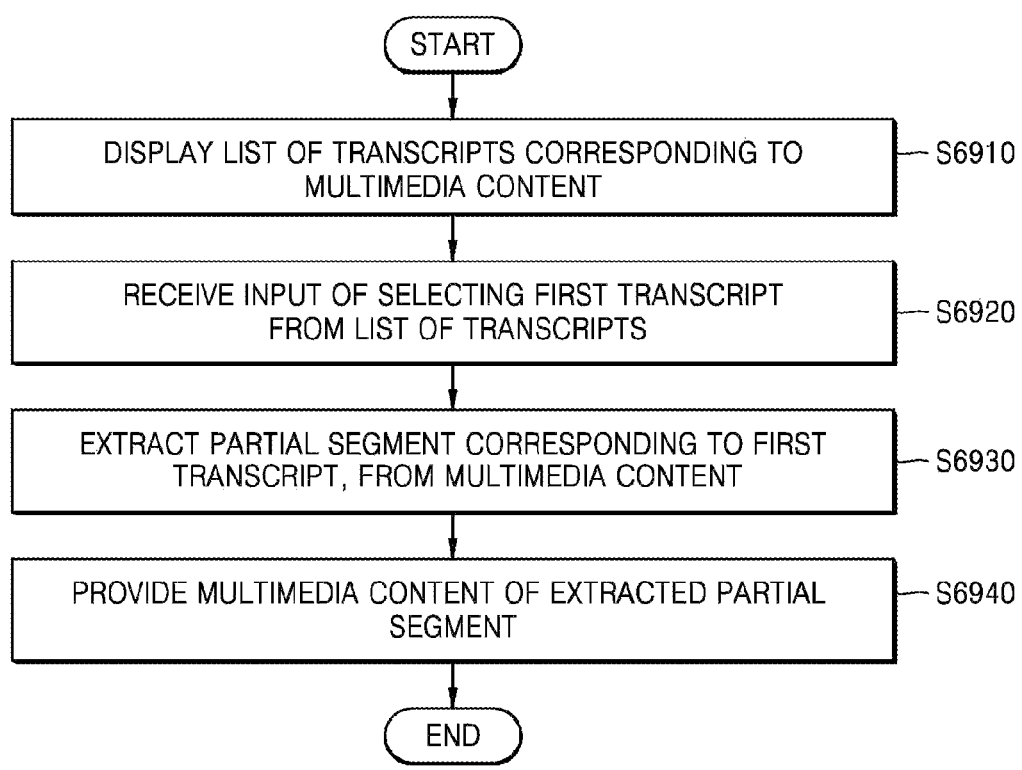
FIG. 69 is a flowchart of a method of providing, by a device, multimedia content of a partial segment corresponding to a selected transcript, according to an exemplary embodiment.

FIG. 69 is a flowchart of a method of the device 100 providing multimedia content of a partial segment corresponding to a selected transcript, according to an exemplary embodiment.

In operation S6910, the device 100 may display a list of transcripts corresponding to multimedia content (for example, video content or audio content). In the specification, a transcript may mean a record obtained by transferring oral details to writing. According to an exemplary embodiment, one transcript may be one sentence.

According to an exemplary embodiment, the device 100 may create a transcript corresponding to multimedia content by changing voice included in the multimedia content to text, based on a speech to text (STT) technology. Here, the transcript may be mapped to reproduce time information of the multimedia content.

According to an exemplary embodiment, the device 100 may create the transcript by changing partial voice included in the multimedia content to text. For example, when voice is not output for a predetermined period of time, and then output at a certain point of time while reproducing moving image lecture content, the device 100 may create a transcript by changing the voice output at the certain point of time to text. According to an exemplary embodiment, the device 100 may create a transcript by changing voice inserted at a point of time when screen is changed in moving image content, to text.

Meanwhile, according to an exemplary embodiment, the device 100 may create a transcript by changing voice to text when a syllable of the voice is at least a predetermined length. For example, the device 100 may not create a transcript of voice having short syllables, such as 'well' or 'no'.

In operation S6920, the device 100 may receive an input of selecting a first transcript from the list of transcripts.

The input of selecting the first transcript may vary. According to an exemplary embodiment, the device 100 may receive an input of specifying a region of interest from the list of transcripts. A shape of the region of interest may vary. For example, the shape of the region of interest may be a circle, an oval, a rectangle, or a free curve, but is not limited thereto. Also, a color and a pattern of the region of interest may vary.

Alternatively, the device 100 may receive a gesture for selecting the first transcript. For example, the device 100 may select the first transcript when a user touches the first transcript for at least a pre-set period of time (for example, touch and hold for at least 3 seconds), or touches the first transcript at least a predetermined number of times (for example, double-tap).

In operation S6930, the device 100 may extract a partial segment corresponding to the first transcript, from the multimedia content.

For example, the device 100 may select a first frame that is reproduced at a point of time the first transcript starts to be created. Alternatively, the device 100 may select an n-th frame that is reproduced at a point of time the first transcript finishes to be created. The device 100 may select an n-th frame corresponding to a point of time a second transcript is created after the first transcript. The device 100 may extract segments from the first frame to the n-th frame as a partial segment corresponding to the first transcript.

In operation S6940, the device 100 may provide the multimedia content of the extracted partial segment.

For example, the device 100 may move to a starting frame of the partial segment corresponding to the first transcript, and reproduce the partial segment corresponding to the first transcript. Alternatively, the device 100 may move a timeline of the multimedia content to a starting point of the partial segment corresponding to the first transcript.

Figure 70:
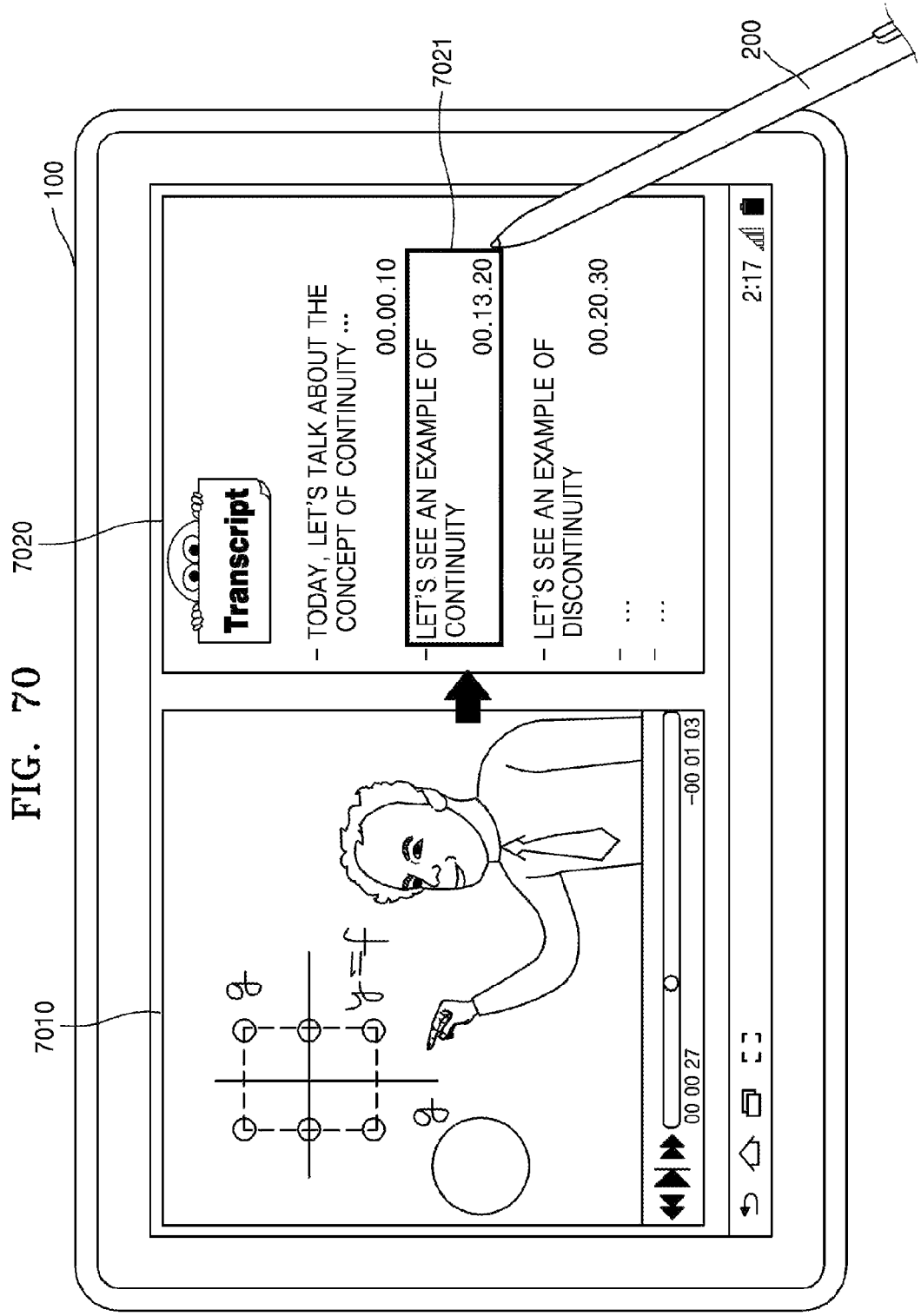
FIG. 70 is a diagram of an example of providing, by a device, a partial moving image segment corresponding to a selected transcript, according to an exemplary embodiment.

FIG. 70 is a diagram of an example of providing, by the device 100, a partial moving image segment corresponding to a selected transcript, according to an exemplary embodiment.

Referring to FIG. 70, the device 100 changes voice included in moving image content 7010 to text to create a plurality of transcripts. Then, the device 100 may display a list 7020 of the plurality of transcripts.

According to an exemplary embodiment, the device 100 may display an entire sentence of the text on the list 7020, or a pre-set length of a sentence of the text on the list 7020.

According to an exemplary embodiment, the device 100 may display reproduce starting point information (for example, 00.00.10) of a moving image partial segment corresponding to each transcript on the list 7020.

According to an exemplary embodiment, the device 100 may receive an input of selecting a second transcript 7021 (for example, 'Let's see an example of continuity') from the list 7020. The device 100 may extract a moving image segment corresponding to the second transcript 7021. For example, if a second segment (00.13.20 to 00.20.30) of the moving image content 7010 is reproduced while the second transcript 7021 is created, the device 100 may extract the second segment of the moving image content 7010. Then, the device 100 may move a timeline of the moving image content 7010 to a starting frame of the second segment.

According to an exemplary embodiment, a user may select a certain transcript to conveniently search for an interested frame in multimedia content.

Figure 71:
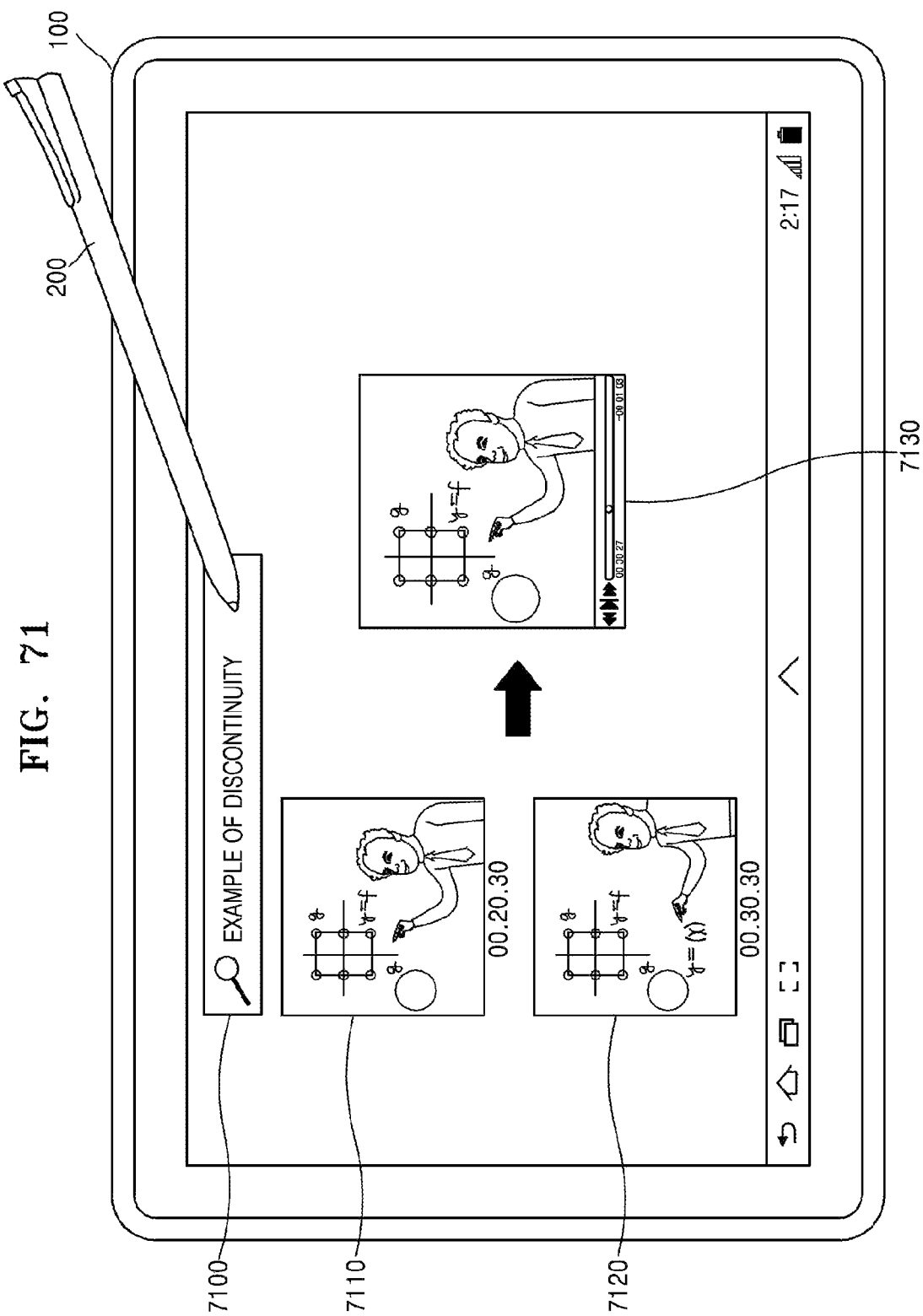
FIG. 71 is a diagram of an example of searching for, by a device, a partial moving image segment based on a search keyword.

FIG. 71 is a diagram of an example of searching for, by the device 100, a partial moving image segment based on a search keyword.

Referring to FIG. 71, the device 100 may change voice included in the moving image content 7010 to text, thereby creating a plurality of transcripts. Then, the device 100 may store the list 7020 of the plurality of transcripts. Here, a transcript may be mapped to reproduce time information of multimedia content.

According to an exemplary embodiment, the device 100 may receive an input of a search keyword. For example, if a user wants to search for a partial segment related to an 'example of discontinuity', the user may input the 'example of discontinuity' to a search window 7100 of the device 100, as a search keyword.

According to an exemplary embodiment, the device 100 may extract a third transcript including the 'example of discontinuity' from the list 7020 of the plurality of transcripts. Then, the device 100 may select a first frame 7110 that is reproduced at a point of time the third transcript starts to be created. Also, the device 100 may select a second frame 7120 that is reproduced at a point of time the third transcript finishes to be created.

The device 100 may extract a segment from the first frame 7110 to the second frame 7120 as a partial moving image segment 7130 corresponding to the third transcript, and reproduce the partial moving image segment 7130.

Figure 72A:
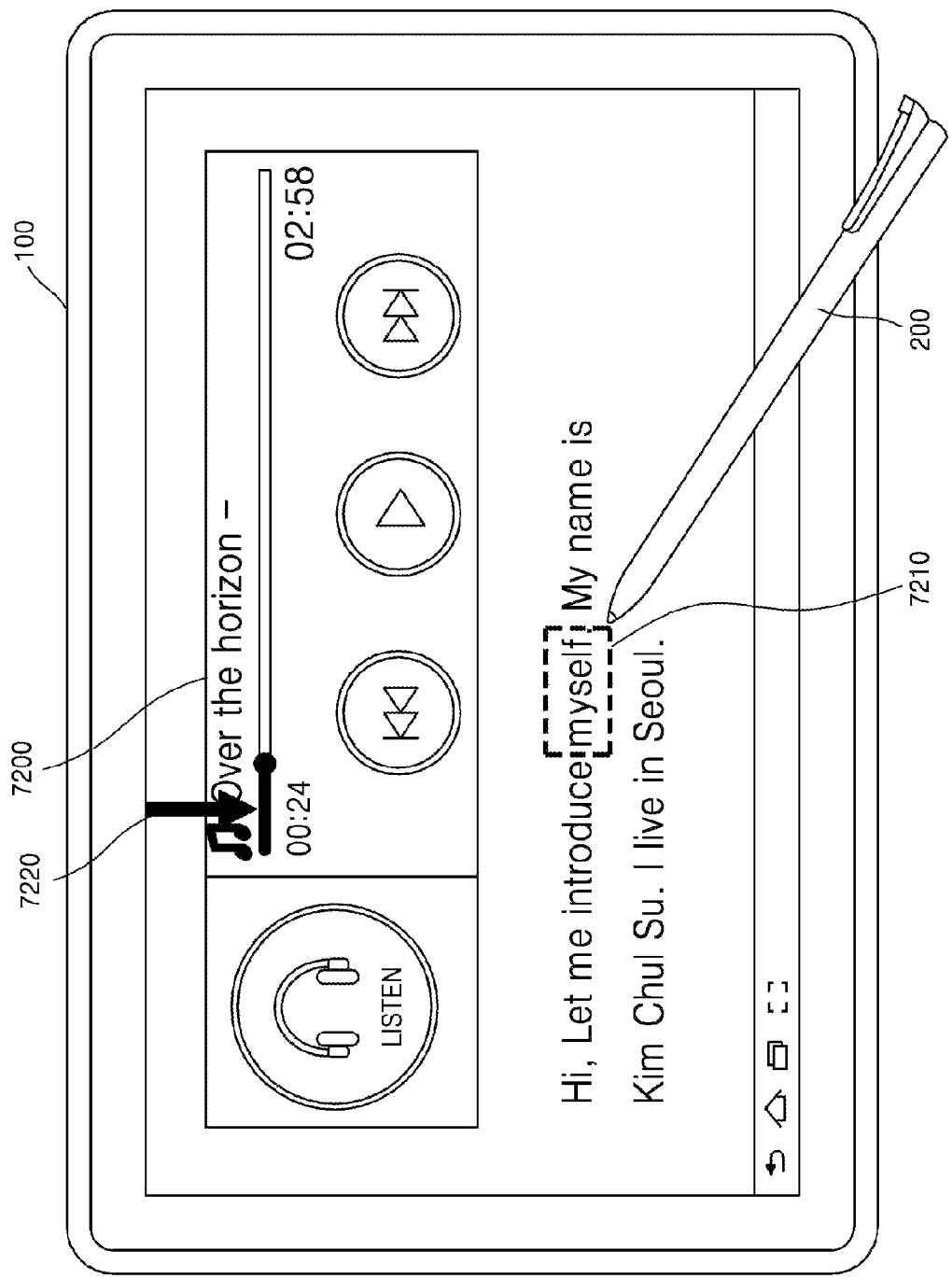

FIGS. 72A and 72B are diagrams of an example of providing, by the device 100, a partial audio segment corresponding to a selected word, according to an exemplary embodiment.

Referring to FIG. 72A, the device 100 may change voice included in audio content 7200 to text, thereby creating a transcript, for example, 'Hi, Let me introduce myself. My name is Kim Chul Su. I live in Seoul'. The device 100 may display the transcript while reproducing the audio content 7200.

According to an exemplary embodiment, the device 100 may receive an input of selecting a certain word 7210, for example, 'myself', included in the transcript.

Referring to FIG. 72B, the device 100 may extract a first timeline, for example, 00:10, when the certain word 7210, for example, 'myself', is output. The device 100 may move a timeline of the audio content 7200 to the first timeline.

Figure 73:
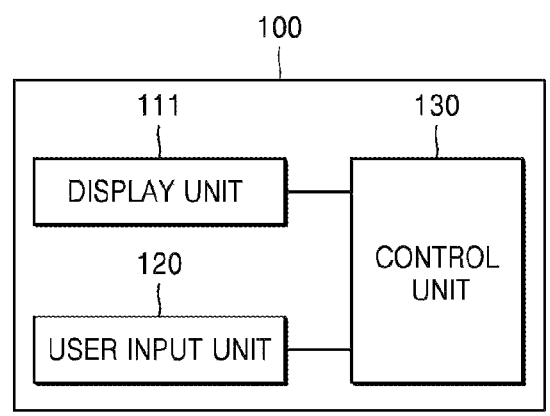
FIGS. 73 and 74 are block diagrams of a structure of a device according to exemplary embodiments.
Figure 74:
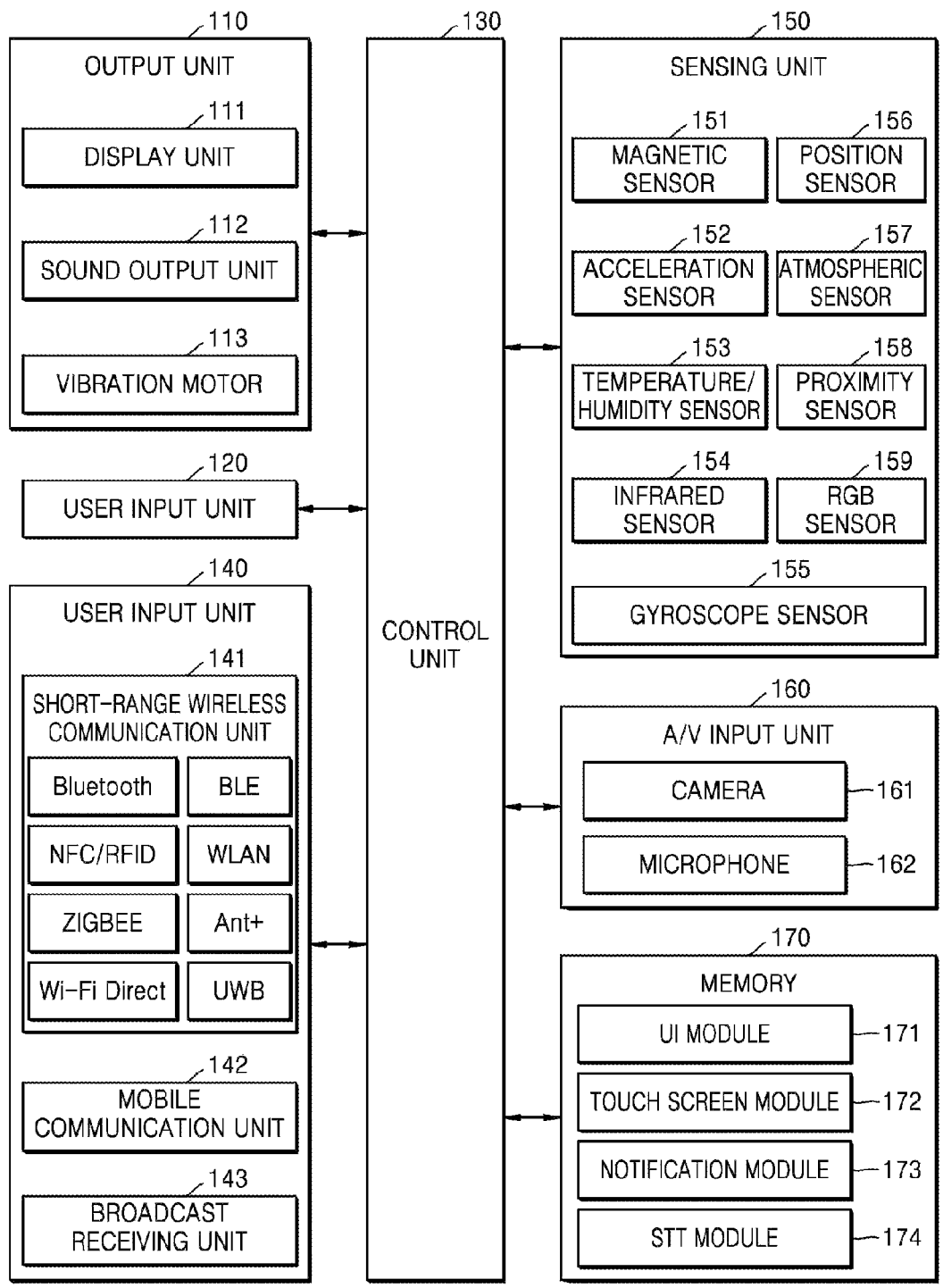

FIGS. 73 and 74 are block diagrams of a structure of the device 100 according to exemplary embodiments.

As shown in FIG. 73, the device 100 according to an exemplary embodiment may include a display unit 111, a user input unit 120, and a control unit 130. The device 100 may be realized by using more or fewer components than the components shown in FIG. 67.

For example, as shown in FIG. 74, the device 100 according to an exemplary embodiment may include an output unit 110, the user input unit 120, the control unit 130, a communication unit 140, a sensing unit 150, an audio/video (A/V) input unit 160, and a memory 170.

Above components of the device 100 will now be described in detail.

The output unit 110 is used to output an audio signal, a video signal, or a vibration signal, and may include the display unit 111, a sound output unit 112, and a vibration motor 113.

The display unit 111 outputs and displays information processed by the device 100. For example, the display unit 111 may display handwritten content on a screen. Also, when partial handwritten content is selected, the display unit 111 may display a control panel including at least one of a reproduce function button and an edit function button. Here, the display unit 111 may display the control panel within a predetermined distance from the partial handwritten content.

The display unit 111 may display a transcript obtained by changing voice to text. For example, the display unit 111 may display a list of transcripts corresponding to multimedia content, for example, video content or audio content.

Meanwhile, when the display unit 111 is configured as a touch screen by forming a layer structure with a touch pad, the display unit 111 may also be used as an input device as well as an output device. The display unit 111 may include at least one of a liquid crystal display (LCD), a thin-film transistor-liquid crystal display (TFT-LCD), an organic light-emitting diode (OLED), a flexible display, a 3D display, and an electrophoretic display. According to an embodiment of the device 100, the device 100 may include at least two display units 111.

The sound output unit 112 outputs audio data received from the communication unit 140 or stored in the memory 170. Also, the sound output unit 112 outputs a sound signal related to a function performed by the device 100, such as a call signal reception sound, a message reception sound, or an alarm sound. The sound output unit 112 may include a speaker or a buzzer.

The vibration motor 113 may output a vibration signal. For example, the vibration motor 113 may output a vibration signal corresponding to an output of audio data or video data, for example, a call signal reception sound or a message reception sound. Also, the vibration motor 113 may output a vibration signal when a touch screen is touched.

The user input unit 120 is used by a user to input data for controlling the device 100. Examples of the user input unit 120 include a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The user input unit 120 may receive a user input of selecting partial handwritten content from the handwritten content displayed on the screen. For example, the user input unit 120 may receive an input of specifying a region of interest on the handwritten content displayed on the screen.

According to an exemplary embodiment, the user input unit 120 may receive an input of activating the reproduce function button or the edit function button through the control panel.

The reproduce function button may include at least one of a reproduce button a pause button, a fast forward button, a rewind button, and a reproduction speed control button. The edit function button may include at least one of an undo button, a redo button, an OCR button, an add button, and an exchange button. The control panel may include a search bar for searching for a partial segment of the partial handwritten content.

The controller 130 generally controls an overall operation of the device 100. For example, the control unit 130 may generally control the output unit 110, the user input unit 120, the communication unit 140, the sensing unit 150, and the A/V input unit 160 by executing programs stored in the memory 170.

The control unit 130 may create the handwritten content by obtaining timestamp information and coordinate information corresponding to each of a plurality of strokes. Also, the control unit 130 may reproduce the partial handwritten content by using time information of strokes included in the partial handwritten content.

The control unit 130 may create the handwritten content while reproducing multimedia content, and store the handwritten content after synchronizing the handwritten content with the multimedia content. The multimedia content may include at least one of video content and audio content.

The control unit 130 may select the partial handwritten content corresponding to the region of interest. For example, the control unit 130 may select the partial handwritten content corresponding to the region of interest based on a stroke unit or a coordinate unit.

The control unit 130 may extract the strokes included in the partial handwritten content, and determine an order of the strokes by using timestamp information corresponding to the strokes. For example, the control unit 130 may determine a stroke that is input first from among the strokes as a start position and a stroke that is input last from among the strokes as an end position.

The control unit 130 may extract moving image content or audio content corresponding to the partial handwritten content, and provide the extracted moving image content or the extracted audio content.

When a plurality of partial handwritten contents are selected, the control unit 130 may provide a list of a plurality of moving image contents corresponding to the plurality of partial handwritten contents.

The control unit 130 may edit the partial handwritten content by using time information of the strokes included in the partial handwritten content.

The communication unit 140 may include at least one component enabling the device 100 to communicate with an external device or a server. For example, the communication unit 140 may include a short-range wireless communication unit 141, a mobile communication unit 142, and a broadcast receiving unit 143.

The short-range wireless communication unit 141 may include a Bluetooth communication unit, a BLE communication unit, an NFC unit, a wireless local area network (WLAN) (Wi-Fi) communication unit, a Zigbee communication unit, an infrared data association (IrDA) communication unit, a Wi-Fi direct (WFD) communication unit, an UWB communication unit, and an Ant+ communication unit, but components included in the short-range wireless communication unit 141 are not limited thereto.

The mobile communication unit 142 transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The broadcast receiving unit 143 receives a broadcast signal and/or broadcast related information from an external source, through a broadcast channel. The broadcast channel may include a satellite channel or a terrestrial broadcasting channel. In some embodiments, the device 100 may not include the broadcast receiving unit 143.

The communication unit 140 may transmit the handwritten content to an external server or an external device. The communication unit 140 may receive the handwritten content edited by an external device from the external device.

The communication unit 140 may receive pulse information, electrocardiogram information, or temperature information from an external wearable device. For example, the device 100 may receive pulse information or temperature information from a smart watch.

The sensing unit 150 may detect a state of the device 100 or a state around the device 100, and transmit the detected state to the control unit 130.

The sensing unit 150 may include at least one of a magnetic sensor 151, an acceleration sensor 152, a temperature/humidity sensor 153, an infrared sensor 154, a gyroscope sensor 155, a position sensor 156 such as a global positioning system (GPS), an atmospheric sensor 157, a proximity sensor 158, and an red, green, blue (RGB) sensor 159 such as an illuminance sensor, but a component included in the sensing unit 150 is not limited thereto. Because functions of each sensor may be intuitively inferred by one of ordinary skill in the art based on its name, details thereof are not described herein.

The A/V input unit 160 is used to receive an audio signal or a video signal, and may include a camera 161 and a microphone 162. The camera 161 may obtain an image frame of a still image or a moving image via an image sensor in a video telephone mode or a photographing mode. An image captured via the image sensor may be processed by the control unit 130 or a separate image processor (not shown).

An image frame processed by the camera 161 may be stored in the memory 170 or transmitted to an external device through the sensing unit 150. According to an embodiment of the device 100, the device 100 may include at least two cameras 161.

The microphone 162 receives an external sound signal and processes the external sound signal to electric voice data. For example, the microphone 162 may receive a sound signal from an external device or a narrator. The microphone 162 may use any one of various noise removing algorithms to remove noise generated while receiving the external sound signal.

The memory 170 may store a program for processes and control of the control unit 130, and may store input/output data, such as an application, handwritten content, multimedia content, or a transcript.

The memory 170 may include at least storage medium from among a flash memory, a hard disk, a multimedia card micro type memory, a card type memory (for example, a secure digital (SD) card or an extreme digital (XD) card), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the device 100 may operate a web storage server or a cloud server that performs a storage function of the memory 170 in the Internet.

Programs stored in the memory 170 may be classified into a plurality of modules based on functions, and may be classified into a UI module 171, a touch screen module 172, a notification module 173, and an STT module 174.

The UI module 171 may provide a specialized UI or GUI linked to the device 100 according to applications. The touch screen module 172 may detect a touch gesture of a user on a touch screen, and transmit information about the touch gesture to the control unit 130. The touch screen module 172 according to an exemplary embodiment may recognize and analyze a touch code. The touch screen module 172 may be configured as separate hardware including a controller.

Various sensors may be disposed inside or around the touch screen to detect a touch or a proximity touch on the touch screen. An example of a sensor for detecting a touch on the touch screen includes a tactile sensor. The tactile sensor detects a contact that can be felt by a person on a certain object. The tactile sensor may detect various types of information, such as a roughness of a contact surface, a rigidness of a contact object, and a temperature of a touch point.

Another example of a sensor for detecting a touch on the touch screen includes a proximity sensor.

The proximity sensor detects an existence of an object approaching or near a predetermined detection surface by using electromagnetic field force or infrared ray, without having to detect a mechanical contact. Examples of the proximity sensor include a transmission photoelectric sensor, a direct reflective type photoelectric sensor, a mirror reflective type photoelectric sensor, a high frequency oscillation proximity sensor, a capacitance type proximity sensor, a magnetic type proximity sensor, and an infrared proximity sensor. Examples of a touch gesture of a user include tap, touch and hold, double-tap, drag, panning, flick, drag-and-drop, and swipe.

The notification module 173 may generate a signal for notifying an event occurrence in the device 100. Examples of an event that occurs in the device 100 include call signal reception, a message reception, key signal input, and schedule notification. The notification module 173 may output a notification signal in a video signal format through the display unit 111, in an audio signal format through the sound output unit 112, or in a vibration signal format through the vibration motor 113.

The STT module 174 may change voice included in multimedia content to text, thereby creating a transcript corresponding to the multimedia content. Here, the transcript may be mapped to reproduce time information of the multimedia content.

As described above, according to the one or more of the above exemplary embodiments, the device 100 may reproduce drawing processes of partial handwritten content selected by a user, by using time information of strokes.

The methods described above may be recorded on a computer readable recording medium by being realized in computer programs executed by using various computers. The computer readable recording medium may include at least one of a program command, a data file, and a data structure. The program commands recorded in the computer readable recording medium may be specially designed or well known to one of ordinary skill in the computer software field. Examples of the computer readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter.

While one or more exemplary embodiments have been described with reference to the figures, it will be understood by those of ordinary skill in the art that various changes in form and details may be made therein without departing from the spirit and scope of the present disclosure as defined by the following claims.

What is claimed is:

1. A device comprising:
    a display configured to display handwritten content in response to an analog handwritten input of a user;
    a memory configured to store data of the handwritten content, the data of the handwritten content comprising strokes in association with time stamp information indicating a time of input of the analog handwritten input corresponding to the strokes of the handwritten content; and
    a processor configured to control the display to provide a user interface configured to receive a user input of selecting a portion of the handwritten content displayed on the display corresponding to at least one stroke of the handwritten content, receive a user input of editing first content corresponding to the portion of the handwritten content into second content, store strokes and time stamp information of the second content in the memory, and sequentially reproduce the handwritten content from the memory by reproducing the second content instead of the first content on the display when the portion of the handwritten content is reproduced.

2. The device of claim 1, wherein the processor is further configured to extract strokes from the handwritten content and determine an order of the strokes of the handwritten content by using the time stamp information of the handwritten content corresponding to the strokes of the handwritten content.

3. The device of claim 1, wherein the processor is further configured to reproduce the second content by determining a first stroke that is input first from among the strokes of the second content as a start position and a last stroke that is input last from among the strokes of the second content as an end position.

4. The device of claim 1, wherein, when the portion of the handwritten content is selected, the processor is further configured to control the display to display a control panel comprising an edit function button within a certain distance from the portion of the handwritten content.

5. The device of claim 1, wherein the user interface is further configured to receive a user input of deleting the first content and drawing the strokes of the second content in a region where the first content is deleted.

6. The device of claim 5, wherein the processor is further configured to add information about the strokes of the second content to a timeline corresponding to the deleted first content from a list of a plurality of strokes corresponding to the handwritten content.

7. The device of claim 5, wherein the processor is further configured to synchronize the second content and a segment of multimedia content corresponding to the first content.

8. The device of claim 1, wherein the processor is further configured to reproduce multimedia content synchronized with the handwritten content.

9. A method of reproducing content, the method being performed by a device and comprising:
    displaying handwritten content in response to an analog handwritten input of a user on a display of the device;
    storing data of the handwritten content in memory, the data of the handwritten content comprising strokes in association with time stamp information indicating a time of input of the analog handwritten input corresponding to the strokes of the handwritten content;
    receiving a user input of selecting a portion of the handwritten content corresponding to at least one stroke of the handwritten content that is displayed on the display of the device;
    receiving a user input of editing first content corresponding to the portion of the handwritten content into second content;
    storing strokes and time stamp information of the second content in the memory; and
    sequentially reproducing the handwritten content from the memory by reproducing the second content instead of the first content on the display when the portion of the handwritten content is reproduced.

10. The method of claim 9, wherein the reproducing comprises:
    extracting strokes from the handwritten content; and
    determining an order of the strokes of the handwritten content by using time stamp information of the handwritten content corresponding to the strokes of the handwritten content.

11. The method of claim 9, wherein the reproducing the second content comprises determining a first stroke that is input first from among the strokes of the second content as a start position and a last stroke that is input last from among the strokes of the second content as an end position.

12. The method of claim 9, further comprising:
    displaying a control panel comprising an edit function button within a certain distance from the portion of the handwritten content.

13. The method of claim 9, wherein the receiving comprises receiving a user input of deleting the first content and drawing the strokes of the second content in a region where the first content is deleted.

14. The method of claim 13, further comprising:
    adding information about the strokes of the second content to a timeline corresponding to the deleted first content from a list of a plurality of strokes corresponding to the handwritten content.

15. The method of claim 13, further comprising:
    synchronizing the second content and a segment of multimedia content corresponding to the first content.

16. The method of claim 9, further comprising:
    reproducing multimedia content synchronized with the handwritten content.

17. A non-transitory computer-readable recording medium having recorded thereon a program, which when executed by a device causes the device to execute a method of reproducing content, the method comprising:
    displaying handwritten content in response to an analog handwritten input of a user on a display of the device;
    storing data of the handwritten content in memory, the data of the handwritten content comprising strokes in association with time stamp information indicating a time of input of the analog handwritten input corresponding to the strokes of the handwritten content;

receiving a user input of selecting a portion of the handwritten content corresponding to at least one stroke of the handwritten content that is displayed on the display of the device;

receiving a user input of editing first content corresponding to the portion of the handwritten content into second content;

storing strokes and time stamp information of the second content in the memory; and sequentially reproducing the handwritten content from the memory by reproducing the second content instead of the first content on the display when the portion of the handwritten content is reproduced.

* * * * *